United States Patent
Munemoto

(10) Patent No.: US 7,603,183 B1
(45) Date of Patent: Oct. 13, 2009

(54) EDITOR DEVICE AND RECORDED MEDIUM ON WHICH EDITOR PROGRAM IS RECORDED

(75) Inventor: Kenichi Munemoto, Osaka (JP)

(73) Assignee: Digital Electronics Corporation, Osaka (JP)

( * ) Notice: Subject to any disclaimer, the term of this patent is extended or adjusted under 35 U.S.C. 154(b) by 1362 days.

(21) Appl. No.: 10/069,542

(22) PCT Filed: Aug. 28, 2000

(86) PCT No.: PCT/JP00/05803

§ 371 (c)(1),
(2), (4) Date: Feb. 27, 2002

(87) PCT Pub. No.: WO01/16657

PCT Pub. Date: Mar. 8, 2001

(30) Foreign Application Priority Data

| Aug. 31, 1999 | (JP) | ............................. | 11-246402 |
| Aug. 31, 1999 | (JP) | ............................. | 11-246407 |
| Aug. 31, 1999 | (JP) | ............................. | 11-246417 |
| Aug. 31, 1999 | (JP) | ............................. | 11-246445 |
| Sep. 2, 1999 | (JP) | ............................. | 11-249221 |
| Sep. 2, 1999 | (JP) | ............................. | 11-249227 |

(51) Int. Cl.
*G05B 11/01* (2006.01)
*G05B 15/00* (2006.01)
*G06F 3/00* (2006.01)
*G06F 9/44* (2006.01)

(52) U.S. Cl. ............................. 700/17; 700/83; 715/762; 717/110

(58) Field of Classification Search ................ 700/17, 700/83; 717/110; 715/762
See application file for complete search history.

(56) References Cited

U.S. PATENT DOCUMENTS 5,251,122 A * 10/1993 Sakamoto et al. ............. 700/18

(Continued)

FOREIGN PATENT DOCUMENTS

EP 0092312 A 10/1983

(Continued)

OTHER PUBLICATIONS

"A Visual Developing Method for Sequence Controller Programs"; May 1997; Information Processing Academic Research Reports, vol. 97, No. 47, p. 65-72. (no English translation).

(Continued)

*Primary Examiner*—Ronald D Hartman, Jr.
(74) *Attorney, Agent, or Firm*—Nixon & Vanderhye

(57) ABSTRACT

A procedure (user program) in which a PLC 2 controls operation of input-output apparatuses (4) is generated on a ladder window by using a ladder editor (32*a*). A screen (user screen) on which a programmable display apparatus (1) displays states of the input-output apparatuses (4) is generated on a screen generating window by a screen generating editor (32*b*). For example, when a symbol on a ladder diagram on the ladder window next to the screen generating window is dragged and dropped onto the screen generating window, attribute data including a name and address of the input-output apparatus that relates to the symbol is copied from a ladder file (33*a*) for registering the user program to a screen file (33*b*) for registering the user screen, and a mark corresponding to the attribute data is displayed on the screen generating window. This eliminates a need of a common database for registering the attribute data.

12 Claims, 81 Drawing Sheets

U.S. PATENT DOCUMENTS

| | | | |
|---|---|---|---|
| 5,267,145 A | | 11/1993 | Zifferer et al. |
| 5,321,829 A | * | 6/1994 | Zifferer ........................ 714/46 |
| 5,404,288 A | * | 4/1995 | McDunn ....................... 700/21 |
| 5,485,620 A | * | 1/1996 | Sadre et al. .................. 717/162 |
| 5,576,946 A | * | 11/1996 | Bender et al. ................. 700/17 |
| 5,812,394 A | * | 9/1998 | Lewis et al. ................... 700/17 |
| 6,854,111 B1 | * | 2/2005 | Havner et al. ................ 717/163 |

FOREIGN PATENT DOCUMENTS

| | | |
|---|---|---|
| JP | 3-100729 | 10/1991 |
| JP | 5-17702 | 3/1993 |
| JP | 05-189012 | 7/1993 |
| JP | 5-210404 | 8/1993 |
| JP | 6-195214 | 7/1994 |
| JP | 8-263111 | 10/1996 |
| JP | 09-325878 | 12/1997 |
| JP | 2809009 | 7/1998 |
| JP | 11-175326 | 7/1999 |
| JP | 11-212607 | 8/1999 |
| JP | 2003-117994 | 6/2005 |

OTHER PUBLICATIONS

Communication and European search report for EP 00 95 5074.

Japanese Office Action (and English translation) dated Jun. 29, 2004 for corresponding Japanese Patent Application No. 2001-222084 (divisional application of JP 11-246402).

Japanese Office Action (and English translation) dated Jun. 29, 2004 for corresponding Japanese Patent Application No. 2001-222092 (divisional application of JP 11-246407).

European Search Report mailed Nov. 27, 2007 for European Patent Application No. 07009510.4.

* cited by examiner

FIG. 5 (a) DATA STRUCTURE

| HEADER CODE |
| --- |
| MEMORY SIZE |
| OBJECT TYPE |
| RESERVATION |
| NUMBER OF ADDRESS INFORMATION |
| ADDRESS INFORMATION 1 |
| ⋮ |
| ADDRESS INFORMATION N |
| RESERVATION |

FIG. 5 (b) OBJECT TYPE

| Bit0 | BIT SWITCH |
| --- | --- |
| Bit1 | TOGGLE SWITCH |
| Bit2 | LAMP |
| Bit3 | NUMERICAL VALUE INDICATOR |
| Bit4 | BAR GRAPH |
| Bit5 | CIRCLE GRAPH |
| Bit6 | SEMI-CIRCLE GRAPH |
| Bit7 | TANK GRAPH |
| Bit8 | METER GRAPH |
| Bit9 | SETTING VALUE INDICATOR |

FIG. 5 (c) ADDRESS INFORMATION

| ADDRESS |
| --- |
| RESERVATION |
| ADDRESS ADDITIONAL INFORMATION |
| RESERVATION |
| OBJECT TYPE |
| RESERVATION |

FIG. 38 (a) DATA STRUCTURE

| HEADER CODE |
| --- |
| MEMORY SIZE |
| OBJECT TYPE |
| RESERVATION |
| NUMBER OF SYMBOLS |
| ADDRESS INFORMATION 1 |
| ⋮ |
| ADDRESS INFORMATION N |
| APPOINTED NUMBER OF BYTES |
| RESERVATION |

FIG. 38 (b) OBJECT TYPE

| Bit0 | BIT SWITCH |
| --- | --- |
| Bit1 | TOGGLE SWITCH |
| Bit2 | LAMP |
| Bit3 | NUMERICAL VALUE INDICATOR |
| Bit4 | BAR GRAPH |
| Bit5 | CIRCLE GRAPH |
| Bit6 | SEMI-CIRCLE GRAPH |
| Bit7 | TANK GRAPH |
| Bit8 | METER GRAPH |
| Bit9 | SETTING VALUE INDICATOR |

FIG. 38 (c) ADDRESS INFORMATION

| SYMBOL NAME |
| --- |
| ADDRESS |
| ADDRESS ADDITIONAL INFORMATION |
| COMMENTS OF VARIABLE NUMBER |
| OBJECT TYPE |
| APPOINTED NUMBER OF BYTES |
| RESERVATION |

| PARTS INFORMATION | |
|---|---|
| ADDRESS | XB0001 |
| TYPE on | SW3D101,SW3D102,···· |
| TYPE off | |
| NAME PLATE on | SW1 |
| NAME PLATE off | |

FIG. 43
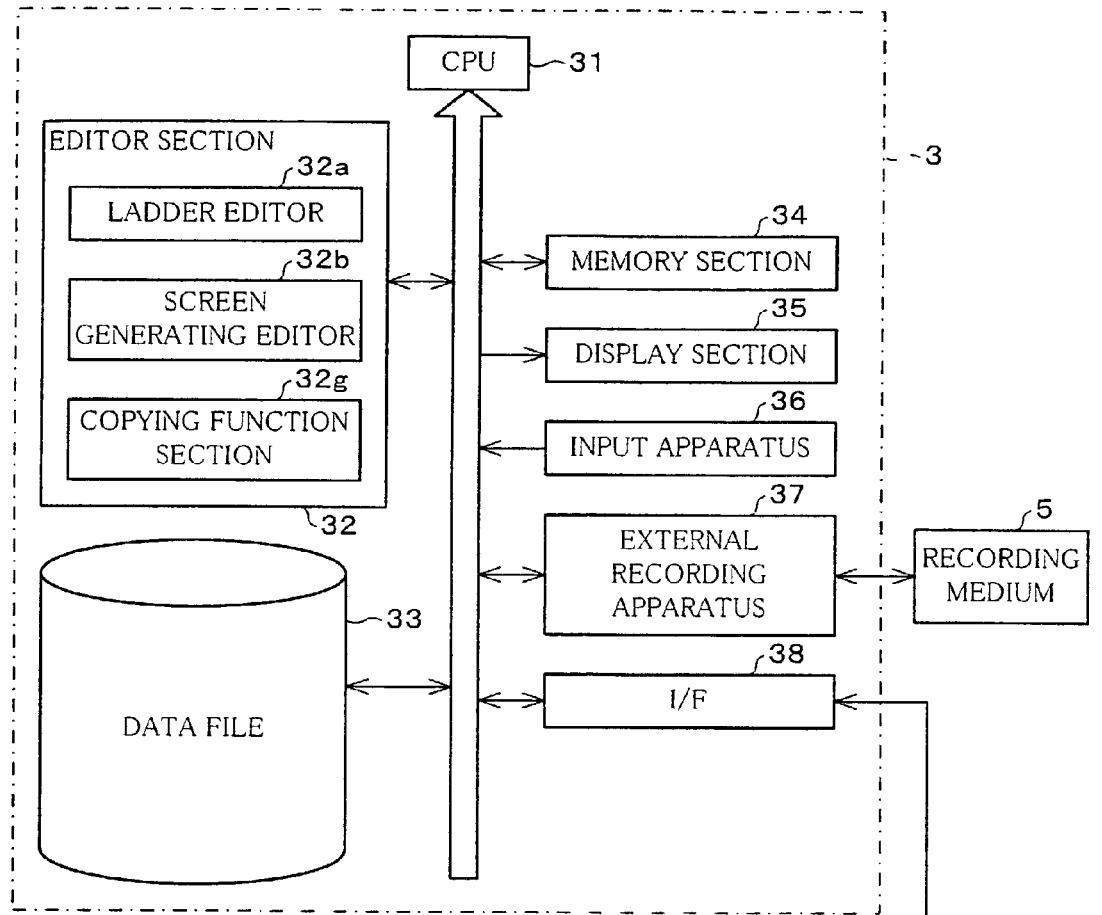
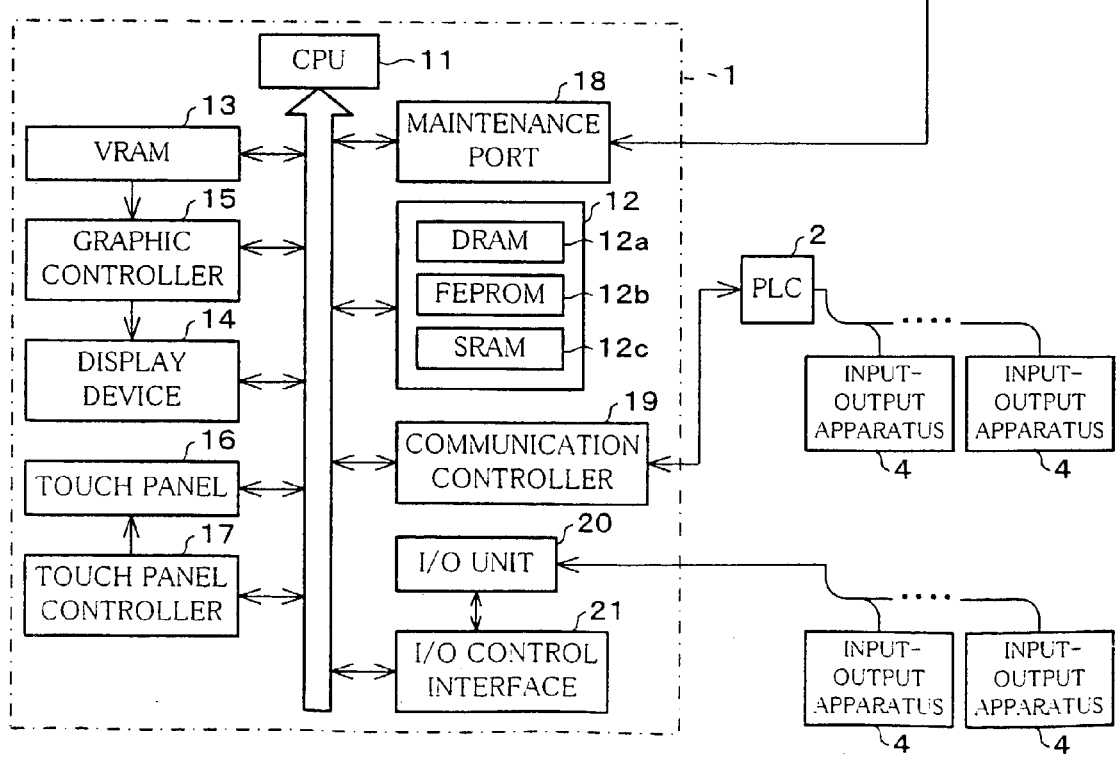

FIG. 52 (a)

| NAME | SW1 |
|---|---|
| TYPE | BIT |
| HOLDING | NOT SET |
| GLOBAL | SET |
| FUNCTION | SWITCH |

FIG. 52 (b)

VARIABLE NUMBER FUNCTION
ATTRIBUTE SETTING

NAME    SW1
TYPE    [ BIT ]
        INTEGRAL NUMBER
        REAL NUMBER
        DISCRETE

HOLDING ☐    FUNCTION [SWITCH ▼]
GLOBAL  ☐

FIG. 57
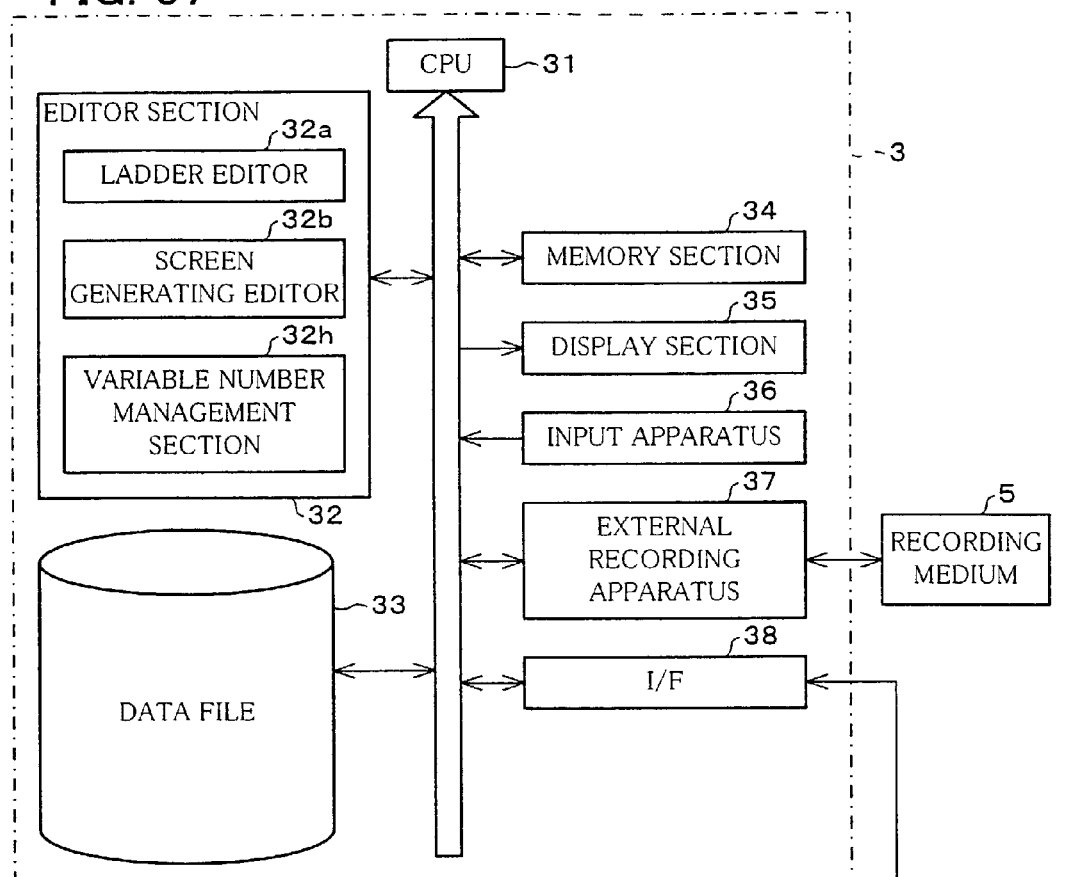
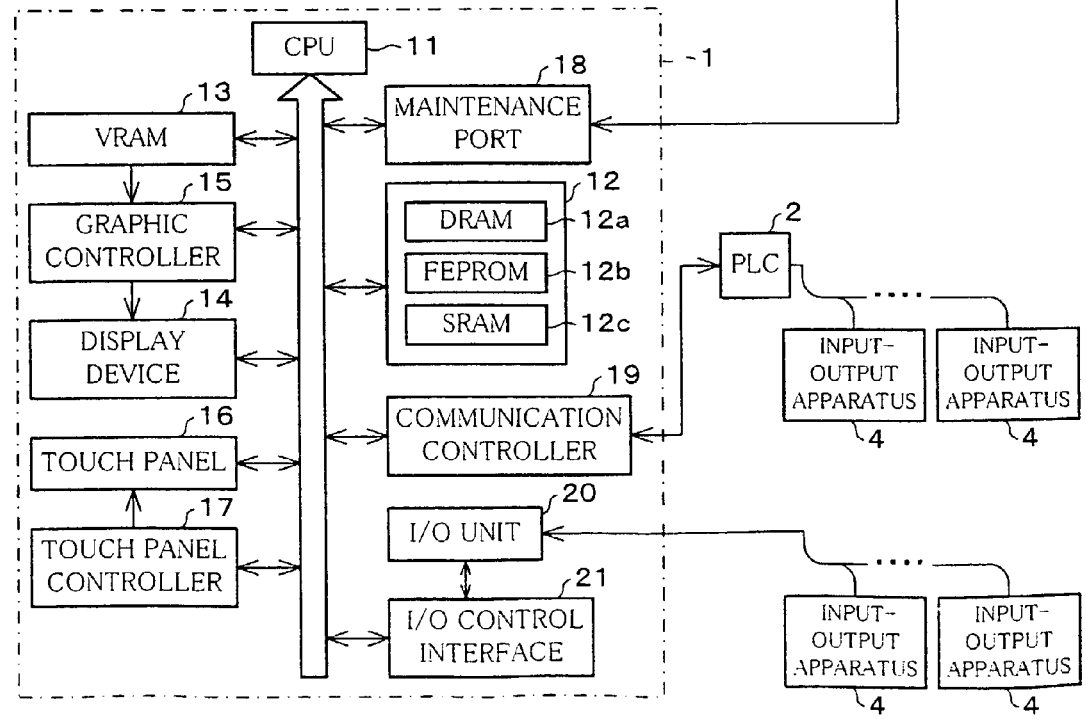

FIG. 68

| VARIABLE NUMBER | COMMAND | |
|---|---|---|
| AUTOMATIC | LD | X0010 |
| MANUAL | ANDN | X0011 |
| AUTOMATIC LAMP OUTPUT | OR | Y0010 |
| STOP | ANDN | X0012 |
| AUTOMATIC LAMP OUTPUT | OUT | Y0010 |
| MANUAL | LD | X0011 |
| AUTOMATIC | ANDN | X0010 |
| MANUAL LAMP OUTPUT | OR | Y0010 |
| STOP | ANDN | X0012 |
| MANUAL LAMP OUTPUT | OUT | Y0010 |
| | RET | |

~LL₁

FIG. 70
| VARIABLE NUMBER | COMMAND | |
|---|---|---|
| SET | CTU | **** |
| RESET | LD | X0100 |
| CNT.R | OUT | Y0100 |
| CNT.EQ | LDEQ | |
| CNT.UP | OUT | Y0101 |
| | RET | |
~LL₁
FIG. 71 (a)
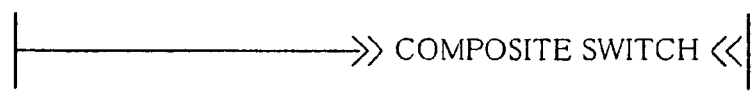
FIG. 71 (b)
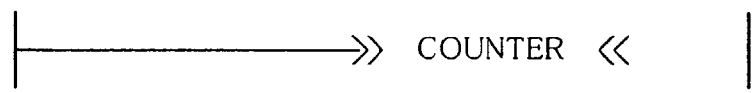

FIG. 73
| LADDER SYMBOL | LADDER COMMAND | PARTS |
|---|---|---|
| ─┤├─ | LD<br>AND | SWITCH |
| ─┤/├─ | LDN<br>ANDN | SWITCH |
| ─○─ | OUT | LAMP<br>LED |
| ─[CTU]─ | CTU | UP COUNTER |
|  |  |  |
FIG. 74 (a)
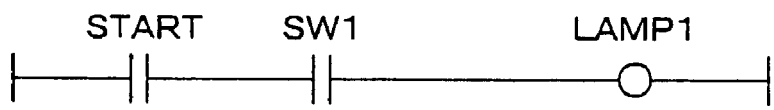
FIG. 74 (b)
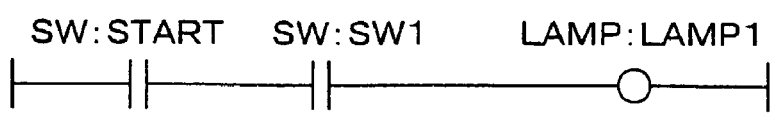

FIG. 76
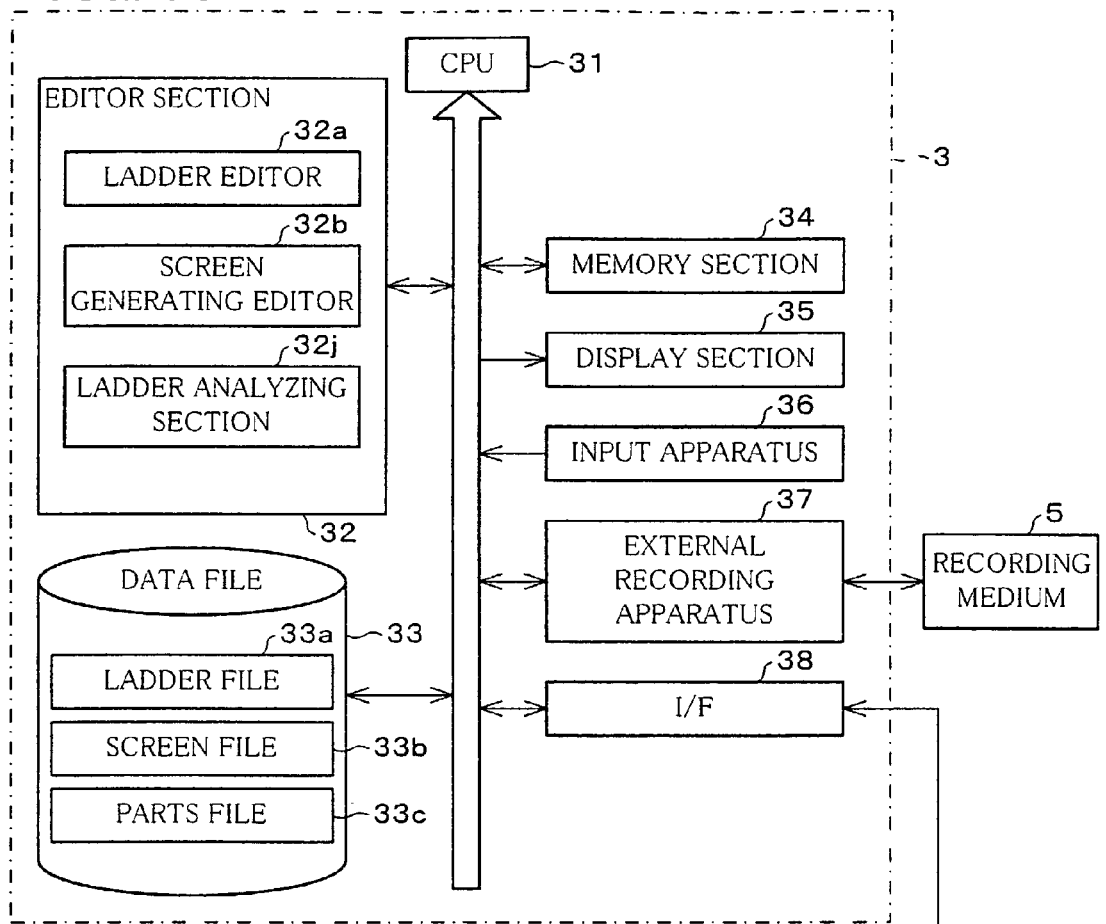
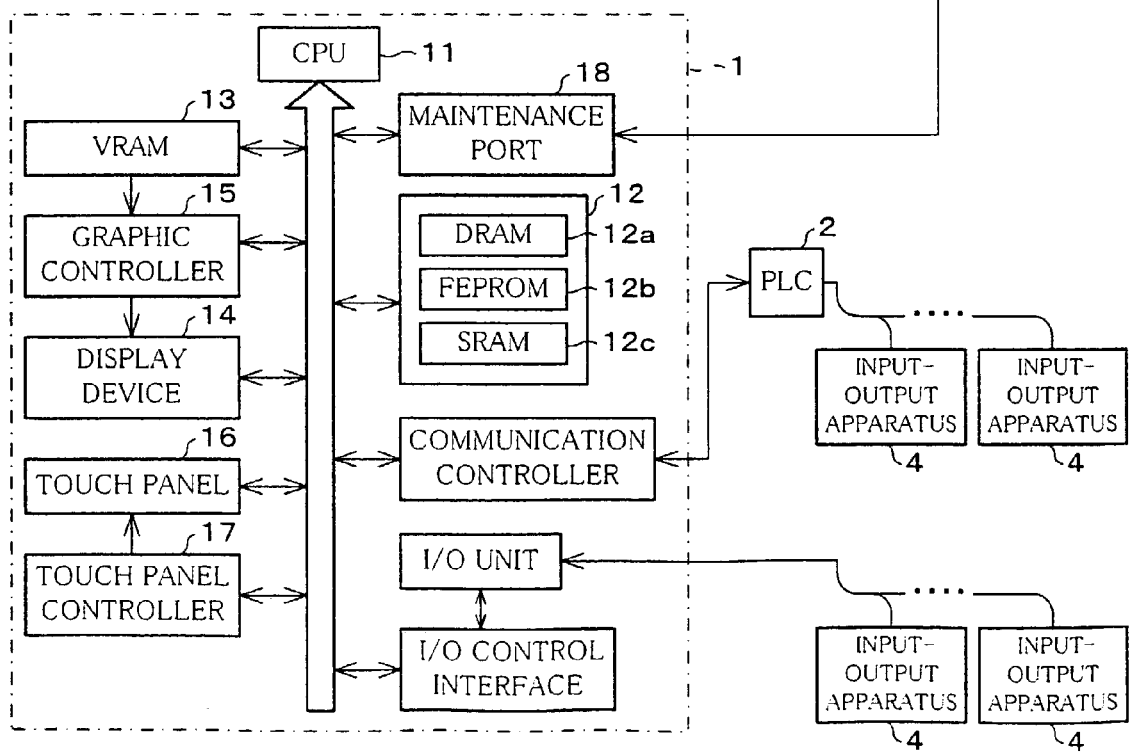

EDITOR DEVICE AND RECORDED MEDIUM ON WHICH EDITOR PROGRAM IS RECORDED

This application is the US national phase of international application PCT/JP00/05803 filed Aug. 28, 2000 which designated the U.S.

TECHNICAL FIELD

The present invention relates to an editing apparatus (editor) and a recording medium for use in a system having a function of displaying a state of an apparatus to be controlled (control-object apparatus), and a function of controlling operation of the control-object apparatus, the editing apparatus being for programming display content corresponding to the state of the control-object apparatus and for programming a control procedure of the control-object apparatus, the recording medium storing an editing program therein.

BACKGROUND ART

Industrial control devices called as programmable logic controllers (hereinafter, just referred to as PLCs) are provided with a hardware part, which is mainly composed of a CPU and a memory, and a software part for controlling, in order to realize various control, including sequence control. The software part includes designing for a sequence control flow for driving a PLC in accordance with a control system originally designed, converting the control flow into a command language, writing the command language into the memory, and the like operation. In general, this series of operation is called programming process.

Such programming process uses a unique language so that a program can be prepared easily without expert knowledge in computer. Various user-friendly programming languages have been developed. Currently, IEC (International Electrotechnical Commission) sets standard programming languages (IEC 6 1131-3). The standard programming languages are those 5 languages, namely: SFC (Sequential Function Chart); LD (Ladder Diagram); IL (Instruction List); FBD (Function Block Diagram); and ST (Structured Text).

As mentioned above, an environment in which the various programming languages can be used for developing programs is about to be accomplished. For example, the Ladder Diagram (LD), which has been so popular until now because the Ladder Diagram can be designed comparatively easily by using relay symbols, is the most-widely used programming languages, even today. As a programming tool for programming operation using the programming language of this kind, programming software such as a ladder editor has come into wide use. When used in a computer apparatus such as a personal computer, the software is capable of generating a ladder diagram and the like in a symbol-including format, thereby facilitating easy creating and editing of programs.

On the other hand, a programmable display apparatus, which is an HMI (Human Machin Interface) apparatus, is a display apparatus for operation, provided with a dot display screen, an input switch for operation, an interface for communicating with a host controller (PLC), a program memory for control, such as operation of inputting on the screen, and the like parts. In general, the programmable display apparatus, which performs a graphic display, can have functions as an operation panel, a switch, a display lamp, and the like. Further, the programmable display apparatus has functions as, for example, various kinds of monitors for management, such as an operation state of the control-object apparatus (device) or operations instructions, and a terminal for input of a setting value for apparatuses.

Moreover, recently such a programmable display apparatus has been introduced, which has a function of controlling the PLC by having an input-output unit for connecting the control-object apparatus thereto.

A control screen (display content program) displayed on this kind of programmable display apparatus can be generated by a user personally by using screen generating software (screen generating editor). In generating screens, the user generates a control screen that he desires on a personal computer or the like, by using parts (marks) such as a switch, a lamp, ten keys, a meter indicator, a graph indicator and the like, and a graphic function, which are provided by screen generating software.

Moreover, the SCADA (Supervisory Control And Data Acquisition), which is software for supervisory control, has come into wide use as software to provide an HMI environment. The SCADA is highly functional graphic monitoring software for displaying driving operation of a machine and an operation panel of a control panel. Similarly to the screen generating editor, the SCADA is so arranged that the control screen can be generated by using the graphic function for basic figures and prepared-in-advance parts.

Furthermore, the screen generating editor is provided in advance with composite parts in which not only a single function but a plurality of functions are composed. Examples of the composite parts include a composite switch, a counter and the like. For example, the composite switch is composed of a plurality of switches incorporated, and if necessary may be provided with a lamp that operates in a synchronizing manner with operation of the switches. Moreover, the counter is provided with a numeral value indicator for displaying both of a setting value and a counting result, a lamp that is lit up when counting up is done, a button for resetting, and the like. The composite parts of this kind are usually registered in a library format, and are provided in such a manner that the user can arbitrarily select the composite parts on a window of the screen generating editor.

The thus generated control screen is transferred as screen data to the programmable display apparatus, and stored therein. When the PLC is operated, the programmable display apparatus displays the parts or figures on the control screen based on data exchanged between the programmable display apparatus and the PLC, in accordance with the operation state of the control-object apparatus.

By the way, generating (programming) of a control procedure program by using the ladder editor or the like, and generating (screen generating) of a display content program by using screen generating editor are generally carried out independently in general. For example, in case the display content program is generated in accordance with the generated control procedure program, design materials are prepared in advance, which are notes in a table format in which inputted name and address of each device are written down when the control procedure program is generated. The generating of the display content program, including defining I/O addresses and the like, is carried out by looking up the design materials. Moreover, the generating of the control procedure program in accordance with the generated display content program is also carried out in accordance with the design material prepared in advance.

However, those methods requires pre-preparation of the design materials that correspond to thus generated program, thereby causing such a problem that efficiency of operation is lowered. Moreover, in the methods, the programming process is carried out solely by inputting by the user. Therefore, the programming method has low efficiency of operation, thereby having such a problem that its programming process needs a long time.

Because the programming process is carried out by inputting by the user, there is a risk that erroneous input may be caused when one program is generated after generation of another program, by inputting in accordance with the design materials. Moreover, when such erroneous input is caused, there is a problem that more debugging of program is necessary. Furthermore, a lot of time and effort are necessary, because inputting for the generation of the display content program is needed, besides the inputting for the generation of the control procedure program.

Moreover, in the programming method, (a) addresses (I/O addresses) of the devices and (b) allocation of ladder commands and the parts need to be inputted separately, because both of the programs are independently programmed, even though the programs are programmed so that common devices are corresponded in both the programs.

As an invention to solve the drawbacks, Japanese Publication of Unexamined Patent Application No. 11-175326 (published on Jul. 2, 1999) discloses an editing apparatus that corresponds a ladder editor for generating a ladder diagram (ladder program), and a screen generating editor for generating a screen, in terms of ladder symbols (ladder command) and parts (mark) to be allocated in the screen. By dragging and dropping on a screen generating window the ladder symbol displayed on a ladder window, the editing apparatus stores, in a common database, attribute data including names and addresses of control-object apparatuses that have a common symbol and at least one common mark corresponding to the common symbol, meanwhile the editing apparatus displays the mark corresponding to the symbol dragged on the screen generating window, in accordance with the attribute data. Moreover, the editing apparatus is so arranged that the editing apparatus will carries out an operation inverse to that operation. In case where one of the ladder diagram and the screen has been prepared in advance, this enables a user to generate another one easily by dragging and dropping operation or the like operation, in accordance with the one of the ladder diagram and the screen.

However, the editing apparatus disclosed in the publication needs to have separate common databases for storing the attribute data, that is, the ladder file for the ladder editor and screen file for the screen generating editor, even though the editing apparatus use command data so as to avoid repeating input of duplicate data for the ladder editor and the screen generating editor. Further, because the attribute data is stored in both files when the generated ladder diagram (user program) and the screen (user screen) is finally registered respectively in the ladder file and the screen file, thereby registering the attribute data in duplicate, again.

Moreover, the attribute data is copied from the command database to one of the ladder file and the screen file. Thus, in order to use data of an external system between the ladder file and the screen file in common, gone through is such a procedure that the data of the system is copied to the common database, then the data is copied to the ladder file and the screen file.

As described above, because the conventional editing apparatus uses special files for data management, there is a drawback that the database is not used efficiently.

Moreover, in order to give the ladder diagram more-easy-to-look appearance, the ladder diagram generated by the ladder editor shows, beside the ladder symbols as shown in FIG. 84(a), names and operation of the control-object apparatuses (such as a switch and a lamp) corresponding to the ladder symbols, comments and the like. Such incidental information of the ladder symbols are usually inputted by the ladder editor when addresses to the inputted ladder symbols are allotted, in such a manner that the incidental information is allotted together with the addresses.

On the other hand, as shown in FIG. 84(b), it is possible to display parts (for example, the switch or the lamp) on the screen, which is generated by the screen generating editor, the parts being attached with the incidental information regarding the parts. Such incidental information is inputted by the screen generating editor, in such a manner that the incidental information is associated with the addresses, when the parts corresponding to the addresses are allotted onto the base screen.

However, with the above-mentioned method, because the incidental information is inputted individually in the ladder editor and the screen generating editor, the more incidental information to be inputted, the more time and effort are required. Moreover, because the incidental information is written into one program, while looking up the design materials corresponding to another program, there is a risk of occurring of the erroneous input, which makes the debugging of the program difficult. Further, it is necessary to prepare in advance the design materials corresponding to the generated program, thereby lowering the operation efficiency.

Moreover, the editing apparatus is capable of generating the ladder diagram and the screen at the same time, but in an inefficient way. Therefore, in general, it is preferable that one of the ladder diagram and the screen is generated first, followed by generation of the other. Therefore, the above-mentioned method is not suitable for the case where the ladder diagram and the screen are generated at the same time. Hence, in case there is alternation in the ladder command or the mark when one of the ladder diagram and the screen is generated in accordance with the other that has been already generated, it is necessary to correct the program (the ladder diagram or the screen) that has been already generated, thereby causing such a problem that efficiency of the programming is reduced.

Furthermore, the editing apparatus registers, as one program in file, that data regarding the ladder command or the mark, which has been inputted by one of the editors. The editing apparatus uses the data to generate the other of the programs. Because of this, it is impossible to generate one of or both of the programs in accordance with pre-prepared data common to both the programs.

Further, in case the ladder diagram is generated in accordance with the generated screen, the editing apparatus is capable of automatically generating one ladder command for one mark, but is incapable of automatically generating a suitable ladder circuit for the above-described composite parts by incorporating a plurality of the ladder commands.

Furthermore, the editing apparatus has a problem that processing efficiency is low because of a need of copying to the screen generating editor the data (device names, addresses and the like) common to the ladder program and the user screen, every time the ladder symbol is dragged and dropped one by one onto the screen generating window. Moreover, with this method, because the user repeats the dragging and dropping of the ladder symbols from the ladder window to the screen generating window, there is a risk that such erroneous operation that some of the ladder symbols are not dragged and dropped.

DISCLOSURE OF INVENTION

The present invention has an object of providing an editing apparatus and a recording medium that stores an editing program, which can efficiently use a database while still having such operability of a conventional editing apparatus that enables the conventional editing apparatus to avoid duplicate input of data, and can easily realize data to be used in common with an external system. Moreover, the present invention has an object of providing an editing apparatus and a recording medium that stores an editing program, which can simplify the input of incidental information so that display content program and control procedure program can be efficiently generated.

Similarly to the conventional editing apparatus, the present invention allows easy generation of a program, and suitable for dealing with various generation formats of program. Moreover, the present invention is suitable for automatic generation of the control procedure program, which deals with composite parts that are inputted when the display content program is generated. Further, the present invention is suitable for efficient and error-free generation of the display content program in accordance with information in the control procedure program.

(1) In order to achieve the above objects, an editing apparatus of the present invention is provided with (i) first editing means for generating a display content program for setting a content of display for displaying states of control-object apparatuses, (ii) second editing means for generating a control procedure program for setting a procedure of control for controlling the control-object apparatuses, and (iii) data copying means for copying data common to the display content program and the control procedure program, from/to a display content program file to/from a control procedure program file, where the display content program file stores the display content program, and the control procedure program file stores the control procedure program, wherein the data copying means copies data, which is common to one of the display content program and the control procedure program and a figure symbol generated by CAD (Computer-Aided Design), from a CAD database to one of the display content program file and the control procedure program file.

In order to attain the above objects, the recording medium of the present invention stores an editing program executing a first editing process, a second editing process and a data copying process, which realize the first and second editing means, and the data copying means respectively on a computer.

Moreover, another recording medium of the present invention stores an editing program executing the data copying process and one of the first and second editing processes. With this recording medium, it is possible to provide two types of editing programs, namely, a first and a second editing program, that respectively execute the data copying process and one of the first and second editing processes.

With the above arrangement, the display content program file stores the display content program generated by the first editing means (the first editing process), meanwhile the control procedure program file stores the control procedure program generated by the second editing means (the second editing process). Moreover, in case the control procedure program is generated by the second editing means (the second editing process) at a time or after the generation of the display content program by the first editing means (the first editing process), the data copying means copies data common to both the programs, from/to one of the files to/from the other of the files, in accordance with operation of selecting the image block displayed on the first editing screen, and copying the image block to the second editing screens. On the other hand, in case the display content program is generated by the first editing means (the first editing process) at a time or after the generation of the control procedure program by the second editing means (the second editing process), the data copying means (the data copying process) copies data common to both the programs, from/to one of the files to/from the other of the files.

Because the data stored in the one of the files is copied to the other of the files by operation of selecting and copying the image block in this way, it is possible to generate the common database common to both of the files. As a result, it is no more necessary to generate a database common to both of the editing means (both of the editing processes). Furthermore, it is possible to avoid that both of the editing means input data in a duplicate manner. Further, the collective copying of the data makes it possible to improve efficiency of processing.

It is preferable for the aforementioned editing apparatus and recording medium that one of the first and second editing means (one of the first and second editing process), which corresponds to one of the files to which the data is copied, displays an image block relating to the data, by looking up the copied data.

With the above arrangement, in case the data is copied from the display content program file to the control procedure program file by the data copying means (data copying process), the image block relating to the data is displayed, by the second editing means (second editing process), by looking up the copied attribute data. On the other hand, in case the attribute data is copied from the control procedure program file to the display content program file by the data copying means (data copying process), the image block relating to the data is displayed, by the first editing means (first editing process), by looking up the copied attribute data.

Moreover, it is preferable that the data copying means (data copying process) copies the data prior to the operation of selecting the image block displayed on an editing screen of the one of the editing means, and copying the image block to an editing screen of the other one of the editing means.

In this way, for example in case the other of the programs is generated based on one of the programs generated in advance, the mark or symbol is displayed after the data is collectively copied in advance.

It is preferable for any one of the editing apparatuses and recording media discussed above, the data copying means (data copying process) copies, to one of the display content program file and the control procedure program file, data common to data of an application program and data of the one of the display content program and the control procedure program. In this way, it is possible to read the data of the application program such as CAD into the display content program file or the control procedure program file. Therefore, it is possible to realize efficient program development by using the database other than the database structured by both the program files, while it is also possible to incorporate the program development into much broader system development, so that the program development will be a part of the broader system development.

It is preferable for any one of the editing apparatuses discussed above that the editing apparatus is connected, via a network, to a system different from the display/control system, and the data copying means copies the data from/to both the files to/from the system. This makes it possible to copy the attribute data directly from the system to the one of the both the files. Therefore, it is possible to easily realize data to be used in common with an external system.

(2) An editing apparatus of the present invention, in order to attain the above objects, is provided with (i) the first editing means and second editing means, (ii) a single file for storing ① screen data, which is inclusive of (a) inherent data inherent to the display content program, (b) variable names set with respect to the respective control-object apparatuses, ② control data, which is inclusive of the variable names and inherent data inherent to the control procedure program, the common data including the variable names, and ③ common data, which is common to (a) the display content program, (b) the control procedure program, and which is inclusive of the variable names, (iii) data generating means for causing one of the first and second editing means to generate, in the file, inherent data, which is inherent to one of the display content program and the control procedure program, based on the variable name of the common data obtained by searching out of the file.

A recording medium of the present invention, in order to attain the above objects, stores an editing program that executes a first editing process and a second editing process, and a data generating process that realize the first and second editing means, and the data generating means, respectively on a computer.

Moreover, another recording medium of the present invention stores an editing program that executes the data generating process and one of the first and the second editing processes. With this recording medium, it is possible to provide two types of editing programs, that is, a first or a second editing program, which respectively execute the data generating process and one of the first and the second editing processes.

With the above arrangement, in case the control procedure program is generated by the second editing means (second editing process) at a time or after the display content program is generated by the first editing means, the data generating means (data generating process) causes the second editing means (second editing process) to generate the inherent data in accordance with the common data inclusive of the variable data. On the other hand in case the display content program is generated by the first editing means (first editing process) at a time or after the control procedure program is generated by the second editing means (second editing process), the data generating means (data generating process) causes the first editing means (first editing process) to generate the inherent data in accordance with the common data inclusive of the variable data. In this way, it is possible to avoid the duplicate input of data by both of the editing means (both of the editing processes). Moreover, by including variable number names in the common data, it is possible to use event names such as symbols for the control-object apparatuses, operation instructions, states of operation of the control-object apparatuses, as the variable number names.

With the file arrangement, where both the symbol data are combined via the variable number names, it is possible to easily structure databases of various types for combining different data together. For example, it is possible to structure a hierarchical database, a network database, or an object-oriented database and the like, besides the relational database that is widely used and easy to handle. Therefore, it is possible to use the database much more efficiently.

It is preferable for the editing apparatus and the recording media that the data generating means generates the inherent data in accordance with operation of selecting an image block that is displayed on an editing screen of one of the editing means, and copying the image block to an editing screen of the other of the editing means.

With the above arrangement, in case the control procedure program is generated by the second editing means at a time or after the display content program is generated by the first editing means, the second editing means generates the inherent data in accordance with the common data, according to the operation of the data generating means to select the image block on the first editing screen and to copy it to the second editing screen.

On the other hand in case the display content program is generated by the first editing means at a time or after the control procedure program is generated by the second editing means, the first editing means generates the inherent data in accordance with the common data, according to the operation of the data generating means to select the image block on the second editing screen and to copy the image block to the first editing screen. In this way, it is possible to avoid the duplicate input of data by both of the editing means.

Furthermore, it is preferable for this editing apparatus and the recording media to be provided with data integrating means (data integrating process) for combining variable number data, which is the common data that includes addresses of the control-object apparatuses and variable number names set corresponding to the addresses, control symbol data, which is the inherent data that includes the control symbols and the variable number names corresponding to the control symbols, display symbol data, which is the inherent data that includes the display symbols and the variable number names corresponding to the display symbols, in such a manner that both of the symbol data can be respectively combined with the variable number data via the variable number names, where the control symbols are the image blocks representing the control operation corresponding to the control-object apparatuses, while the display symbols are the image blocks representing the control-object apparatuses and states thereof.

With this arrangement, where the data integrating means (data integrating process) combines the symbol data with the variable number data via the variable number names, it is possible to easily structure databases of various types for combining different data together. For example, it is possible to structure a hierarchical database, a network database, or an object-oriented database and the like, besides the relational database that is widely used and easy to handle. Therefore, it is possible to use the database much more efficiently.

(3) An editing apparatus of the present invention, in order to attain the above objects, includes, in addition to the editing apparatus (2), incidental information supplying means for supplying, from one of the editing means to the other of the editing means, variable number names, which are so set as to correspond to addresses of the respective control-object apparatuses, where the variable numbers are supplied as incidental information regarding a plurality of display symbols for representing the control-object apparatuses and states thereof, or a plurality of control symbols for representing control operation that corresponds to the control-object apparatuses.

A recording medium of the present invention, in order to attain the objects, stores an editing program that executes a first and a second editing process, and an incidental information supplying process that realize the first and the second editing means and the incidental information supplying means respectively on a computer.

Moreover, another recording medium of the present invention stores an editing program that executes the incidental information supplying process and one of the first and second editing processes. With this recording medium, it is possible to provide two types of editing programs, that is, a first editing program and a second editing program, which respectively execute the incidental information supplying process and one of the first and second editing processes.

With the above arrangement, in case the control procedure program is generated by the second editing means (second editing process) at a time or after the display content program is generated by the first editing means (first editing process), the incidental information supplying means (incidental information supplying process) supplies the variable numbers as incidental information regarding the display symbol or the control symbol to the second editing means (second editing process).

On the other hand, in case the control procedure program is generated by the second editing means (second editing process) at a time or after the control procedure program is generated by the second editing means (second editing process), the incidental information supplying means (incidental information supplying process) supplies the variable numbers as incidental information regarding the display symbol or the control symbol to the first editing means (first editing process).

By supplying to one of the editing means (editing process) the variable numbers already inputted by the other of the editing means as the incidental information, it is possible to use information in common.

It is preferable for the editing apparatus and the recording media that the incidental information supplying means (incidental information supplying process) supplies the incidental information in accordance with operation of selecting one of the display symbols and the control symbols that is displayed on an editing screen of one of the editing processes, and copying the one of the display symbols and the control symbols to an editing screen of the other of the editing processes.

With the above arrangement, in case the control procedure program is generated by the second editing means at a time or after the display content program is generated by the first editing means, the incidental information supplying means supplies the incidental information to the second editing means, in accordance with the operation of selecting the display symbol on the editing screen of the first editing means and the operation of copying the display symbol to the editing screen of the second editing means. On the other hand, in case the display content program is generated by the first editing means at a time or after the control procedure program is generated by the second editing means, the incidental information supplying means supplies the incidental information to the second editing means, in accordance with the operation of selecting the control symbol on the editing screen of the second editing means and the operation of copying the display symbol to the editing screen of the first editing means.

Moreover, it is preferable for the editing apparatus and the recording media that the incidental information supplying means (incidental information supplying process) causes the one of the first and second editing means (first and second editing processes) to automatically draw, together with the incidental information, the copied one of the display symbol and the control symbol, by looking up common data that are common to both the programs and include the variable numbers.

By drawing the incidental information together with the display symbol or the control symbol in this way, the operation for generating a program is simplified.

(4) An editing apparatus of the present invention is provided with (i) first editing means and second editing means, (ii) registering means for registering a variable number assigned to an address of the control-object apparatus in such a manner that the variable number is associated with functionally associated ones of image blocks provided respectively in the first and second editing means, so as to display the variable number on the first and second editing screens, and (iii) display means for displaying the registered variable number, and for displaying, in accordance with operation of selecting the displayed variable number and indicating the selected variable number on one of the first and second editing screens, the image block associated with the variable number on the editing screen on which the variable number is indicated.

A recording medium of the present invention stores an editing program that executes a first editing process, a second editing process, the registering process, and the displaying process that realize the first editing means, the second editing means, the registering means and the display means respectively on a computer.

Moreover, another recording medium of the present invention stores an editing program that executes the registering process, the displaying process, and one of the first and second editing processes. With this recording medium, it is possible to provide two types of editing programs, namely a first editing program and a second editing program, which respectively execute the registering process, the displaying process, and one of the first and second editing processes.

With the above arrangement, if the variable number has been registered by the registering means (registering process) at the time the display content program is generated by the first editing means (first editing process), the variable number is displayed by the display means (display process). Then, if the variable number is selected and indicated on the first editing screen, the image block associated with the variable number is displayed on the first editing screen by the display means (display process). Examples of the operation of selecting and indicating include dragging and dropping. On the other hand, if the variable number is registered in the similar way at the time the control procedure program is generated by the second editing means (second editing process), the image block associated with the variable number is displayed on the second editing screen by selecting and indicating the variable number on the second editing screen by the display means (display process). Moreover, if the variable number has registered in advance, it is possible to generate both the programs at the same time by using the first and second editing means (first and second editing processes).

The registering of the variable number, which may be registered in advance before the generation of both the programs, may be carried out at the same time the programs are respectively generated. In this case, where the registration of the variable number is carried out at the same time the input of the image block onto the first or the second editing screen, it is impossible to automatically display the image block by the display means (display process), but it is possible to use the registered variable number for the program generation by the other of the editing means (editing processes).

Because the image block is displayed based on the registered variable number as described above, it is not necessary to follow such a procedure that the one of the programs is generated by looking up the other one of the programs. Thus, as long as the variable number is registered, the automatic generation of the image block can be performed, without regard to the way the program is generated. Therefore, it is possible to realize a simple generation of program that deals with various ways of program generation.

It is desirable for the editing apparatus and the recording media that the registering means (registering process) carries out the association of the functionally associated image blocks and the variable number by giving functional attribute to the variable number. As the functional attributes, for example, control processes (such as counting and calculation) provided to control functions such as a switch, a lamp, a timer, a counter, or functions of control-object apparatuses are suitable. When the variable number has such functional attribute, it is possible to manage the variable number based on the functional attribute. Therefore, it is possible to easily select the variable number, for example, by respectively displaying the variable number for each functional attribute.

Moreover, it is preferable for the editing apparatus and the recording media that the display means (display process) displays the variable number together with the image block. This arrangement makes it possible to use the functional attribute of the variable number as the incidental information thereof, when the image block is displayed together with the incidental information such as a name and comments of the image block, thereby causing no increase in a number of parameters to be inputted. Therefore, this reduces input operation thereby improving operability.

(5) An editing apparatus of the present invention is further provided with (i) the first editing means, which assigns an address to each function of an image block having a plurality of the functions, via variable numbers that associate addresses and names of the control-object apparatuses, and (ii) second editing means, and (iii) program generating means for generating, upon positioning the image block on the first editing screen by the first editing means, a partial program corresponding to the image block by registering variable numbers on a program list for storing commands that compose the control procedure program in accordance with order of execution, where the variable numbers are assigned to addresses of the control-object apparatuses in advance and associated with each of the functions of the image block.

A recording medium of the present invention stores an editing program that executes a first editing process, a second editing process, and a program generating process that realize the first and second editing means, and the program generating means respectively on a computer.

Moreover, another recording means of the present invention stores an editing program that execute the program generating process and one of the first and second editing processes. With this recording medium, it is possible to provide two types of editing programs, namely, a first editing program and a second editing program, which respectively execute the program generating process and one of the first and the second editing processes.

With the above arrangement, when the image block is positioned onto the first editing screen, the program generating means (program generating process) registers the variable number on the program list. Because the program list stores the commands composing the control procedure program in accordance with the order of execution, the registering on the program list the variable number that corresponds to the address and function of the image block generates a group of the commands that corresponds to the function of the image block via the variable number. This composes the partial commands that corresponds to the function of the image block via the variable number. This composes the partial program. Because the generation of the partial program is carried out simply by positioning the image block onto the first editing screen in terms of operation, it is possible to significantly reduce a number of steps of designing that users should do. Therefore, this improves the efficiency of the generation of the control procedure program.

It is preferable for the editing apparatus and the recording media that the program generating means (program generating process) visualizes, on the second editing screen of the second editing means, a group of commands composing the partial program. Specifically, in case the control procedure program is a ladder diagram, the ladder circuit, which is the partial program, is displayed on the second editing screen.

Because, in this manner, the provision of the program generating means (program generating process) causes the ladder diagram and the like as the partial program to be displayed on the second editing screen simply by positioning the image block on the first editing screen, an operation environment that is easy to understand visually is provided. Therefore, it is possible to further improve the efficiency of generating the control procedure program.

It is preferable for the editing apparatus and the recording media that the program generating means (program generating process) stores the generated partial program individually in a separate file. Conventionally, the control procedure program is stored in a single file. However, by storing the partial program individually in the separate file as described above, realized is a decentralized process, while making it easier to manage the file as to control areas. Further, the composite parts and the partial program are easily associated with each other with the file arrangement. Therefore, efficiently carried out is the management of the control procedure program including the execution control, while realizing an efficient program development of the display content program and the control procedure program by having a closer association between the first and second editing means (first and second editing processes).

In addition, it is preferable for the editing apparatus and the recording media that the program generating means (program generating process) stores the generated partial program, as a subroutine of the control procedure program, in a subroutine-by-subroutine manner. In this way, even if the partial program, which is used repeatedly in the control procedure program, is used as a subroutine, it is possible to realize the decentralized process and easy file management. Therefore, it is possible to facilitate the efficiency in the management of the control procedure program and in the development of the display content program and the control procedure program, similarly to the above-mentioned editing apparatuses.

Moreover, the editing apparatus and the recording media may be so arranged that the program generating means registers, onto the program list, ladder commands corresponding to the variable numbers and addresses assigned to the variable numbers, so that the functions of the image block are realized when the partial program is generated. This gives commands obtained by the combination of the ladder commands and the addresses.

(6) An editing apparatus of the present invention is provided with (i) the first editing means and second editing means, and (ii) extracting means for associating in advance commands for composing the control procedure program with an image block for composing the display content program, and for extracting, with respect to a plurality of the commands, the image block associated with the commands included in the control procedure program generated by the second editing means.

A recording medium of the present invention stores an editing program that executes the first and second editing processes that realize the first editing means, the second editing means and the extracting means respectively on a computer.

Moreover, another recording medium of the present invention stores an editing program that executes the extracting process and one of the first and second editing processes. With this recording medium, it is possible to provide two types of editing programs, namely a first editing program and a second editing program, which respectively execute the program generating process and one of the first and the second editing processes.

With the above arrangement, because the extracting means (extracting process) extracts the image block that corresponds to the command included in the generated control procedure program, the display content program corresponding to the command is generated by using the image block. Moreover, efficiency of processing is improved because the image block is extracted with respect to a plurality of the commands. Further, because the display content program is generated by using the extracted image block as well, solved is such a drawback that the image block corresponding to the commands is not used on the display content program. Therefore, it is possible to generate the display content program efficiently and precisely.

It is preferable for the editing apparatus and the recording media that the extracting means registers the extracted image block per one screen of the display content program. Use of the image block per one registered screen allows the display content program to be generated without considering to which part of the control procedure program the display content program of the one screen corresponds. Therefore, it is possible to improve the efficiency of generating the display content program.

Furthermore, it is preferable for the editing apparatus and the recording media that the extracting means (extracting process) extracts the image blocks collectively with respect to the separate control procedure program. Such collective extraction of the image block shortens a time required for the extracting process. Therefore, the process can be carried out efficiently.

Alternatively, it is preferable for the editing apparatus and the recording media that the extracting means (extracting process) extracts attribute information regarding the commands together with the image block. This eliminates a step of additionally inputting the attribute information separately, thereby reducing the number of steps of operation.

For a fuller understanding of the nature and advantages of the invention, reference should be made to the ensuing detailed description taken in conjunction with the accompanying drawings.

BRIEF DESCRIPTION OF DRAWINGS

FIG. 3 is an explanatory view illustrating a basic format of a process instructions word that is included in a user screen to be displayed by the programmable display apparatus and the like.

FIG. 5(a) is a data structure, which is used for copying of attribute data, carried out by a computer used in the first to a third display/control system.

FIG. 5(b) is an explanatory view showing object types in the data structure.

FIG. 5(c) is an explanatory view illustrating address information in the data structure.

FIG. 38(a) is an explanatory view showing a data structure used for copying attribute data carried out in a computer of the first to a third display/control system of the third embodiment.

FIG. 38(b) is an explanatory view illustrating an object type of the data structure.

FIG. 38(c) is an explanatory view showing address information of the data structure.

FIG. 43 is a block diagram illustrating constitution of the second display/control system of the third embodiment of the present invention.

FIG. 52(a) is an explanatory view illustrating a specific example of a second method, which provides variable numbers with functional attributes.

FIG. 52(b) is an explanatory view showing a dialog box for setting the functional attributes.

FIG. 57 is a block diagram showing constitution of the second display/control system of the fourth embodiment of the present invention.

FIG. 68 is an explanatory view illustrating a ladder list used in case a ladder circuit is generated from the composite part of the composite switch.

FIG. 70 is an explanatory view showing a ladder list used when the ladder circuit is generated from the composite part of the counter.

FIG. 71(a) is a circuit diagram showing a ladder circuit for jumping from a main routine to a subroutine, where the subroutine is the ladder circuit corresponding to the composite switch.

FIG. 71(b) is a circuit diagram showing a ladder circuit for jumping from a main routine to a subroutine, where the subroutine is the ladder circuit corresponding to the counter.

FIG. 73 is an explanatory view illustrating association between ladder commands and the parts, where ladder analyzing sections of computers of the respective display/control systems in the sixth embodiments have the ladder commands as data.

FIGS. 74(a) and 74(b) are ladder circuit diagrams showing examples of association between the ladder commands and key words.

FIG. 76 is a block diagram showing constitution of the second display/control system of the sixth embodiment of the present invention.

BEST MODE FOR CARRYING OUT THE INVENTION

In the following, the present invention is explained further in details, but the present invention is not limited to those.

First Embodiment

Explained below is an embodiment of the present invention, with reference to FIGS. 1 through 21.

Various arrangements may be thought of for a display/control system of the present embodiment. However, first to third arrangements are explained here.

Figure 1:
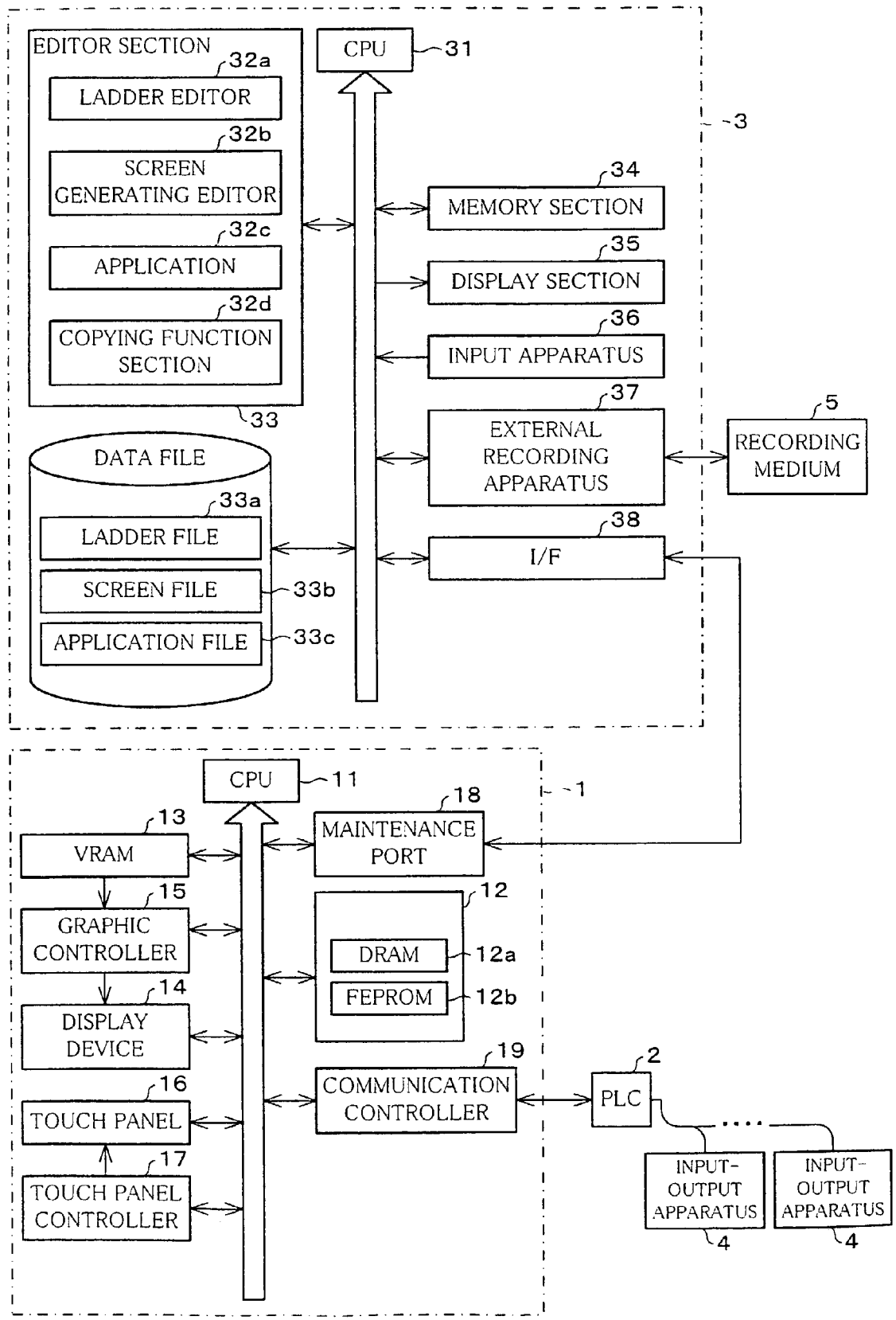
FIG. 1 is a block diagram illustrating constitution of a first display/control system of a first embodiment of the present invention.

To begin with, the first display/control system shown in FIG. 1 includes a programmable display apparatus 1 and a PLC 2.

The programmable display apparatus 1, which is a displaying function section, is provided with a CPU 11, a memory section 12, a VRAM 13, a display device 14, a graphic controller 15, a touch panel 16, a touch panel controller 17, a maintenance port 18, and a communication controller 19.

The memory section 12 includes memories such as a DRAM 12a and an FEPROM (Flash Erasable and Programmable ROM) 12b. The DRAM 12a is mainly used for calculation for display control, but also used for temporal storage of data that is exchanged between the memory section 12 and the PLC 2. The FEPROM 12b, which is an erasable and read-only flash memory, acts a role of a hard disc drive in a general personal computer. Because flash memories lacks a moving element and has tolerance against impact, the flash memories stably operates under an inferior ambient environment.

Figure 2:
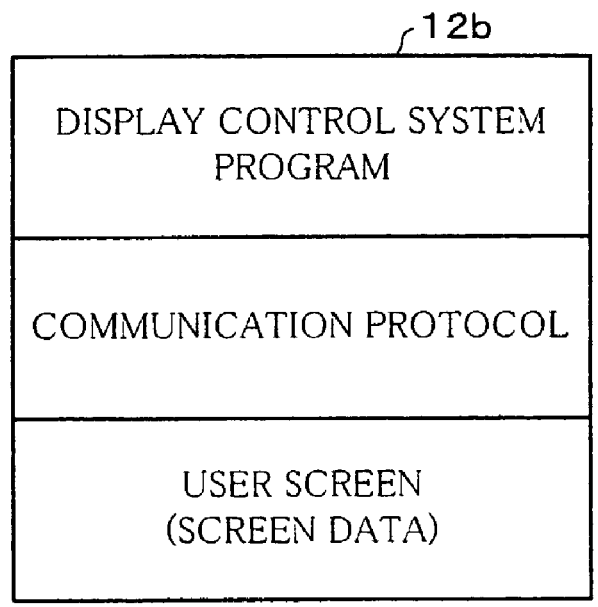
FIG. 2 is an explanatory view showing a program to be store in an FEPROM of a programmable display apparatus of the first display/control system.

Moreover, as shown in FIG. 2, the FEPROM 12b has areas in which a display control system program, a communication protocol, and a user screen (screen data) are respectively stored. The display control system program is a program for realizing fundamental functions for performing image display control. The communication protocol is a protocol used for communication with the PLC 2, and is set specifically according to types (makers) of the PLC 2. The user screen is generated by a screen generating editor 32b, which is discussed later, and is downloaded to the FEPROM 12b. The user screen includes data of marks as a base screen or image blocks (display symbols) to be displayed on the display device 14, and a later-described process instructions word W (see FIG. 3) given to each mark. The user screen composes the display content program.

The marks are provided in advance as symbolized fundamental parts such as a touch switch, a lamp, various display apparatuses. Moreover, also included as the marks are dynamic screen function section (so called tags), in which a desired dynamic function is set in a quadrangular area set in a desired position so as to express, in a predetermined position on a screen, dynamic changes of the switch or a numeral value indicator.

Figure 3:
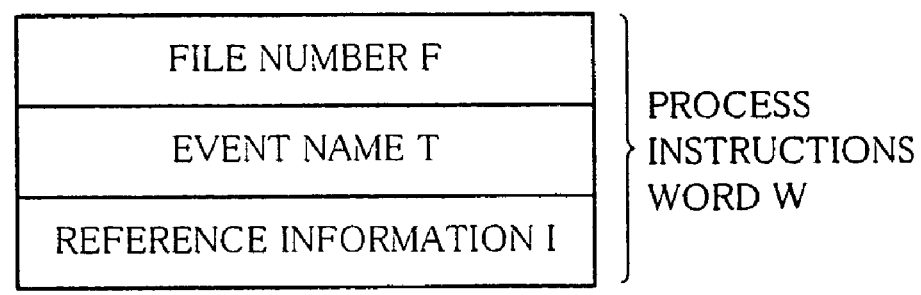

As shown in FIG. 3, the process instructions word W included in the screen data is generated for every event to be carried out on the base screen. The process instructions word W is basically provided, in one set, with a file number F of the base screen on which display control operation is to be carried out, an event name T for specifying operation content to be performed on the base screen, and reference information I, which is composed of one or plural data to be looked up for every performed event.

The CPU 11 controls operation of each section of the programmable display apparatus 1 in accordance with the display control system program stored in the above-mentioned FEPROM 12b. Moreover, the CPU 11, which has a function of controlling communication with a later-described computer 3 via the later-described maintenance port 18, stores in the FEPROM 12b screen data from a screen generating editor 32b upon reception of the screen data, and transfers to the PLC 2 a ladder program (user program), which is a control procedure program from a ladder editor 32a.

The VRAM 13, which is a memory for temporally storing an image of a screen to be displayed on the display device 14, stores orderly images of the display data from the FEPROM 12b as dot data, in accordance with horizontal positions of the images on the screen displayed.

The display device 14 is composed of a flat-board type display element such as a liquid crystal panel or an EL panel. The graphic controller 15 is a driver software for drawing on the display device 14 an image of a screen expanded in the VRAM 13. The touch panel 16 is provided so that input can be performed on a display screen of the display device 14. An appropriate example of the touch panel 16 is an analogue resistance film type touch panel. The touch panel controller 17 converts an output voltage of the touch panel 16 into input position information and outputs the input position information to the CPU 11.

The maintenance port 18 is a communication port for communicating with the computer 3 described later. On the other hand, the communication controller 19 is an interface for controlling transfer of data, which regards control or supervisory of input-output apparatuses 4, from and to the PLC 2, and for controlling reception of output data of the PLC 2, via a communication cable (for example, RS-232C).

As the control function section, the PLC 2 controls, by using a built-in CPU section, operation of the input-output apparatuses 4 in accordance with a procedure set by a user program (ladder program) generated by the ladder editor 32a in accordance with a control function program described later.

In a memory inside the PLC 2, a word device and a bit device are set so that storing locations of the word device and the bit device can be specified by specifying addresses. The word device is set for word data, which is for example data, such as numerical values, to be inputted/outputted, while the bit device is set for bit data, which is represented for example by ON/OFF states. With those setting, it is possible to control the input-output apparatuses 4 or to read out individually information regarding operation state of the bit device or the word device, simply by arbitrarily accessing to word device or bit device in the PLC 2.

The programmable display apparatus 1 reads, in appropriate timing, necessary information among state information represented by the bit device or the word device, and stores the necessary information in the memory section 12. Meanwhile, the programmable display apparatus 1 repeatedly reads the process instructions word W so as to carry out operation of the content specified by the event name T of each process instructions word W, looking up the state information of the PLC 2. In this manner, carried out is display operation, which varies in accordance with a change in the state of the bit device or the word device.

Figure 4:
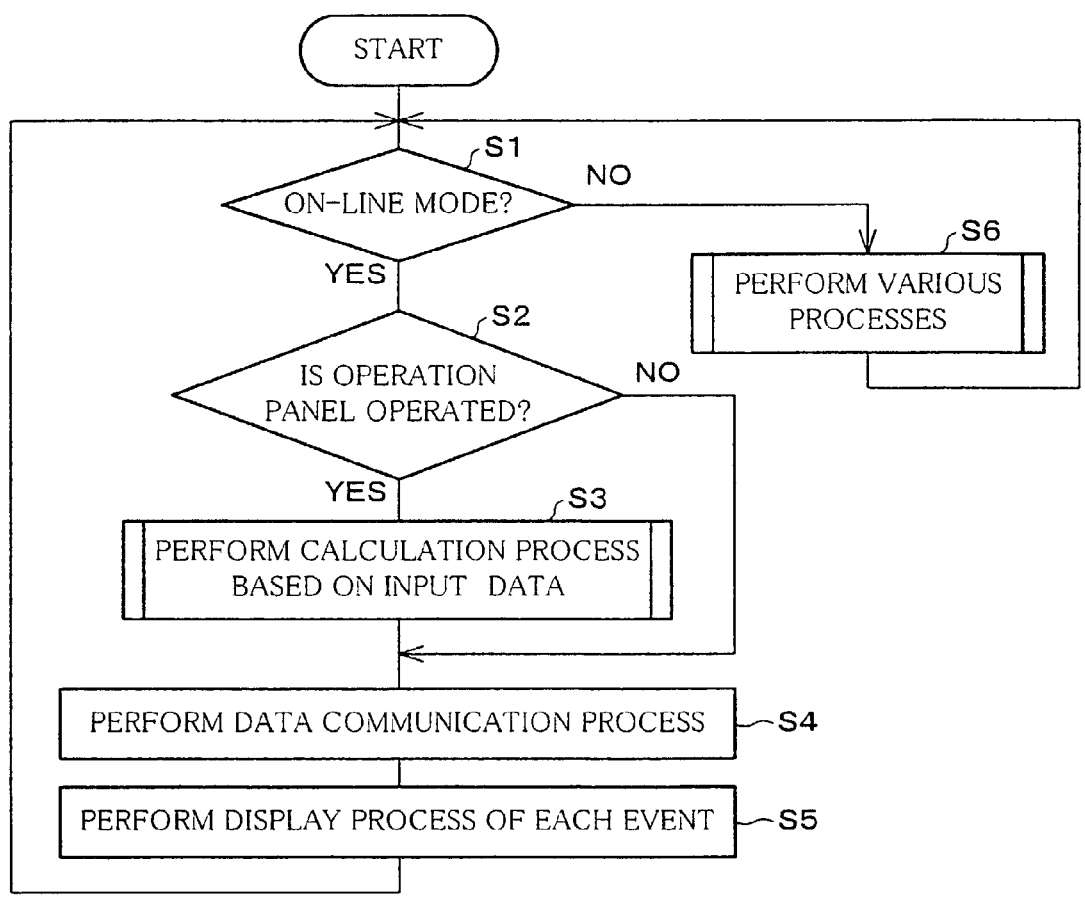
FIG. 4 is a flow chart illustrating a process procedure of display operation of the programmable display apparatus.
Figure 6:
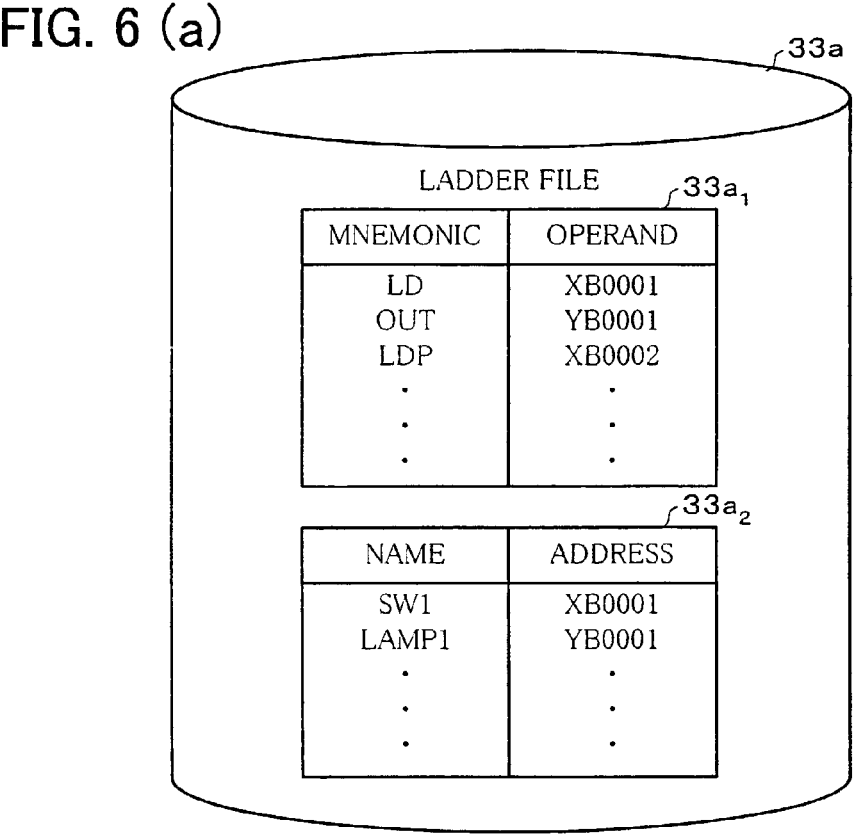
FIG. 6(a) is an explanatory view showing a ladder file to be formed in the computer.
FIG. 6(b) is an explanatory view illustrating a screen file to be formed in the computer.
Figure 6:
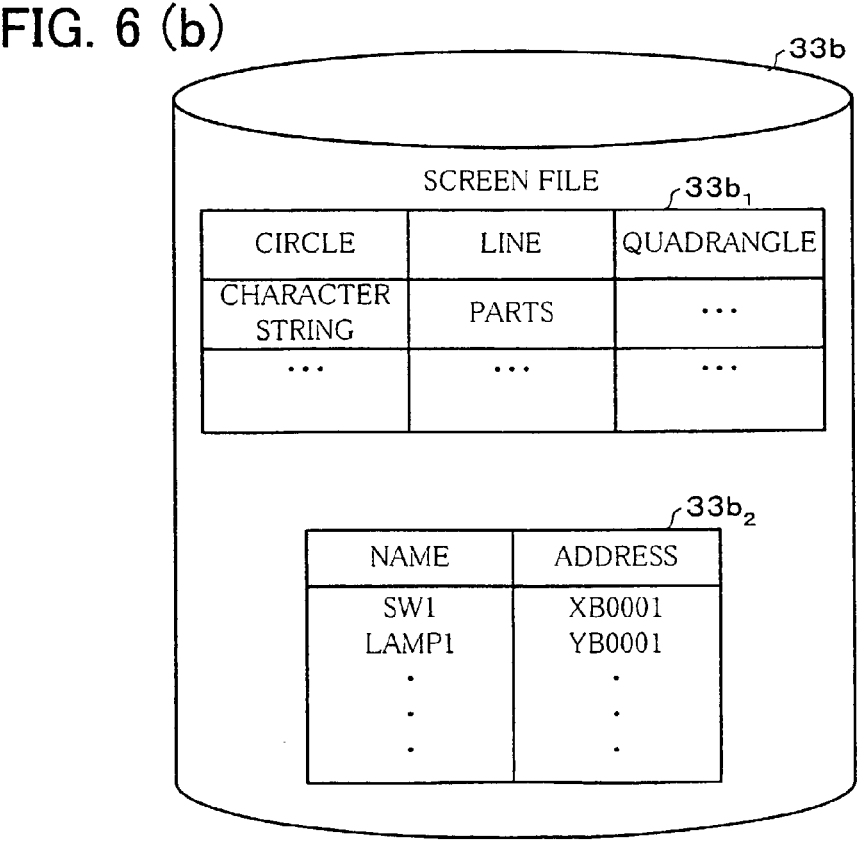

The display operation of the programmable display apparatus 1 is carried out in accordance with a procedure of a flow chart shown in FIG. 4.

To begin with, selected alternatively is one of an online mode, in which possible is communication with the PLC 2, which is carrying out the control of the input-output apparatuses 4, and an offline mode, in which only the programmable display apparatus 1 is operated (S1). In case the offline mode is selected (NO), various processes such as a setting process and a diagnosis process are carried out in the programmable display apparatus 1 (S6), and S1 is carried out thereafter.

In case the online mode is selected in S1 (YES), read out by the programmable display apparatus 1 is the state information of the PLC 2 quoted by the process instructions word W, which is set in the memory section 12 of the programmable display apparatus 1. Specifically, the addresses of the word device and the bit device set by the PLC 2 are extracted from information included in a process instructions word W that relates to a base screen currently displayed, among the process instructions words W stored in the memory section 12. Then, the state information, which is addressed by direct access to the memory of the PLC 2 in accordance with the addresses, is expanded in the memory section 12 and is displayed on an operation panel screen. In the online mode, whether input is carried out or not is judged by using the operation panel screen displayed on the programmable display apparatus 1 (S2). Here, in case input is carried out, predetermined calculation is carried out in accordance with data thus inputted (S3), and further, data communication process is carried out (S4).

Next, carried out is a display process of each event (S5). Here, carried out is display operation in accordance with the state information extracted by the communication process from the process instructions words W stored in the memory section 12.

Next, explained is the computer 3.

As shown in FIG. 1, the computer 3 is composed of a multipurpose computer such as a personal computer. This computer 3 is provided with a CPU 31, an editing section 32, a data file 33, a memory section 34, a display device 35, an input apparatus 36, an external recording apparatus 37 and an interface (shown as I/F in the figure) 38.

The CPU 31 carries out, on OS (operating system) installed in the computer 3, control of each section, including the editing section 32, and the calculation process, so as to operate various application software.

The memory section 34, which is provided with memories such as a RAM and a ROM, has functions such as storing constant data, temporary recording of data, providing an operation area for the calculation process of the CPU 31.

The editing section 32 includes the ladder editor 32a, the screen generating editor 32b, an application 32c and a copying function section 32d.

The ladder editor 32a, which is second editing means, is programming software for generating a user program for setting a control procedure of the PLC 2 so that the input output apparatuses 4 are operated in accordance with a desired sequence. The ladder editor 32a is so arranged that the ladder diagram can be generated by positioning, on a display screen 35a (see FIG. 15(a)) of the display device 35, a ladder symbol (a symbol and a control symbol) corresponding to operation of the input-output apparatus 4. For this ladder editor 32a, for example, used are the above-mentioned programming languages in accordance with the IEC.

Moreover, the ladder editor 32a performs associating of input numbers and output numbers, which are respectively given to input terminals and output terminals of the PLC 2, with the input-output apparatuses 4, each of which is connected to each of the input terminals and output terminals.

The associating is carried out as assigning of the input numbers and the output numbers (I/O assigning) via variable numbers, which represents names (device name) of the input-output apparatuses 4. A result of the assigning is stored in a ladder file 33a described later.

When the assigning is carried out, the memory section 34 stores the device names corresponding respectively to addresses, where the input-output numbers are respectively the addresses. Because until now such assigning differs depending on makers of PLCs and is set by using absolute addresses, it is necessary to provide for a suitable memory table, depending on the makers. However, because the present ladder editor 32a in accordance with IEC allows the user to make a decision on the input and the output by using the variable number (free variable number), the memory tables as mentioned above are not necessary for the ladder editor 32a. Moreover, it is possible to alter once-determined assignment afterward.

The user program generated by the ladder editor 32a is transferred to the PLC 2 via the programmable display apparatus 1 (or directly) and downloaded to the memory inside the PLC 2.

The screen generating editor 32b, which is first editing means, is image generating software for generating a screen to be displayed on the display device 14 so as to provide the programmable display apparatus 1 with functions as a terminal for inputting therein setting values and operation instructions for various monitor and apparatuses for management, which are operation state and operation instructions of the input-output apparatuses 4, for example. Generally, the screen generating editor 32b is provided with, for example, a drawing function, a text input function and parts (marks) for switches, lamps, ten keys, various display apparatuses (for example, a numerical value display apparatus, a meter indicator, and a graph indicator), so that a screen original with the user (user screen) can be generated. As the parts, not only simple parts having a single function, but also composite parts, such as composite switches, counters and timers, having plural functions are provided. Such composite parts are registered in a library format so that the composite parts can be located in desired positions on the base screen by operation such as dragging and dropping, in a same way as the simple parts. Moreover, the screen generating editor 32b assigns, via the variable numbers, the input-output numbers (addresses) with respect to the respective input-output apparatuses 4 of the marks positioned on the generated screen.

The user screen generated by the screen generating editor 32b is stored in a later-described screen file 33b, and if necessary transferred to the programmable display apparatus 1 via the interface 38 and downloaded as image data to the FEPROM 12b.

The application 32c, which is mainly multipurpose application software, is composed of software for generating the attribute data that can be exchanged with the ladder editor 32a and the screen generating editor 32b. Examples of such software include spreadsheet software, which can generates data, and CAD software for designing circuit and the like, and like software.

Using a data copying function of the OS, the copying function section 32d, which is data copying means, automatically generates (draws), on the screen generated by the screen generating editor 32b, the mark corresponding to the ladder symbols in the ladder diagram generated by the ladder editor 32a, while the copying function section 32d copies the attribute data of the ladder symbols as attribute data of the marks. Moreover, similarly using the data copying function of the OS, the copying function section 32d automatically generates (draws), on the ladder diagram generated by the ladder editor 32a, ladder symbols corresponding to the marks on the screen generated by the screen generating editor 32b, while the copying function section 32d copies the attribute data of the mark as the attribute data of the ladder symbols.

Specifically, the copying of the attribute data is carried out by using the drag & drop function or the copy & paste function, via a later-described clip board CB (see FIGS. 16 and 18) provided to the memory section 34.

A data structure to be stored in the clip board CB, as shown in FIG. 5(a), is composed of header code, memory size, object type, reservation, address information number, address information (1 to N) and reservation. Among those, the memory size is a size of the memory required for storing data in the clip board CB. The object type is a preset type of parts to be stored in the clip board CB. As shown in FIG. 5(b), set as the object type are the bit switch, a toggle switch, the lamp, the numerical value display apparatus, a bar graph, a circle graph, a semi-circle graph, a tank graph, a meter graph and the setting value display apparatus. The address information, as shown in FIG. 5(c), is composed of address (address name), reservation, address supplement information, reservation, object type and reservation. The address supplement information is information regarding types of symbols (integral number symbols, discrete symbols and the like). The object type of the address information, which has the same content as the above-mentioned object type, designates to which parts the address corresponds, and turns ON only a bit of parts required for this.

In addition, the copying function section 32d may be included respectively in the ladder editor 32a and the screen generating editor 32b as a function of one of the ladder editor 32a and the screen generating editor 32b.

By being provided with the editing section 32, the computer 3 functions as an editor for generating and editing the user program and the user screen. Moreover, although the editing section 32 has some other functions in later-described respective embodiments, the editing section 32 is explained with the same reference number in each embodiments for convenience.

The editing section 32 is software that can be provided in a form of program media, as package software or custom-made software. For example, the editing section 32 is stored in a recording medium 5, which can be detached from the computer 3. And, the editing section 32 is installed from the recording medium 5 to the computer 3 so that the editing section 32 can function as an editor. The editing section 32 in each later-described embodiment is also software composed in a similar manner.

Moreover, while the editing section 32 may be stored in the single recording medium 5, the ladder editor 32a and the screen generating editor 32b may be stored respectively in separate recording media.

Suitable examples of the program media include tape type media such as magnetic tapes and cassette tapes, magnetic type media such as floppy discs and hard discs, optical disc type media such as CD-COM, MO, MD, and DVD, and card type media such as IC cards (including memory cards) and optical cards. Besides those, the program media may be media fixedly holding a program, which include a semiconductor memory such as mask ROM, EPROM, EEPROM, and flash ROM.

Moreover, because the computer 3 can be connected to communication networks including the Internet, the program media may be media movably holding the program so that the program will be downloaded via the communication networks. However, in the case the program is downloaded via the communication networks, it may be such that the program for downloading is stored in the computer 3 in advance or may be installed from other recording media.

The data file 33 includes the ladder file 33a, the screen file 33b and an application file 33c.

The ladder file 33a, which is a control procedure program file, as shown in FIG. 6(a), is composed of a command file section $33a_1$ and attribute data file section $33a_2$. The command file section $33a_1$ stores mnemonic (ladder command) and operand corresponding to inputted ladder symbols, while the attribute data file section $33a_2$ stores the names and addresses of the devices with respect to the inputted ladder command, so as to correspond to the command file section $33a_1$.

The screen file 33b, which is a display content program file, is composed of a figure data file section $33b_1$ and an attribute data file section $33b_2$, as shown in FIG. 6(b). The figure data file section $33b_1$ stores figure data with respect to inputted marks, while the attribute data file section $33b_2$ stores the names and addresses of the devices as to the inputted marks, so as to correspond to the figure data file section $33b_1$.

Because the ladder file 33a and the screen file 33b are associated with each other by the attribute data file sections $33a_2$ and $33b_2$, the display operation and the control operation of the first to third display/control systems are associated with each other.

The application file 33c stores attribute data that can associate, with attribute data of the attribute data file sections $33a_2$ and $33b_2$, the data generated by the application 32c.

The display device 35 is composed of CRT, LCD or the like. However, for the computer 3, which is a panel computer, the display device 35 is composed of the flat board type display element such as a liquid crystal panel or an EL panel. The input apparatus 36 is an apparatus for input operation, such as a key board, a mouse and the like. Especially, mice or the like apparatus are suitable for input operation for the editing section 32, which operates under a GUI (Graphical User Interface) environment. The external recording apparatus 37 is an apparatus such as magnetic disc drives like hard disc apparatuses, optical disc drives such as CD-ROM drives, or the like apparatus. The external recording apparatus 37 includes at least an apparatus capable of reading out information such as the program recorded in the recording medium 5. The interface 38 is an input-output section for carrying out data communication with the programmable display apparatus 1. The user program generated by the ladder editor 32a, and the user screen generated by the screen generating editor 32b are transferred to the programmable display apparatus 1 via this interface 38.

Next, explained is the second display/control system.

Figure 7:
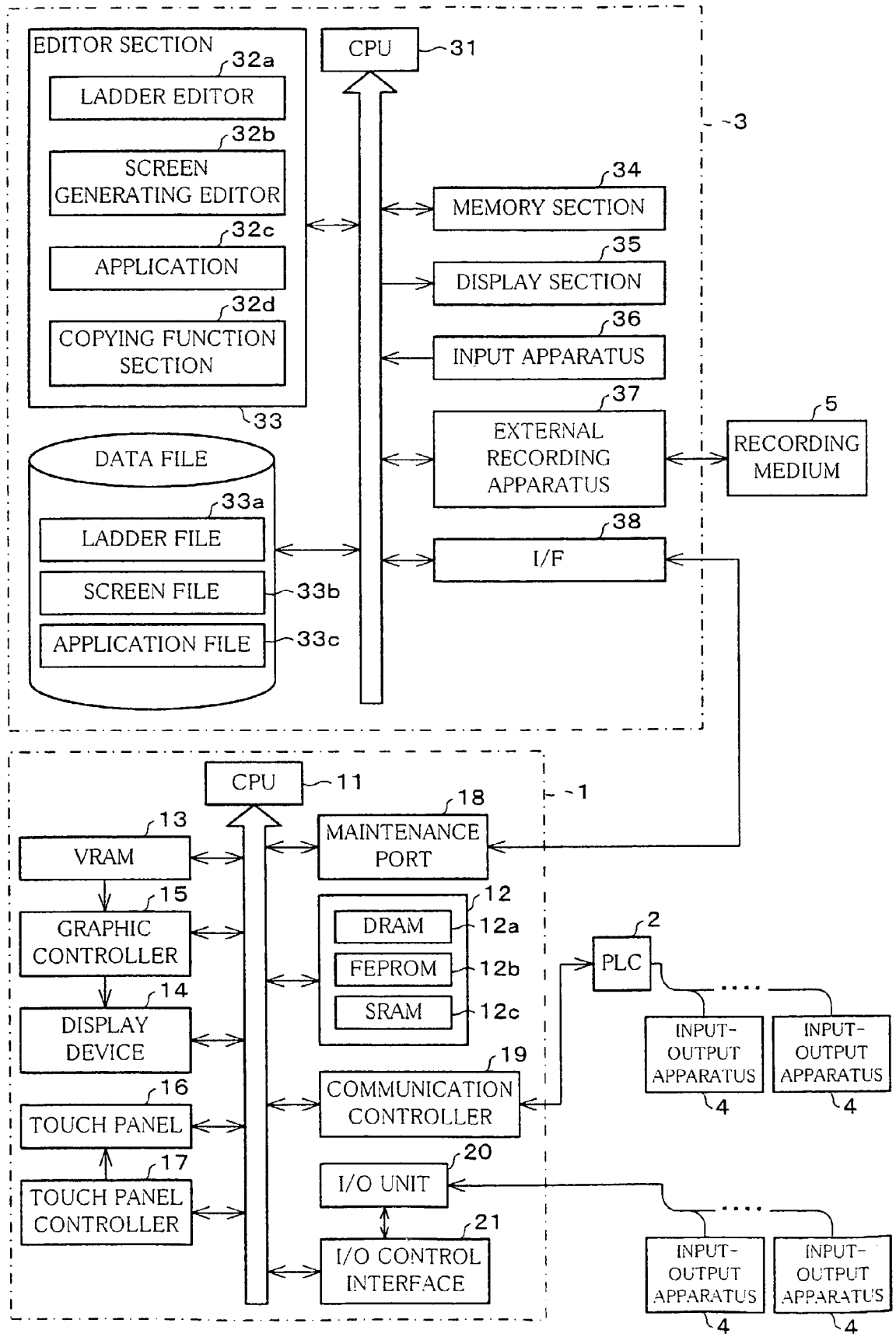
FIG. 7 is a block diagram showing constitution of a second display/control system of an embodiment of the present invention.

The second display/control system shown in FIG. 7, similarly to the aforementioned first display/control system, includes a programmable display apparatus 1 and a PLC 2, but the programmable display apparatus here is further provided with a PLC function, and is so arranged as to directly control input-output apparatuses 4. For this reason, the programmable display apparatus 1 is provided with an SRAM 12c in a memory section 12, and further provided with an input-output unit (in the figure, abbreviated as I/O unit) 20 and I/O control interface 21, in addition to a communication controller 19, which is described above.

Figure 8:
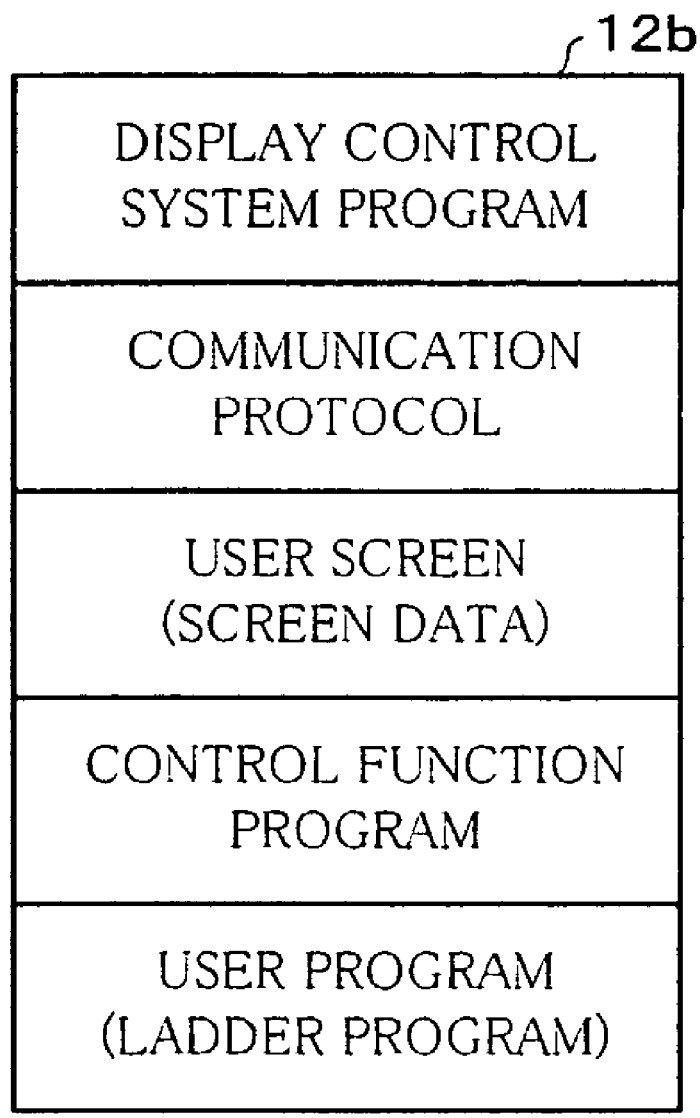
FIG. 8 is an explanatory view illustrating a program to be stored in an FEPROM of a programmable display of the second display/control system and a third display/control system.

The SRAM 12c has an area for storing a user program generated by a ladder editor 32a, and an area for storing variable numbers inputted by the ladder editor 32a. Moreover, in order to have the PLC function, as shown in FIG. 8, an FEPROM 12b has areas for storing a control function program and a user program respectively, in addition to areas for respectively storing a display control system program, a communication protocol and a screen data. The control function program is a program for realizing a basic function of sequence control.

The input-output unit 20 is provided with a large number of input-output terminals, input-output circuits and the like so that the input-output apparatuses 4 can be connected. The I/O control interface 21 is an interface circuit for being intermediatory for transmitting and receiving signals between a CPU 11 and the input-output unit 20, and is provided with an input-output memory, a D/A convertor, an A/D converter and the like.

Next, explained is the third display/control system.

Figure 9:
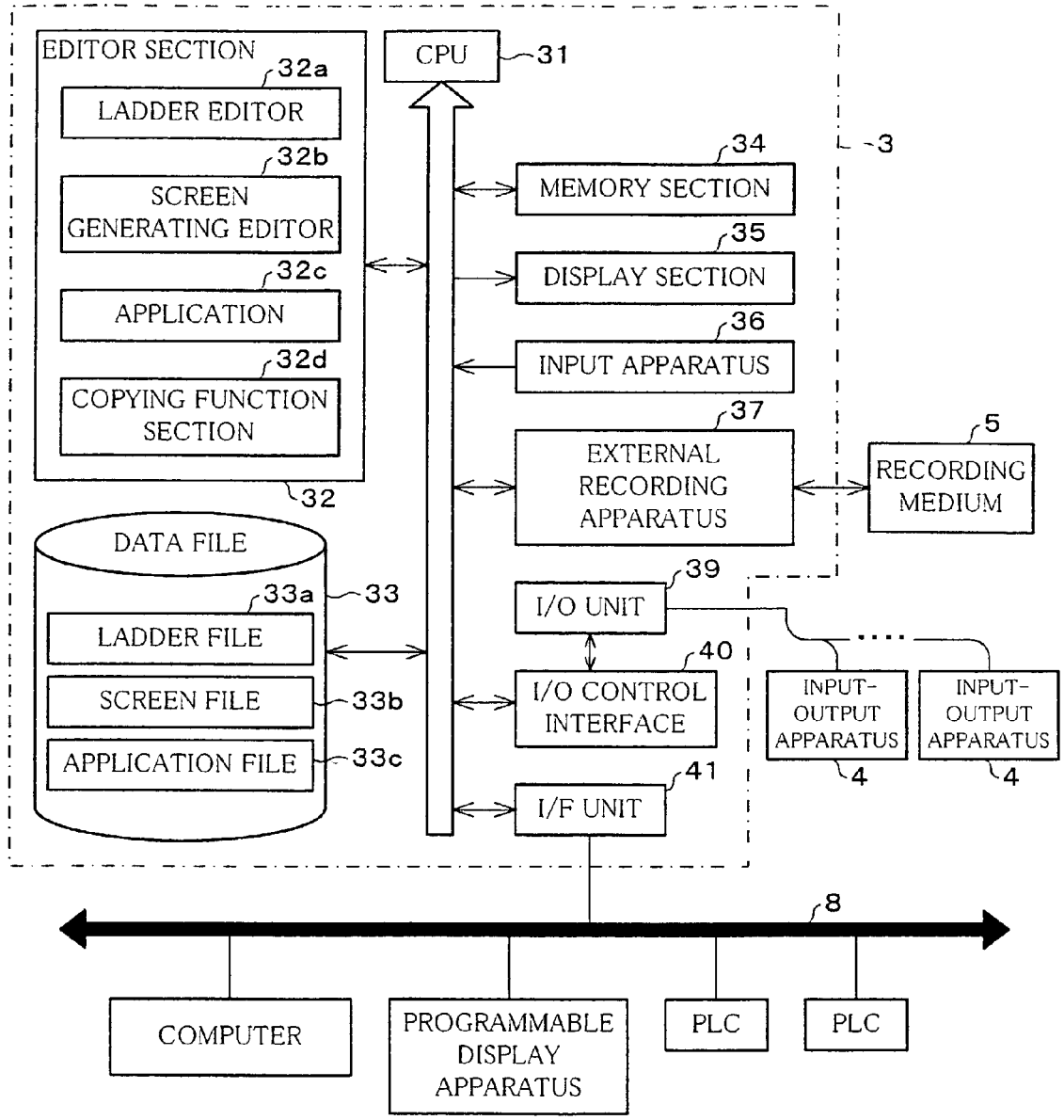
FIG. 9 is a block diagram illustrating constitution of the third display/control system of an embodiment of the present invention.

The third display/control system shown in FIG. 9 is composed mainly of a so-called open controller (software PLC), which is operated on software.

The open controller, which is composed of a computer 3, is provided with an input-output unit (in the figure, abbreviated as I/O unit) 39 and an I/O control interface 40, instead of the interface 38 of the computer 3 of the first display/control system, in order to connect the input-output apparatuses 4.

The input-output unit 39 is provided with a large number of input-output terminals, input-output circuits and the like so that the input-output apparatuses 4 can be connected. Such input-output unit 39 is mounted as an I/O board inside the computer 3, but may be externally and independently provided, as a remote I/O, to the computer 3.

The I/O control interface 40, which is an interface circuit for being an intermediatory for transmission and reception of signals between a CPU 31 and the input-output unit 39, is provided with an input-output memory, a D/A converter, an A/D converter and the like. This I/O control interface 40 exchanges with the CPU 31 digital signals or analogue signals inputted and outputted from and to the input-output apparatuses 4.

Moreover, the computer 3 is provided with an interface unit (in the figure, abbreviated as I/F unit) 41, so as to function as the open controller. The interface unit 41 is an input-output section for an open network 8, which uses a multipurpose communication protocol such as the Ethernet (registered Trademark), and is connected to the open network 8. In this way, the computer 3 is connected to other computers, programmable display apparatuses, PLCs and the like via the open network 8.

As shown in FIG. 8, the memory section 34 is, similarly to the aforementioned FEPROM 12b, has areas for respectively storing a display control system program, a communication protocol, a user screen, a control function program, and a user program.

When a target system provided with the input-output apparatus 4 is operated (online state), the thus composed computer 3 functions as a monitor for supervising operation state of the target system by displaying on a display device 35 a generated screen or actual condition of the operation, while controlling the input-output apparatuses 4 of the target system. Here, the computer 3 carries out the user program in accordance with the control function program, where the user program is generated by the ladder editor 32a and stored in the ladder file 33a. On the other hand, the computer 3 functions as an editing apparatus for generating the user program or the user screen by actuating the ladder editor 32a or the screen generating editor 32b, when the target system is not operated (offline state).

Here, explained is a procedure of generating the user program and the user screen in the first to third display/control systems, with reference to flow charts of FIGS. 10 to 14.

Figure 10:
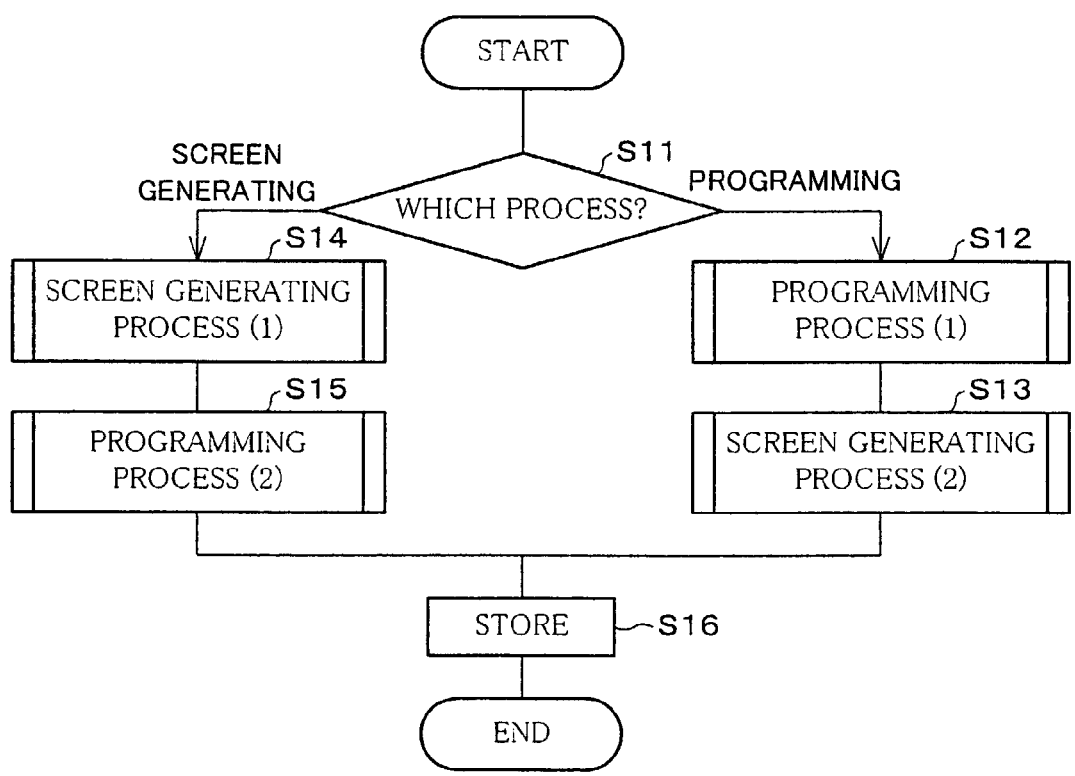
FIG. 10 is a flow chart illustrating a procedure of editing process, which is carried out by the computer of the first to third display/control systems.

As shown in FIG. 10, in accordance with input operation by user, made is such decision as to which one is carried out prior, the generating of the user screen (screen generating) or the generating of the user program (programming) (S11). In case the user program is generated prior, the programming process (1) using the ladder editor 32a is carried out (S12), then the screen generating process (2) using the screen generating editor 32b is carried out (S13). On the other hand, in case the user screen is generated prior, the screen generating process (1) using the editor 32b is carried out (S14), then the programming process (2) using the ladder editor 32a is carried out (S15).

Next, the generated user program and user screen are stored in predetermined storing locations so that the user program and the user screen will be available for use (S16). Here, for the first or the second display/control system, the user program and the user screen are temporally stored in the data file 33, then are downloaded respectively to the PLC 2 and the programmable display apparatus 1, and stored in the memory section 12. Alternatively, for the second display/control system, the user program and the user screen are temporally stored in the data file 33, then downloaded to the programmable display apparatus 1, and stored in the memory section 12. In case of the third display/control system, the user program and the user screen are stored in the data file 33.

Note that in the above examples one of the screen generating and the programming processes is carried out prior and the other is carried out next. However, the present invention is not limited to this, and both of the processes may be carried out at the same time. A procedure of this and the above procedure in second and third embodiments described later are also arranged as such, similarly to those in the present embodiment.

Figure 11:
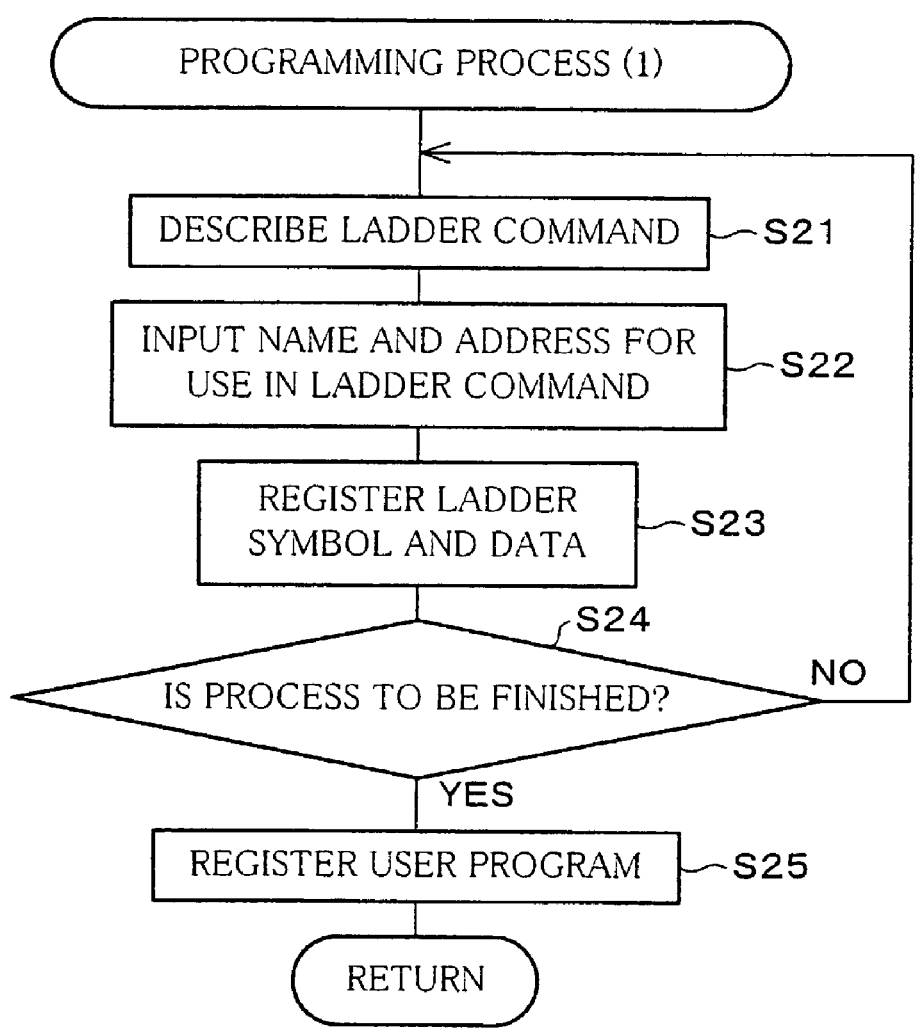
FIG. 11 is a flow chart showing a procedure of programming process carried out prior in the editing process.

In case the programming process (1) is carried out prior, a procedure of the flow chart shown in FIG. 11 is followed. Here, it is assumed that the ladder editor 32a and the screen generating editor 32b are operated in the computer 3, while (i) a window (hereinafter, denoted as a screen generating window) 32b₁ for displaying an editing screen (first editing screen) for the generation of the user screen, and (ii) a window (hereinafter, denoted as a ladder window) 32a₁ for displaying an editing screen (second editing screen) for the generation of the user program are displayed at the same time on a display section 35a (see FIG. 15(a)) of the display device 35. However, in case the programming process (1) is carried out prior, it is only required that at least the ladder editor 32a is activated.

To begin with, the ladder command is described by positioning the ladder symbols on the ladder window 32a₁ with respect to the respective input-output apparatuses 4 (S21). Next, inputted are the attributed data such as a name and an address used for the ladder command described (S22), and the ladder symbols and the attribute data are registered in the temporary file (S23). After that, whether or not the programming process is to be finished is judged in accordance with the operation by the user (S24). Here, in case the programming process is not to be finished, S21 is carried out thereafter, meanwhile the generated user program is registered in the ladder file 33a in case the programming process is to be finished (S25).

Figure 12:
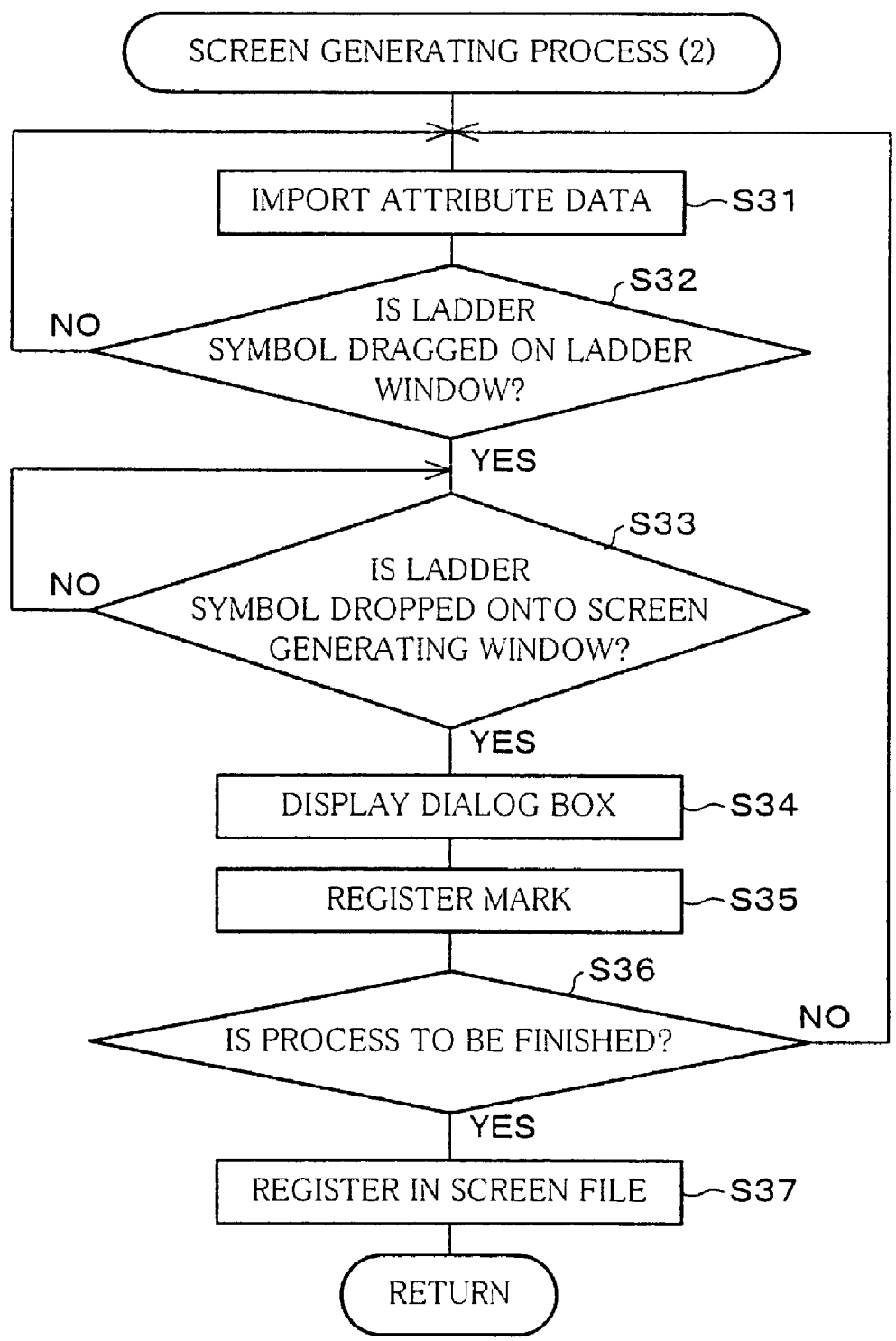
FIG. 12 is a flow chart illustrating a procedure of screen generating process carried out after the programming process shown in FIG. 11.

As to the screen generating (2), which is carried out next, a procedure of the flow chart shown in FIG. 12 is followed.

To begin with, the attribute data as to the ladder symbol (ladder command) registered in advance in the ladder file 33a is imported to the screen file 33b (S31). Judged is whether or not the ladder symbol on the ladder window 32a₁ is dragged by the mouse or the like (S32). In case the ladder symbol is dragged, whether or not the dragged ladder symbol is dropped onto the screen generating window 32b₁ is judged (S33). Here, in case it is confirmed that the ladder symbol is dropped, displayed in accordance with the functions included in the attribute data as to the dragged ladder symbol is a dialog box D₁ (see FIG. 15(c)) including a plurality of marks having the functions (S34).

By the procedure, the attribute data as to all the ladder symbols generated by the ladder editor 32a is copied to the screen file 33b collectively by importing in advance in S31. However, instead of this, it may be so adopted that the attribute data as to one ladder symbol is imported one by one every time the dragging and dropping is performed. Especially, in case the ladder diagram including a large number of the ladder symbols is generated, it is possible to improve process efficiency by importing the attribute data collectively. On the other hand, in case the ladder diagram including a small number of the ladder symbols is generated, the one-by-one import of the attribute data makes no significant deterioration in the process efficiency. Therefore, selection based on a size of the ladder diagram and other factors is preferable, for selecting the types of import to be adopted.

Thereafter, when one mark is selected out of the plural marks displayed on the dialog box D₁, the mark is registered in the temporary file (S35). Then, whether or not the screen generating process is to be finished is judged in accordance with the operation by the user (S36). Here, in case the screen generating process is not to be finished, S31 is carried out thereafter, meanwhile, in case the screen generating process is to be finished, the generated user screen is registered in the screen file 33b (S37).

Here, explained is a specific example of the screen generating process (2) carried out in accordance with the procedure of the flow chart shown in FIG. 12.

Figure 16:
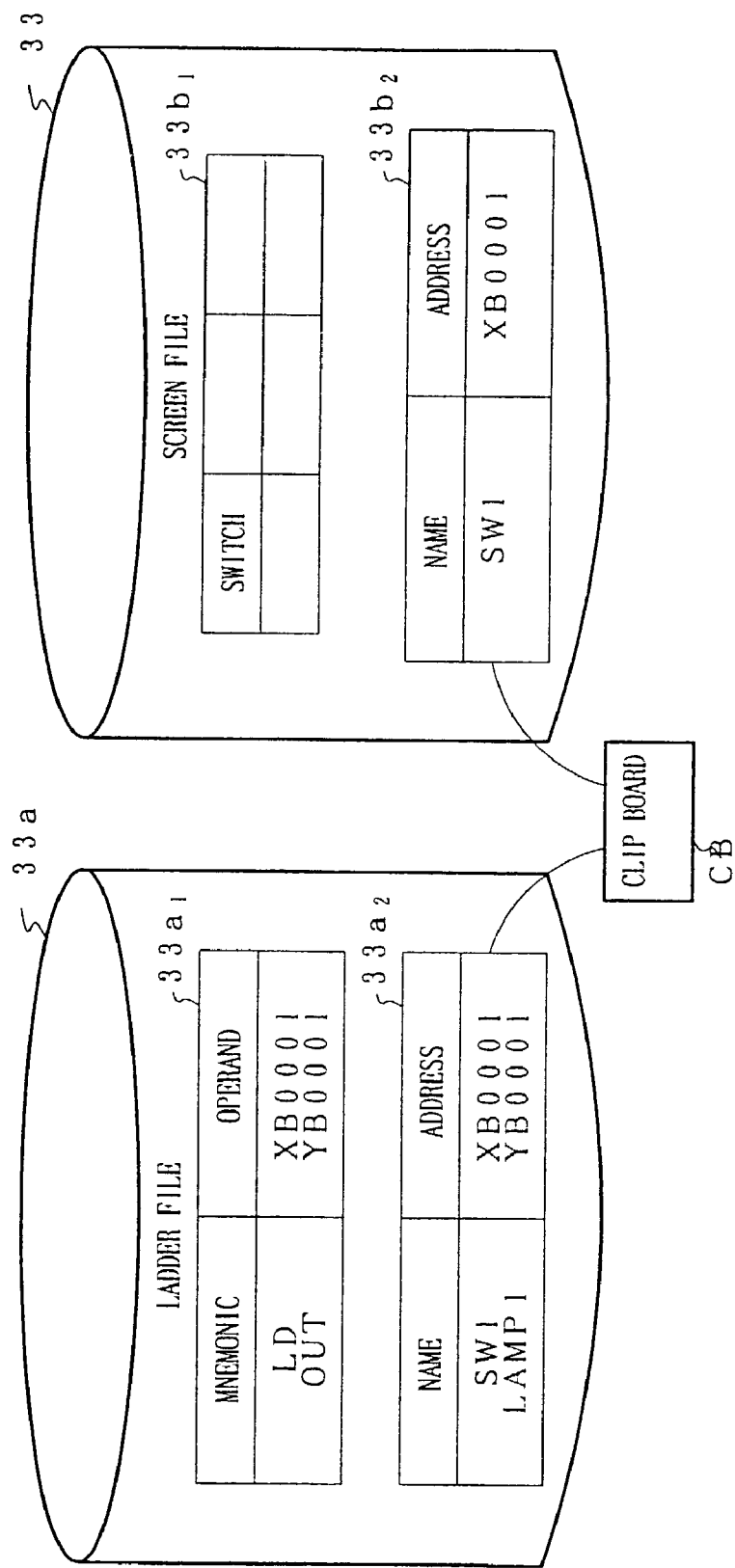
FIG. 16 is an explanatory view showing specifically how copying of the attribute data is carried out in accordance with the procedure shown in FIGS. 15(a) to 15(d).

To begin with, as shown in FIG. 15(a), drawn in advance on the ladder window 32a₁ by the ladder editor 32a are a ladder symbol L for representing a switch (input) and a ladder symbol L' for representing a lamp (output). In accordance with this, data as to the switch and the lamp is registered in the ladder file 33a, as shown in FIG. 16. Specifically, as to the switch, at least name "SW1" and address "XB0001" are registered. Moreover, as for the lamp, at least name "LAMP1" and address "YB0001" are registered.

As shown in FIG. 15(a), the screen generating window 32b₁ is kept opened in this state. Further, as shown in FIG. 15(b), when the ladder symbol L of the ladder window 32a₁ is dragged and dropped onto the screen generating window 32b₁, the dialog box D₁ is displayed on the screen generating window 32b as shown in FIG. 15(c).

As discussed above, the attribute data as to all the ladder symbols generated by the ladder editor 32a is copied to the screen file 33b collectively in advance by importing. Alternatively, the attribute data as to a single ladder symbol is imported each time the dragging and dropping is carried out. This importing is realized by recording the attribute data temporarily in the clip board CB, then by copying the attribute data in the screen file 33b, as shown in FIG. 16.

When one adequate mark is selected from among marks of various kinds having switching functions in the dialog box D₁, a screen M of the mark selected is displayed on the screen generating window 32b₁, as shown in FIG. 15(d), while a dialog box D₂, which includes therein the attribute data (name "SW1" and property "ON"), is displayed. Here, if an OK button is clicked, the mark M on the screen generating window 32b₁ and the attribute data are determined, and figure data and attribute data as to the mark M of the switch are recorded in association in the figure data file section 33 $b_1$ and the attribute data file section 33$b_2$ of the screen file 33$b$ (see FIG. 16).

Therefore, the user do not need to carry out operation of drawing the mark M of the switch on the screen generating window 32$b_1$, and operation of inputting the necessary attribute data, so that the user can generate the user screen very easily.

Figure 13:
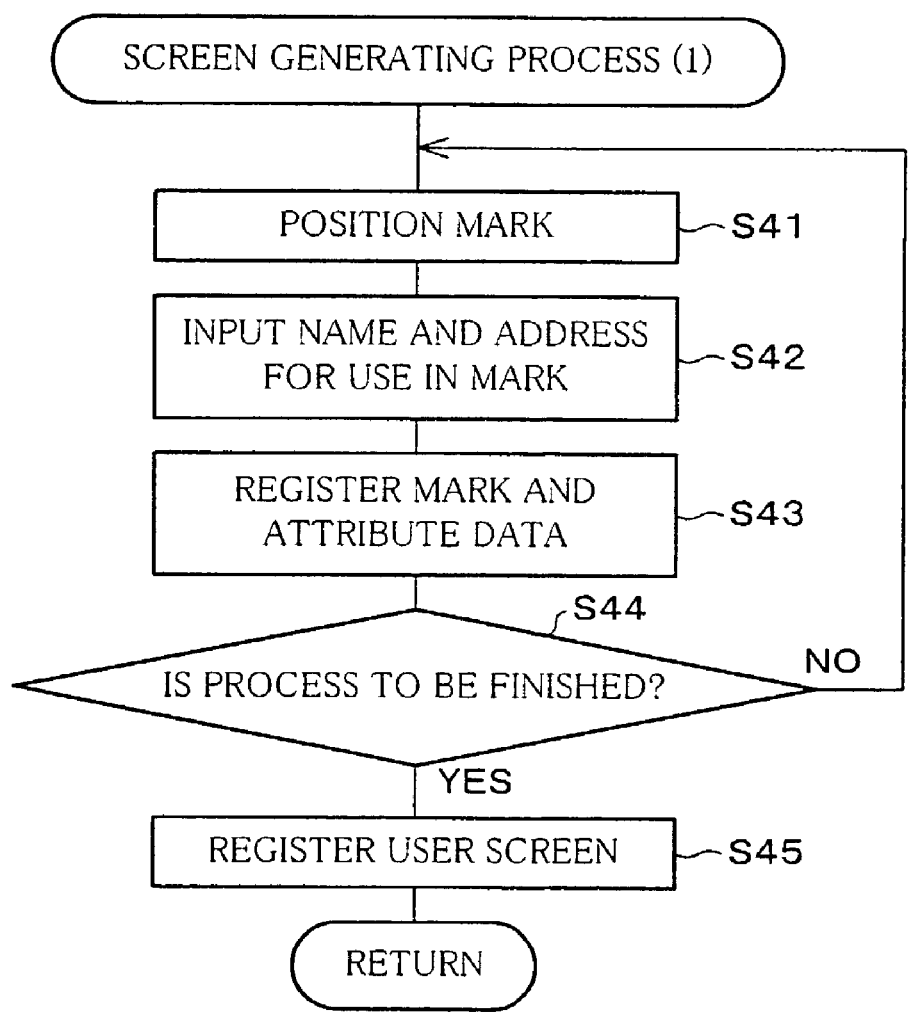
FIG. 13 is a flow chart showing a procedure of screen generating process carried out prior in the editing process.

On the other hand, in case the screen generating process (1) is carried out prior, a procedure of the flow chart illustrated in FIG. 13 is followed. Here, it is assumed that the ladder editor 32$a$ and the screen generating editor 32$b$ are activated in the computer 3, the ladder window 32$a_1$ and the screen generating window 32$b_1$ are opened at the same time on the display section 35$a$ (see FIG. 17($a$)) of the display device 35. However, in case the screen generating process (1) is carried out prior, it is only required that at least the screen generating editor 32$b$ is activated.

To begin with, the marks are positioned on the screen generating window 32$b_1$, with respect to each input-output apparatus 4 (S41). Next, inputted is the attribute data, such as names and addresses, as to the positioned marks (S42), then, the marks and the attribute data is registered in the temporary file (S43). Thereafter, according to the operation by the user, whether or not the screen generating process is to be finished is judged (S44). Here, in case the screen generating process is not to be finished, S41 is carried out thereafter, meanwhile in case the screen generating process is to be finished, the generated user screen is registered in the screen file 33$b$ (S45).

Figure 14:
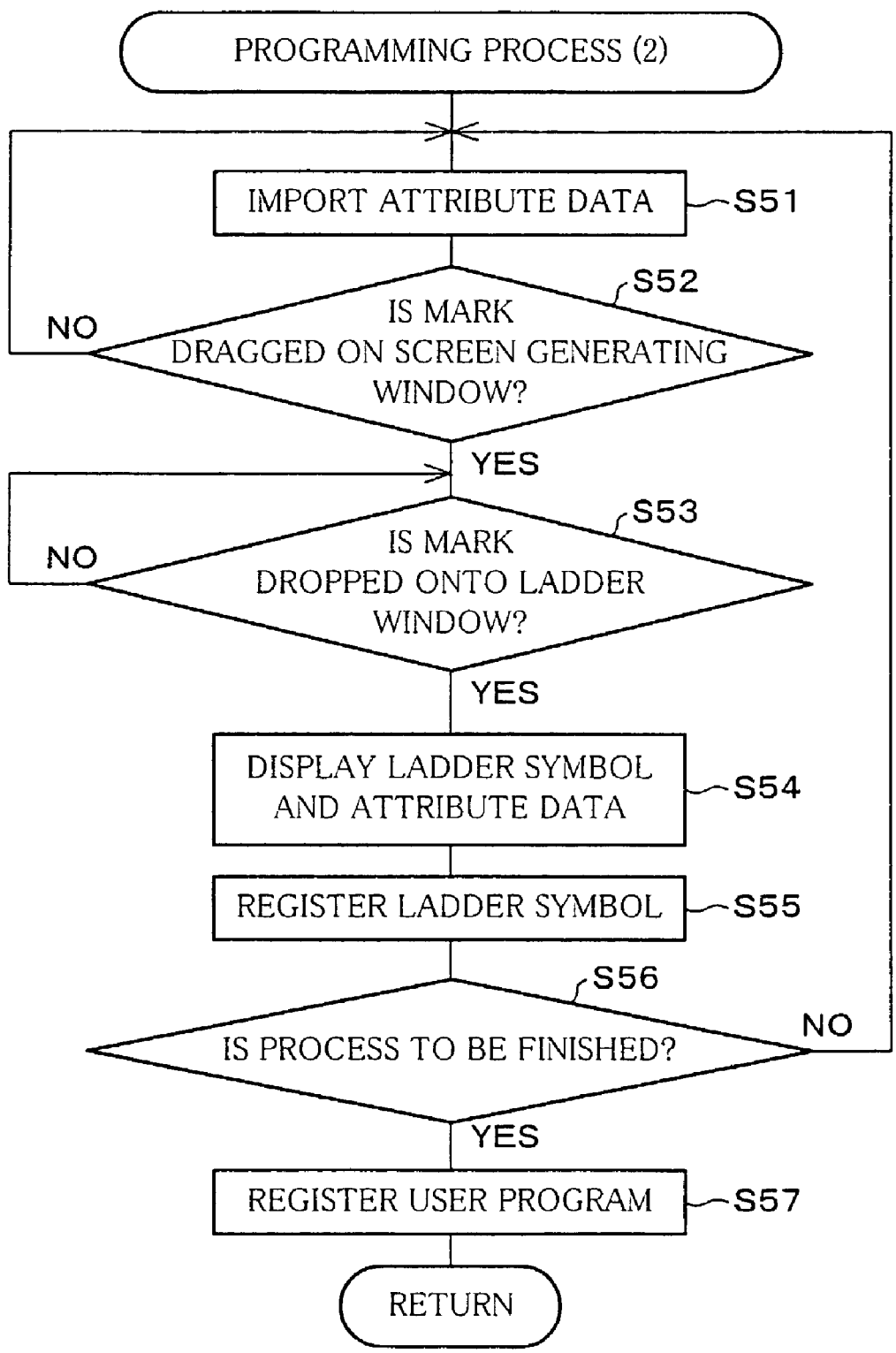
FIG. 14 is a flow chart showing a procedure of programming process carried out after the screen generating process shown in FIG. 13.
Figure 15:
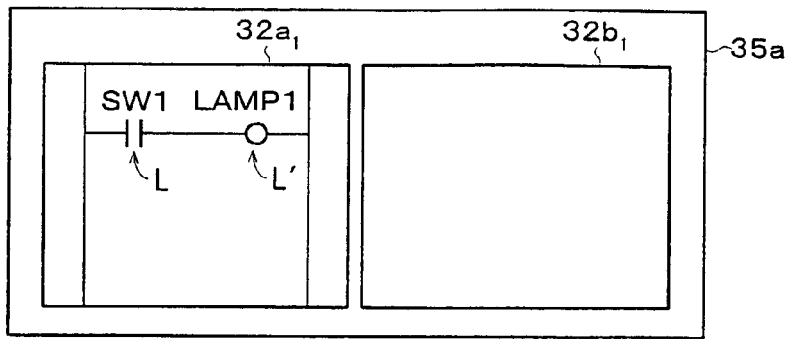
FIGS. 15(a) to 15(d) are explanatory views illustrating a specific example of the procedure shown in FIG. 12.
Figure 15:
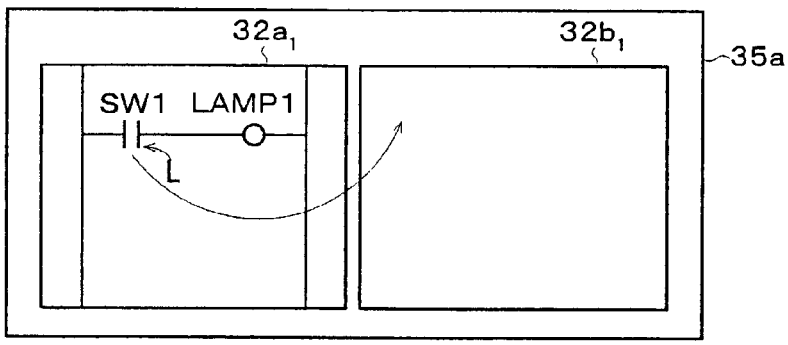
Figure 15:
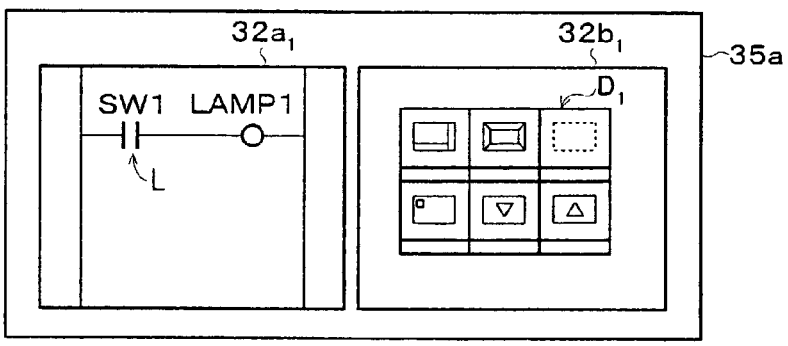
Figure 15:
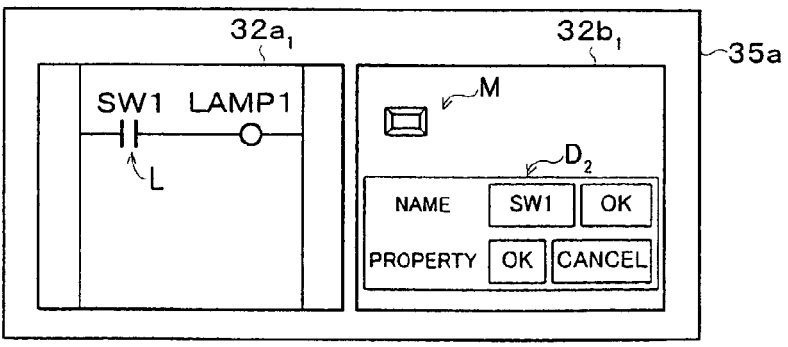

The programming process (2) carried out next follows a procedure of the flow chart shown in FIG. 14.

To begin with, the attribute data as to the mark registered in the screen file 33$b$ in advance is imported to the ladder file 33$a$ (S51). Whether the mark on the screen generating window 32$b_1$ is dragged or not is judged (S52). In case the mark is dragged, whether the mark dragged is dropped onto the ladder window 32$a_1$ or not is judged (S53). Here, in case it is ascertained that the mark is thus dropped, the attribute data is displayed together with the ladder symbol associated with the function, in accordance with the function included in the attribute data as to the mark dragged (S54).

With the above procedure, the attribute data as to all the marks positioned by the screen generating editor are collectively copied to the ladder file 33$a$ in advance by importing in S51. However, alternatively to this, it may be so arranged that the attribute data as to a single mark is imported every time the dragging and dropping is carried out.

Thereafter, the displayed ladder symbol is registered in the temporary file (S55). Then, whether the programming process is to be finished or not is judged in accordance with the operation by the user (S56). Here, in case the programming process is not to be finished, S51 is carried out thereafter, meanwhile in case the programming process is to be finished, the generated user program is registered in the ladder file 33$a$ (S57).

Here, explained is a specific example of the programming process (2) by the procedure of the flow chart shown in FIG. 14.

Figure 17:
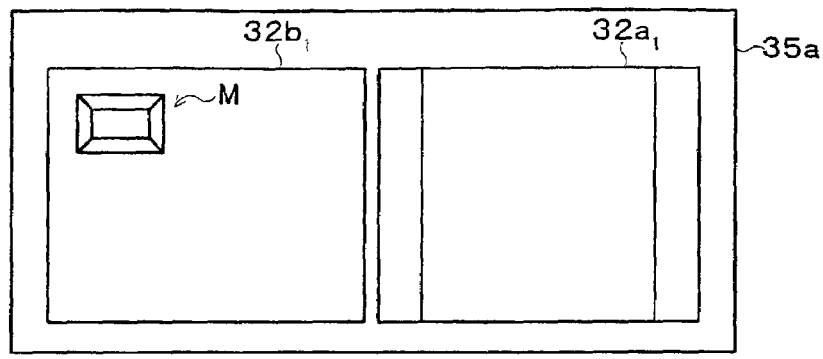
FIGS. 17(a) to 17(c) are explanatory view illustrating a specific example of the procedure shown in FIG. 14.
Figure 17:
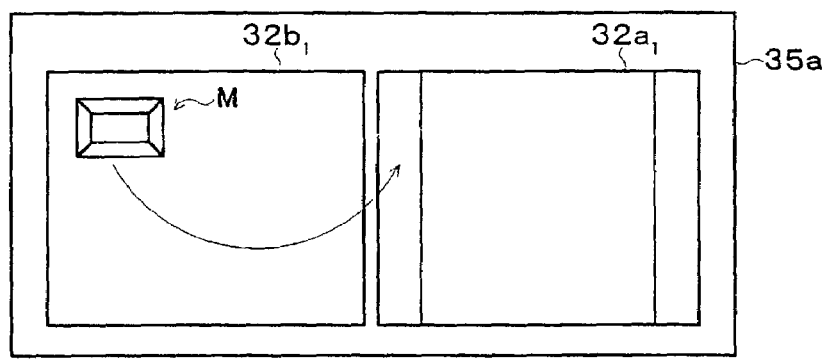
Figure 17:
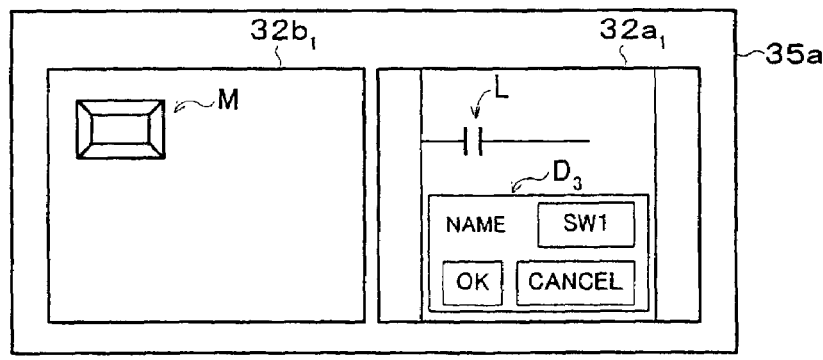
Figure 18:
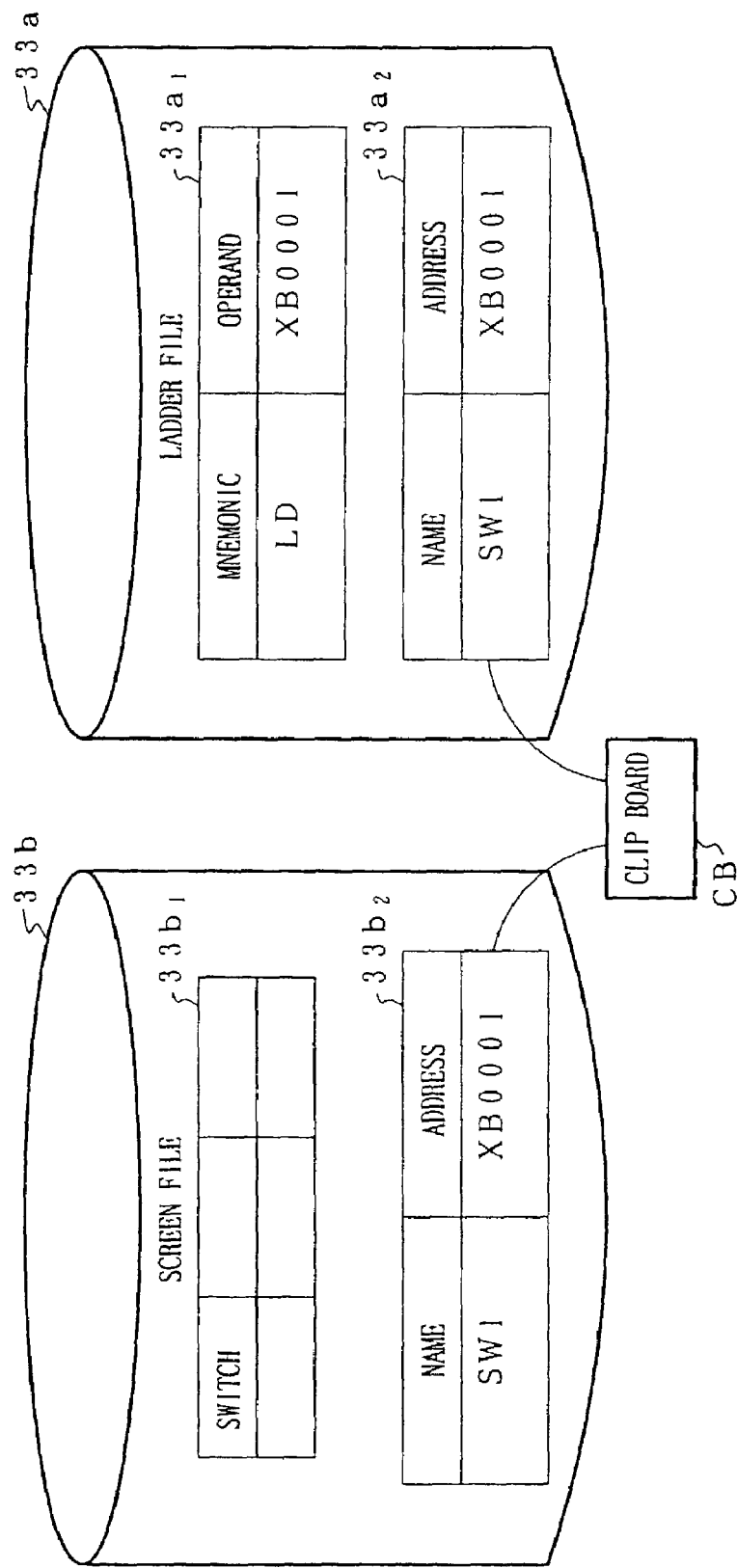
FIG. 18 is an explanatory view illustrating specifically how copying of the attribute data is carried out in accordance with the procedure shown in FIGS. 17(a) to 17(c).
Figure 19:
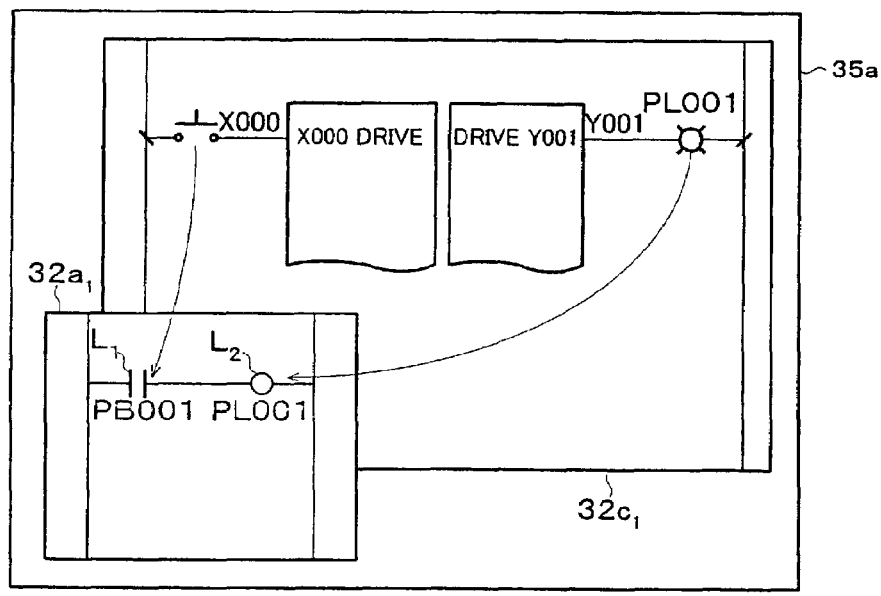
FIG. 19(a) is an explanatory view showing an example of automatic generating of a ladder symbol by a ladder editor using data of CAD software.
FIG. 19(b) is an explanatory view showing an example of automatic generating of a mark by a screen generating editor using the data of the CAD software.
Figure 19:
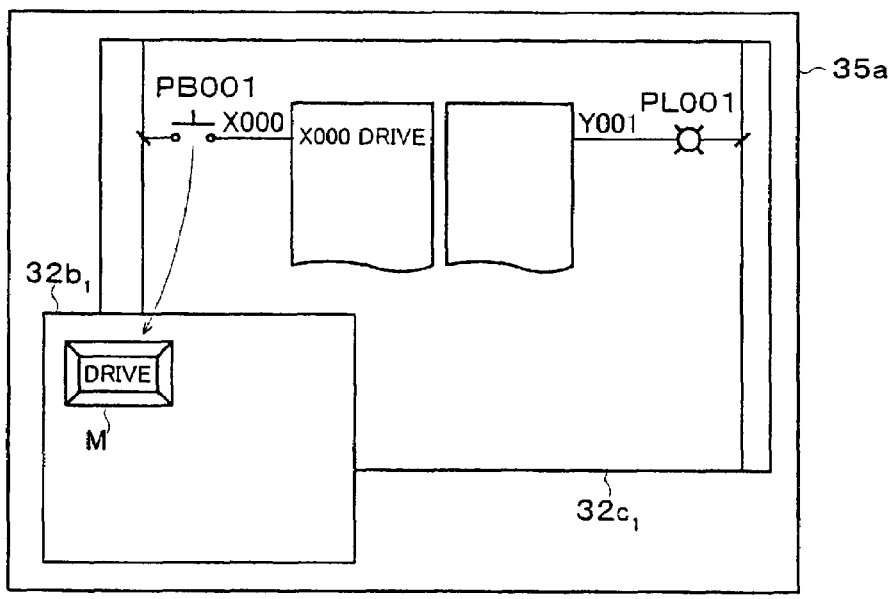

To begin with, as shown in FIG. 17($a$), a mark M, which represents a switch (input), is positioned and drawn in advance on the screen generating window 32$b_1$ by the screen generating editor 32$b$. In accordance with this, the data as to the switch is registered in the screen file 33$b$ as shown in FIG. 18. Specifically, as to the switch, at least name "SW1" and address "XB0001" are registered.

The ladder window 32$a_1$ is opened in this state as shown in FIG. 17($a$). Further, if the mark M on the screen generating window 32$b_1$ is dragged to the ladder window 32$a_1$ and then dropped thereto as shown in FIG. 17($b$), a ladder symbol L and a dialog box $D_3$ are displayed on the ladder window 32$a_1$ as shown in FIG. 17($c$).

As described previously, the attribute data as to all the marks positioned by the screen generating editor 32$b$ is collectively copied to the ladder file 33$a$ in advance by importing. Alternatively, the attribute data as to a single mark is imported every time the dragging and dropping is carried out. This importing is realized by, as shown in FIG. 18, temporarily storing the attribute data in the clip board CB, and then copying the attribute data to the ladder file 33$a$.

Then, as shown in FIG. 17($c$), the ladder symbol L corresponding to the function of the switch is drawn on the ladder window 32$a_1$, while the dialog box $D_3$ including the attribute data (name "SW1") is displayed. Here, if the OK button is clicked, the ladder symbol L on the ladder window 32$a_1$ and the attribute data is determined, and a command and the attribute data as to the ladder symbol L of the switch are stored, in association with each other, in the command file section 33$a_1$ and the attribute data file section 33$a_2$ of the ladder file 33$a$ (see FIG. 18).

Therefore, the user does not need to carry out operation of drawing the ladder symbol L of the switch on the ladder window 32$a_1$, and operation of inputting the necessary attribute data, so that the user can generate the user program very easily.

As mentioned above, the first to third display/control systems of the present embodiment, which are provided individually with the ladder file 33$a$ for storing the user program generated by the ladder editor 32$a$, and the screen file 33$b$ for storing the user screen generated by the screen generating editor 32$b$, are so arranged that the first to third display/control systems copy, by using the copying function section 32$d$, the attribute data of the ladder symbol to the screen file 33$b$, and the attribute data of the mark to the ladder file 33$a$. This makes it possible to have the attribute data common to the both the files 33$a$ and 33$b$, while making it possible to easily have association of the attribute data between both the files 33$a$ and 33$b$.

Moreover, by thus having the databases, which are independently used for the user program and the user screen, it is possible to copy the attribute data from/to the one database to/from the other database as described above. Specifically, data of database is generated by a database prepared by using multipurpose application software (such as spreadsheet software), a database of CAD for electronic circuits, software for G code programming (process programming) for NC control apparatuses, or the like. The data inputted on operation input screens of the software are selected as image blocks, and the data is copied to the database of the user program or the user screen by dragging and dropping (or copying and pasting) as described above.

Especially, for designing control panels by CAD software, it is effective to exchange the data between the ladder editor and the screen generating editor.

For any apparatus, an electrical system diagram is needed for developing the apparatus, not to speak of a machine design drawing. Moreover, in order to prepare the electrical system diagram, it is necessary to prepare electrical specifications, a diagram of a control panel, a list of parts, a hardware diagram (such as circuit diagram). And in accordance with the prepared electrical system diagram, the control panel is produced. Then, executed are works such as electrical works of an apparatus system in which the control panel is mounted. Furthermore, as to processes of designing and producing the control panel, firstly specifications are determined and electrical constitution is designed by using a diagram-preparing tool, such as CAD software, in accordance with the specifications. Thereafter, program generating of the display/control system including the PLC and the like is carried out. At this point, by using the function of the copying function section $32d$ of the present embodiment, it is possible to utilize data inputted by the CAD software in order to generate the user program and the user screen.

Specifically, in case CAD software is incorporated in the application $32c$ (see FIGS. 1, 7 and 9) of the computer 3, the CAD software is activated in order that a CAD window $32c_1$ and a ladder window $32a_1$ are displayed on the display section $35a$ as shown in FIG. $19(a)$. Displayed on the CAD window $32c_1$ are an push-button switch (represented by figure symbol name PB001), which is connected to an input section of the PLC, and a pilot lamp (represented by figure symbol name PL001), which is connected to an output section of the PLC. Following a procedure almost identical to the procedure of the flow chart shown in FIG. 14, a ladder symbol $L_1$ (such as LD command) corresponding to the push-button switch is displayed on the ladder window $32a_1$ by dragging and dropping onto the ladder window $32a_1$ a figure symbol (image block) of the push-button switch displayed in this state on the CAD window $32c_1$. In a similar manner, the pilot lamp is displayed as a ladder symbol $L_2$ (OUT command) on the ladder window $32a_1$.

On the other hand, in case the user screen is generated by using the data of CAD, as shown in FIG. $19(b)$, the CAD window $32c_1$ and the screen generating window $32b_1$ are displayed on the display section $35a$. In this state, a mark $M_1$ corresponding to the push-button switch is displayed on the screen generating window $32b_1$ by dragging and dropping onto the screen generating window $32b_1$ the figure symbol of the push-button switch displayed on the CAD window $32c_1$, following a procedure almost identical with the procedure of the flow chart shown in FIG. 12. Here, the mark $M_1$ for both the push-button switch and the pilot lamp is displayed on the screen generating window $32b_1$, if the input section and the output section of the PLC use the push-button switch and the pilot lamp functions of the same type.

Figure 20:
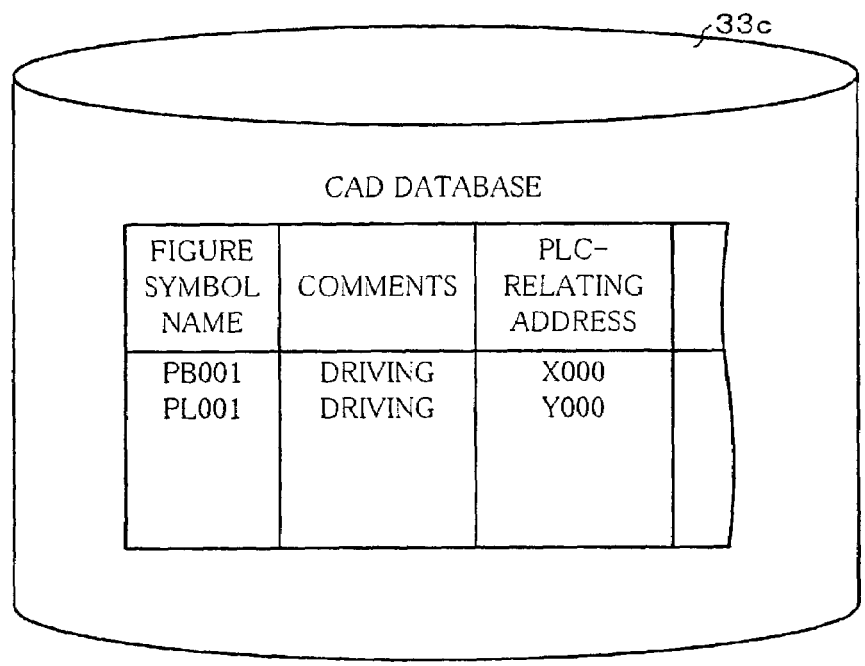
FIG. 20 is an explanatory view showing constitution of a CAD database, which stores the data of the CAD software therein.
Figure 21:
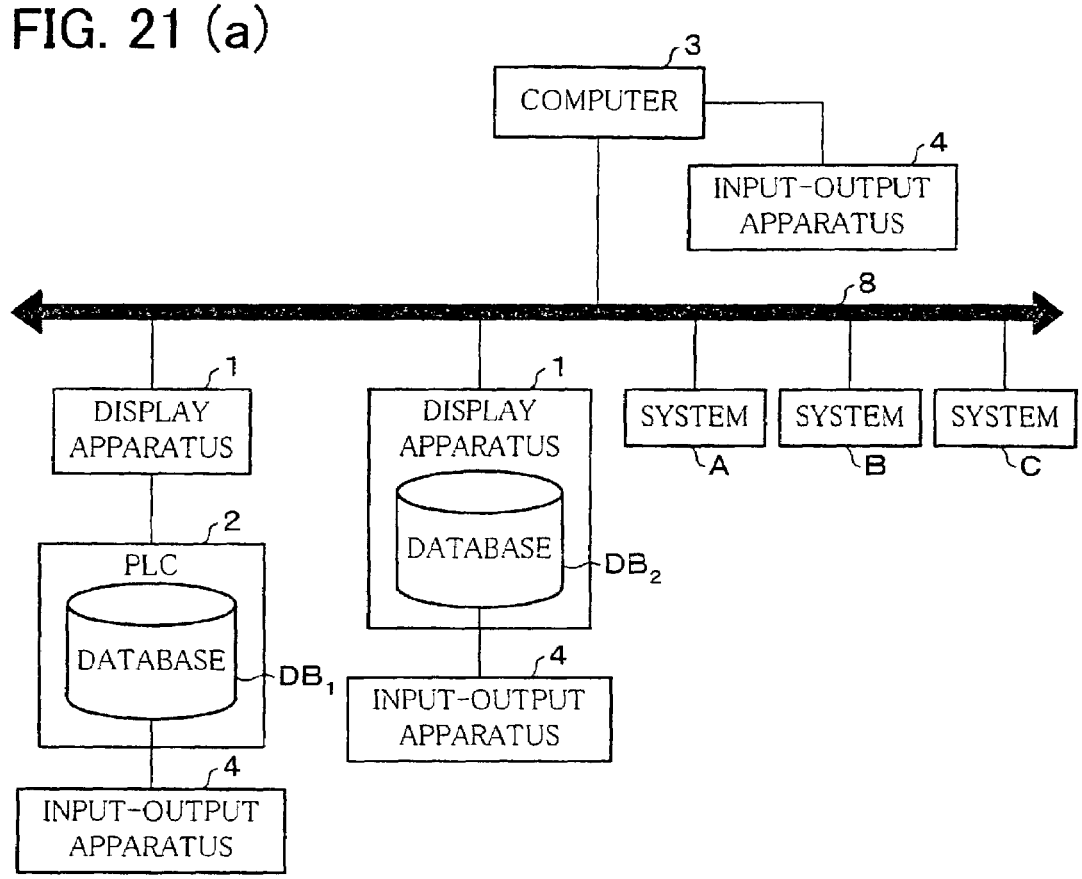
FIG. 21(a) is a block diagram showing the first to third display/control systems connected with other systems via an open network.
FIG. 21(b) is an explanatory view illustrating an example of automatic generation of the ladder symbol and the mark using a database of another system, in a computer connected to the open network.
Figure 21:
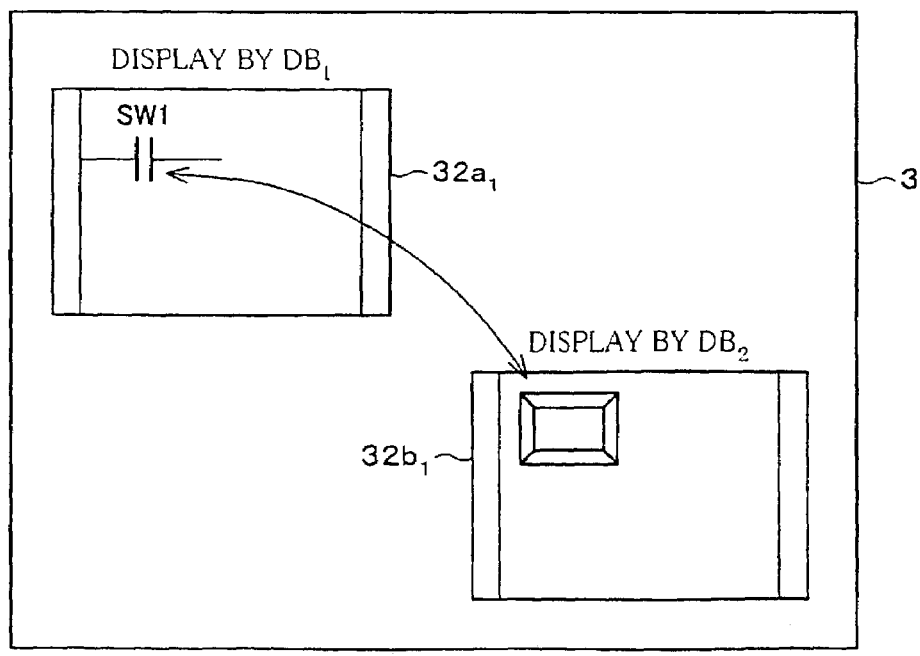

The data, which is to be imported to the ladder file $33a$ and the screen generating file $33b$ during the above process, is stored in a CAD database structured in the application file $33c$, as shown in FIG. 20. Specifically, stored are figure symbol names, comments, PLC-relating addresses and the like. The PLC-relating address is an address allotted to an apparatus, such as the push-button switch and the pilot lamp to be connected to the PLC 2. The figure symbol name is a name of a symbol given to the push-button switch and the pilot lamp in the above-mentioned figure generated by the CAD software. The figure symbol name, which is associated with the address, is set to be identical with a variable number, which is used instead of the address when the address of the push-button, the pilot lamp or the like is allotted to the ladder symbol or the mark. The comments are provided in order to represents operation state of the apparatus.

In the CAD database, it is possible to use the figure symbol name (name) and the PLC-relating address (address) as the attribute data (see FIGS. $6(a)$ and $6(b)$) by setting the figure symbol name and the variable number to be identical to each other. By doing this, the ladder editor $32a$ and the screen generating editor $32b$ display the figure symbol name as the variable number, together with the ladder symbols $L_1$ and $L_2$ and mark M. Moreover, the screen generating editor $32b$ displays on the mark M a comment "driving".

Here, because the computer 3 having the editing function and the PLC function is connected to the open network 8 in the third display/control system as shown in FIG. 9, it is possible to exchange via the network the attribute data as to the ladder symbols and the marks between the database of the computer 3 and databases of the other systems A to C connected to the open network 8. Moreover, this makes it possible for the computer 3 and a system in a remote place to use a database in common via the network.

Again in the second display/control system, if the programmable display apparatus 1 is provided with an interface, which can be connected to the open network 8, it is possible to connect via the open network 8 the programmable display apparatus 1 with the computer 3 and the other systems A to C and the like as shown in FIG. $21(a)$. Moreover, in case of the first display/control system, for the communication between the programmable display apparatus 1 and the PLC 2, it is necessary to deal with communication protocols, which are different depending on makers of the PLC 2, even though it is possible to connect the programmable display apparatus 1 to the open network 8 in the same manner as the second display/control system. For this reason, as recited in International Patent Publication No. WO 99/56186 (published on Nov. 4, 1999), provided to the programmable display apparatus 1 is a function for converting mutually from/to a common communication protocol for use in communication via the open network 8 to/from communication protocols, which correspond to types of PLC 2.

Furthermore, even in case a plurality of the user screens having different patterns are generated with respect to a single user program, and in case the single programmable display apparatus 1 is connected with a plurality of PLCs 2 in the first display/control system, it is possible to easily realize linkage between one database and plural databases by copying data from/to the one database to/from the plural database.

Moreover, even though the example where ladder window and the screen generating window are displayed on the same display device is explained in the present embodiment, it is possible to adopt in the present invention a case where the ladder window and the screen generating window are displayed based on databases of different apparatuses, which are connected with each other via a network.

Specifically, as shown in FIG. $21(a)$, the data is exchanged between a database $DB_1$, in which the user program, which is downloaded to the PLC 2 of the first display/control system, is stored, and a database $DB_2$, in which the user screen, which is downloaded to the programmable display apparatus 1 of the second display/control system, is stored. In this case, in the computer 3, as shown in FIG. $21(b)$, it is possible to carry out automatic generation of the ladder symbols and the marks by dragging and dropping between the user program of the database $DB_1$ displayed on the ladder window $32a_1$, and the user screen of the database $DB_2$ displayed on the screen generating window $32b_1$. Therefore, it is possible to easily carry out editing and correcting between the user program already downloaded to the PLC 2 and the user screen downloaded to the programmable display apparatus 1.

In addition, the present invention including all embodiments including the present embodiment and all the following embodiments is of course adopted to not only programming using the ladder diagram but also such programming using other languages including the aforementioned five languages set as standard by IEC 6 1131-3. Moreover, the following other embodiments are also arranged as such, similarly to the present embodiment.

Second Embodiment

Described below is a second embodiment of the present invention with reference to FIGS. 5, 22 to 36. It should be noted that, in the present embodiment, constituent elements having almost identical functions with those in the first embodiment, and the constituent elements whose essential part has an identical function with those in the first embodiment are labelled in the same manner and explanations of those are omitted here. This is also applied in the following other embodiments.

Figure 22:
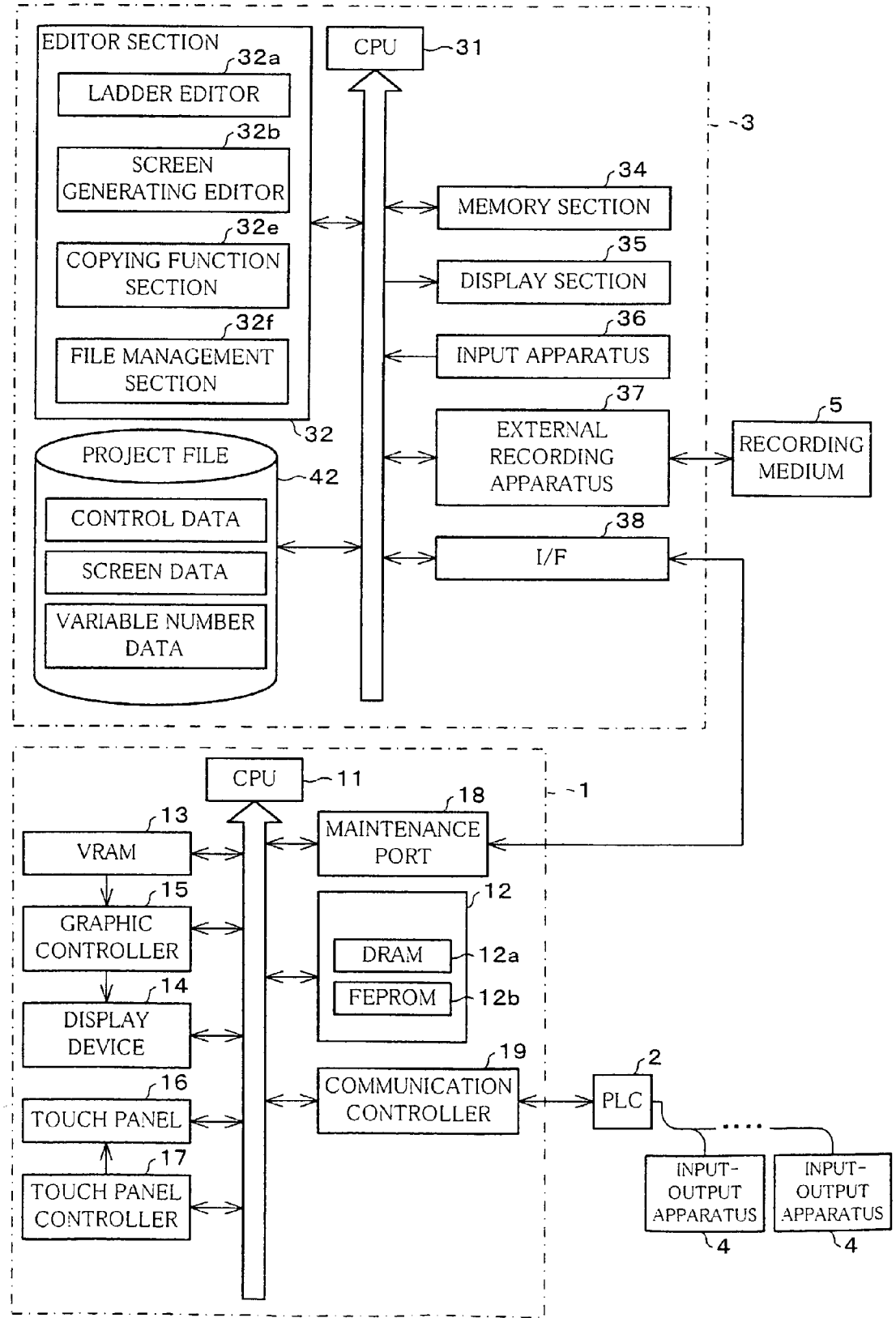
FIG. 22 is a block diagram illustrating a first display/control system of a second embodiment of the present invention.

A first display/control system shown in FIG. 22 includes a programmable display apparatus 1 and a PLC 2, similarly to the display/control system (see FIG. 1) of the first embodiment.

A computer 3 connected to the programmable display apparatus 1 is provided with a CPU 31, an editing section 32, a memory section 34, a display device 35, an input apparatus 36, an external recording apparatus 37, and an interface 38, similarly to the computer 3 of the display/control system shown in FIG. 1, but is provided with a project file 42, instead of the data file 33.

The editing section 32 includes a ladder editor 32a, a screen generating editor 32b, a copying function section 32e, and a file management section 32f.

By using a data copying function of OS, the copying function section 32e, which is data generating means in the present display/control system, causes the screen generating editor 32b to automatically generate (draw), on a screen generating window 32$b_1$, a mark corresponding to a ladder symbol in a ladder diagram generated by the ladder editor 32a via later-described variable number data. Moreover, by similarly using the data copying function of OS, the copying function section 32e causes the ladder editor 32a to automatically generate (draw), on a ladder window 32$a_1$, the ladder symbol corresponding to the mark on a screen generated by the screen generating editor 32b via the variable number data.

Specifically, when a function of dragging and dropping or that of copying and pasting is used to copy the mark or the ladder symbol, the mark and the ladder symbol are automatically generated in such a manner that attribute data is temporarily stored on a latter described clip board CB (see FIG. 33) provided to the memory section 34, then an editor to which the mark or the ladder symbol is copied looks up the variable number data of the attribute data.

The file management section 32f integrally manages a user program and a user screen by structuring in the project file 42 a database described later.

Data structure stored in the clip board CB is structured as shown in FIG. 5(a) discussed previously. An object type of the data structure is structured as shown in FIG. 5(b) and address information of the data structure is structured as shown in FIG. 5(c).

In addition, the copying function section 32e and the file management section 32f may be included respectively in the ladder editor 32a and the screen generating editor 32b as a function of one of the ladder editor 32a and the screen generating editor 32b.

Figure 23:
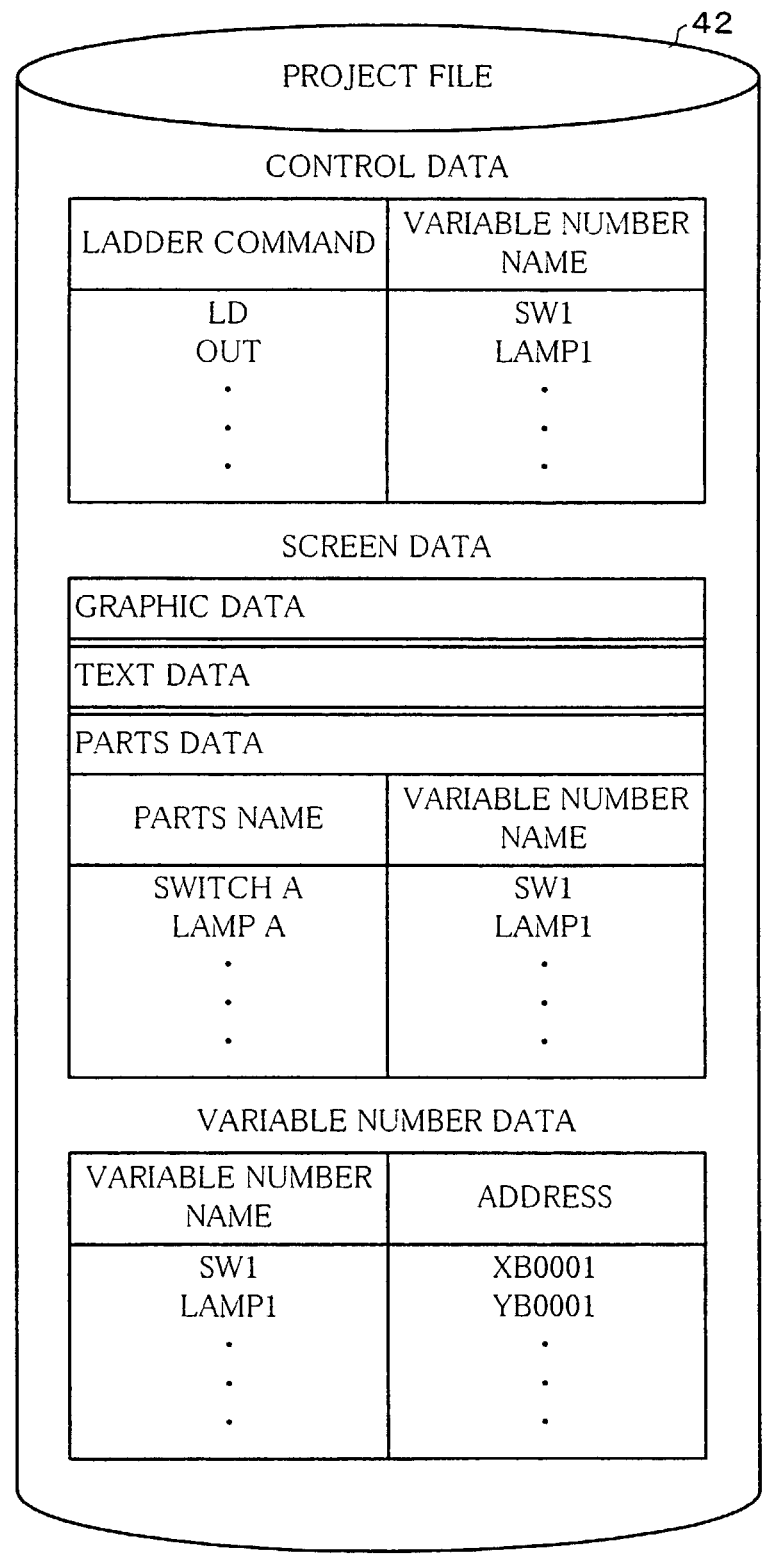
FIG. 23 is an explanatory view showing a database formed in a project file of a computer in the first to a third display control system of the second embodiment of the present invention.

The project file 42, as shown in FIG. 23, includes control data, screen data, and variable number data. The user program includes control data and variable number data, while the user screen includes the screen data and variable number data.

Moreover, the project file 42 stores the aforementioned result of I/O assigning, even though the result of I/O assigning is not shown here.

The user program, which is generated by the ladder editor 32a, is stored in the project file 42, and at the same time transferred to the PLC 2 via the programmable display apparatus 1 (or directly), then downloaded to a memory inside the PLC 2. On the other hand, the user screen, which is generated by the screen generating editor 32b, is stored in the project file 42, and, if necessary, transferred to the programmable display apparatus 1 via the interface 38 and downloaded to an FEPROM 12b.

The control data, which is inherent data, is composed of a ladder command (mnemonic) as a control symbol data, and a variable number name, which correspond to the ladder symbol inputted. Examples of the variable number name include a symbol such as SW1 corresponding to a switch or LAMP1 corresponding to a device (an input-output apparatus 4), operation instructions, event name such as operation state of the device. A variable number defined by the variable number name of this kind is, in advance, associated with a desired input-output number (I/O address) corresponding to the device, as described above.

The screen data, which is inherent data, includes graphic data, text data, and parts data. The graphic data is figure data such as a line, a circle, a ellipse, a triangle, a quadrangle, a painted-out figure. The text data includes a title of the user screen or a sentence, which are composed of characters or symbols. The parts data is the parts-relating data mentioned previously, which is provided in advance in the screen generating editor 32b, and composed of parts name and the variable number name as display symbol data. Examples of the parts name include names, like switch A, which is distinguished so that a switch is specifically selected from among various switches, parts codes given to the parts respectively (for example, codes formed by combination of alphabets and numbers). Moreover, the function section described previously in which the dynamic function is set, is included as the screen data, even though the function section is not shown here.

The variable number data, which is common data, is information commonly used for the user program and the user screen, and is composed of the variable number name and the address (I/O address and the like). The variable number data is included in the attribute data. The variable number can be set in a bit format, an integral number format, or a real number format, besides this format. Data of those kinds is included in the attribute data, together with the variable number data.

The project file 42 shown in FIG. 23 is composed as a database including specific data, which can be associated with. The project file 42 is composed of the control data, the screen data, and the variable number data, which are respectively formed as a relational table. In this way, by setting the variable number names of the variable number data basic keys, while setting the variable number names of the control data as external keys, the variable number data and the control data is combined, thereby forming the user program. Moreover, by setting the variable number names of the variable number data as basic keys, while setting the variable number names of the screen data as external keys, the variable number data and the screen data is combined, thereby forming the user screen.

For example, because a relational database is described in a table format, it is possible to incorporate, into the present database, data prepared by commercial database software or a spreadsheet software, by constituting the ladder editor 32a and the screen generating editor 32b to be capable of reading and writing files in CSV (Comma Separated Value) format.

The reverse of this is also possible.

As descried above, the user program and the user screen are associated with each other by using the variable number data, under the management of the file management section 32f. Therefore, display operation and control operation of the first to a third display/control system are related to each other.

The project file 42 may be composed as a hierarchical database, a network data base, or an object-oriented database and the like, besides the relational database.

Figure 24:
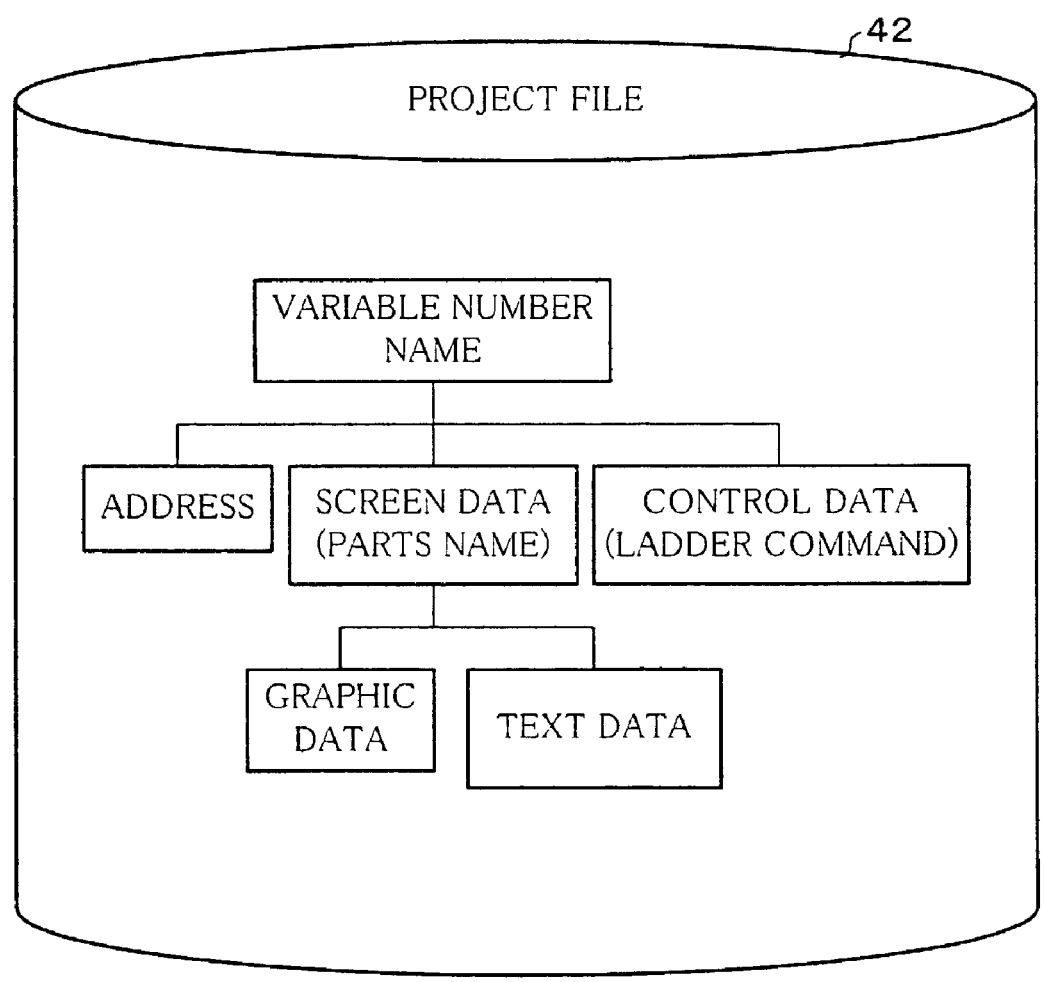
FIG. 24 is an explanatory view showing another database formed in the project file of the computer.

For example, for each variable number name the hierarchical database forms, as shown in FIG. 24, hierarchical structure, which is so arranged that the variable number name is a root segment while the control data (ladder command), the screen data (parts name) and the address are subordinate segments being subordinate thereto, and further that the graphic data and the text data are subordinate segments being subordinate to the screen data. Moreover, in the network database, which is similarly arranged as the hierarchical database, the subordinate segments are subordinate to other parent segment if necessary.

Figure 25:
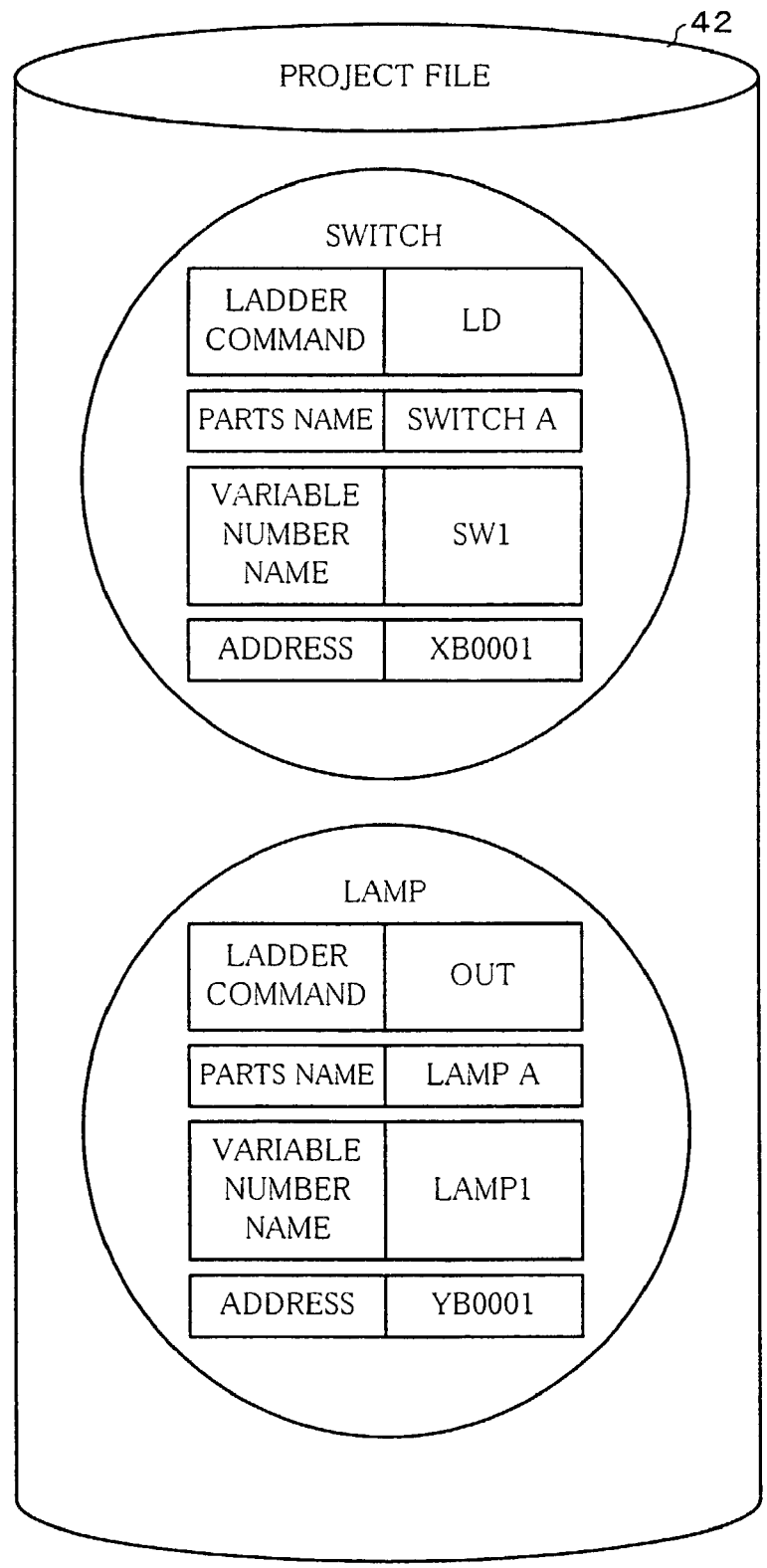
FIG. 25 is an explanatory view illustrating still another database formed in the project file of the computer.

In the object-oriented database, as shown in FIG. 25, treated as objects are encapsulated parts such as a switch and the like, in which the ladder command (for example, LD), the parts name (for example, switch A), the variable number name (for example, SW1), and the address (for example, XB0001). In each object, the ladder command, the parts name, and address are treated as data, while the variable number name is treated as a procedure. Therefore, access to each data (looking up each data) is carried out via the variable number name.

Figure 26:
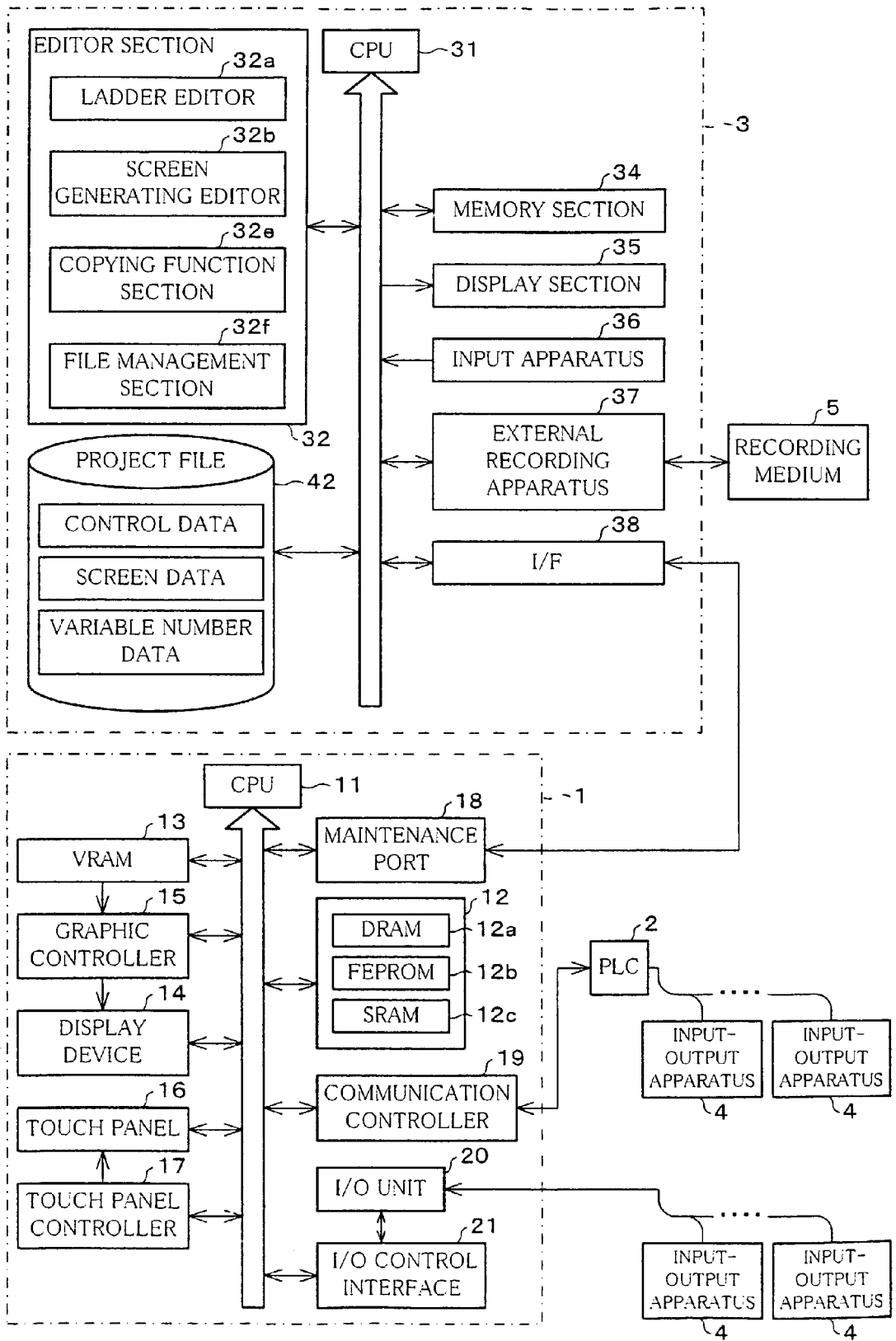
FIG. 26 is a block diagram showing constitution of the second display/control system of the second embodiment of the present invention.

The second display/control system, which is shown in FIG. 26, includes the programmable display apparatus 1 and the PLC 2, similarly to the first display/control system described before. However, the programmable display apparatus 1 is further provided with a PLC function, and is so adopted as to directly control the input-output apparatuses 4. For this reason, the programmable display apparatus 1 is provided with an SPAM 12c in a memory section 12, and further provided with an input-output unit 20 and an I/O control interface 21, in addition to a communication controller 19, which is described previously.

Figure 27:
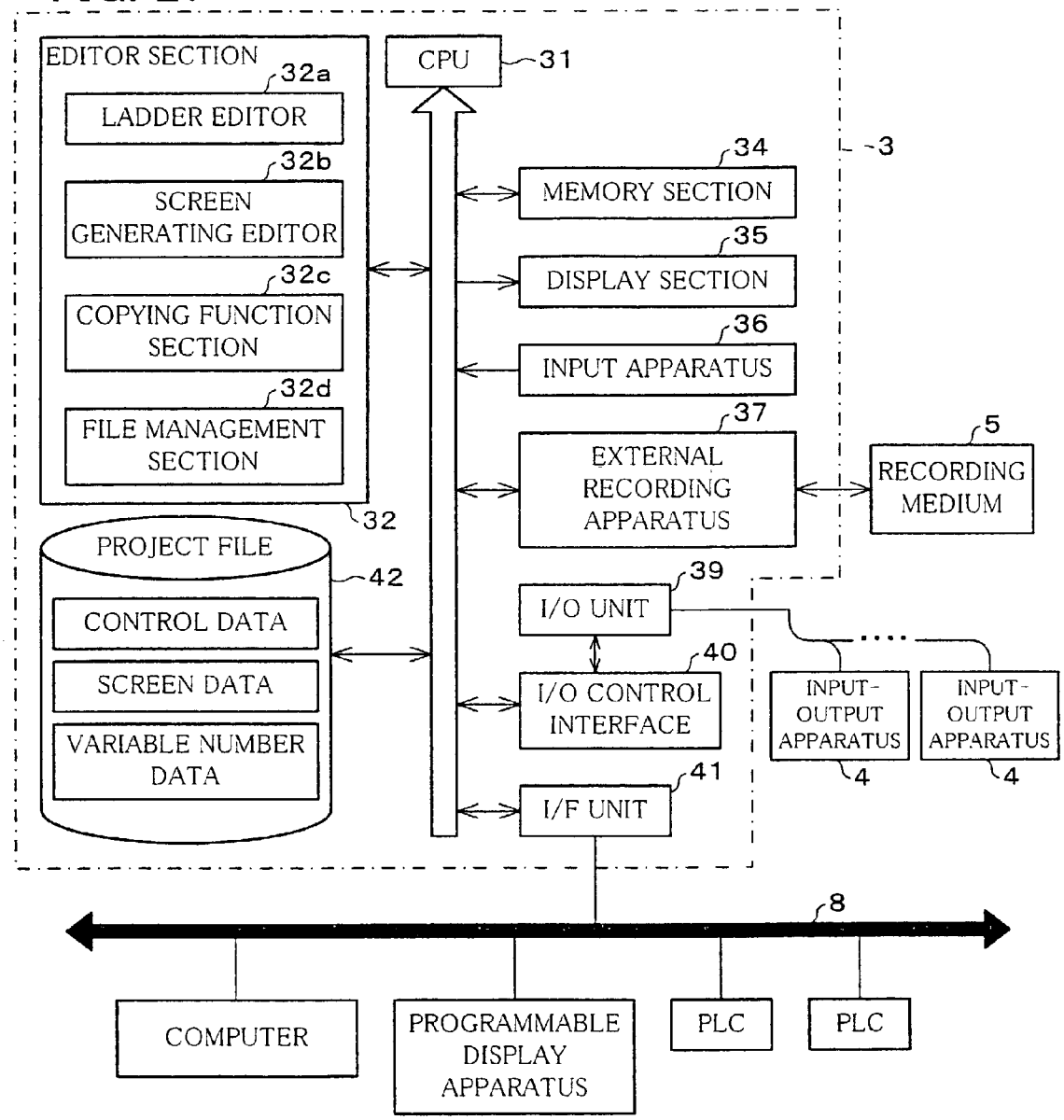
FIG. 27 is a block diagram illustrating constitution of the third display/control system of the second embodiment of the present invention.

The third display/control system, which is shown in FIG. 27, is composed of a computer 3 as an open controller, and is provided with an input-output unit 39 and an I/O control interface 40, instead of the interface section 38 of the computer 3 of the first display/control system. Moreover, the computer 3 is provided with an interface unit 41 for connection with an open network 8. With this, the computer 3 is connected with other computers, programmable display apparatuses, PLCs and the like via the open network 8.

The computer 3 carries out, in accordance with a control function program, the user program, which is generated by the ladder editor 32a and stored in the project file 42. On the other hand, the computer 3 functions as an editing apparatus for generating the user program or the user screen by activating the ladder editor 32a or the screen generating editor 32b when the computer 3 is in an off-line state.

Here, explained are procedures of generating the user program and the user screen in the first to third display/control systems, with reference to flow charts shown in FIGS. 28 to 31.

Figure 28:
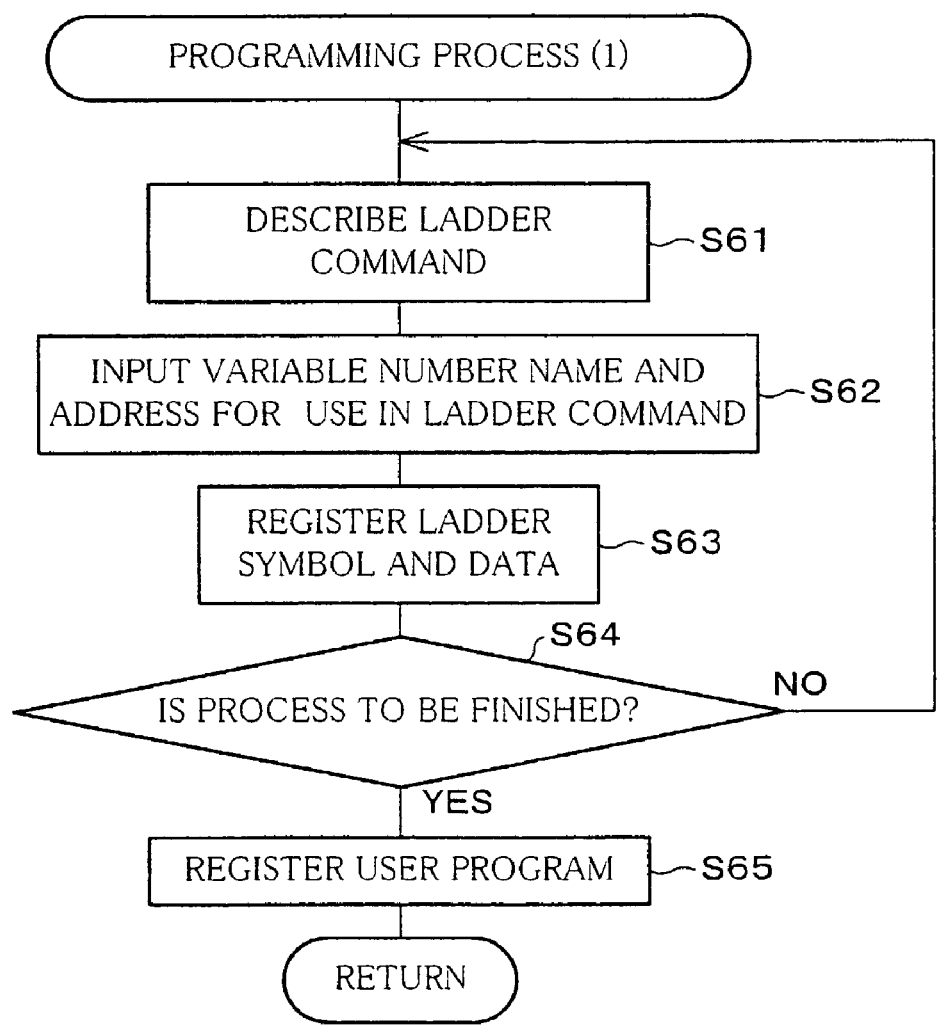
FIG. 28 is a flow chart showing a procedure of programming process carried out prior in an editing process carried out in the computer of the first to third display/control systems.

In case a programming process (1) is carried out prior, followed is a procedure of the flow chart shown in FIG. 28. Here, it is assumed that, in the computer 3, the ladder editor 32a and the screen generating editor 32b are activated and a screen generating window $32b_1$ for generating the user screen and a ladder window $32a_1$ for generating a user program are opened at the same time on a display section 35a (see FIG. 32(a)) of the display device 35. However, when the programming process (1) is carried out prior, it is only required that at least the ladder editor 32a is activated.

To begin with the ladder command is described by positioning the ladder symbols on the ladder window $32a_1$, with respect to each input-output apparatus 4 (S61). Next, inputted are the attribute data including the variable number data (the variable number name and address) to be used as to the ladder command described (S62), and the ladder symbol and the attribute data are registered in a temporary file (S63). Then, judged in accordance with operation by a user is whether the programming is to be finished or not (S64). Here, in case the programming is not to be finished, S62 is carried out thereafter, meanwhile in case the programming is to be finished, the thus generated user program is registered in the project file 42 (S65).

Figure 29:
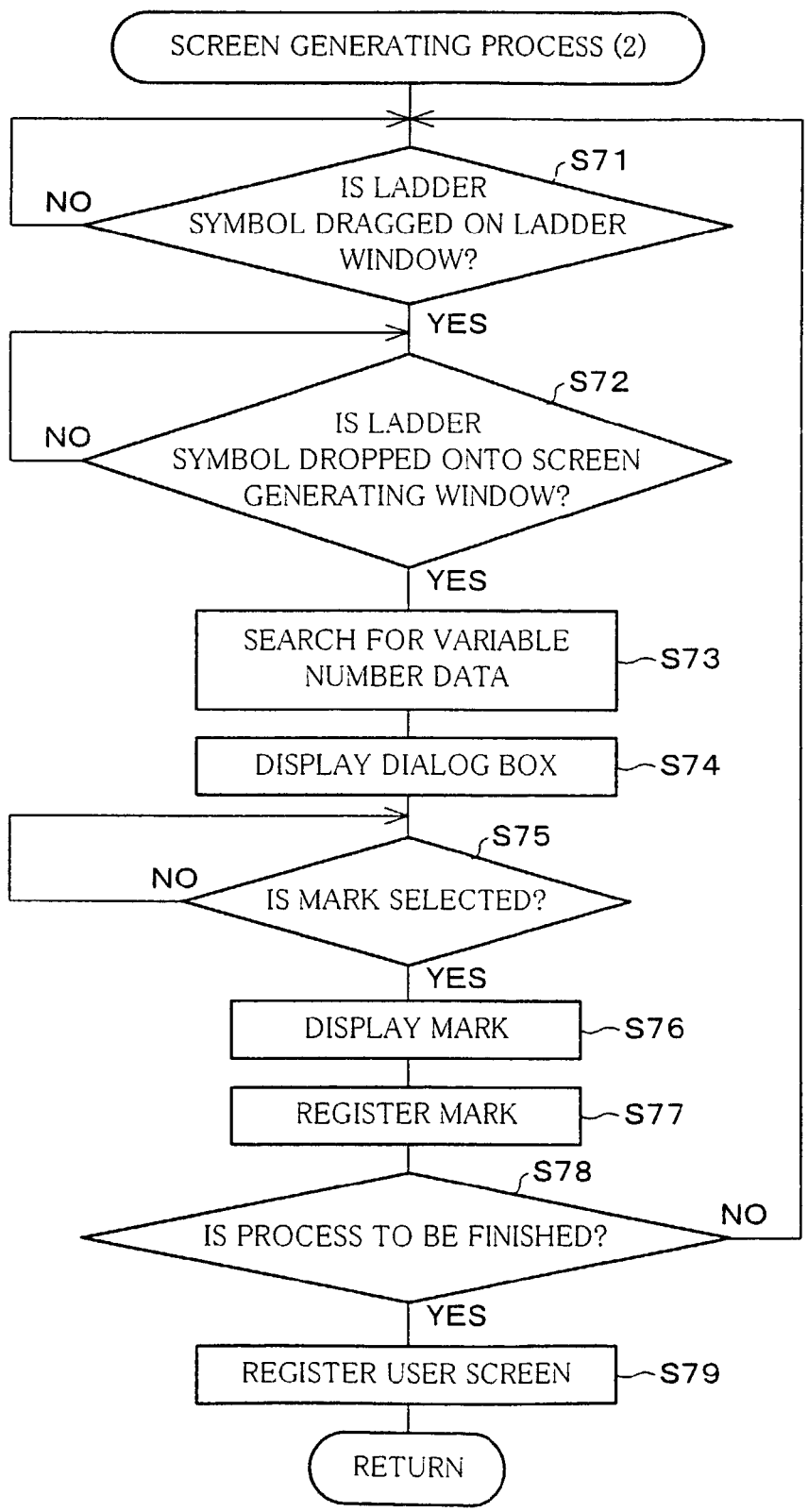
FIG. 29 is a flow chart illustrating a procedure of screen generating process carried out after the programming process shown in FIG. 28.

Screen generating (2) to be carried out next follows the flow chart shown in FIG. 29.

To begin with, whether or not the ladder symbol on the ladder window $32a_1$ is dragged by using a mouse or the like is judged (S71). In case the ladder symbol is dragged, whether or not the dragged ladder symbol is dropped onto the screen generating window $32b_1$ is judged (S72). Here, in case it is ascertained that the ladder symbol is dropped thereon, searched for in database of the project file 42 are the variable number data, in order to extract, out of the variable number data registered in the database, the variable number name as to the dropped ladder symbol (S73).

Next, in accordance with the function included in the variable number name as to the dragged ladder symbol, displayed is a dialog box $D_1$ (see FIG. 32(c)) including a plurality of marks having that function (S74).

Then, judged is whether or not selected is one of the plurality of marks displayed in the dialog box $D_1$ (S75). In case the mark is selected, the mark is displayed (S76), furthermore, is registered in the temporary file (S77). Then, whether or not the screen generating process is to be finished is judged in accordance with the operation by the user (S78). Here, in case the screen generating process is not to be finished, S71 is carried out thereafter, meanwhile in case the screen generating process is to be finished, the thus generated user screen is registered in the project file 42 (S79).

In addition, the steps of S73 to S76 are provided in order to provided the user with a degree of freedom in selecting the marks. Therefore, if no such degree of freedom is necessary and it is so fixed that only one kind of mark is available, the steps of S73 to S76 are not necessary. In this case, for example, constant reference numeral data (parts code) of the switch only available is registered in the database in advance.

Here, explained is a specific example of the screen generating process (2) carried out in accordance with the procedure of the flow chart shown in FIG. 29.

Figure 33:
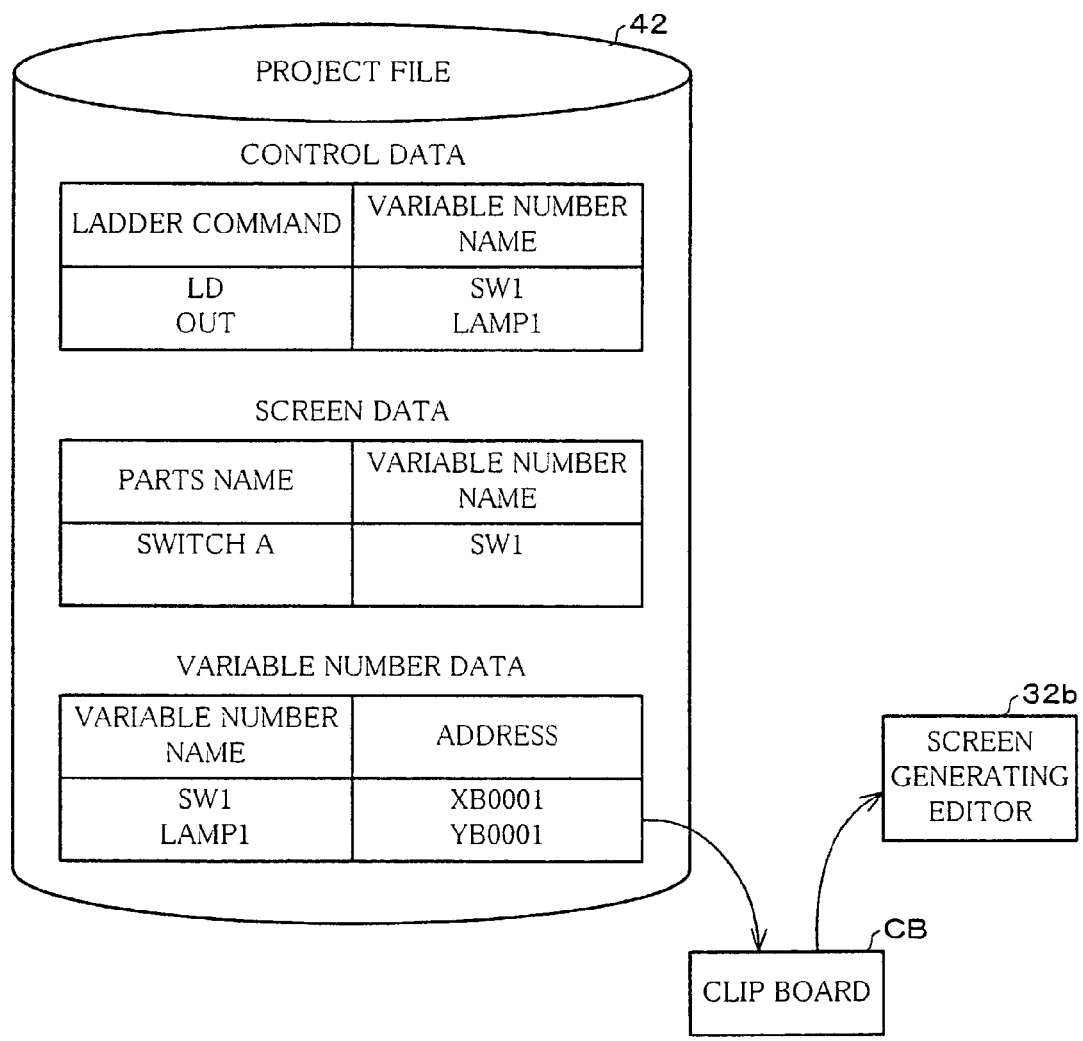
FIG. 33 is an explanatory view showing specifically how the process is carried out in accordance with the procedure shown in FIGS. 32(a) to 32(d).
Figure 34:
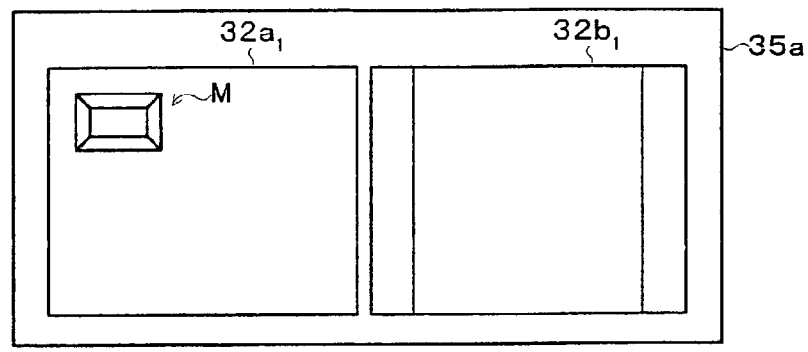
FIGS. 34(a) to FIG. 34(c) are explanatory views illustrating a specific example of the procedure shown in FIG. 31.
Figure 34:
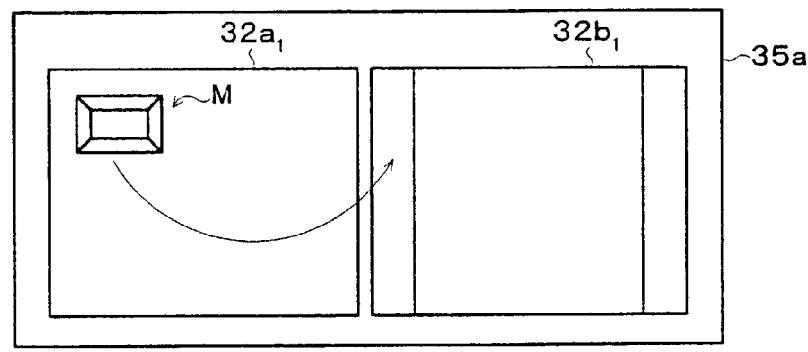
Figure 34:
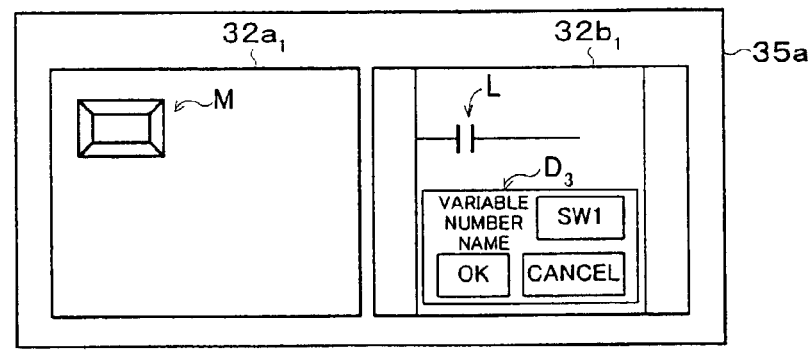

To begin with, as shown in FIG. 32(a), a ladder symbol L for representing a switch (input) and a ladder symbol L' for representing a lamp (output) are drawn in advance on the ladder window $32a_1$ by the ladder editor 32a. In accordance with this, data as to the switch and the lamp are registered in the project file 42 as shown in FIG. 33. Specifically, as to the switch, at least variable number name "SW1" and address "XB0001" are registered as the variable number data. Moreover, as to the lamp, at least variable number name "LAMP1" and address "YB0001" are registered as the variable number data.

As shown in FIG. 32(a), the screen generating window $32b_1$ is kept open in this state. Furthermore, when the ladder symbol L on the ladder window $32a_1$ is dragged and dropped onto the screen generating window $32b_1$ as shown in FIG. 32(b), the variable number data extracted from the project file 42 is temporarily stored in the clip board CB as shown in FIG. 33. Then, as shown in FIG. 32(c), the dialog box $D_1$ is displayed on the screen generating window $32b_1$ by the screen generating editor 32b looking up the variable number data.

As described above, the attribute data including the variable number data as to all the ladder symbols selected and drawn by the ladder editor 32a are registered in the project file 42 in advance. Therefore, the screen generating editor 32b displays the dialog box $D_1$ in accordance with the variable number data.

When one adequate mark is selected from among the marks of plural kinds having the function of the switch of the dialog box $D_1$, a screen M of the selected mark is displayed on the screen generating window $32b_1$ as shown in FIG. 32(d), and at the same time a dialog box $D_2$ including the attribute data (variable number name "SW1" and property "ON") is displayed. Here, when the OK button is clicked, the mark M on the screen generating window $32b_1$ and the screen data is determined, and figure data and variable number data as to the mark M of switch are stored, in association with each other, in the database of the project file 42 (see FIG. 33).

Therefore, the user does not need to carry out operation of drawing the mark of the switch on the screen generating window $32b_1$, or operation of inputting necessary variable number data, so that the user can generate the user screen very easily.

Figure 30:
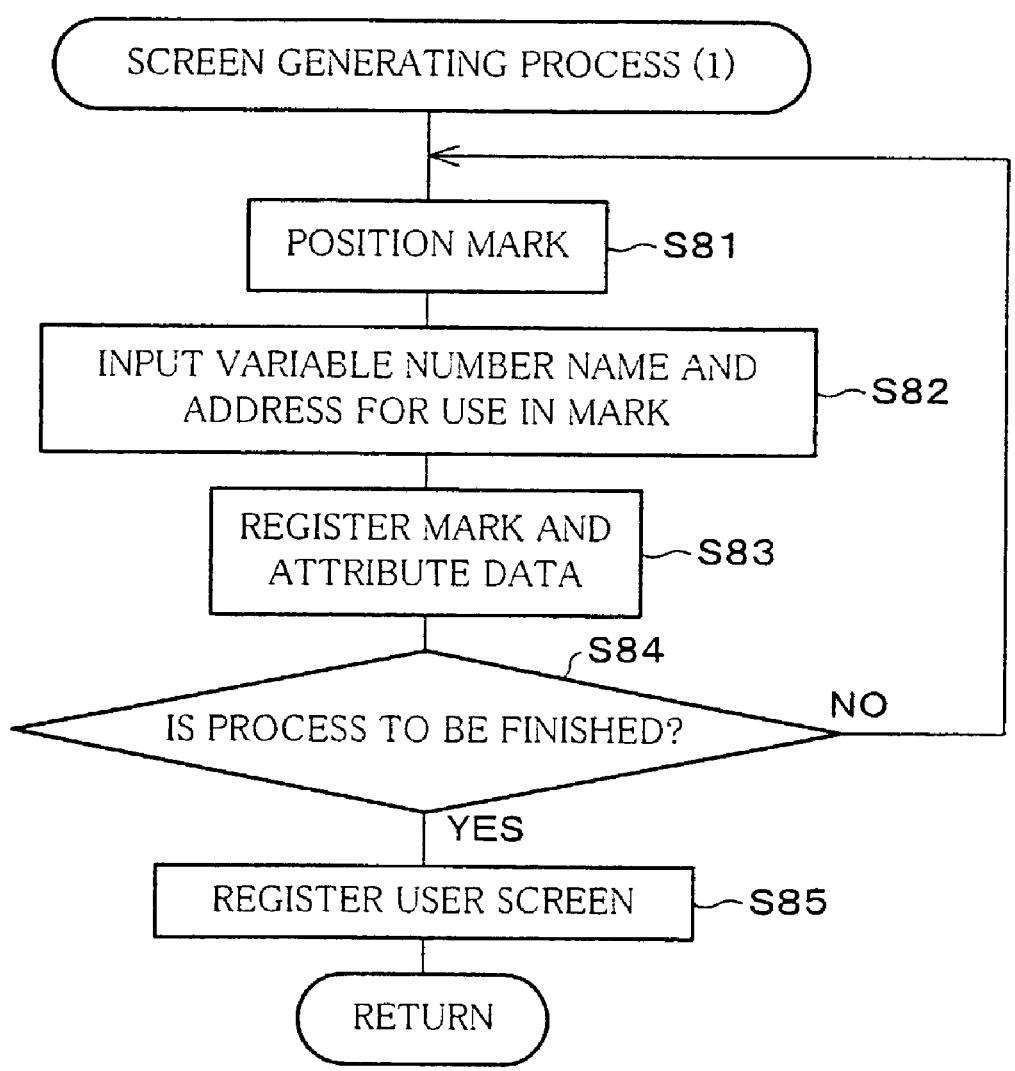
FIG. 30 is a flow chart showing a procedure of screen generating process carried out prior in the editing process.

On the other hand, in case the screen generating process (1) is carried out prior, a procedure of the flow chart shown in FIG. 30 is followed. Here, it is assumed that the ladder editor 32a and the screen generating editor 32b are activated in the computer 3, and the ladder window $32a_1$ and the screen generating window $32b_1$ are opened at the same time on the display section 35a (see FIG. 34(a)) of the display device 35. However, in case the screen generating process (1) is carried out prior, it is only required that at least the screen generating editor 32b is activated.

To begin with, the marks are positioned on the screen generating window $32b_1$, with respect to each input-output apparatus 4 (S81). Next, inputted are the attribute data including the variable number data to be used for the thus positioned marks (S82), so that the marks and the attribute data is registered in the temporary file (S83). Then, whether or not the screen generating process is to be finished is judged in accordance with the operation by the user (S84). Here, in case the screen generating process is not to be finished, S81 is carried out thereafter, meanwhile in case the screen generating process is to be finished, the generated user screen is registered in the project file 42 (S85).

Figure 31:
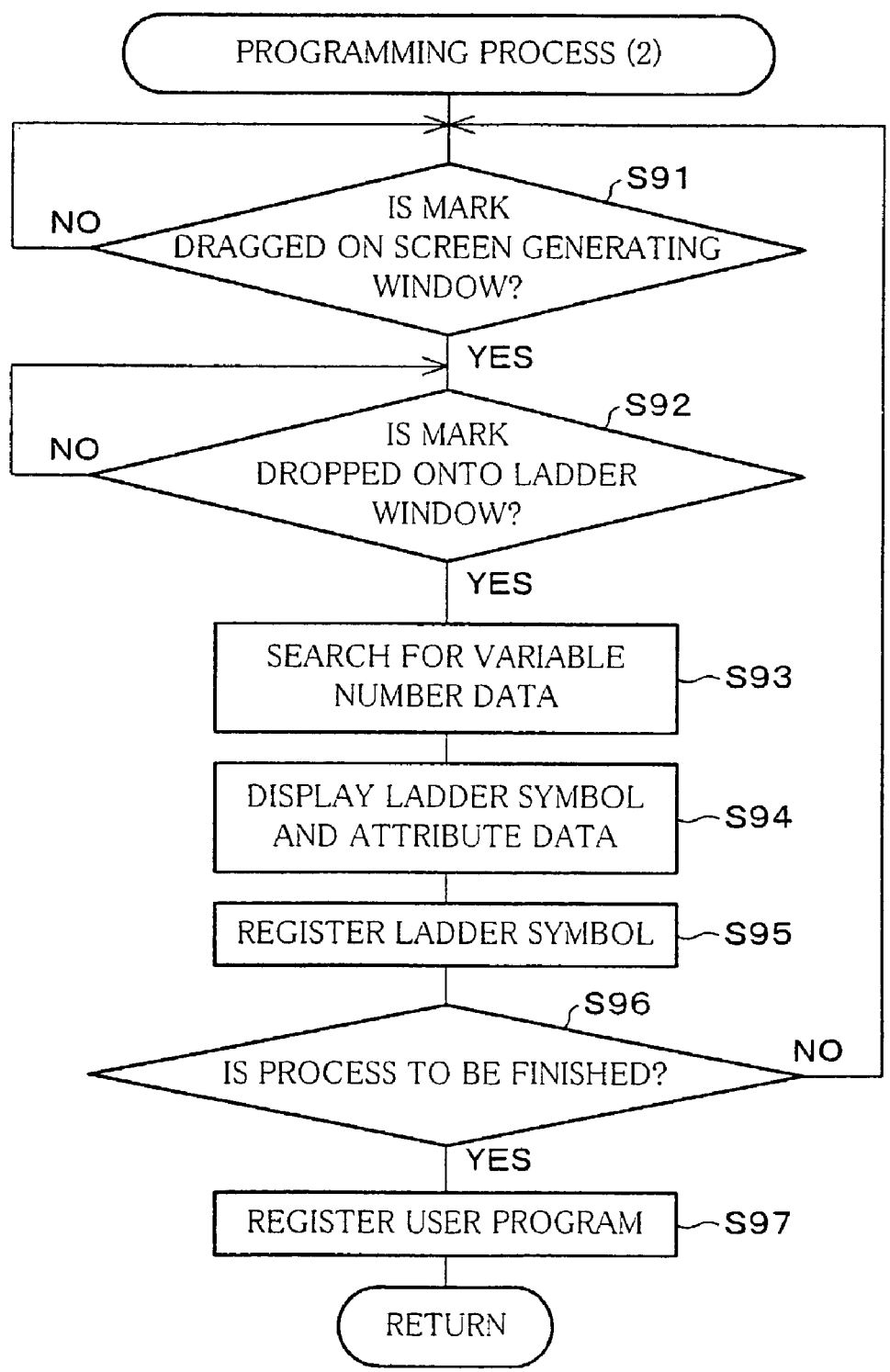
FIG. 31 is a flow chart illustrating a procedure of programming process carried out after the screen generating process shown in FIG. 30.
Figure 32:
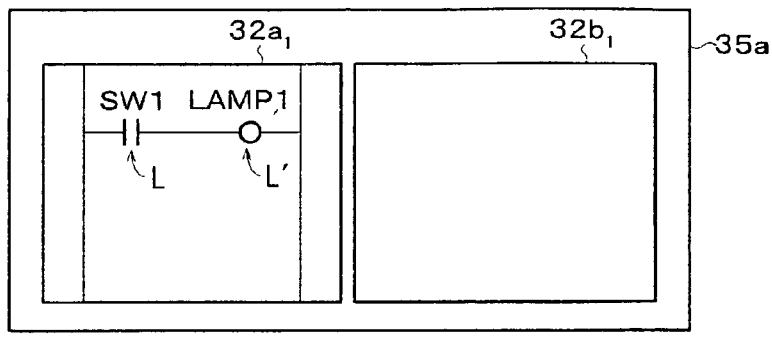
FIGS. 32(a) to 32(d) are an explanatory view showing a specific example of the procedure shown in FIG. 29.
Figure 32:
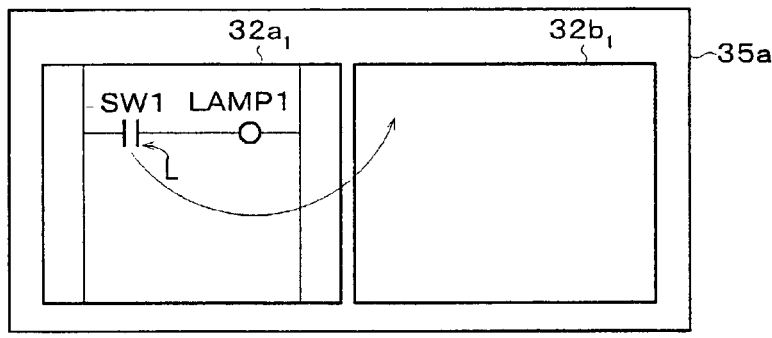
Figure 32:
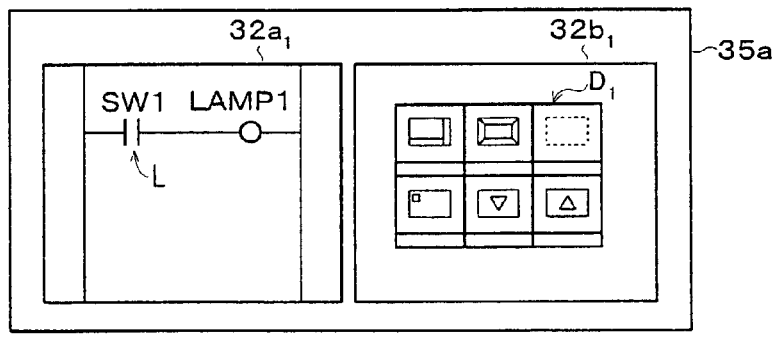
Figure 32:
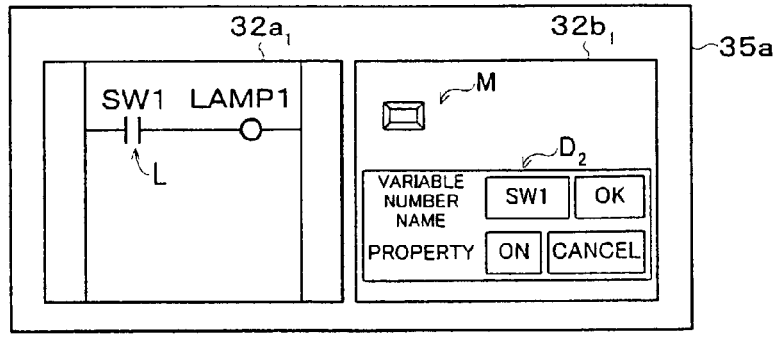

A programming process (2), which is carried out next, follows a procedure of the flow chart shown in FIG. 31.

To begin with, whether or not the mark on the screen generating window $32b_1$ is dragged is judged (S91). In case the mark is dragged, whether or not the mark dragged is dropped onto the ladder window $32a_1$ is judged (S92). Here, in case it is ascertained that the mark is dropped, the variable number data is searched for in the database of the project file 42, in order to extract the variable number name as to the dropped mark out of the variable number data registered in the database (S93).

Next, based on the function included in the attribute data as to the dragged mark, the attribute data (at least the variable number name) is displayed together with the ladder symbol corresponding to the function (S94). Then, the ladder symbol thus displayed is registered in the temporary file (S95). Then, whether or not the programming process is to be finished is judged in accordance with the operation by the user (S96). Here, in case the programming process is not to be finished, S52 is carried out thereafter, meanwhile in case the programming process is to be finished, the generated user program is registered in the project file 42 (S97).

Here, explained is a specific example of the programming process (2) carried out following the procedure of the flow chart shown in FIG. 31.

Figure 35:
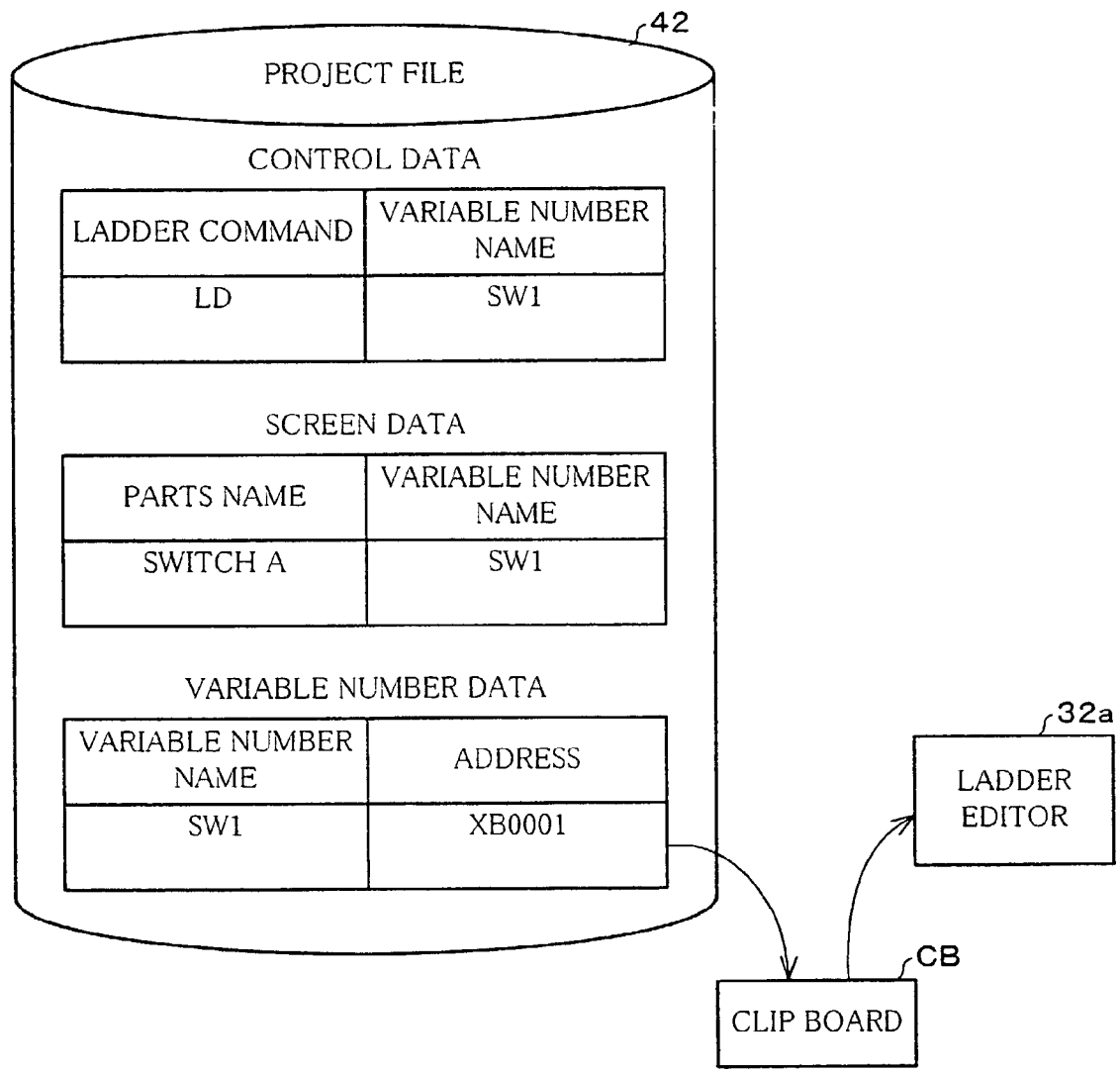
FIG. 35 is an explanatory view showing specifically the process carried out in accordance with the procedure shown in FIGS. 34(a) to 34(c).

To begin with, as shown in FIG. 34(a), the mark M for representing the switch (input) is positioned and drawn in advance on the screen generating window $32b_1$ by the screen generating editor 32b. In accordance with this, the data as to the switch is registered in the project file 42, as shown in FIG. 35. Specifically, as to the switch, at least variable number name "SW1" and address "XB0001" are registered as the variable number data.

As shown in FIG. 34(a), the ladder window $32a_1$ is kept open in this state. Furthermore, when the mark M on the screen generating window $32b_1$ is dragged and dropped onto the ladder window $32a_1$ as shown in FIG. 34(b), the variable number data extracted out of the project file 42 is temporarily stored in the clip board CB as shown in FIG. 35. Then, as shown in FIG. 34(c), the ladder symbol L and a dialog box $D_3$ are displayed on the ladder window $32a_1$ by the ladder editor 32a looking up the variable number data.

As described previously, the attribute data including the variable number data as to all the marks positioned by the screen generating editor 32b is registered in advance in the project file 42. Therefore, the ladder editor 32a displays the dialog box $D_3$ in accordance with the variable number data.

Specifically, the ladder symbol corresponding to the function of the switch is drawn on the ladder window $32a_1$, and at the same time, the dialog box $D_3$ including the variable number data (variable number name "SW1") is displayed. Here, when an OK button of the dialog box $D_3$ is clicked, the ladder symbol L on the ladder window $32a_1$ and the control data is determined, so that the control data and variable number data as to the ladder symbol L of the switch are registered in the project file 42 in association with each other (see FIG. 35).

Therefore, the user do not need not carry out the operation of drawing the ladder symbol of the switch on the ladder window $32a_1$, or the operation of inputting the necessary attribute data, so that the user can generate the user program very easily.

As described above, the first to third display/control systems of the present embodiment are provided with the file management section 32f for storing in the project file 42 and integrally managing the attribute data (especially variable number data) common to the user program and the user screen, the control data inherent to the user program, the screen data inherent to the user screen. Moreover, those display/control systems are so arranged that the ladder editor 32a generates the control data and draws the ladder symbol in accordance with the dragging and dropping of the ladder symbol or the mark by using the copying function section 32e, meanwhile, the screen generating editor 32b generates the screen data and draws the mark.

This makes it possible that the single project file 42 can manage all the data, thereby facilitating each data management. Moreover, compared with constitution in which data is separately stored in separate files with resect to the ladder editor 32a and the screen generating editor 32b, it is not necessary to copy the data between the files in order that the respective files have the variable number data. Moreover, it is also possible to download the user program and the user screen at once from the project file 42 to the programmable display apparatus 1 and the like. Furthermore, it is possible to compose the aforementioned various databases according to types of usage by the management of the data by the project file 42.

Figure 36:
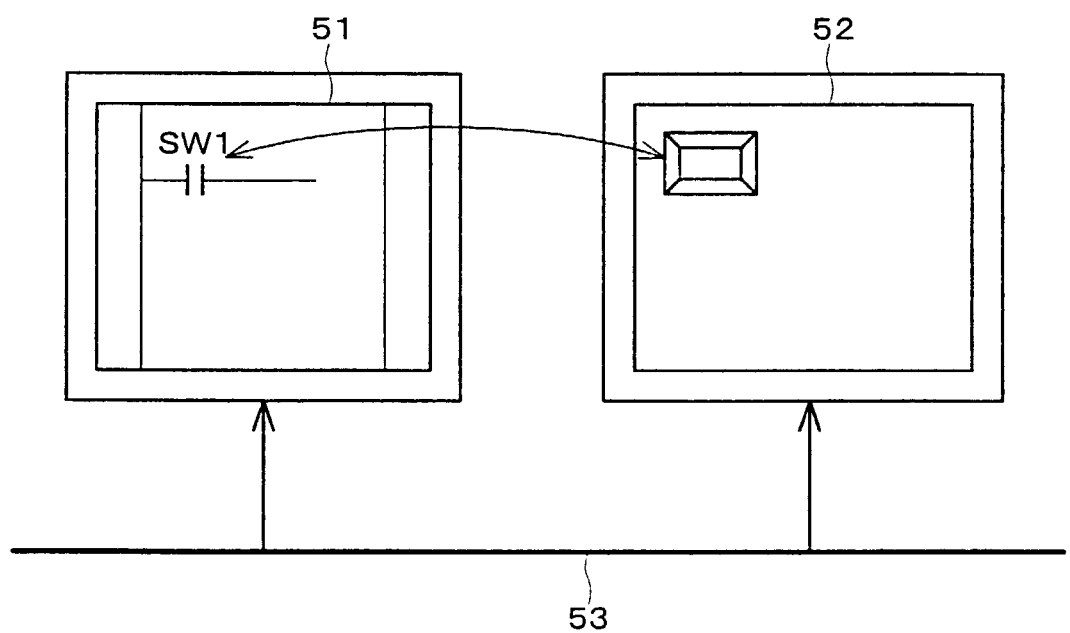
FIG. 36 is an explanatory view showing how the attribute data is copied by copying and pasting, with an example of display of the ladder symbol or the mark.

Moreover, even though in the present embodiment the example in which the ladder window $32a_1$ and the screen generating window $32b_1$ are displayed on the same display device 35 is explained, it is possible to adopt the present invention to a case where a ladder window 51 and a screen generating window 52 are displayed based on databases of different types via a network 53, as shown in FIG. 36.

Third Embodiment

Explained below is a third embodiment of the present invention, with reference to FIGS. 37 to 49.

Figure 37:
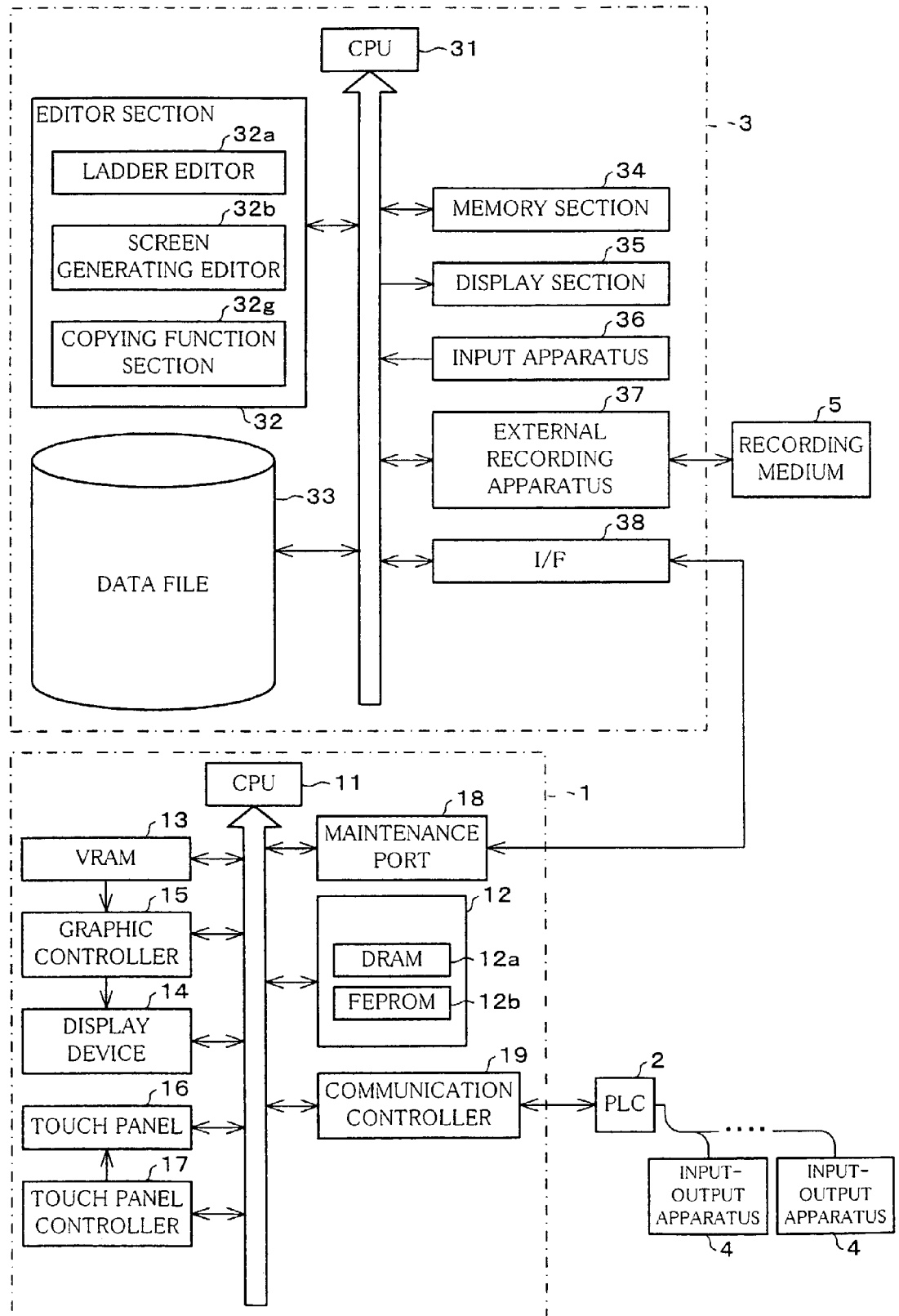
FIG. 37 is a block diagram illustrating a first display/control system of a third embodiment of the present invention.

A first display/control system shown in FIG. 37 includes a programmable display apparatus 1 and a PLC 2, similarly to the first display/control system (see FIG. 1) of the first embodiment.

Similarly to the computer 3 of the display/control system shown in FIG. 1, a computer 3 connected to the programmable display apparatus 1 is provided with a CPU 31, an editing section 32, a data file 33, a memory section 34, a display device 35, an input apparatus 36, an external recording apparatus 37 and an interface 38.

The editing section 32 includes a ladder editor 32a, a screen generating editor 32b and a copying function section 32g.

By using data copying function of OS, the copying function section 32g, which is incidental information supplying means, causes the screen generating editor 32b to automatically generate (draw), on a screen generating window $32b_1$, a mark corresponding to a ladder symbol on a ladder diagram generated by the ladder editor 32a, while supplying to the screen generating editor 32b incidental information of the ladder symbol as name plate information (incidental information) of the mark. Moreover, similarly using the data copying function of OS, the copying function section 32g causes the ladder editor 32a to automatically generate (draw), on the ladder window $32a_1$, the ladder symbol corresponding to the mark on the screen generated by the screen generating editor 32b, while supplying the name plate information as the incidental information of the ladder symbol. Furthermore, the copying function section 32g supplies, to the ladder editor 32a and the screen generating editor 32b, the attribute data including common data (variable number (variable number name) and addresses) common to the ladder symbol and the mark, together with the incidental information.

Specifically, the supply of the incidental information is carried out by using the drag & drop function or the copy & paste function, via a later described clip board CB (see FIG. 48, for example) provided to the memory section 34.

Data structure stored in the clip board CB, as shown in FIG. 38(a), is composed of header code, memory size, object type, reservation, number of symbols (N), address information (1 to N) and reservation. Among those, the memory size is a size of memory required to store the data in the clip board CB, while the object type is a preset kind of parts to be stored in the clip board CB. Set as the object type are: bit, switch, toggle switch, lamp, numeral value indicator, bar graph, circle graph, semi-circle graph, tank graph, meter graph and setting value indicator, as shown in FIG. 38(b). The address information is, as shown in FIG. 38(c), composed of symbol name, address (address name), address additional information, comments on variable number, object type, reserved number of bytes and reservation. The address additional information is information regarding kinds of symbols (such as integral number symbols and discrete symbols). The comments on variable number are various comments, which regard the variable number, and which should be displayed together with the ladder symbol and the mark. The object type in the address information, which has the same content as the object type mentioned above, indicates which part the address corresponds to, and for this reason, only a bit of a part required for this is turned ON.

In addition, the copying function section 32g may be included respectively in the ladder editor 32a and the screen generating editor 32b as a function of one of the ladder editor 32a and the screen generating editor 32b.

In the data file 33, for example as shown in FIG. 39(a), the user program is stored in the ladder file 33a, while the user screen is stored in the screen file 33b, as shown in FIG. 40(a).

The ladder file 33a is composed of a command file section $33a_1$ and a common file section $33a_2$. The command file $33a_1$ stores therein the ladder command and operand corresponding to the ladder symbol inputted, while the common data file section $33a_2$ stores therein the variable number name of the device and the address of the device, as to the ladder command, so as to correspond to the command file section $33a_1$.

The screen file 33b is composed of a figure data file section $33b_1$ and a common data file section $33b_2$. The figure data file section $33b_1$ stores therein data as to various figures (circle, line, quadrangle, character string and the like) including parts as the marks. The attribute data file section $33b_2$ stores therein the variable number name of the device and the address of the device, as to the inputted mark, so as to correspond to the figure data file section $33b_1$.

Figure 40:
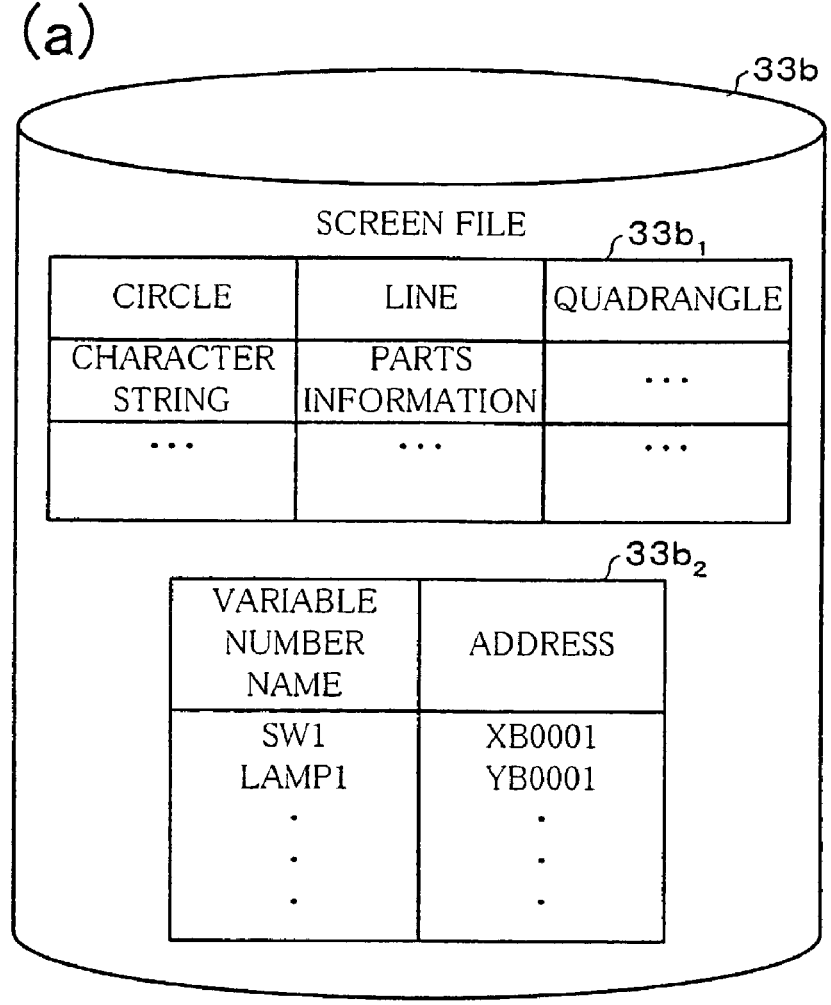
FIG. 40(a) is an explanatory view showing a screen file formed in the computer.
FIG. 40(b) is an explanatory view illustrating in details a part of data of the screen file.

Moreover, going into details, parts information of the screen file 33b is stored with data structure including address, type (on), type (off), name plate (on) and name plate (off), as shown in FIG. 40. Type (on) and type (off) are figure data of the parts. For example in case of switches, the switches are illustrated with indication whether the switches are in an on state or an off state, by using a provided parts code for the switches, which may be single or plural. The parts code is a code, given to each of the parts, which is a combination of alphabets and numbers. Name plate (on) and name plate (off) are name plate information to be attached to the mark, and are illustrated with indication whether the parts are in the on state or off state.

Because the ladder file 33a and the screen file 33b are associated with each other by the common data file sections $33a_2$ and $33b_2$, display operation and control operation of the first to third display/control systems are associated with each other.

Figure 41:
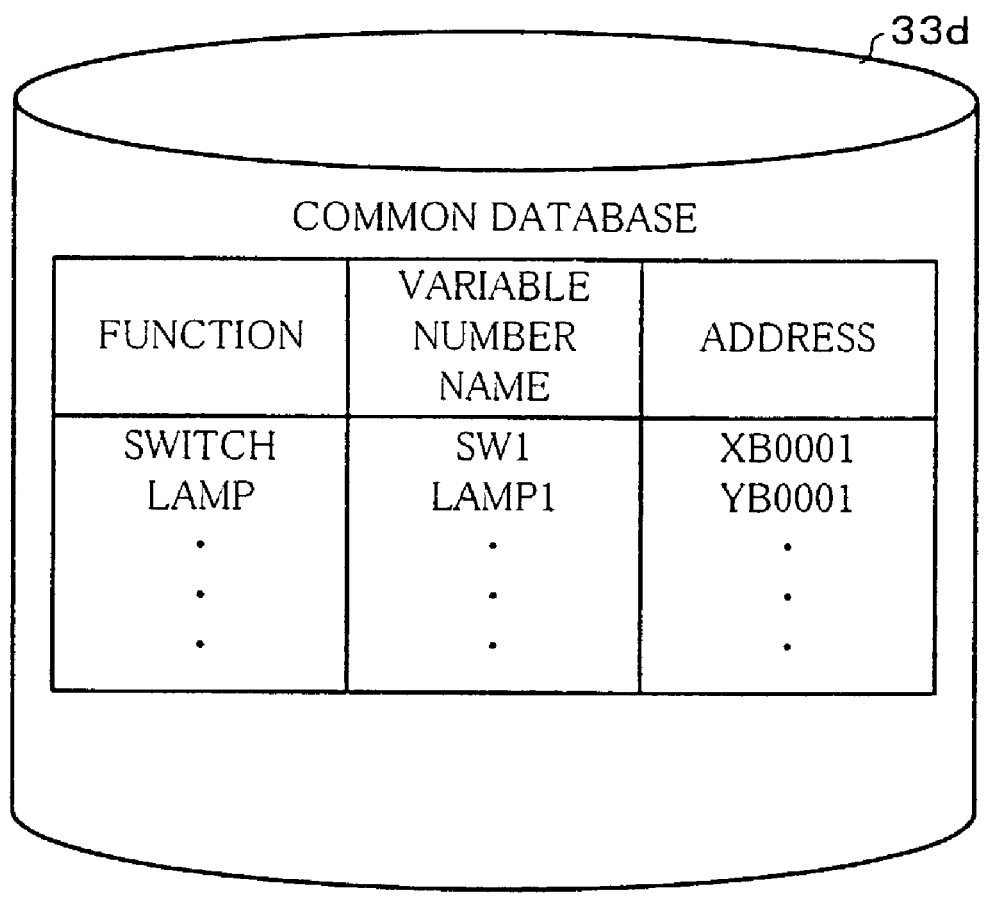
FIG. 41 is an explanatory view illustrating a common database included in the data file.

Moreover, the data file 33 may be further provided with a common database 33d, as shown in FIG. 41. The common database 33d includes, as the attribute data, variable number name and address to be stored in the common data file sections $33a_2$ and $33b_2$, and functions (a switch, a lamp and the like) of the ladder symbol and the mark corresponding to those. Such common database 33d is, as described later, provided as a storing section of common data for prior generating the user program or the user screen by the ladder editor 32a or the screen generating editor 32b.

Figure 42:
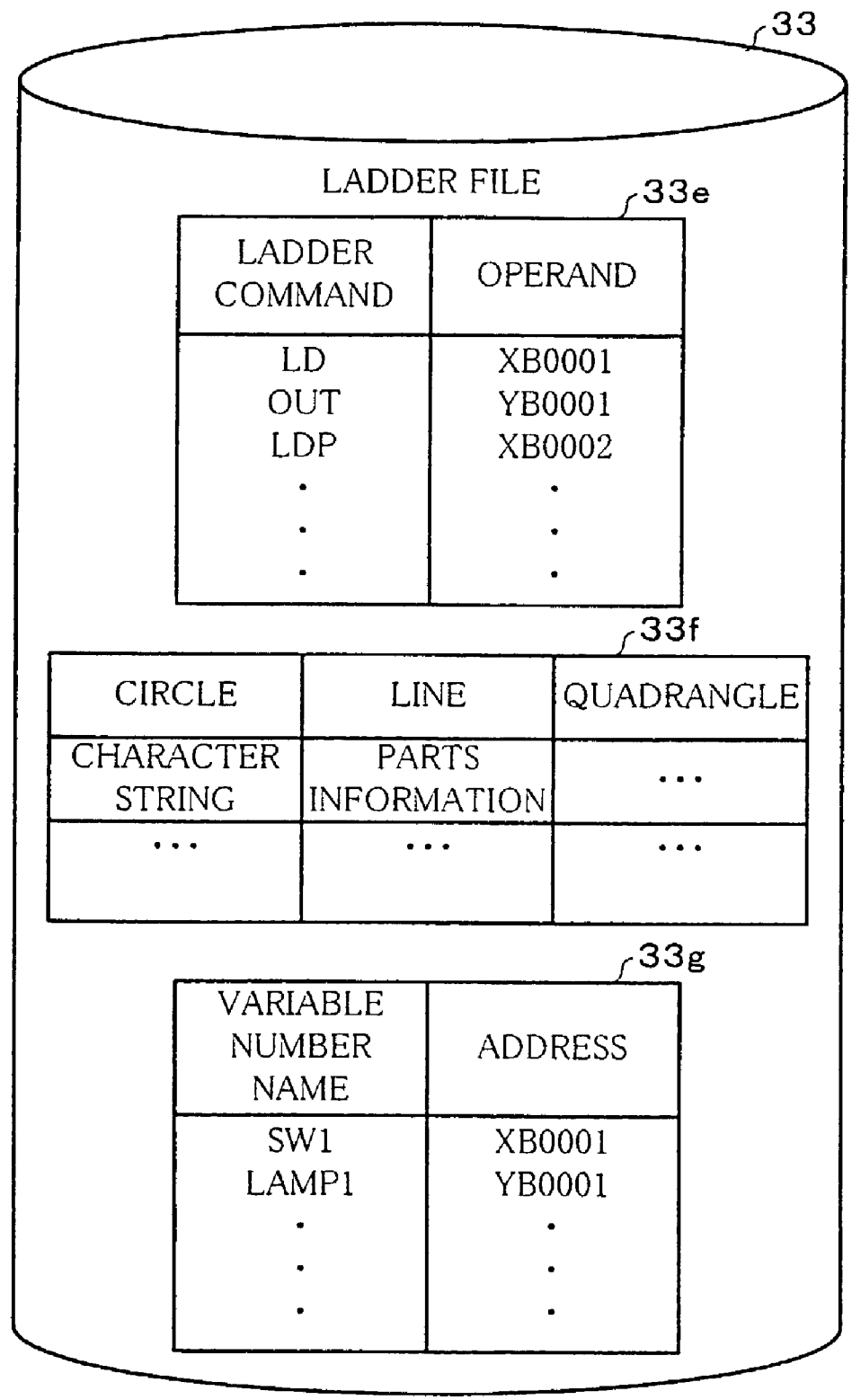
FIG. 42 is an explanatory view showing a data file stored by merging a user program and a user screen in the computer.

Alternatively, the data file 33 may have a format in which the ladder file 33a and the screen file 33b are integrated therein, as shown in FIG. 42. The data file 33 is composed of a command file section 33e, a figure data file section 33f, and a common data file section 33g. The "parts information" of the figure data file section 33f includes therein detail information shown in FIG. 40(b), as described above. In case the data file 33 is used, it is not necessary to copy the attribute data from/to the ladder file 33a to/from the screen file 33b by the copying function section 32g.

The second display/control system shown in FIG. 43 includes a programmable display apparatus 1 and a PLC 2, similarly to the first display/control system mentioned above. However, the programmable display apparatus 1 here, which is further provided with a PLC function, is so arranged as to directly control the input-output apparatuses 4. For this reason, the programmable display apparatus 1 is provided with an SRAM 12c in a memory section 12, and further provided with an input-output unit 20 and an I/O control interface 21 in addition to the communication controller 19, mentioned previously.

Figure 44:
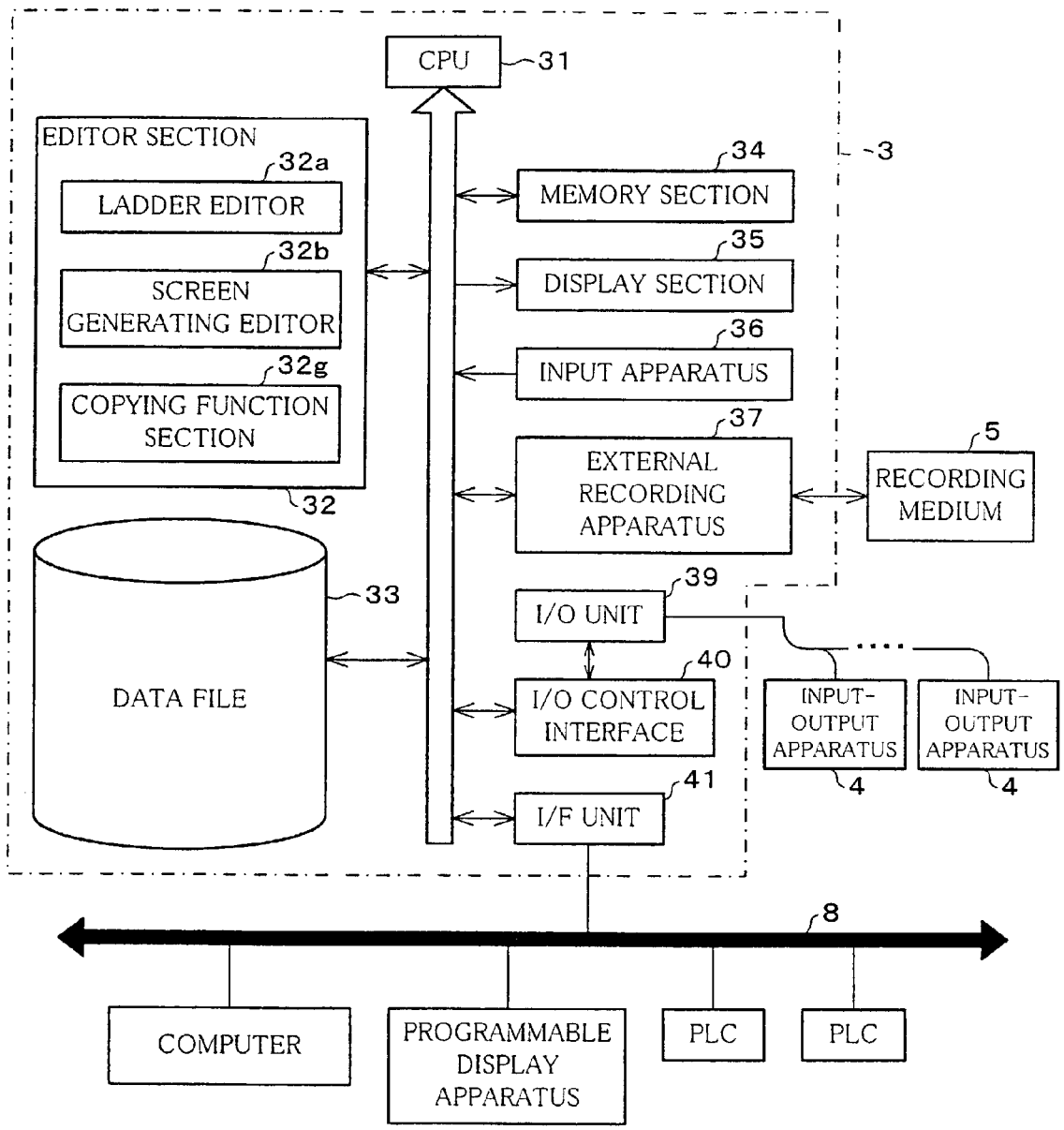
FIG. 44 is a block diagram showing constitution of the third display/control system of the third embodiment of the present invention.

The third display/control system shown in FIG. 44 is composed of a computer 3 as an open controller, and is provided with an input-output unit 39 and an I/O control interface 40 instead of the interface 38 of the computer 3, in order to be connected with the input-output apparatuses 4. Moreover, the computer 3 is provided with an interface unit 41 to be connected with an open network 8.

Figure 45:
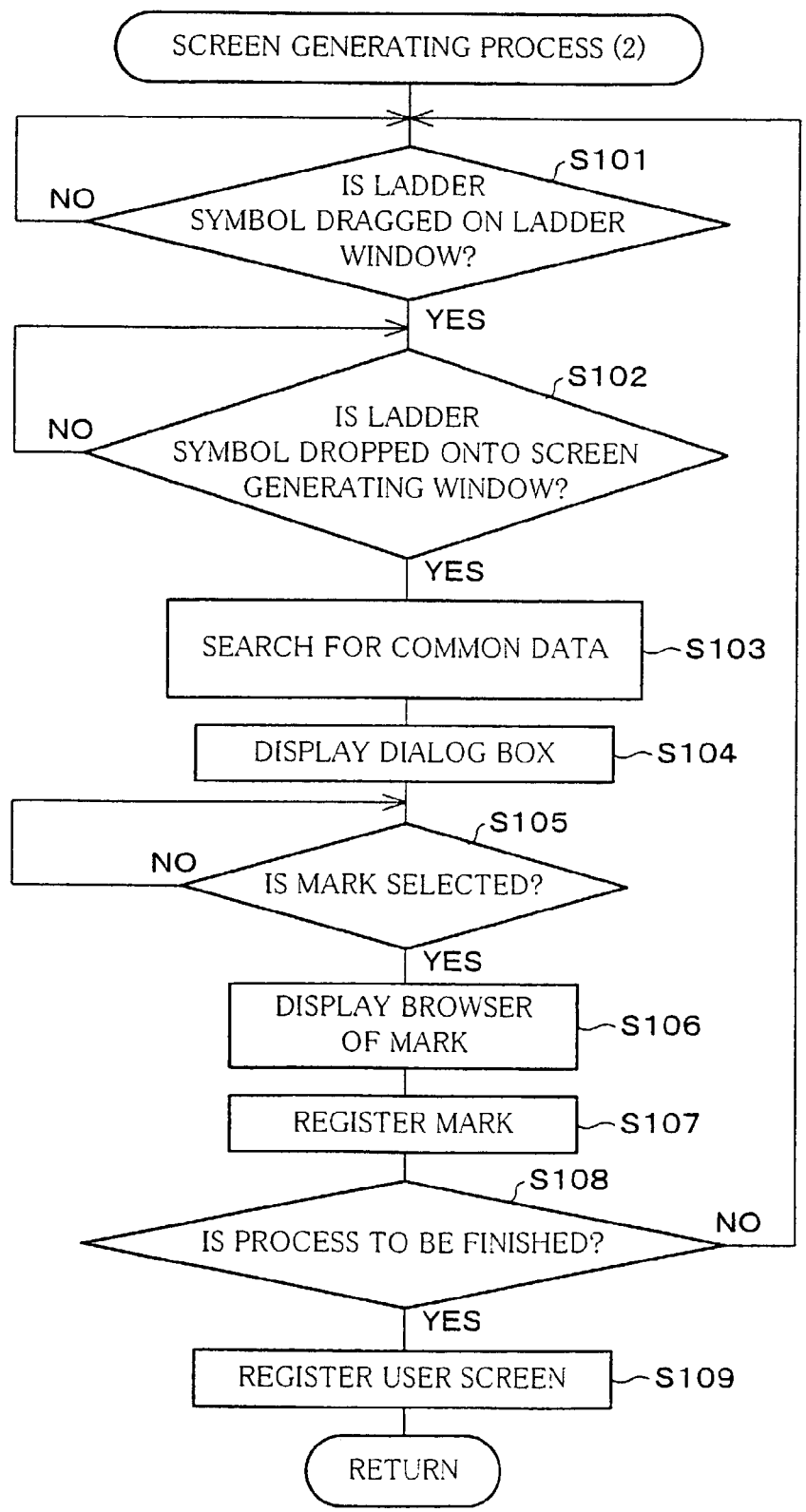
FIG. 45 is a flow chart illustrating a procedure of a screen generating process carried out after a programming process in the editing process carried out in the computer of the first to third display/control systems.
Figure 46:
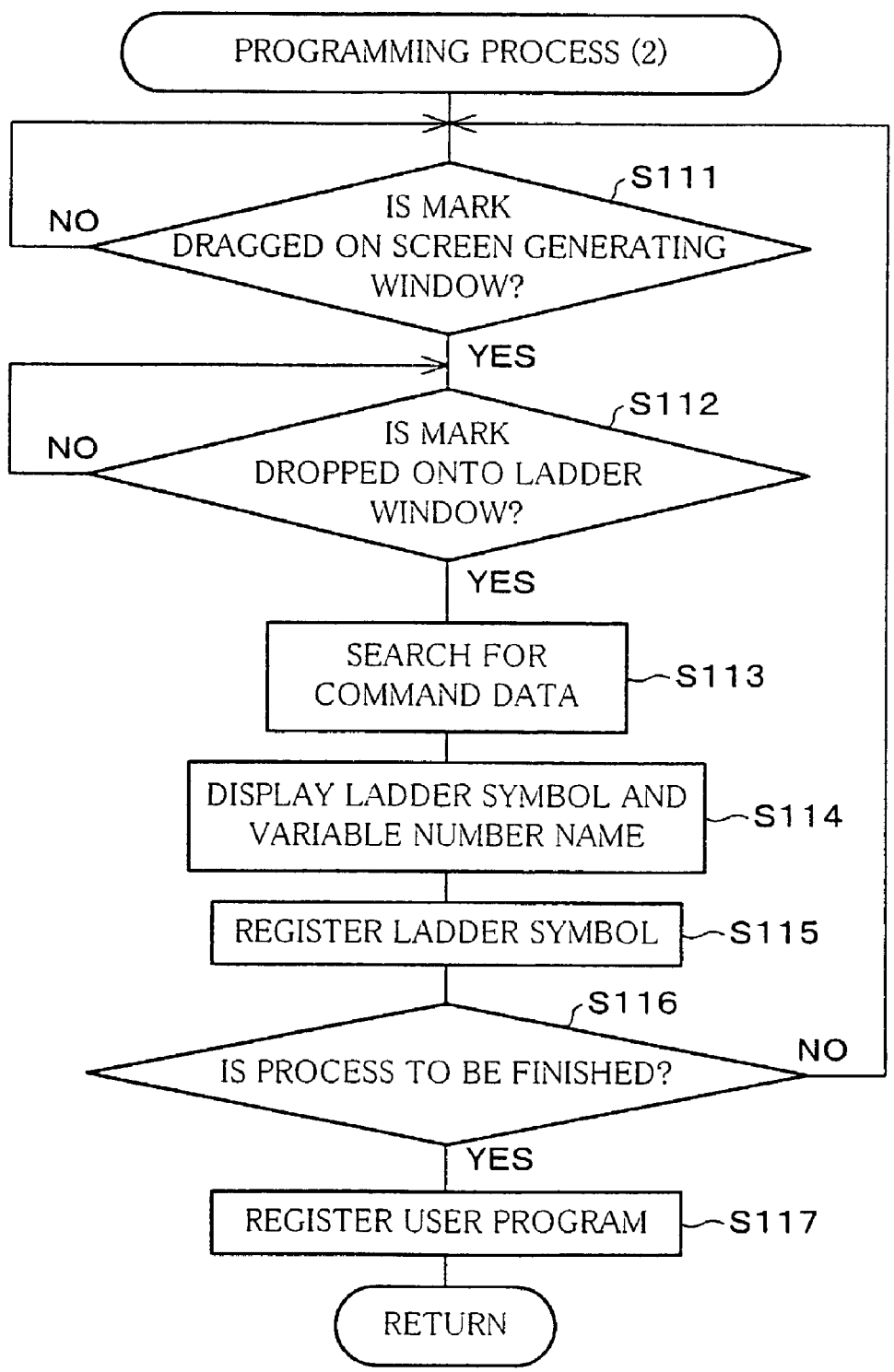
FIG. 46 is a flow chart showing a procedure of the programming process carried out after the screen generating process carried out prior in the editing process.
Figure 47:
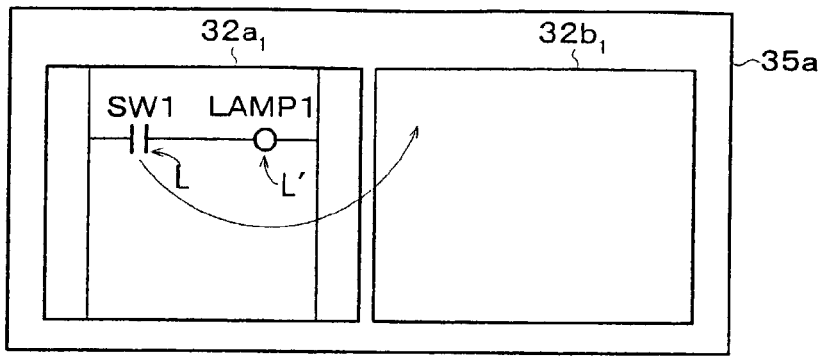
FIGS. 47(a) to 47(d) are explanatory views showing a specific example of the procedure shown in FIG. 45.
Figure 47:
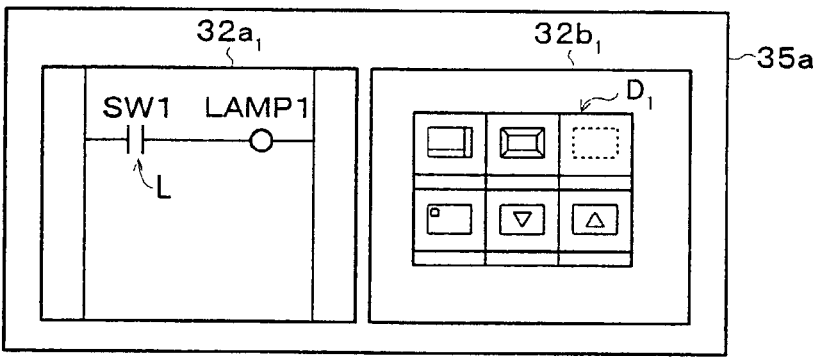
Figure 47:
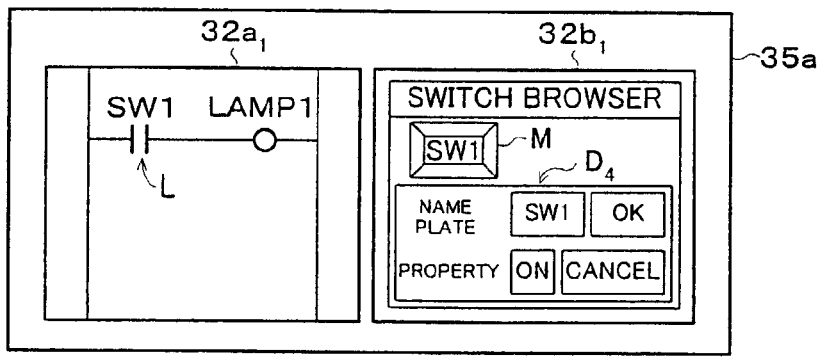
Figure 47:
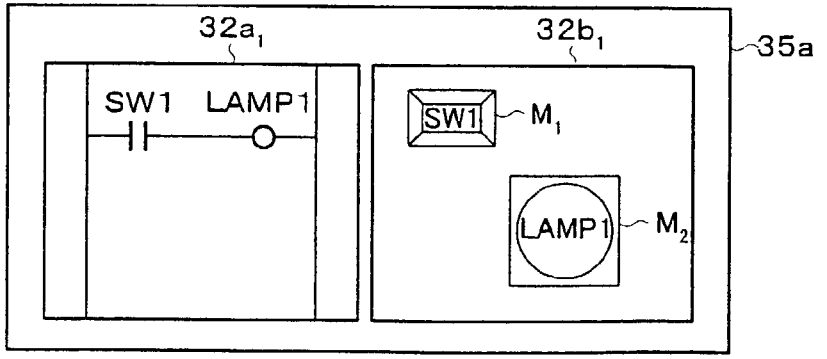

Here, explained are procedures of generating the user program and the user screen in the first to third display/control systems, with reference to flow charts shown in FIGS. 45 and 46.

In case of a programming process (1) is carried out prior, the process is carried out similarly to the procedure (See FIG. 28) of the second embodiment. However, the process here is different from the procedure of the second embodiment in which the user program is registered in the data file 33 in S65.

Screen generating (2) to be carried out next follows the flow chart shown in FIG. 45.

To begin with, whether or not the ladder symbol on the ladder window $32a_1$ is dragged by using a mouse or the like is judged (S101). In case the ladder symbol is dragged, whether or not the dragged ladder symbol is dropped onto the screen generating window $32b_1$ is judged (S102). Here, in case it is ascertained that the ladder symbol is dropped thereon, a database (the common data file section $33a_2$ or 33g, or the common database 33d) of the data file 33 is searched in order to extract common data as to the dropped ladder symbol (S103).

Next, in accordance with the function assigned to the variable number name as to the dragged ladder symbol, displayed is a dialog box $D_1$ (see FIG. 47(b)) including a plurality of marks having that function (S104). Then, judged is whether or not one of a plurality of marks displayed in the dialog box $D_1$ is selected (S105). In case the mark is selected, browse-display of the mark is carried out (S106), furthermore, the mark is registered in the temporary file (S107). Then, whether or not the screen generating process is to be finished is judged in accordance with the operation by the user (S108). Here, in case the screen generating process is not to be finished, S101 is carried out thereafter, meanwhile in case the screen generating process is to be finished, the thus generated user screen is registered in the data file 33 (S109).

Note that, in generating the user program, in case where the common data is registered in the common data file $33a_2$ or the common database 33d, the common data is registered temporarily in the temporary file in S108 and is stored in the common data file section $33b_2$ in S109. Also, in generating the user program, in case where the common data is registered in the common data file 33g, the common data is registered temporarily in the temporary file in S108 and is stored in the figure data file section 33f in S109.

In addition, the steps of S103 to S106 are provided in order to provide the user with a degree of freedom in selecting the marks. Therefore, if no such degree of freedom is necessary and it is so fixed that only one kind of mark is available, the steps of S103 to S106 are not necessary. In this case, for example, constant reference numeral data (parts code) of the switch is registered in the database in advance.

Here, explained is a specific example of the screen generating process (2) carried out in accordance with the procedure of the flow chart shown in FIG. 45.

Figure 48:
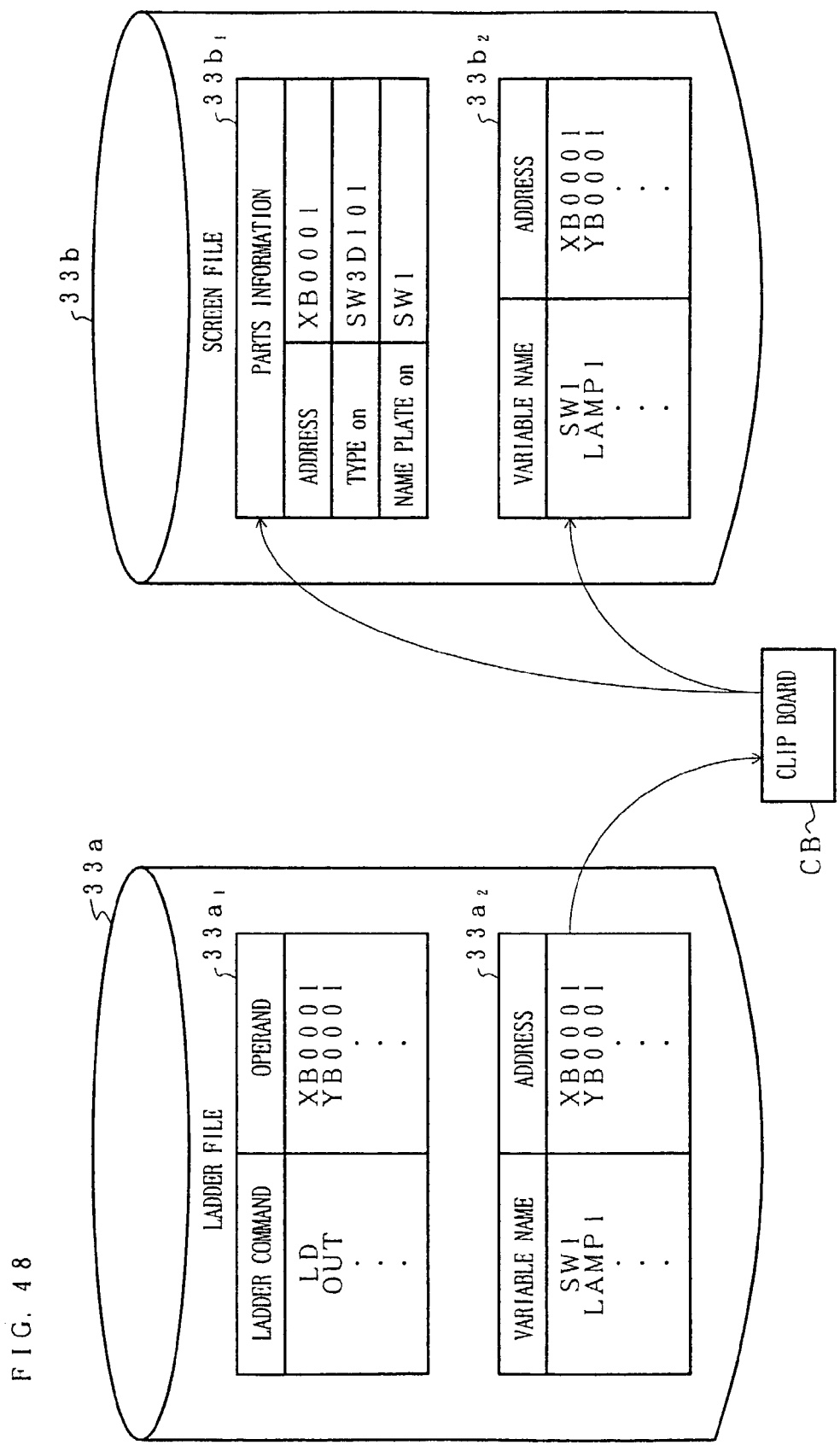
FIG. 48 is an explanatory view illustrating specifically how the process is carried out in accordance with the procedure shown in FIGS. 47(a) to 47(d).

To begin with, as shown in FIG. 47(a), a ladder symbol L for representing a switch (input) and a ladder symbol L' for representing a lamp (output) are drawn in advance on the ladder window $32a_1$ by the ladder editor 32a. In accordance with this, data as to the switch and the lamp are registered in the data file 33 as shown in FIG. 48. Specifically, as to the switch, at least variable number name "SW1" and address "XB0001" are registered as the common data. Moreover, as to the lamp, at least variable number name "LAMP1" and address "YB0001" are registered as the common data.

As shown in FIG. 47(a), the screen generating window $32b_1$ is kept open in this state. Furthermore, when the ladder symbol L on the ladder window $32a_1$ is dragged and dropped onto the screen generating window $32b_1$, the dialog box $D_1$ is displayed on the screen generating window $32b_1$, as shown in FIG. 47(b).

Moreover, when the ladder symbol L is dragged, the common data as to the switch, which is extracted from the ladder file $33a_1$ (the common database 33d or the common data file section 33g) is temporarily stored in the clip board CB as shown in FIG. 48. Then, when the ladder symbol L is dragged, the common data is given to from the clip board CB to the screen generating editor 32b. The screen generating editor 32b displays the dialog box $D_1$ in accordance with the common data.

When one adequate mark is selected from among the marks of plural kinds having the function of the switch of the dialog box $D_1$, browser-display of a selected mark M is carried out on the screen generating window $32b_1$ as shown in FIG. 47(c), and at the same time a dialog box $D_4$ including the name plate information (name plate "SW1") is displayed. Here, when the OK button is clicked, the mark M on the screen generating window $32b_1$ and the attribute data is determined. With this, as shown in FIG. 48, respectively in the figure data file section $33b_1$ and the common data file section $33b_2$ of the screen file 33b, figure data (parts information) and common data as to the mark M of switch are stored, in association with each other.

In case the data file 33 has an arrangement shown in FIG. 42, common data, which is given from the clip board CB to the screen generating editor 32b, is stored only in the figure data file section 33f since the common data as to the user program and the user screen has been already stored in the data file 33.

As a result of this, as shown in FIG. 47(d), a mark $M_1$ of the switch including the name plate "SW1" is drawn on the screen generating window $32b_1$. Also, when a similar operation to the above operation is carried out as to a lamp, a mark $M_2$ of the switch including the name plate "LAMP1" is drawn on the screen generating window $32b_1$.

Therefore, the user does not need to carry out operation of drawing the ladder symbol of the switch on the ladder window $32a_1$, or operation of inputting the common data, so that the user can generate the user program very easily. Also, it is not necessary to input the name plate information again in generating the user screen.

On the other hand, in case the screen generating process (1) is carried out prior, a process is carried out in a manner similar to the procedure (See FIG. 30) of the second embodiment. It should be noted that it is different from the procedure of the second embodiment in which the user screen is registered in the data file 33 in S85.

A programming process (2), which is carried out next, follows a procedure of the flow chart shown in FIG. 46.

To begin with, whether or not the mark on the screen generating window 32$b_1$ is dragged is judged (S111). In case the mark is dragged, whether or not the mark dragged is dropped onto the ladder window 32$a_1$ is judged (S112). Here, in case it is ascertained that the mark is dropped, the common data is searched for in the database (image data file section 33$b_1$ or 33$f$) of the data file 33, in order to extract the common data as to the dropped mark (S113).

Next, based on the function included in the attribute data as to the dropped mark, the common data (at least the variable number name) is displayed together with the ladder symbol corresponding to the function (S114). Then, the ladder symbol thus displayed is registered in the temporary file (S115). Then, whether or not the programming process is to be finished is judged in accordance with the operation by the user (S116). Here, in case the programming process is not to be finished, S112 is carried out thereafter, meanwhile in case the programming process is to be finished, the generated user program is registered in the data file 33 (S117).

Note that, in case the common data is registered in the common data file section 33$b_2$ or the common database 33$d$ in generating the user screen, the common data is temporarily registered in the temporary file in S115 and is stored in the common data file 33$a_2$ in S117. Meanwhile, in case the common data is registered in the common data file section 33$g$ in generating the user screen, the common data is temporarily registered in the temporary file in S115 and is stored in the command file section 33$e$ in S117.

Here, explained is a specific example of the programming process (2) carried out following the procedure of the flow chart shown in FIG. 46.

Figure 49:
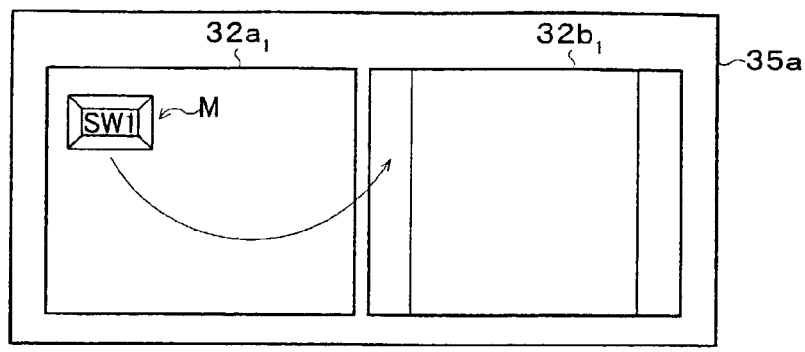
FIGS. 49(a) to 49(c) are explanatory views showing a specific example of the procedure shown in FIG. 46.
Figure 49:
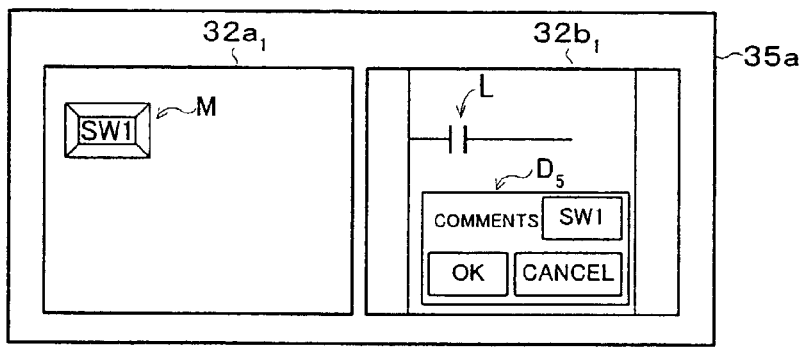
Figure 49:
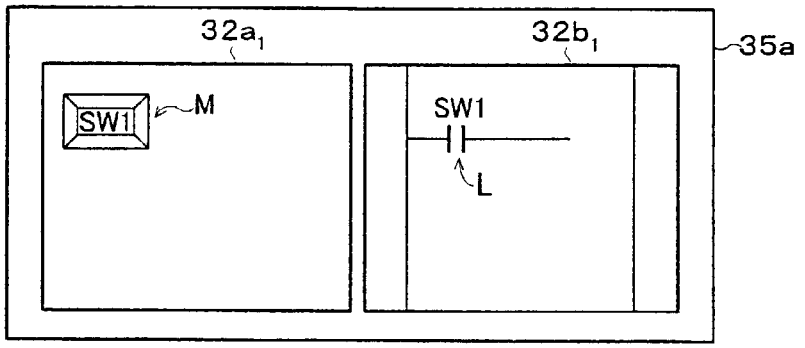
Figure 50:
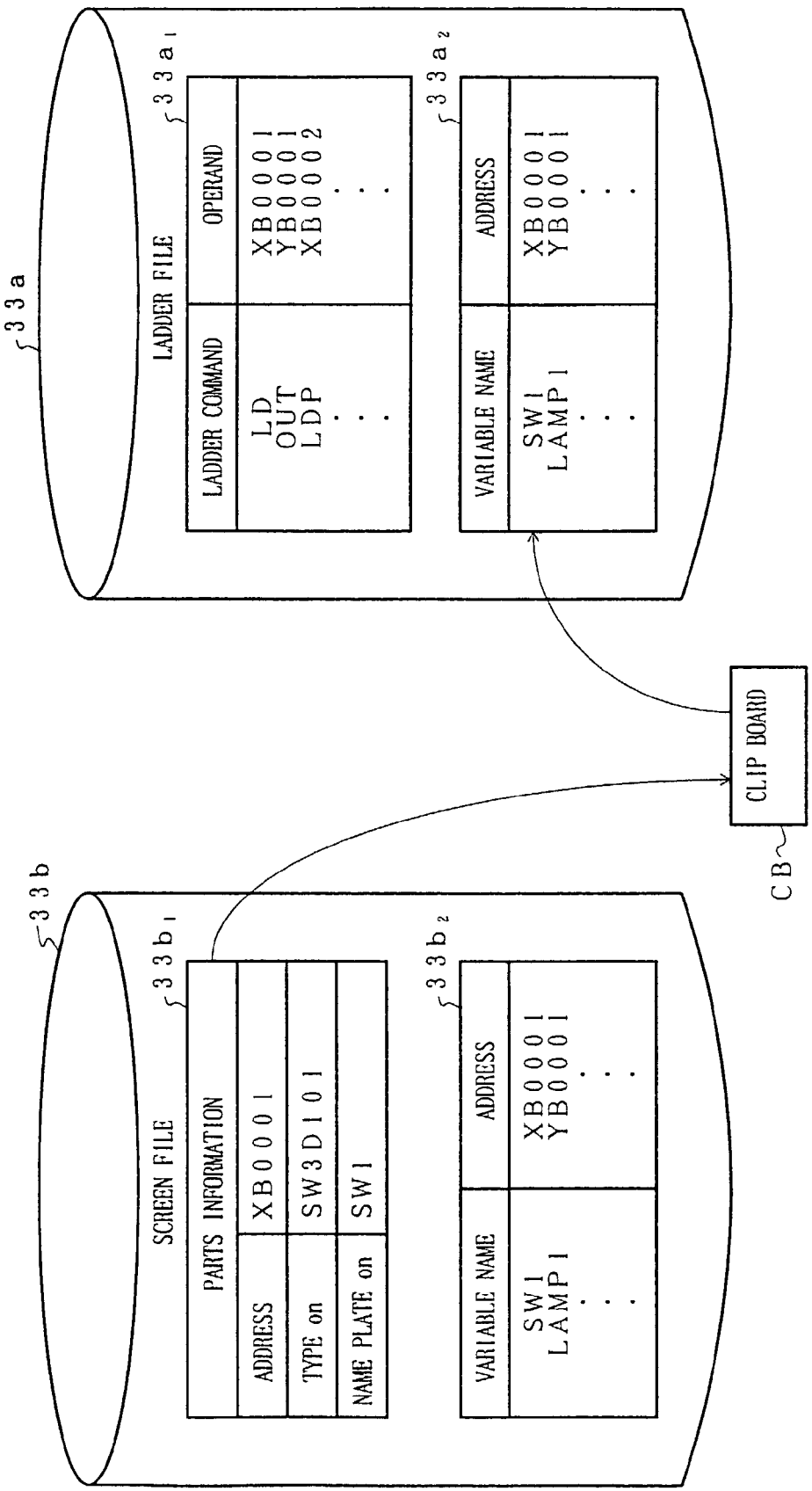
FIG. 50 is an explanatory view illustrating specifically how the processes is carried out in accordance with the procedure shown in FIGS. 49(a) to 49(c).

To begin with, as shown in FIG. 49(*a*), the mark M for representing the switch (input) is positioned and drawn in advance together with name plate "SW1" on the screen generating window 32$b_1$ by the screen generating editor 32$b$. In accordance with this, at least the data as to the switch are registered in the data file 33, as shown in FIG. 50. Specifically, as to the switch, at least variable number name "SW1" and address "XB0001" are registered as the variable number data.

As shown in FIG. 49(*a*), the ladder window 32$a_1$ is kept open in this state. Furthermore, when the mark M on the screen generating window 32$b_1$ is dragged and dropped onto the ladder window 32$a_1$, the ladder symbol L corresponding to the function of the switch is drawn on the ladder window 32$a_1$, and at the same time, the dialog box D$_5$ including incidental information ("SW1") such as comments is displayed.

Further, when the mark M is dragged, the address and the name plate information as to the switch, which are extracted out of the screen file 33$b$ (image data file section 33$b_1$), are temporarily stored in the clip board CB as shown in FIG. 50. Then, when the mark M is dragged, the common data is given from the clip board CB to the ladder editor 32$a$. In accordance with the address and the name plate information, the ladder editor 32$a$ displays the dialog box D$_5$ as to the ladder symbol (LD command) that is assigned to the switch.

Here, when an OK button is clicked, the ladder symbol L and the attribute data on the ladder window 32$a_1$ are determined. With this, the command and the attribute data as to the ladder symbol L corresponding to the switch are registered, in association with each other, in the command file section 33$a_1$ and the common data file section 33$a_2$ of the ladder file 33$a$, as shown in FIG. 50.

As a result of this, as shown in FIG. 49(*c*), drawn on the ladder window 32$a_1$ is the ladder symbol L including "SW1" as a name of the switch.

Therefore, the user do not need to carry out the operation of drawing the ladder symbol of the switch on the ladder window 32$a_1$, or the operation of inputting the necessary attribute data, so that the user can generate the user program very easily. Moreover, it is not necessary to input the names of the input-output apparatuses 4 corresponding to the ladder symbol and comments as to the ladder symbol again in generating the user program.

Figure 39:
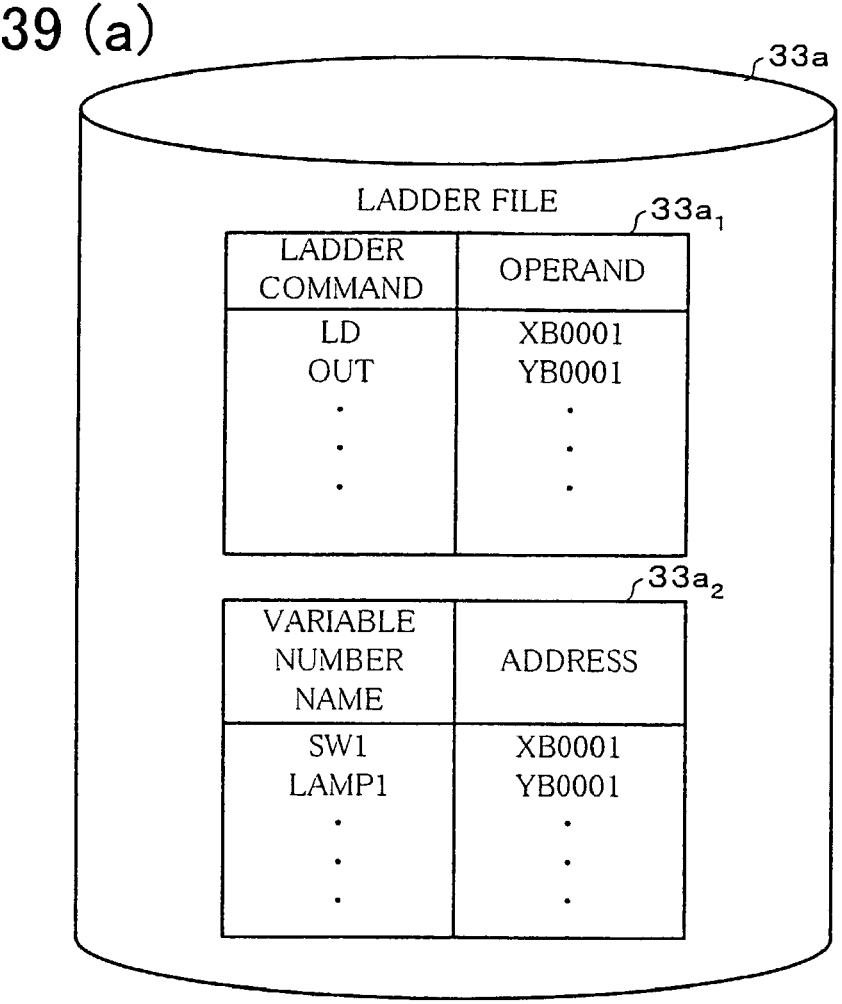
FIGS. 39(a) and 39(b) are respectively an explanatory view illustrating a ladder file included in a data file of the computer
Figure 39:
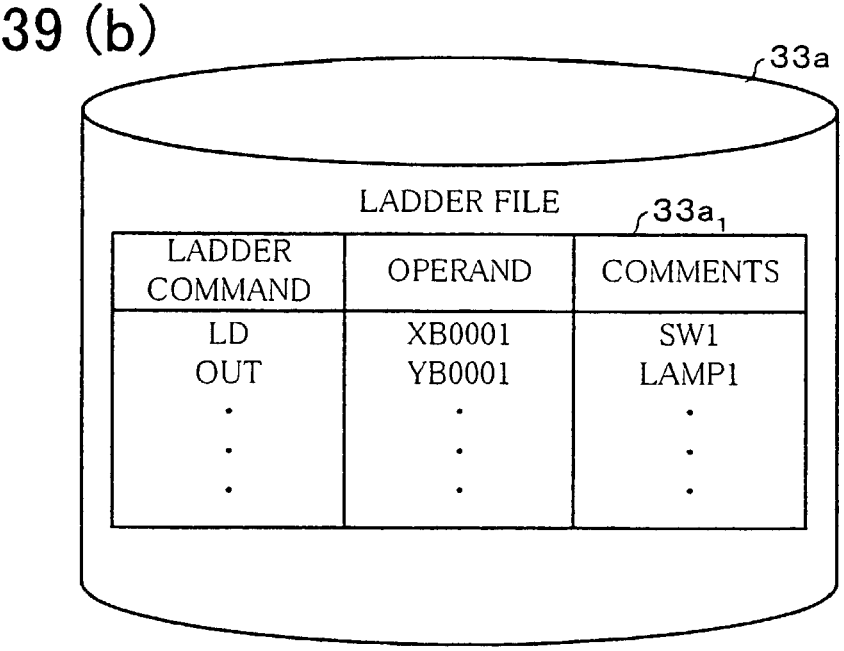

Further, in case the file shown in FIG. 39(*b*) is used as the ladder file 33$a$, it is possible to assign the name plate information to the ladder symbol, as described above. The ladder file 33$a$ is often used for a common ladder editor which does not use variable numbers and has areas for storing a ladder command, operand, and comments (incidental information) corresponding to those. Therefore, in case the ladder file 33$a$ is used, the address and the name plate information, which are extracted from the image data file section 33$b_1$, are copied respectively to the area of operand and the area of comments, synchronizing to the dragging and dropping of the mark M.

Note that, in case the comments registered in the ladder file 33$a$ shown in FIG. 39(*b*) are assigned to the name plate information of the mark, the process is carried out in a reverse procedure of the above case. At this point, the above comments are stored as variable number names, together with the name plate information, in the common data file section 33$b_2$.

As described above, the first to third display/control systems of the present embodiment are so arranged that the attribute data of the ladder symbol is copied to the screen file 33$b$, and at the same time the attribute data of the mark is copied to the ladder file 33$a$, by using the copying function section 32$g$. With this, it is possible to have the attribute data in common with both files 33$a$ and 33$b$, and it is possible to easily relate the attribute data between both files 33$a$ and 33$b$.

Also, each display/control system is so arranged that the incidental information of the ladder symbol included in the generated user program is assigned to the mark on the user screen, and at the same time, the name plate information accompanying the mark included on the generated user screen is assigned to the ladder symbol as incidental information, by using the copying function section 32$g$. This makes it possible that it is not necessary to input the incidental information of the ladder symbol and the name plate information of the mark respectively in generating the user program and the user screen. Therefore, it is possible to simplify the input operation, and to prevent that the inputted incidental information for the ladder symbol is different to that for the mark, even though the ladder symbol and the mark correspond to the same input-output apparatus 4.

Moreover, in each display/control system described above, since the common data, which is given via the clip board CB to the editor, includes the incidental information, it is possible to easily carry out the assigning of the incidental information to the ladder symbol and the mark in the editor. In addition, since the variable number name is used as incidental information, it is possible to have the information in common and simplify the management of data. Besides, even in case the ladder editor 32$a$ is a conventional and popular ladder editor using the ladder file 33$a$ which does not include the variable number name, as shown in FIG. 39(*b*), it is possible to exchange the incidental information with the screen generating editor 32$b$.

Note that, in the present embodiment, the example in which the user screen or the user program is generated respectively in accordance with the generated user program or the user screen; however, the present invention is not limited to this. For example, also included in the present invention is an example in which only exchange of the incidental information is carried out, by the operation of dragging and dropping, or copying and pasting, from/to the user program to/from the user screen, which have been already generated.

Fourth Embodiment

Described below is a fourth embodiment of the present invention with reference to FIGS. 51 to 61.

Figure 51:
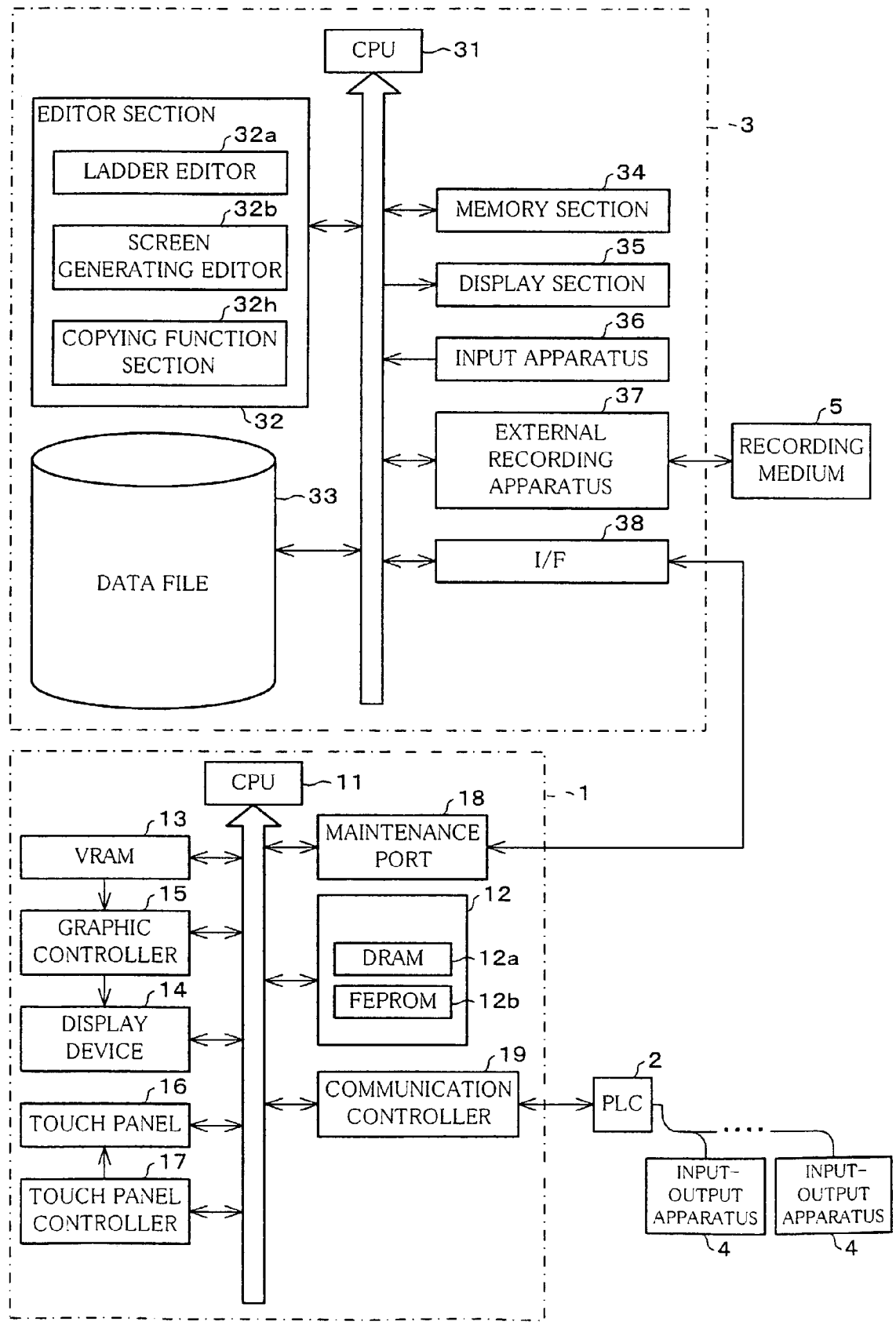
FIG. 51 a block diagram showing constitution of a first display/control system of a fourth embodiment of the present invention.

A first display/control system shown in FIG. 51 includes a programmable display apparatus 1 and a PLC 2, similarly to the display/control system (see FIG. 1) of the first embodiment described before.

A computer 3 connected to the programmable display apparatus 1 is provided with a CPU 31, an editing section 32, a memory section 34, a display device 35, an input apparatus 36, an external recording apparatus 37, and an interface 38, similarly to the computer 3 of the display/control system shown in FIG. 1.

The editing section 32 includes a ladder editor 32a, a screen generating editor 32b, and a variable number management section 32h.

The variable number management section 32h, which is registering means, registers in the later-described data file 33, in such a format that variable numbers inputted from the ladder editor 32a and the screen generating editor 32b are provided, as functional attributes, with functions (a switch, a lamp, a timer, counters) represented by ladder commands and marks.

Examples of registering the variable number include the following two methods.

The first method is such that when a desired ladder command is selected from a ladder command group prepared in the ladder editor 32a, a screen for registering a variable number (for example, the later-described dialog box in FIG. 52(b)) is displayed so that the variable number is registered therein. The second method is such that the variable number is first registered, then, the inputted ladder command is assigned to the registered variable number.

Moreover, examples of methods for providing a variable number with functional attribute include the following two methods.

The first method is such that a variable number includes a reserved word, so that the variable number is provided with the functional attribute. Specifically, it is so assumed that a switch variable number is a variable number which includes the reserved word "S" at the head of the variable number, like "S****" (* shows any characters and numbers). Similarly, a lamp variable number, a timer variable number, and a counter variable number are respectively assumed to be variable numbers starting with the reserved words "L", "T", "C".

The second method is such that a functional attribute is provided to the variable number itself. Specifically, as shown in FIG. 52(a), the inputted variable numbers are set in terms of name, type, holding, global, and function. Such setting is carried out , for example, in a dialog box as shown in FIG. 52(b). For type and the function, a plurality of options are available for selection.

Name, which is the name of the variable number, is set in such a manner that name is set as "SW1" for a particular switch. Type, which represents the type of the variable number, is set in accordance with each functional element. For example, with respect to functional elements which perform ON/OFF operation, such as a switch and a lamp, "bit" is set as a type, while with respect to functional elements which perform number counting operation, such as a timer and a counter, "integral number" is set as a type. Further, functional elements which perform display operation of discrete values, such as a meter, "real number" is set as a type. As a function, prepared are the switch, the lamp, the timer, and the counter, as described before.

Holding is set as to whether the above data is held or not during power-down, and in case setting is carried out, a check is made in a check box. Global is set as to whether the registered variable number is used in common between the editor (for example, the ladder editor 32a) which registered functional attributes and other application software (for example, the screen generating editor 32b). Similarly, in case the registered variable number is used in common, a check is made in a check box. In case the setting of the global is not performed, it is not possible to import the variable number to other application software.

Note that, the holding and the global are provided if necessary.

Further, it should be noted that the variable number management section 32h sets the functional attribute simply by inputting the variable number if the functional attribute is set specifically by the ladder command and parts. In such case, the registration of the functional attribute by a user is not necessary.

Figure 53:
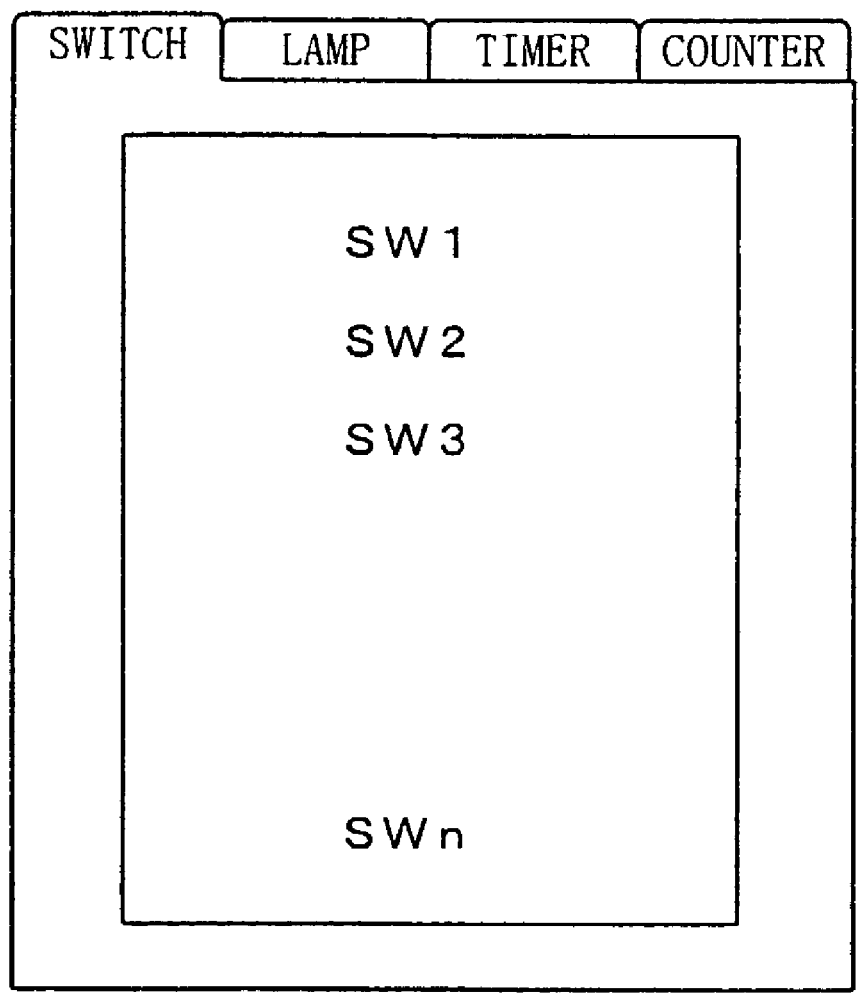
FIG. 53 is an explanatory view illustrating a list of variable numbers for displaying the variable numbers.

The above variable number management section 32h displays the variable numbers registered in the data file 33 on a ladder window $32a_1$ and a screen generating window $32b_1$, which are described later, in a list format provided for each function. Specifically, as shown in FIG. 53, a variable number list is structured with a tab format provided for each function. In the tab of the switch, for example, a plurality of variable numbers such as "SW1", "SW2", . . . "SWn" are included in accordance with various switches.

Besides the above variable number list, a variable number list may be so formatted that the variable numbers are displayed so as to be looked though regardless of functions. In such variable number list, data of functional attributes (functions, types of variable numbers, and the other) are also displayed together with variable numbers so that the functional attributes can be recognized.

That is, a variable number list can be displayed with any formats as far as the variable number list is adapted to allow that necessary variable numbers are selected therefrom. However, it is more preferable that the variable number list is adapted to allow ease selecting of the variable numbers, like the above example.

Further, when the variable number, which is selected from the above variable number list, for example, by clicking operation with a mouse, is dragged and dropped in input-enable regions of the ladder window $32a_1$ and the screen generating window $32b_1$, the variable number management section 32h, which is displaying means, causes the ladder editor 32a and the screen generating editor 32b to automatically generate (draw) a ladder symbol and a mark at the position where the variable number is dropped on the ladder window $32a_1$ and the screen generating window $32b_1$.

Note that, the variable number management section 32h may be included respectively in the ladder editor 32a and the screen generating editor 32b as a function of one of the ladder editor 32a and the screen generating editor 32b, or may be included in both editors 32a and 32b as a common function.

Figure 54:
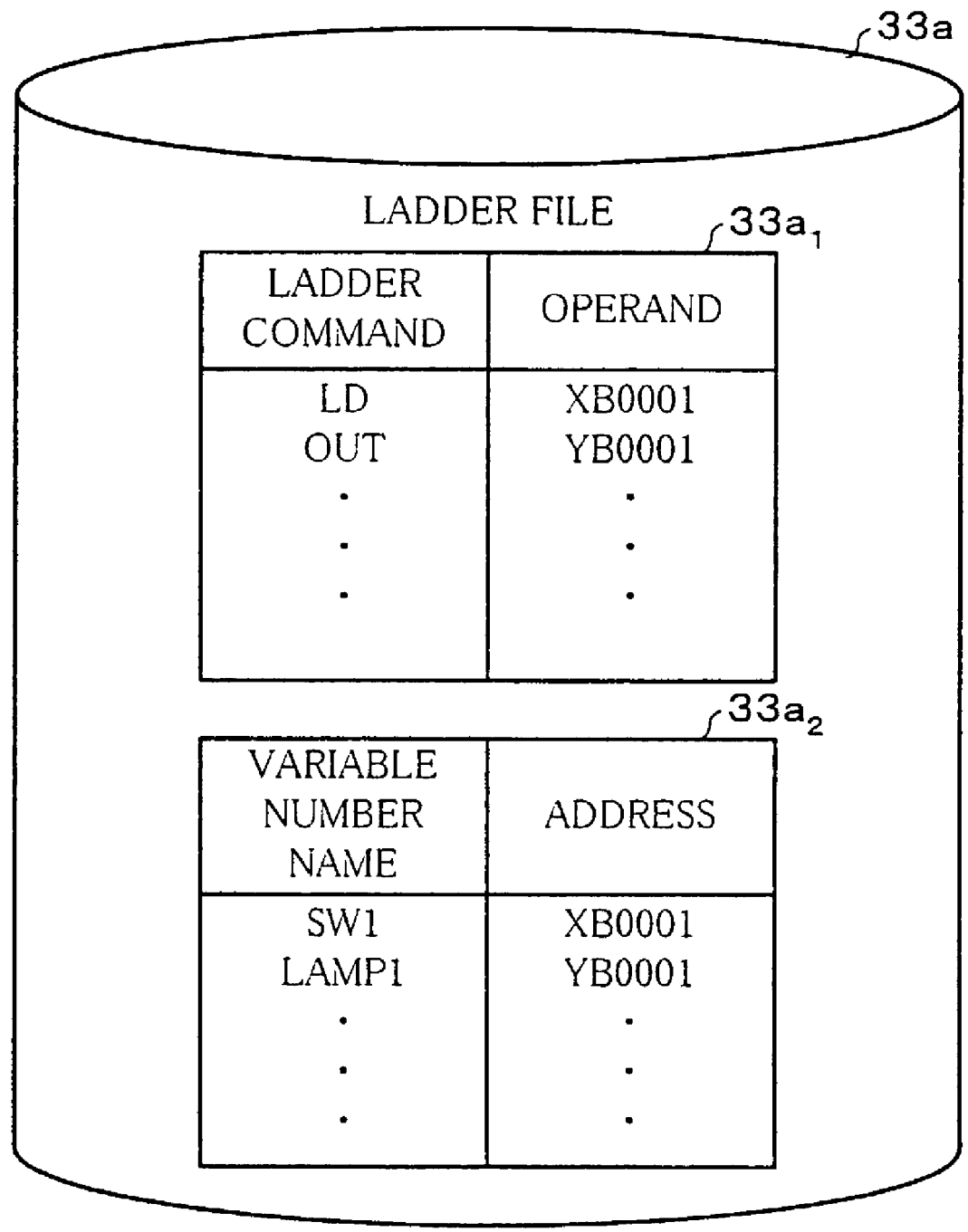
FIG. 54 is an explanatory view showing constitution of a ladder file formed in a data file provided in a computer of each display/control system of the fourth embodiment.
Figure 55:
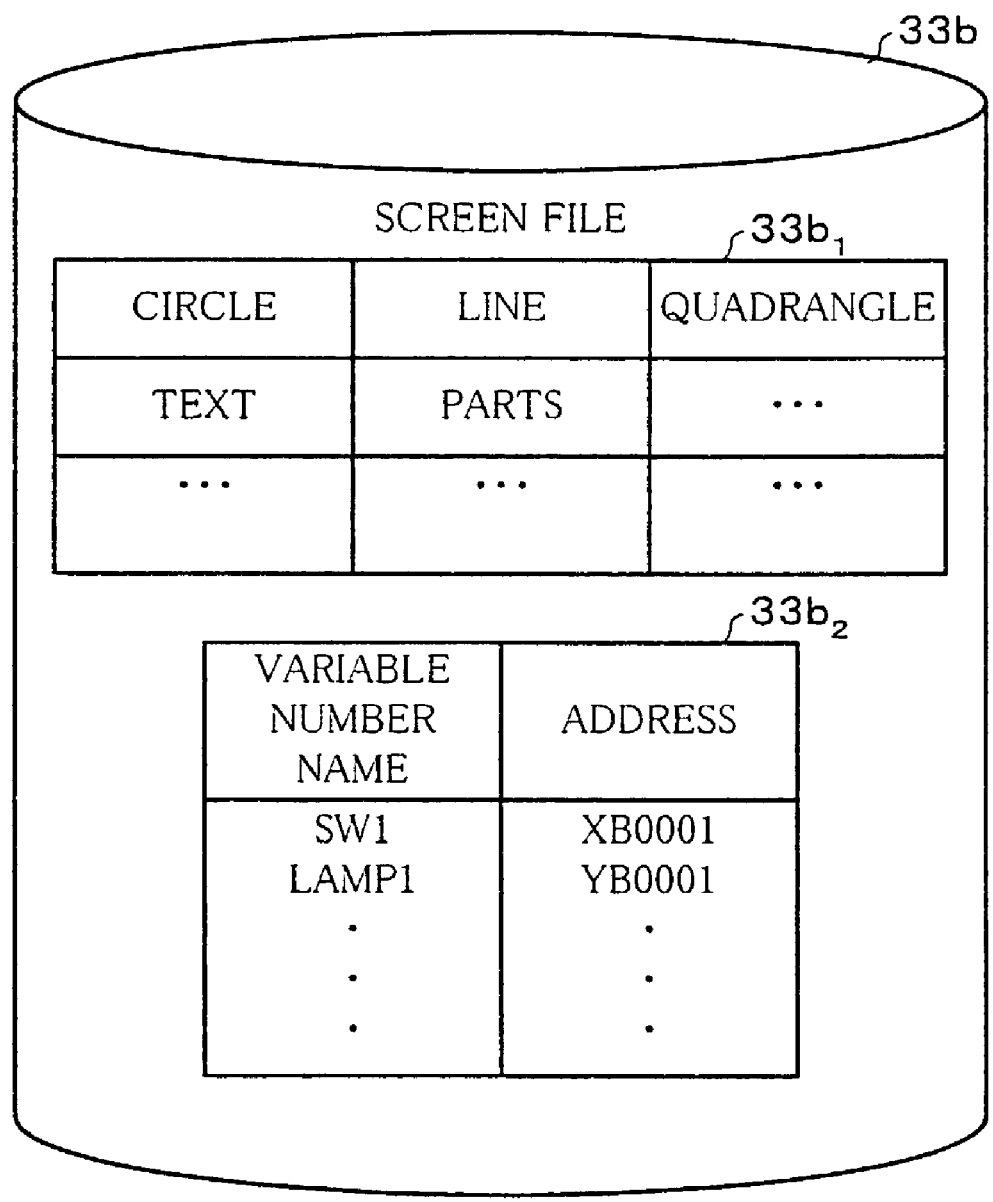
FIG. 55 is an explanatory view showing constitution of a screen file formed in the data file provided in the computer of each display/control system.

With respect to the data file 33, for example, a user program is stored in the ladder file 33a as shown in FIG. 54, while a user screen is stored in the screen file 33b as shown in FIG. 55.

The ladder file 33a is composed of a command file section 33$a_1$ and a variable number data file section 33$a_2$. The command file section 33$a_1$ stores ladder command and operand corresponding to inputted ladder symbols, while the variable number data file section 33$a_2$ stores the variable numbers and addresses of the devices with respect to the ladder command, so as to correspond to the command file section 33$a_1$. Moreover, the variable number data file section 33$a_2$ stores the functional attributes registered by the variable number management section 32h, together with the variable numbers.

The screen file 33b is composed of a figure data file section 33$b_1$ and a variable number data file section 33$b_2$. The figure data file section 33$b_1$ stores data such as various figures (a circle, a line, a quadrangle, and the other), texts (a character string), and parts, while the variable number data file section 33$b_2$ stores the variable numbers and addresses of the devices as to the inputted marks, so as to correspond to the figure data file section 33$b_1$. Further, the variable number data file section 33$b_2$ stores data as to the functional attributes registered by the variable number management section 32h, together with the variable numbers.

In the data file 33, in case the ladder file 33a and the screen file 33b, which are individually created, are used, it is necessary to import data as to the variable numbers and their functional attributes registered in advance in one of the variable number data file sections 33$a_2$ and 33$b_2$ by the variable number management section 32h to the other, as described later.

Because the ladder file 33a and the screen file 33b are associated with each other by the variable numbers and their functional attributes stored in the variable number data file sections 33$a_2$ and 33$b_2$, the display operation and the control operation of the first to third display/control systems are associated with each other.

Figure 56:
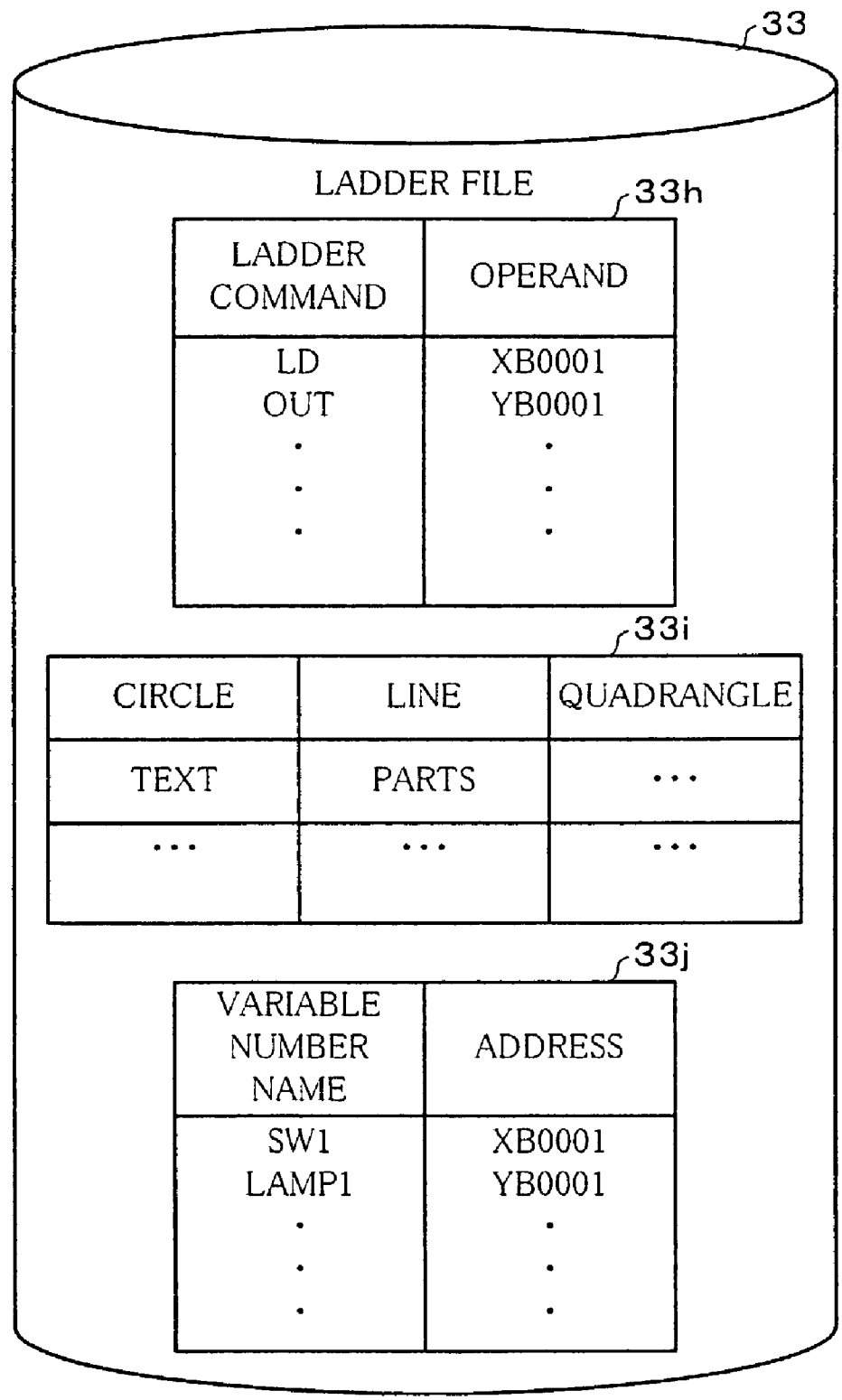
FIG. 56 is an explanatory view illustrating another constitution of the data file provided in the computer of each display/control system.

Alternatively, for example, as shown in FIG. 56, the data file 33 may have a format in which the ladder file 33a and the screen file 33b are integrated so as to store the user program and the user screen therein. The data file 33 is composed of a command file section 33h, a figure data file section 33i, and a variable number data file section 33j.

In case the data file 33 is used, the variable number data (including (a) addresses and (b) data as to the variable numbers and their functional attributes) between the ladder file 33a and the screen file 33b of the variable number management section 32h is stored in common with the user program and the user screen; therefore, unlike the case of using the ladder file 33a and the screen file 33b described before, it is not necessary to import the variable number data from/to one of the files 33a and 33b to the other.

The second display/control system shown in FIG. 57, includes a programmable display apparatus 1 and a PLC 2, similarly to the first display/control system mentioned above. However, since the programmable display apparatus 1 here is further provided with a PLC function, the programmable display apparatus 1 is provided with an SRAM 12c in a memory section 12, and further provided with an input-output unit 20 and an I/O control interface 21.

Figure 58:
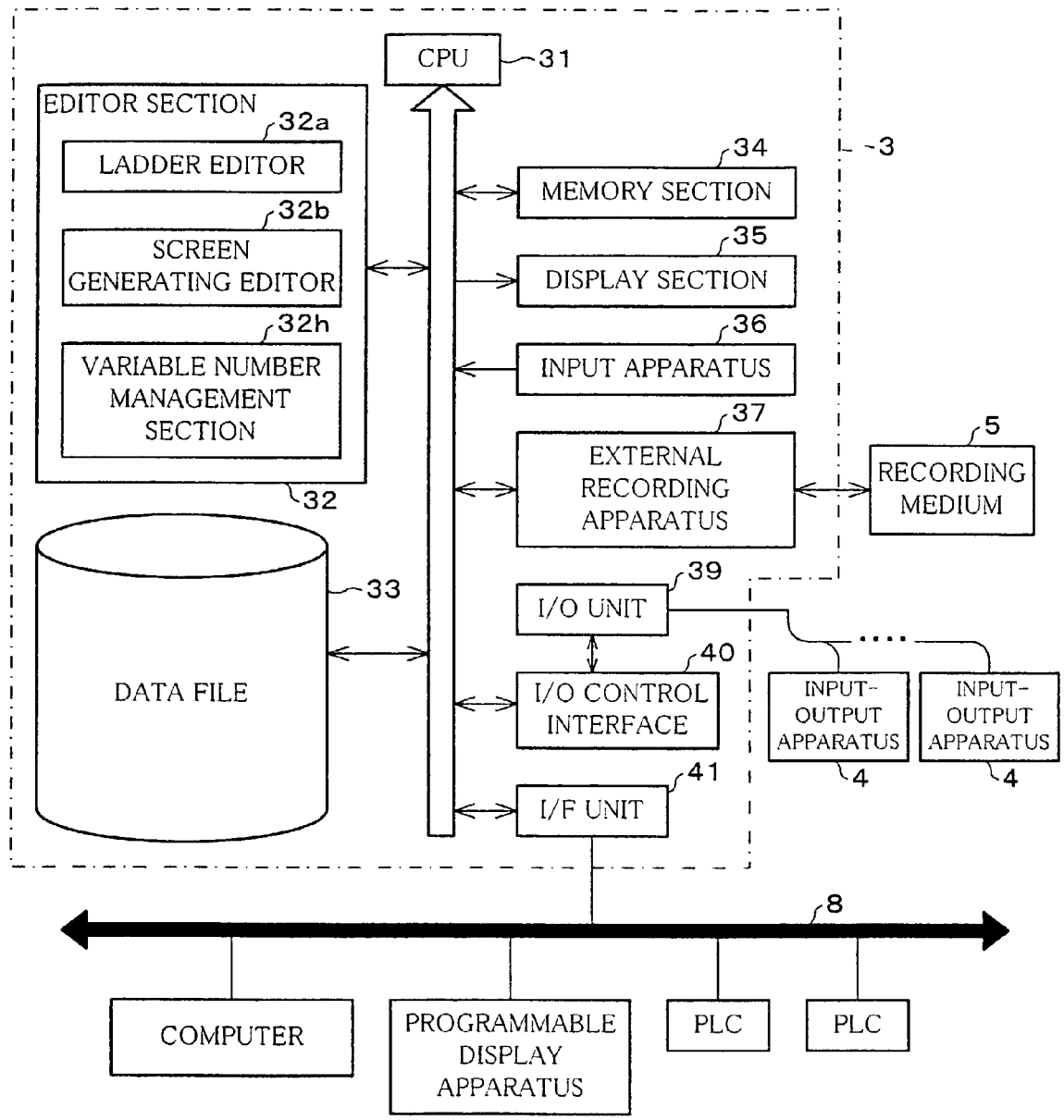
FIG. 58 is a block diagram showing constitution of the third display/control system of the fourth embodiment of the present invention.

In the third display/control system shown in FIG. 58 is composed mainly of a computer 3 which functions as an open controller. The computer 3 is provided with, instead of the interface 38, an input-output unit 39 and an I/O control interface 40, and is further provided with an interface unit 41 to be connected with an open network 8.

Here, more specifically explained are procedures of generating the user program and the user screen in the first to third display/control systems.

Figure 59:
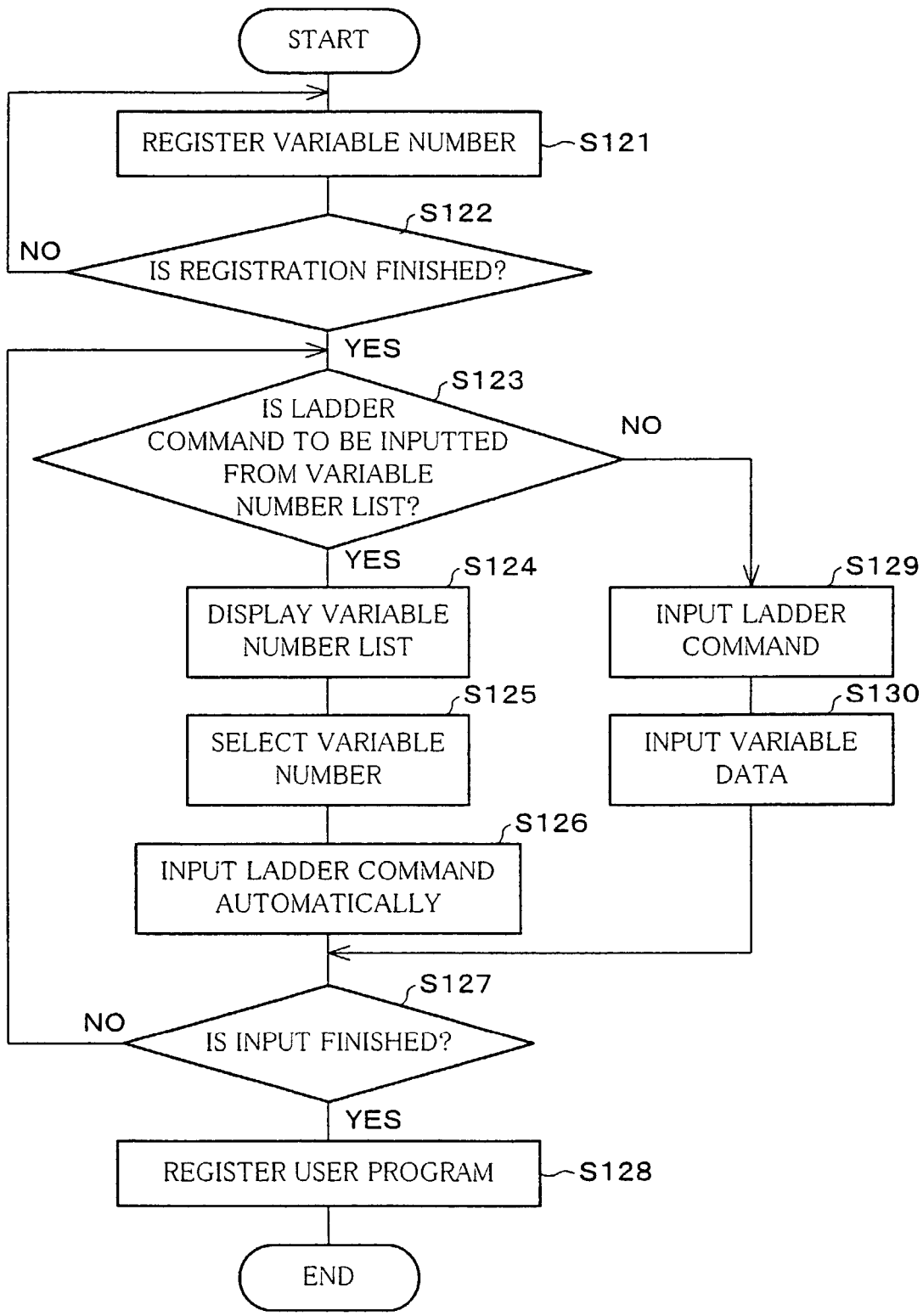
FIG. 59 is a flow chart illustrating a procedure of generating a user program, which is carried out by the respective display/control systems.

In case a user program is generated, a procedure of the flow chart shown in FIG. 59 is followed. Here, it is assumed that, in the computer 3, at least the ladder editor 32a is activated and the ladder window 32$a_1$ is opened on a display section 35a (see FIG. 61(a)) of the display device 35.

To begin with, on the ladder window 32$a_1$, variable numbers corresponding to ladder commands are registered together with functional attributes with respect to each input-output apparatus 4 (S121). At this point, the addresses corresponding to the variable numbers are assigned to the variable numbers. After finished is the registration of the variable numbers corresponding to ladder commands used (S122), judged is whether a ladder command is to be inputted from a variable number list or not (S123).

In case the ladder command is inputted from the variable number list, the variable number list is displayed (S124). Next, a desired variable number, which is selected from the variable number list, is dragged and dropped onto the ladder window 32$a_1$ (S125). Then, the ladder command corresponding to the thus selected variable number is automatically inputted (S126), and the ladder symbol which represents the ladder command is displayed on the ladder window 32$a_1$. Then, judged is whether the input of the ladder command is finished or not (S127). Here, in case the input of the ladder command is not finished, S123 is carried out thereafter, meanwhile in case it is finished, the thus generated user program is registered in the data file 33 (S128).

On the other hand, the ladder command is not inputted from the variable number list in S123, that is, the ladder command to be inputted is not registered in the variable number list, the ladder command is inputted in a usual method by the ladder editor 32a (S129). Then, inputted is the variable number corresponding to the ladder command (S130). At this point, similarly to S121, the registration of the variable number and the functional attribute is carried out at the same time the input is carried out, and the address corresponding to the variable number is assigned to the variable number. Thereafter, S127 is carried out.

Note that, in the above example, explained is the method in which after a variable number is registered in advance, the ladder command is automatically inputted in accordance with the thus registered variable number. However, as to the registration of the variable number, it is not limited to this method, and the registration of the variable number may be carried out while inputting the ladder command. In such case, the processes are carried out in order beginning from S129 to S121, S122, S127, and S128.

Further, in case by using the screen generating editor 32b the registration of the variable number and the functional attribute is carried out together with the generating of the user screen, as described later, the variable number list obtained by the registration is utilized. Specifically, The processes except for S121 and S122 are carried out.

Figure 60:
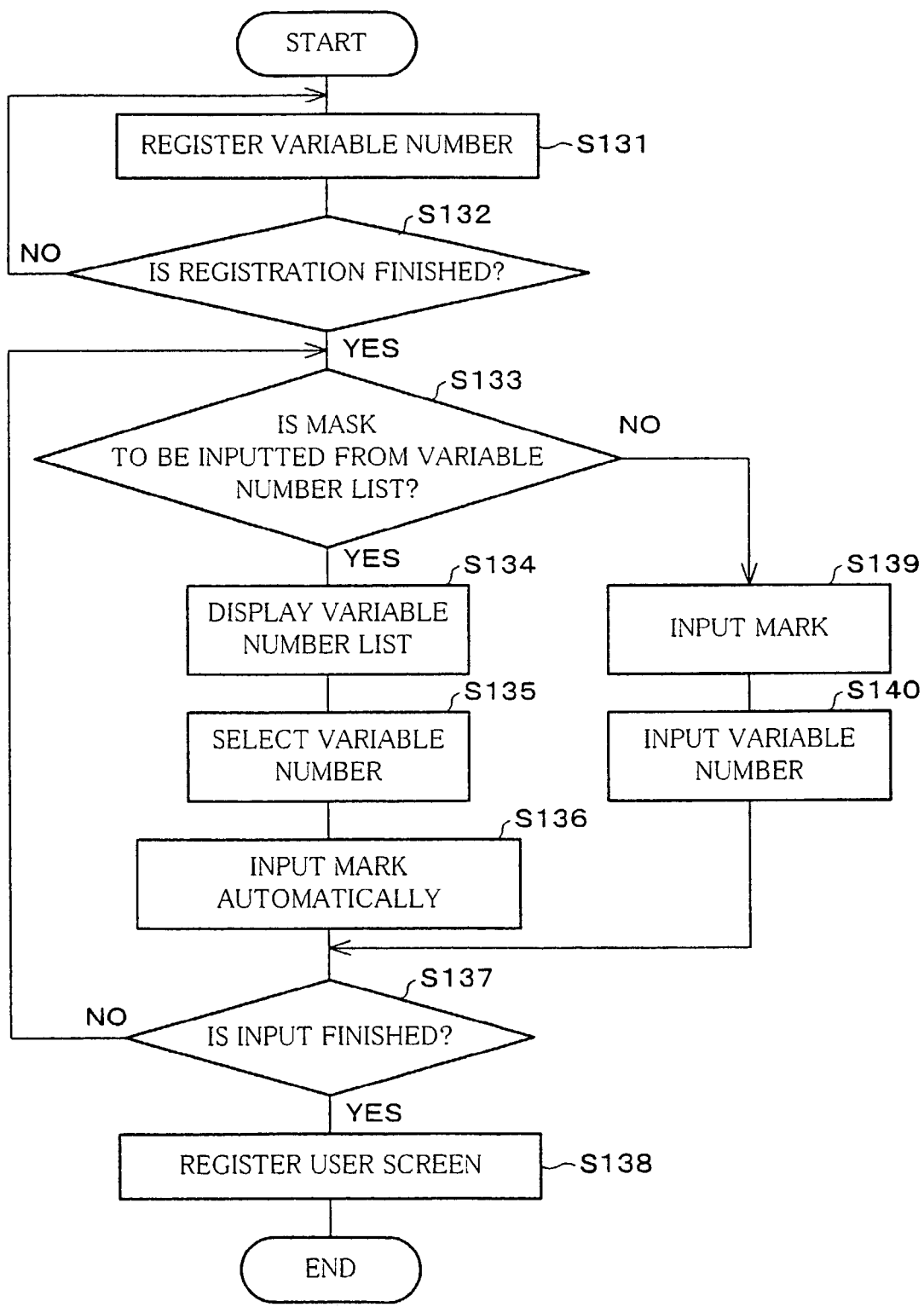
FIG. 60 is a flow chart showing a procedure of generating a user screen, which is carried out by the respective display/control system.
Figure 61:
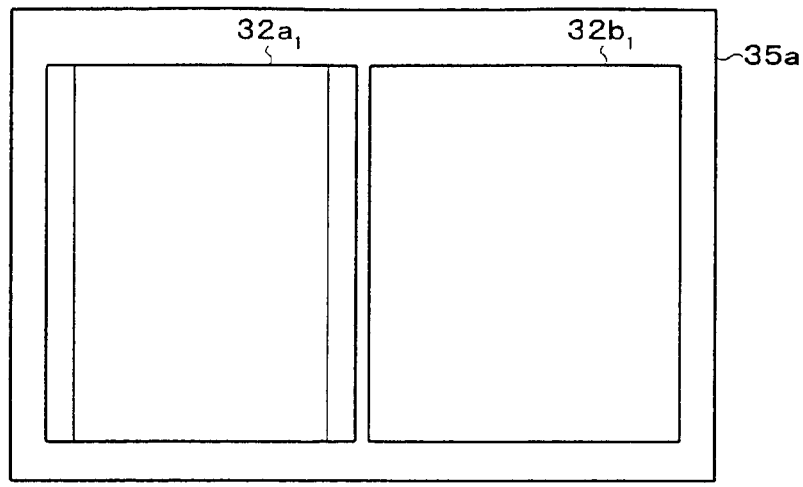
FIGS. 61(a) to 61(c) are explanatory views illustrating a specific example of operation of a ladder editor and a screen generating editor when the user program and the user screen are generated at the same time.
Figure 61:
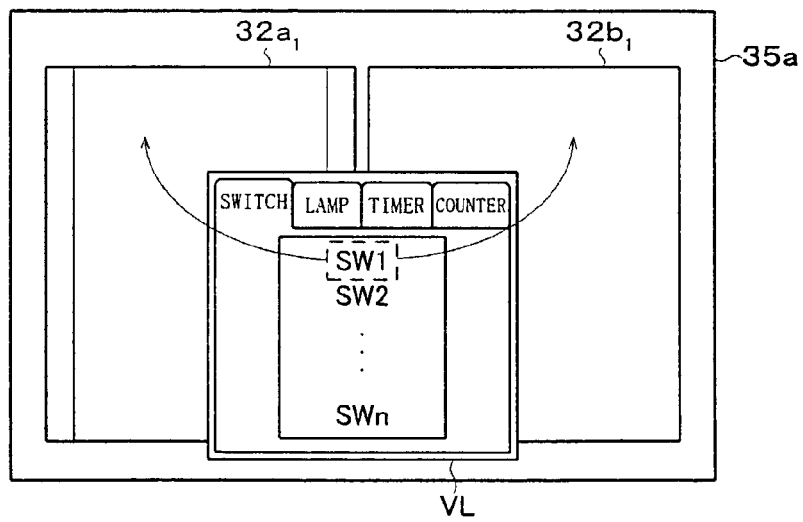
Figure 61:
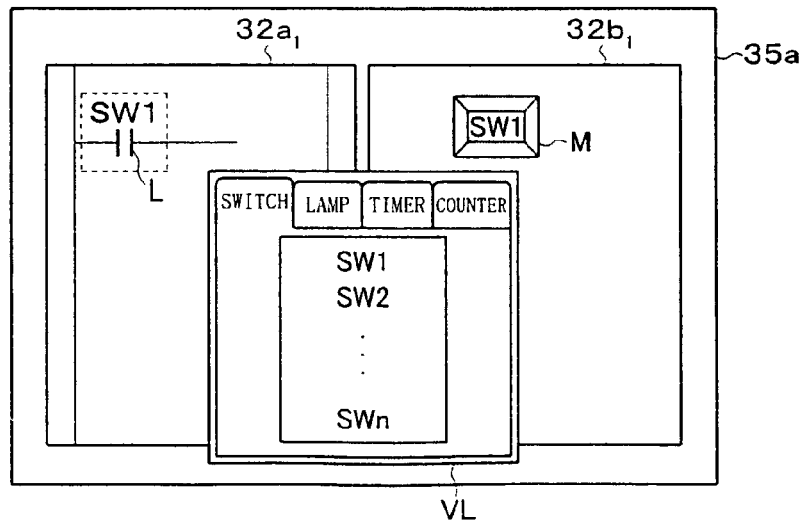

In case the user screen is generated, a procedure of the flow chart shown in FIG. 60 is followed. Here, it is assumed that, in the computer 3, at least the screen generating editor 32b is activated and the screen generating window 32$b_1$ is opened on a display section 35a (see FIG. 61(a)) of the display device 35.

To begin with, on the ladder window 32$a_1$, the variable numbers corresponding to the marks are registered together with the functional attributes with respect to each input-output apparatus 4 (S131). At this point, the addresses corresponding to the variable numbers are assigned to the variable numbers. After finishing the registration of the variable numbers corresponding to marks used (S132), judged is whether a mark is to be inputted from a variable number list or not (S133).

In case the mark is inputted from the variable number list, the variable number list is displayed (S134). Next, a desired variable number, which is selected from the variable number list, is dragged and dropped onto the screen generating window $32b_1$ (S135). Then, the mark corresponding to the thus selected variable number is automatically inputted (S136), and the mark is displayed on the screen generating window $32b_1$. Then, judged is whether the input of the mark is finished or not (S137). Here, in case the input of the mark is not finished, S133 is carried out thereafter, meanwhile in case the input is finished, the thus generated user screen is registered in the data file 33 (S138).

On the other hand, the mark is not inputted from the variable number list in S133, that is, the mark to be inputted is not registered in the variable number list, the mark is inputted in a usual method by the screen generating editor 32b (S139). Then, inputted is the variable number corresponding to the mark (S140). At this point, similarly to S131, the registration of the variable number and the functional attributes is carried out at the same time the input is carried out, and the address corresponding to the variable number is assigned to the variable number. Thereafter, S137 is carried out.

Note that, in the above example, explained is the method in which after the variable number is registered in advance, the mark is automatically inputted in accordance with the thus registered variable number. However, as to the registration of the variable number, it is not limited to this method, and the registration of the variable number may be carried out while inputting the mark. In such case, the processes are carried out in order beginning from S139, to S131, S132, S137, and S138.

Further, in case by using the ladder editor 32a the registration of the variable number and the functional attribute is carried out together with the generating of the user program, as described before, the variable number list obtained by the registration is utilized. Specifically, the processes except for S131 and S132 are carried out.

Here, explained is a specific example of the case in which the user program and the user screen are generated at the same time in accordance with the procedures of the flow charts of FIG. 59 and FIG. 60.

Here, as shown in FIG. 61(a), the ladder editor 32a and the screen generating editor 32b are activated, and the ladder window $32a_1$ and the screen generating window $32b_1$ are opened on the display section 35a of the display device 35. Also, it is assumed that the variable numbers and functional attributes as to the variable numbers are registered in advance.

In such state, as shown in FIG. 61(b), a variable number list is displayed on the display section 35a. Among variable numbers that are included in the tabs of switches, for example, the variable number "SW1" is dragged and dropped at a desired position on the ladder window $32a_1$ and the screen generating window $32b_1$.

Then, as shown in FIG. 61(c), on the ladder window $32a_1$, at the position where the variable number "SW1" is dropped, displayed is a ladder symbol L which is equivalent to LD (Load) command. Moreover, the variable number "SW1" is displayed together near the ladder symbol L. Meanwhile, on the screen generating window $32b_1$, at the position where the variable number "SW1" is dropped, displayed is a mark M of a switch, which is associated with the variable number. Moreover, the variable number "SW1" is displayed together above the mark M.

In accordance with the above process, all the user has to do is to select, from the variable number list, the variable number registered in advance in the variable number list and carry out the operation of dragging and dropping so that a desired ladder symbol and mark, which are associated with the variable number, can be automatically generated on the ladder window $32a_1$ and the screen generating window $32b_1$, respectively. Also, in addition, the variable number is displayed together with the ladder symbol L and the mark M, so that a need to input the ladder symbol L and the mark M will be eliminated.

The above example is the case in which the user program and the user screen are generated at the same time. However, as described before, in case the registration of the variable number and the functional attribute is carried out while the input of the ladder symbol and the mark is carried out, the registration and the generation of the user program or the user screen are carried out at the same time. Therefore, in such case, as described before, the user screen or the user program is generated by using the thus registered variable number and the functional attribute.

As described above, each display/control system of the present embodiment is composed of the variable number management section 32h which registers the variable number with the functional attribute so as to automatically generate the ladder symbol and the mark by using the registered variable number, as described before. This makes it possible to efficiently carry out both procedures: the procedure (1) in which one of the user program and the user screen is generated, and then the other is generated, and the procedure (2) in which the user program and the user screen are generated at the same time. Further, even in the procedure (2), not only it is possible that the registration of the variable number and the functional attribute and the input of the ladder command and the mark are carried out successively, but also it is possible that the input of the ladder symbol and the mark is carried out after all the registration of the variable number and the functional attribute is carried out in advance. Moreover, even after registration, it is possible to call the dialog box of FIG. 52(b) and easily change the content of the registration. Thus, it is possible to deal with various generation formats of the above program.

In addition, since the variable number has the functional attribute, displaying of the variable number with the ladder symbol and the mark eliminates a need of inputting an additional comment and a name for characterization of the displayed ladder symbol and mark. Also, the management of the variable number becomes easy because of the functional attribute.

Further, in the present embodiment, explained is the example where the variable number is dragged and dropped from the variable number list; however, the present invention is not limited to this.

Fifth Embodiment

Described below is a fifth embodiment of the present invention with reference to FIGS. 55, 56, and 62 to 71.

Figure 62:
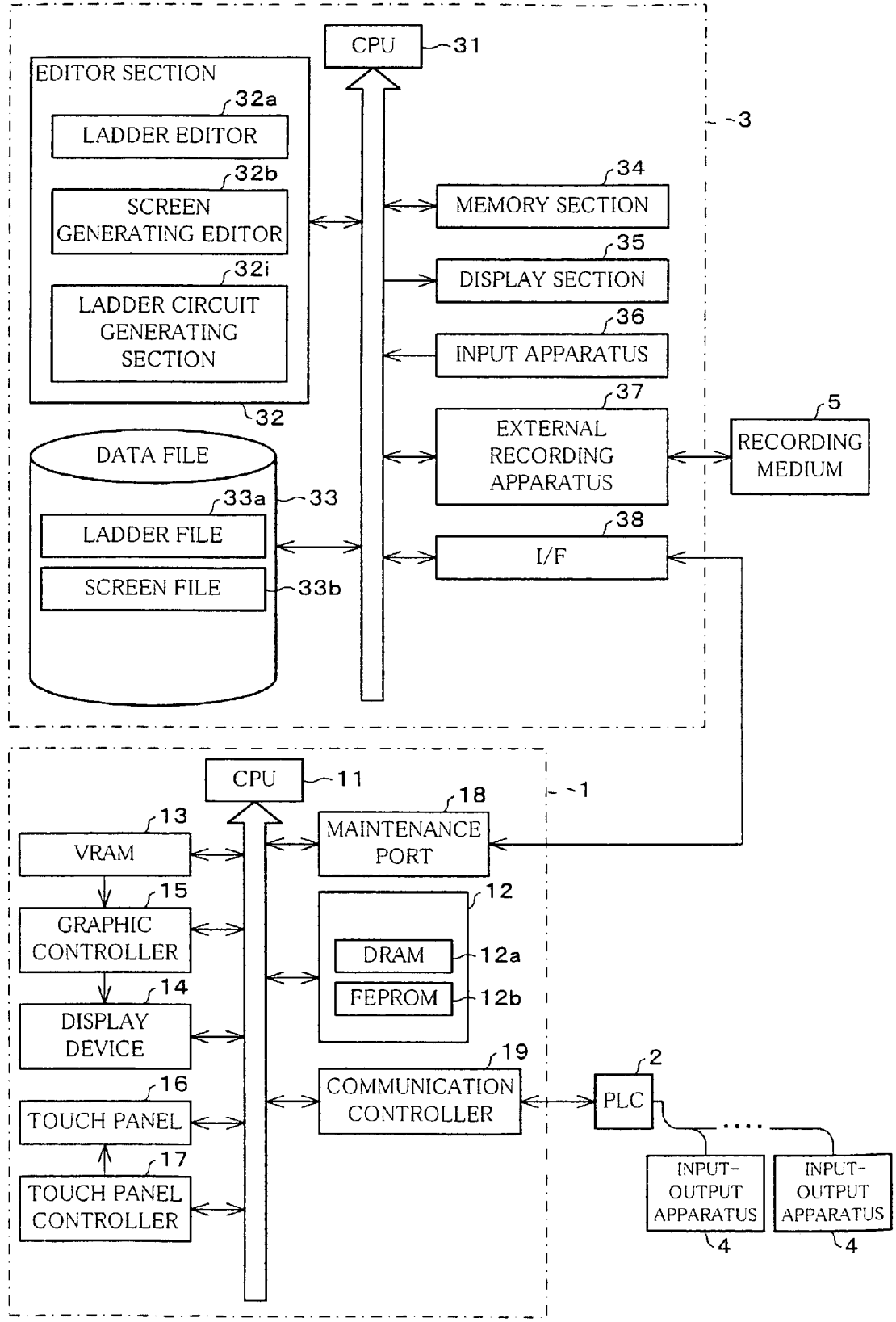
FIG. 62 is a block diagram showing constitution of a first display/control system of a fifth embodiment of the present invention.
Figure 63:
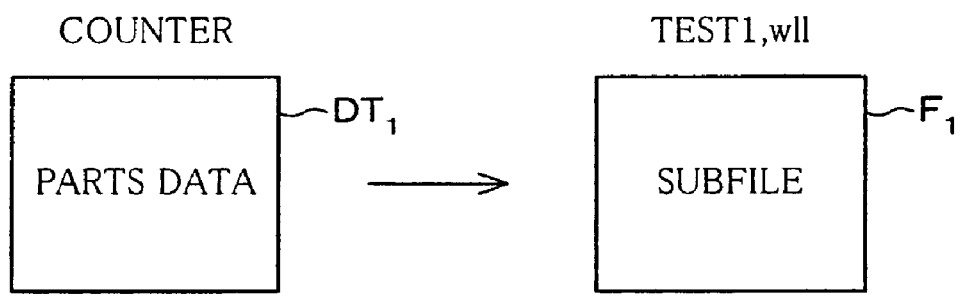
FIGS. 63(a) and 63(b) are explanatory views illustrating relationships between (i) data of a composite part, which is inputted by a screen generating editor provided in a computer of each display/control system of the fifth embodiment, and (ii) a sub file which stores therein a ladder circuit generated in accordance with the data, by the ladder editor.
Figure 63:
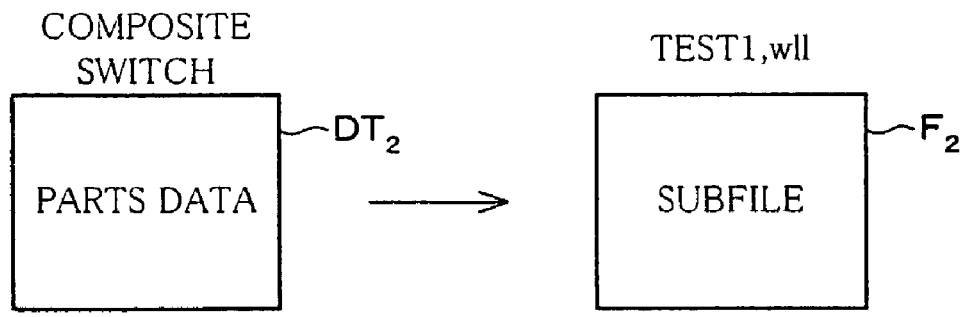

A first display/control system shown in FIG. 62 includes a programmable display apparatus 1 and a PLC 2. A computer 3 connected to the programmable display apparatus 1 is provided with a CPU 31, an editing section 32, a memory section 34, a display device 35, an input apparatus 36, an external recording apparatus 37, and an interface 38, similarly to the computer 3 of the display/control system shown in FIG. 1.

The editing section 32 includes a ladder editor 32a, a screen generating editor 32b, and a ladder circuit generating section 32i.

Ladder commands, which are inputted by the ladder editor 32a, are temporarily registered on a ladder list (program list) which is generated in the memory section 34. On the ladder list, the ladder commands are stored in such a manner that addresses are assigned respectively to the ladder commands. A user program, which is generated by the combination of such ladder commands, is transferred via the programmable display apparatus 1 (or directly) to the PLC 2, and then downloaded in a memory inside the PLC 2.

Moreover, the screen generating editor 32b assigns, via the variable numbers, the input-output numbers (addresses) with respect to the respective input-output apparatuses 4 of the parts positioned on the generated screen.

When the parts selected by the operation of the user using the screen generating editor 32b are positioned on the latter-described screen generating window $32b_1$ (See FIG. 67(a)), the ladder circuit generating section 32i, which is program generating means, causes the ladder editor 32a to automatically generate a ladder circuit corresponding to the parts. Specifically, the ladder circuit generating section 32i registers the variable numbers, which are inputted by the screen generating editor 32b, by being corresponded with the ladder commands, which are inputted by the ladder editor 32a, in the ladder list, while generating the ladder command group which is associated with the variable number in advance, so that the ladder command group is provided to the ladder editor 32a, so as to display the ladder command group on the ladder window $32a_1$ (See FIG. 67(a)). The associating of the variable numbers with the ladder command may be such that the association can be carried out by a user, or may be such that the association is carried out in advance by a supplier who supplies the editing section 32 as a software.

Note that, the ladder circuit generating section 32i may be included respectively in the ladder editor 32a and the screen generating editor 32b as a function of one of the ladder editor 32a and the screen generating editor 32b, or may be included in both editors 32a and 32b as a common function.

The data file 33 includes the ladder file 33a and the screen generating file 33b.

In the data file 33, for example, the user program is stored in the ladder file 33a shown in FIG. 54 described before, and the user screen is stored in the screen file 33b shown in FIG. 55 described before. Because the ladder file 33a and the screen file 33b are associated with each other by the variable number data file sections $33a_2$ and $33b_2$, the display operation and the control operation of the first to third display/control systems are associated with each other.

Especially, the ladder file 33a has subfiles (for example, having a extension ".wll") for each of composite parts, where stored is data as to the respective ladder circuits corresponding to data as to the composite parts stored in the screen file 33b. Specifically, as shown in FIG. 63(a), in case the composite parts are counters, with respect to data $DT_1$ of the user screen as to the counters, a subfile $F_1$, having the file name, for example, "TEST1.wll", is generated in the ladder file 33a by the ladder circuit generating section 32i. Also, as shown in FIG. 63(b), in case the composite parts are composite switches, with respect to data $DT_2$ of the user screen as to the composite switches, a subfile $F_2$, having the file name, for example, "TEST2.wll", is generated in the ladder file 33a by the ladder circuit generating section 32i.

Figure 64:
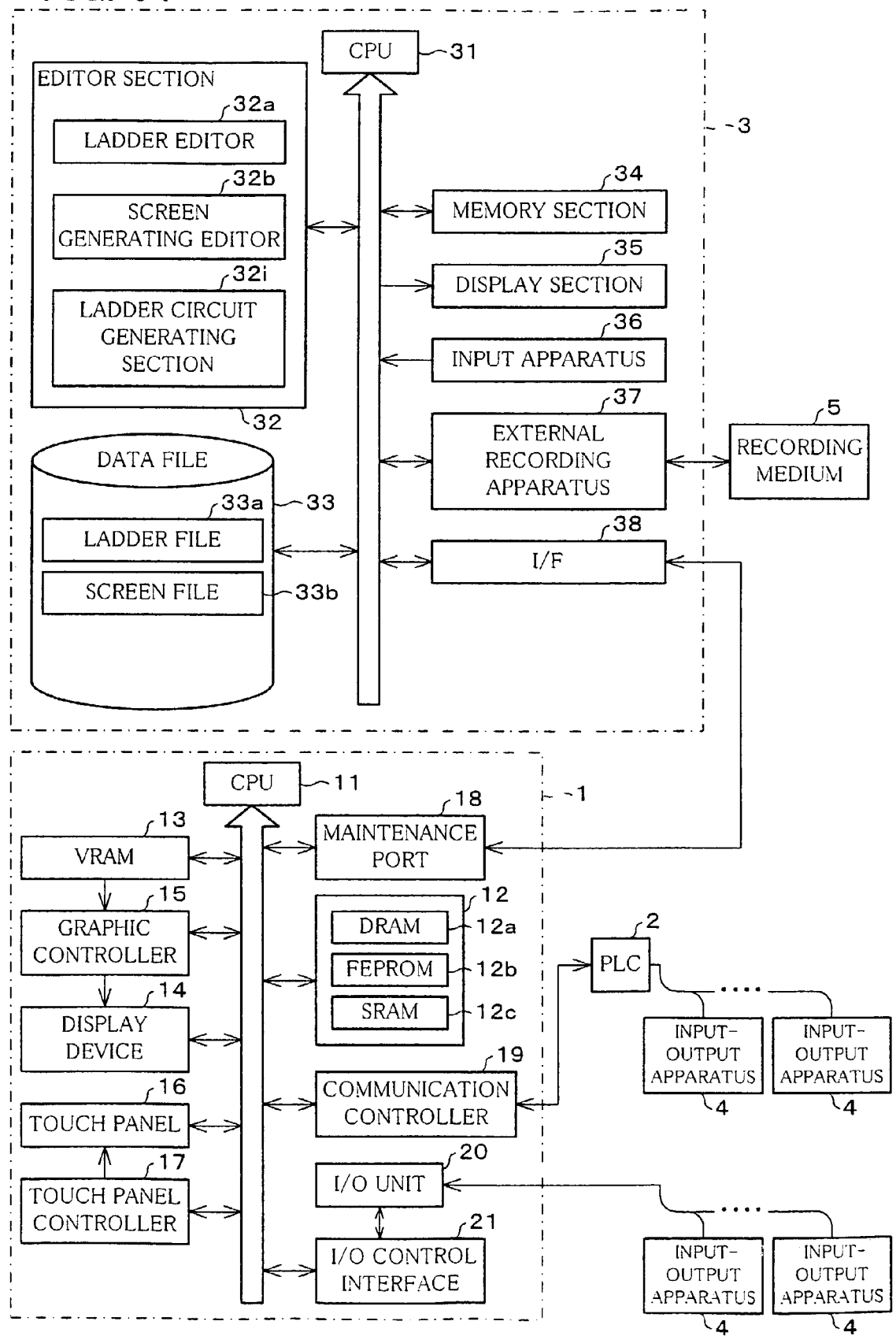
FIG. 64 is a block diagram illustrating constitution of the second display/control system of the fifth embodiment of the present invention.

The second display/control system shown in FIG. 64, includes a programmable display apparatus 1 and a PLC 2, similarly to the first display/control system mentioned above. However, since the programmable display apparatus here is further provided with a PLC function, the programmable display apparatus 1 is provided with an SRAM 12c in a memory section 12, and further provided with an input-output unit 20 and an I/O control interface 21.

Figure 65:
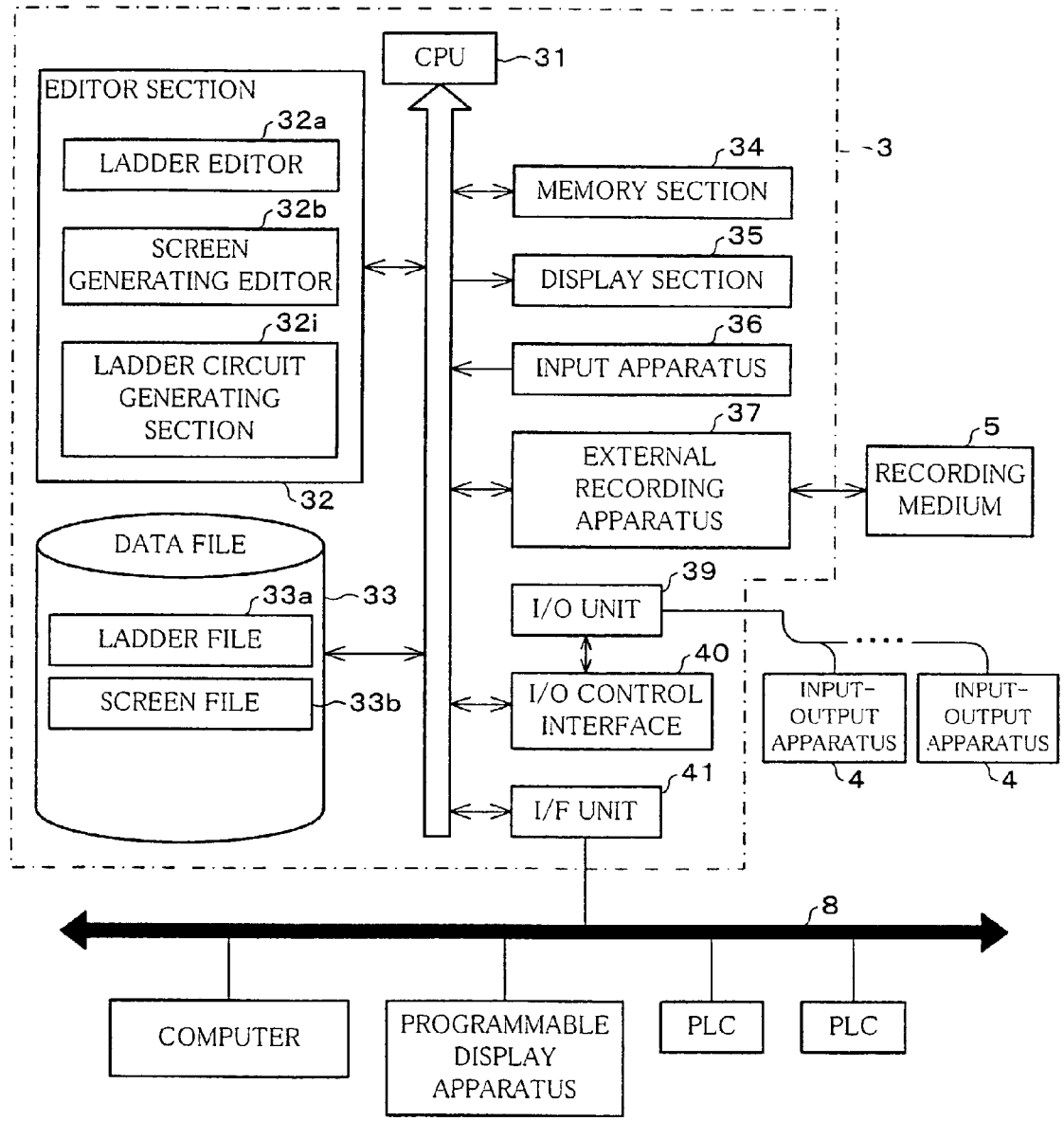
FIG. 65 is a block diagram showing constitution of the third display/control system of the fifth embodiment of the present invention.

For having a function as an open controller, the computer 3 in the third display/control system shown in FIG. 65 is provided with an input-output unit 39, an I/O control interface 40, and an interface unit 41.

Figure 66:
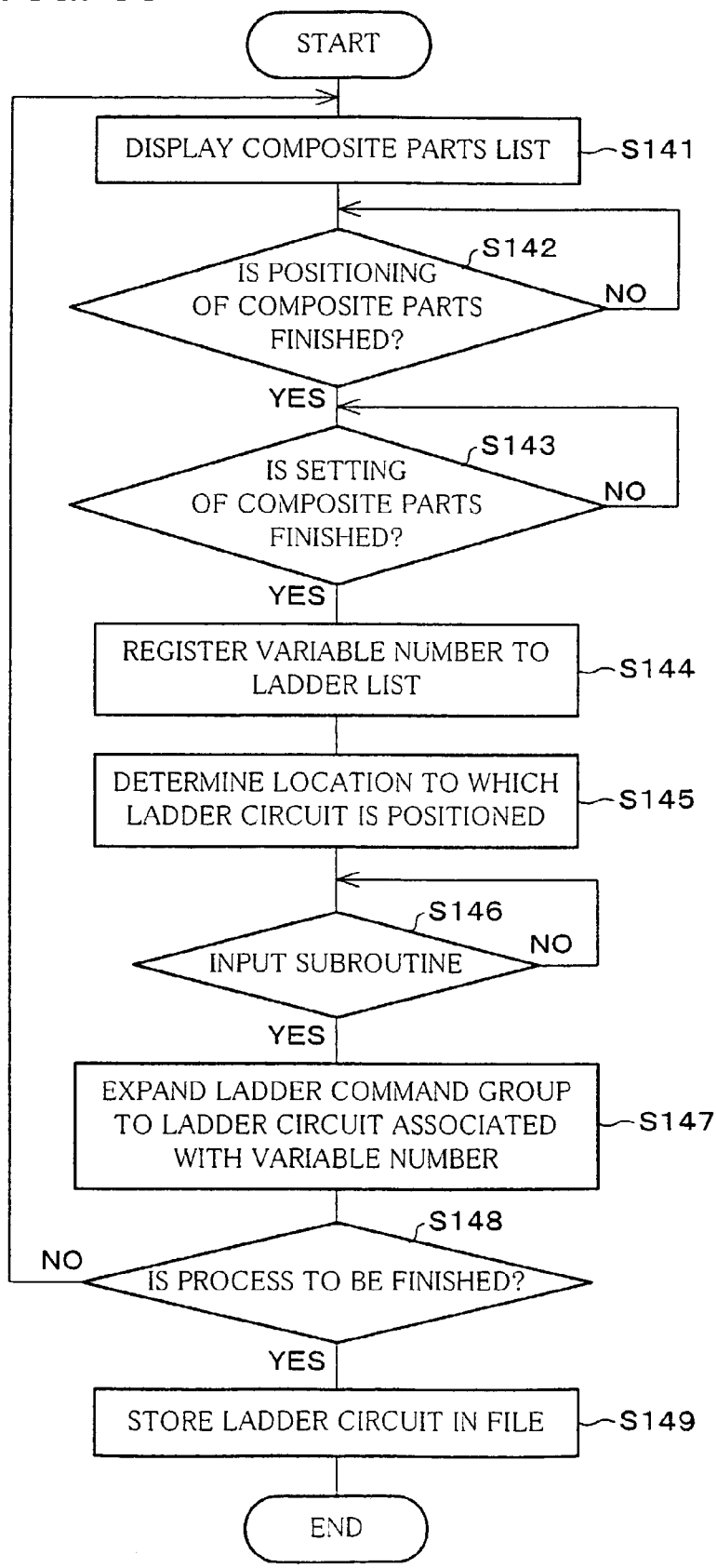
FIG. 66 is a flow chart illustrating a procedure of a process of generation of a ladder circuit, which is carried out in each display/control system, when the composite part is positioned onto the user screen.
Figure 67:
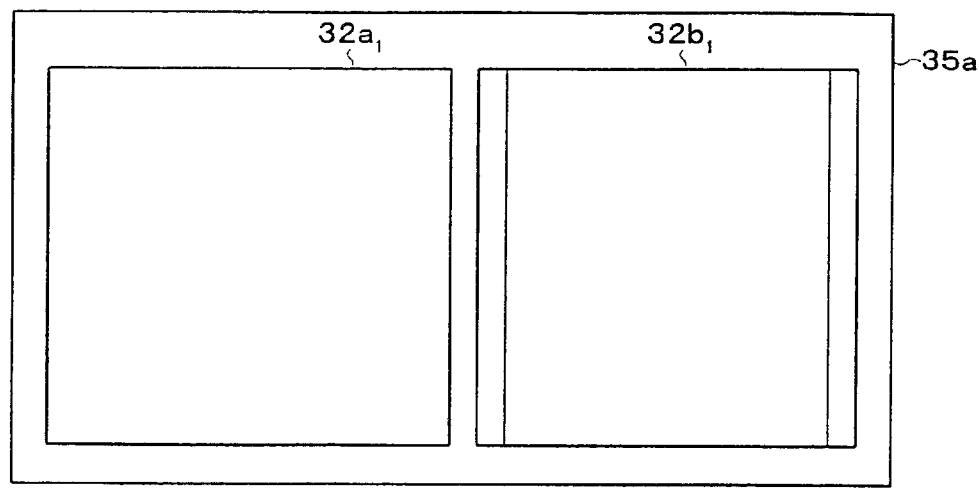
FIGS. 67(a) to 67(c) are explanatory views showing a specific example of the procedure of the process shown in FIG. 66, where a composite part of a composite switch is arranged.
Figure 67:
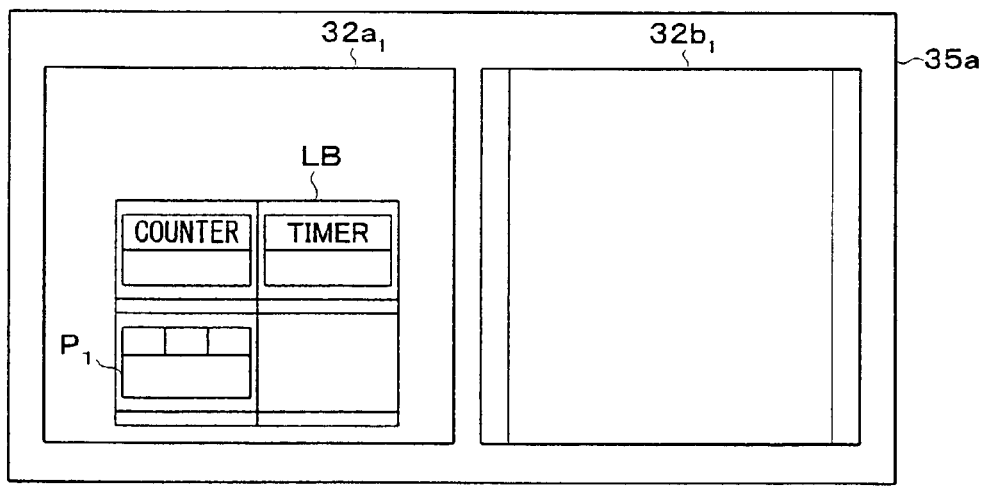
Figure 67:
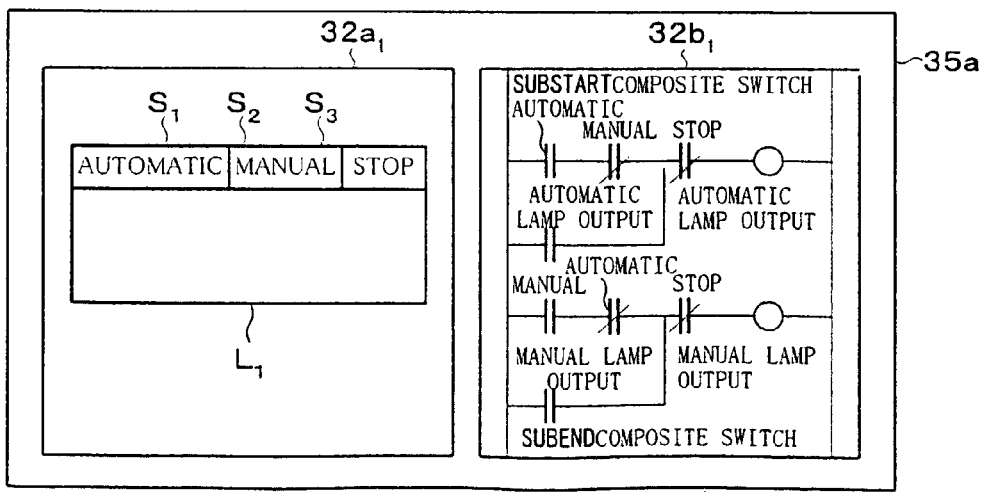
Figure 69:
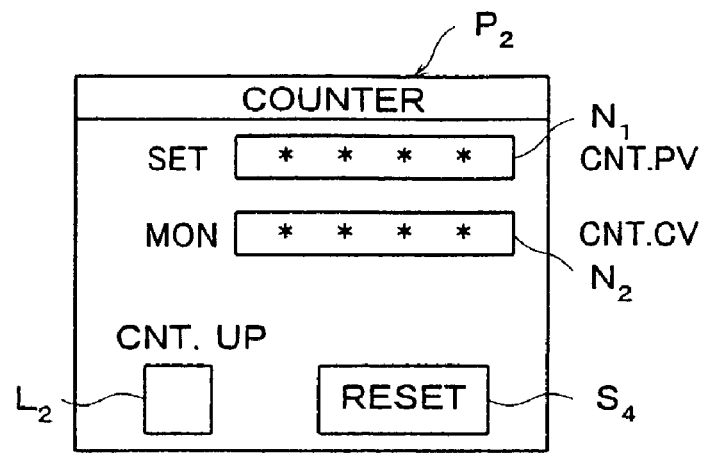
FIG. 69(a) is an explanatory view showing a composite part of a counter arranged on a screen generating window.
FIG. 69(b) is a circuit diagram illustrating a ladder circuit generated on a ladder window by arranging the composite part of the counter.
Figure 69:
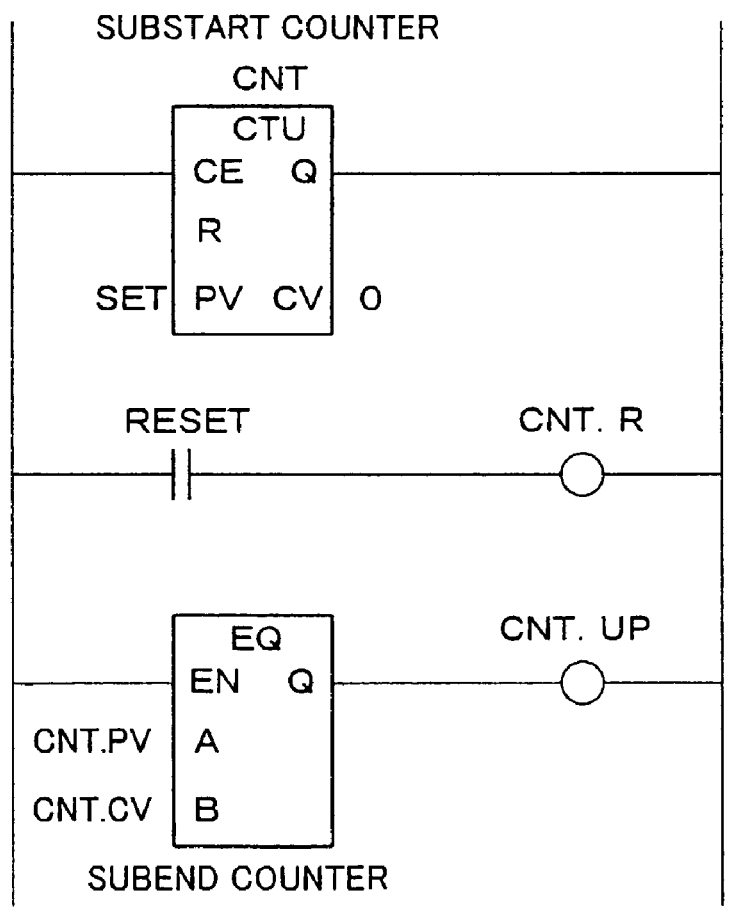

Here, more specifically explained are procedures of automatically generating a ladder circuit corresponding to a compound part in generating the user program and the user screen in the first to third display/control systems, with reference to a flow chart shown in FIG. 66.

It is assumed that, in the computer 3, in case a user program is generated while generating a user screen, the ladder editor 32a and the screen generating editor 32b are activated, and the screen generating window $32b_1$ and the ladder window $32a_1$ are opened at the same time on the display section 35a (see FIG. 67(a)) of the display device 35.

To begin with, on the screen generating window $32b_1$, the list of the composite parts is displayed by the operation of the user (S141), judged is whether or not the composite parts selected from the list by the user are positioned in the screen generating region of the screen generating window $32b_1$ (S142). In case the composite parts are positioned, judged is whether or not setting that addresses are assigned via variable numbers to each of functions of the composite parts is finished (S143). When the setting is finished, the variable numbers are registered in a ladder list (S144).

Next, by the generation of the ladder command group, which is associated with the registered variable number, in the ladder list, determined is a location to which the ladder circuit corresponding to the ladder command group is positioned on the ladder window $32a_1$ (S145). After that, judged is whether or not a subroutine corresponding to the ladder circuit is inputted (S146). In case the subroutine is inputted, the ladder command group is developed together with the variable numbers to the ladder circuit in the ladder window $32a_1$ (S147). Then, whether or not the process is to be finished is judged (S148). Here, in case the process is not to be finished, S141 is carried out thereafter, meanwhile in case the process is to be finished, the generated ladder circuit is stored as a subfile in the ladder file 33a (S149).

Here, explained is a specific example of generating of the ladder circuit carried out by the procedures of the flow chart shown in FIG. 66.

To begin with, as shown in FIG. 67(a), the ladder window $32a_1$ and the screen generating window $32b_1$ are opened on the display section 35a. In this state, as shown in FIG. 67(b), the screen generating editor 32b causes the screen generating window $32b_1$ to display a library LB of composite parts thereon. Then, as shown in FIG. 67(c), for example, the composite part $P_1$ of the composite switch is selected from the library LB and is positioned on the screen generating window $32b_1$. When the process of S145 is finished, the ladder circuit corresponding to the composite switch is generated on the ladder window $32a_1$ by a series of the processes S144 to S147.

The composite part $P_1$ is composed of a switch $S_1$ for instructing the automatic operation of the target system in which input-output apparatuses 4 are positioned, a switch $S_2$ for instructing the manual operation of the target system, a switch $S_3$ for stopping the automatic operation or the manual operation, and a lamp $L_1$ for lighting on during the automatic operation or the manual operation. On the switches $S_1$, $S_2$, and $S_3$, "automatic", "manual", and "stop" are displayed, respectively, as variable numbers. The composite switches are adapted to light the lamp $L_1$ on when either the switch $S_1$ or the switch $S_2$ is ON, and are adapted to light the lamp $L_1$ off when only the switch $S_3$ is ON. Such functional attributes are stored in advance as data of the composite part $P_1$ in the figure data file $33b_1$.

When the ladder circuit is generated from such composite part $P_1$, the above variable numbers and "automatic lamp output" and "manual lamp output", which are variable numbers when the lamp $L_1$ is lighted on, are registered in the ladder list $LL_1$ shown in FIG. 68 by the ladder circuit generating section 32i. The variable numbers "automatic", "manual", and "stop" are related in advance to switches, and the variable numbers "automatic lamp output" and "manual lamp output" are related in advance to a lamp. These variable numbers are registered sequentially in the ladder list $LL_1$ so as to realize the functions of the composite part $P_1$. Also, addresses (such as X0010 and X0001) which are assigned to the respective variable numbers are registered together with the variable numbers. Further, in accordance with the functions (such as switches and a lamp) related to the respective variable numbers, and the whole function of the composite part $P_1$, the ladder commands (such as LD and ANDN) corresponding to the respective variable numbers are registered automatically. As a result of this, it is possible to obtain the commands by the combination of the ladder commands and the addresses.

In accordance with the ladder list $LL_1$, the ladder editor 32a draws the ladder circuit corresponding to the composite part $P_1$ on the ladder window $32a_1$. The ladder circuit, which is created as a subroutine, is made up of an automatic operation section on the subroutine start side (SUBSTART composite switch) and the manual operation section on the subroutine end side (SUBEND composite switch). In any ladder circuits, self holding circuits are created by OR so that a lamp is ON when the set condition of the LD and ANDN is established, and so that the lamp is kept in an ON state even if the switch of LD is OFF. Further, the lamp is OFF when the stop (ANDN) is ON to establish for a reset condition.

As shown in FIG. 69(a), in case the composite part $P_2$ of the counter is positioned on the screen generating window $32b$, the ladder circuit shown in FIG. 69(b) is generated. The composite part $P_2$ is composed of a numeral value indicator $N_1$ for displaying a setting value, a numeral value indicator $N_2$ for displaying a counting value, a lamp $L_2$ which is lit up when counting up is done, and a switch $S_4$ with a lamp for a counting reset. The counter causes the lamp $L_2$ to light on when a counting value (CNT.CV), which is displayed successively on the numeral value indicator $N_2$, reaches to the setting value (CNT.PV), which is set on the numeral value indicator $N_1$. Further, the counter resets the counting value to light the switch $S_4$ having a lamp when the switch $S_4$ having a lamp is turned ON. Still Further, on the composite part $P_2$, displayed is the variable number "SET" for setting a setting value for functioning as a counter, the variable number "RESET" for a reset input, and the variable number "CNT.UP" for counting up output.

When the ladder circuit is generated from such composite part $P_2$, the above variable numbers and "CNT.R", which is a variable number for a reset output, and "CNT.EQ", which is a variable number for detection of a counting up (matching detection of a setting value and a count value), are registered in the ladder list $LL_2$ shown in FIG. 70 by the ladder circuit generating section 32i. The variable number "SET" is associated in advance with a counter, the variable number "RESET" is associated in advance with a switch, and the "CNT.R" and "CNT.UP" are associated in advance with lamps. These variable numbers are registered sequentially in the ladder list $LL_2$ so as to realize the functions of the composite part $P_2$. Also, addresses (such as X0100 and X0101) which are assigned respectively to the variable numbers are registered in the ladder list $LL_2$, together with the variable numbers. Further, in accordance with the functions (such as switches and a lamp) related to the respective variable numbers, and the whole function of the composite part $P_2$, the ladder commands (such as CTU and LD) corresponding to the respective variable numbers are registered automatically in the ladder list $LL_2$. As a result of this, it is possible to obtain the commands by the combination of the ladder commands and the addresses.

In accordance with the ladder list $LL_2$, the ladder editor 32a draws the ladder circuit corresponding to the composite part $P_2$ on the ladder window $32a_1$. The ladder circuit, which is created as a subroutine, is composed of a counter section on a subroutine start side (SUBSTART counter), a reset section in middle, and a counting up section on a subroutine end side (SUBEND counter). When the setting value and the count value match with each other as a result of a comparison command, the SUBEND counter turns ON Q output, and then, turns ON a counting up output.

Note that, in a count input CE of the counter section, a normally-open contact (not shown) for a count clock supply is usually positioned.

As shown in FIG. 71(a) and FIG. 71(b), since stored for each composite part in subfiles, the ladder circuit corresponding to the composite switch and the counter as described above is generated as a block independent from a subroutine or a main routine. When the ladder circuit is generated as a subroutine, a return command (RET) is described at the end with out exception as shown in FIGS. 68 and 70. Also, in order to jump to such ladder circuit, incorporated in the main routine is a command (CALL command) for jumping under no condition to the circuit of the subroutine names "composite switch" and "counter" shown in FIGS. 71(a) and 71(b). Further, in case the above ladder circuit is not generated as a subroutine, a command (JMP command) for jumping under no condition to the specified step is incorporated in the main routine (not shown).

As described above, in the first to third display/control systems of the present embodiment, the ladder circuit generating section 32i provided automatically generates the ladder circuit corresponding to the composite parts on the ladder window $32a_1$ simply by positioning the composite parts on the screen generating window $32b_1$, as shown in FIG. 67(c). Therefore, the input operation by a user substantially becomes unnecessary, which is conventionally needed for generating the ladder circuit by the combination of a plurality of ladder commands corresponding to the composite parts. Thus, it is possible to drastically increase the efficiency of generating the user program including such ladder. Moreover, generating the ladder circuit by positioning the composite parts provides an operation environment in which it is visually easy to recognize, thereby improving operability.

Further, since adopted is such file structure that the ladder circuits corresponding to the composite parts are stored individually in separate subfiles, a decentralized process is possible and file management in control sections is easy, unlike a conventional editing apparatus with which the user programs for run time control (performance control) are managed in a single file. In addition, the adoption of such file structure makes it easy to associate the composite parts with the ladder circuits, thereby increasing the affinity of the ladder editor 32a and the screen generating editor 32b.

Still further, generating the ladder circuit as a subroutine makes it possible to generate the ladder circuit of the composite parts, independently from generating of the ladder circuit of the main routine. Therefore, it is possible to increase the degree of freedom in a program design and to drastically reduce numbers of steps of detailed designing process of the ladder circuit corresponding to the composite parts.

Note that, in the present embodiment, mainly explained is the example of automatically generating a ladder circuit by positioning the composite parts on the screen generating window $32b_1$. However, the ladder symbol corresponding to the part can be generated by positioning a single part on the screen generating window $32b_1$. In such case, unlike the above ladder circuit, the generated ladder symbol is stored in the file which the main routine is registered, not in the subfile.

Sixth Embodiment

Explained below is a sixth embodiment of the present invention, with reference to FIGS. 54, 55, 72 to 83.

Figure 72:
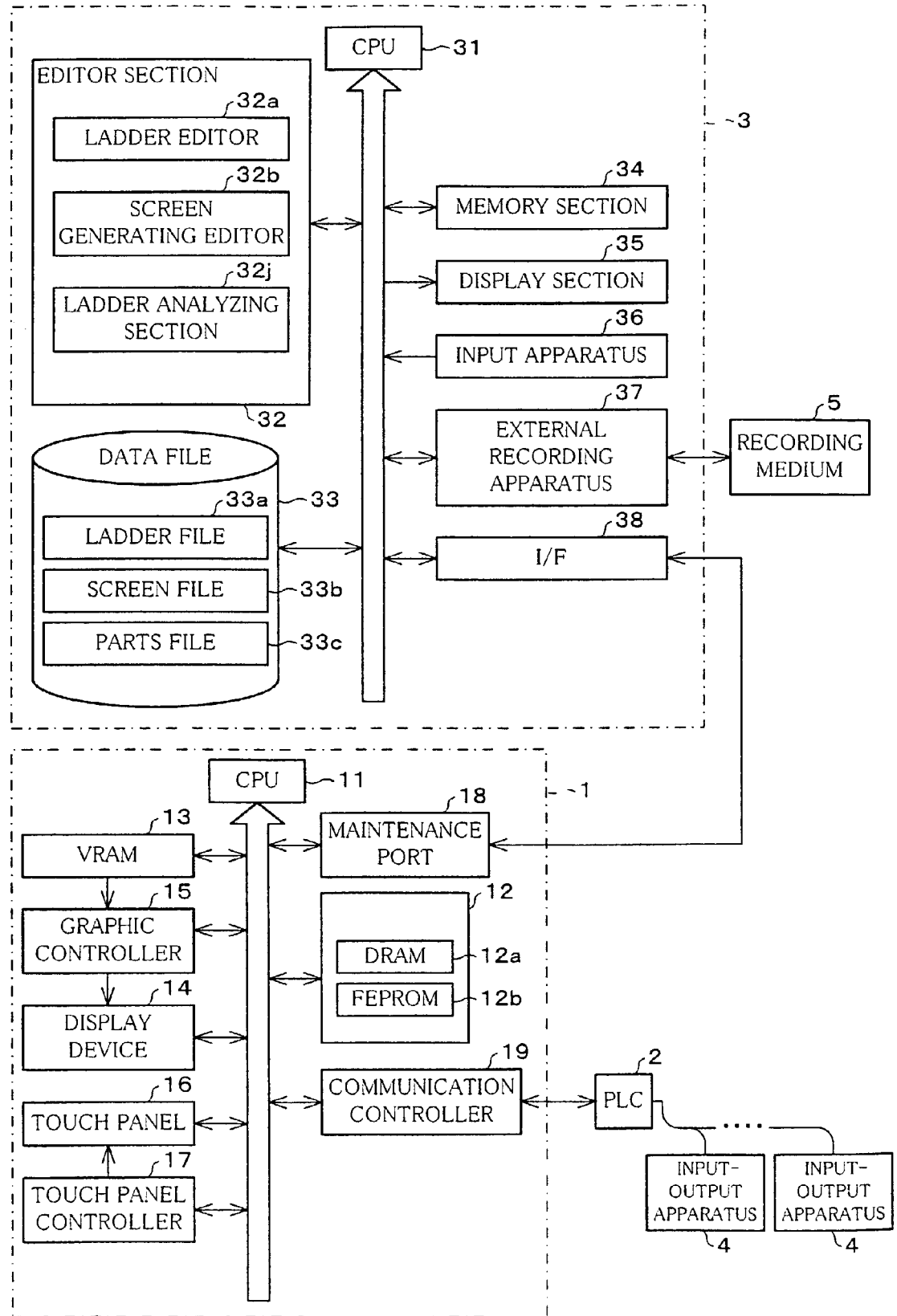
FIG. 72 is a block diagram illustrating constitution of a first display/control system of a sixth embodiment of the present invention.

To begin with a first display/control system shown in FIG. 72 includes a programmable display apparatus 1 and a PLC 2. A computer 3 connected to the programmable display apparatus 1 is provided with a CPU 31, an editing section 32, a memory section 34, a display device 35, an input apparatus 36, an external recording apparatus 37, and an interface 38, similarly to the computer 3 of the display/control system shown in FIG. 1. The editing section 32 includes a ladder editor 32a, a screen generating editor 32b, and a ladder analyzing section 32j.

The ladder editor 32a, which usually generates ladder programs in a sequence continuously, may be so arranged as to provide a page mode in which the ladder program is generated per one screen of a user screen. When the ladder program is generated in the page mode, the ladder program equivalent to one page is stored in a separate file, every time the ladder program equivalent to one page is generated. For this reason, the ladder editor 32a is provided with a user interface (for example, a dialog box) for storing the ladder program in a page-by-page manner.

The ladder analyzing section 32j, which is extracting means, analyzes ladder commands included in the ladder program generated by operation of a user using the ladder editor 32a. Then, with respect to the single ladder program, the ladder analyzing section 32j extracts collectively parts of the screen generating editor 32b, which are associated with the respective ladder commands, and registers the parts in a parts file 33e (see FIG. 80), with respect to the single user screen. The parts file 33e is described later. The ladder commands are fixedly associated with the parts, and the ladder analyzing section 32j has data as to the association. Specifically, as shown in FIG. 73, an LD command and an AND command, which are ladder commands for representing the normally-open contact, are associated with parts such as switches and sensors (ON/OFF type), while an LDN command and an ANDN command, which are ladder commands for representing the normally-close contact, are similarly associated with the parts such as the switches and the sensors. Moreover, an OUT command, which is a ladder command for representing a coil output, is associated with parts such as lamps and LEDs.

Figure 80:
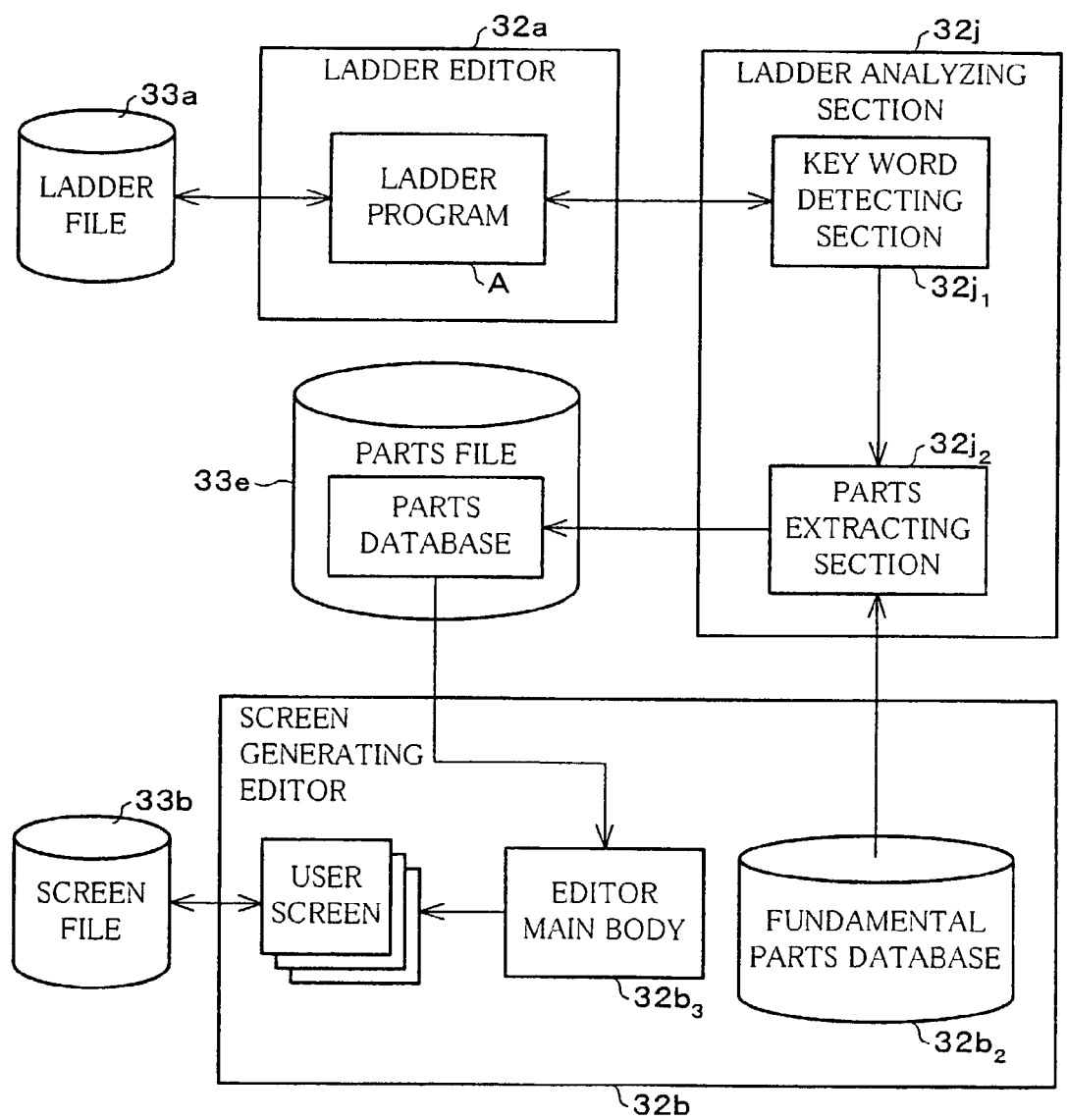
FIG. 80 is a block diagram showing association between each section of an editing section and each section of a data file, in connection with the process shown in FIG. 78.
Figure 81:
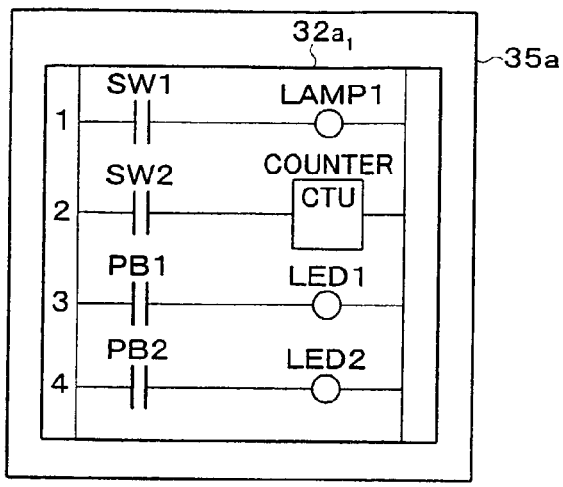
FIG. 81(a) is an explanatory view showing a ladder program generated on a ladder window.
FIGS. 81(b) to 81(e) are explanatory views illustrating a process for generating a user screen by using the parts database obtained by the procedure of process shown in FIG. 79.
Figure 81:
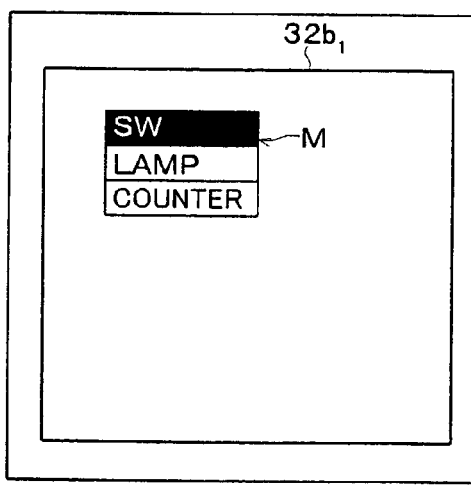
Figure 81:
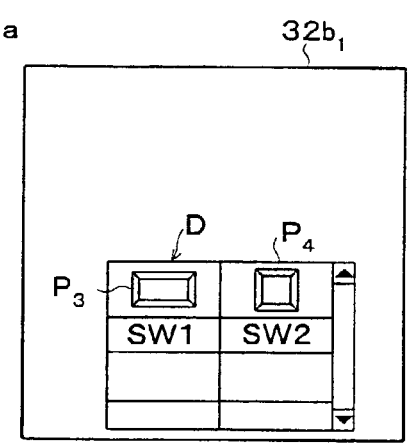
Figure 81:
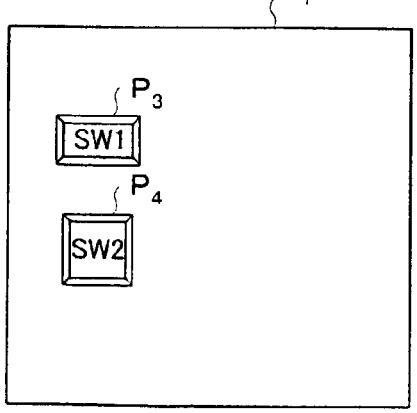
Figure 81:
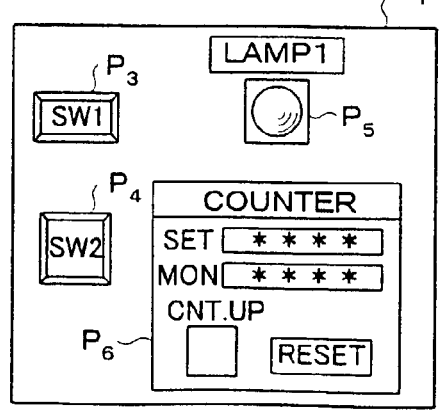

The analysis of the ladder commands by the ladder analyzing section 32j is carried out by a key word detecting section $32j_1$ and a parts extracting section $32j_2$, which are shown in FIG. 80 and provided to the ladder analyzing section 32j. The key word detecting $32j_1$ detects a key word associated with the ladder command out of the ladder program, in such an order that begins from an input bus-line to an output bus-line in the ladder diagram and is in step-by-step manner. On the other hand, the parts extracting section $32j_2$ extracts the parts associated with the detected key word from a fundamental parts database $32b_2$. Moreover, the parts extracting section $32j_2$ writes a tag onto the extracted parts, where the tag is the above-described process instructions word W including information on the events to be carried on every base screen, in order that the extracted parts and the base screen are associated with the base screen. The fundamental parts database $32b_2$, which is a database for storing screen data of the fundamental parts such as switches, lamps, counters, is provided to the screen generating editor 32b.

Examples of methods of setting the key word include a method for setting the ladder command itself as the key word, as shown in FIG. 74(a) and a method for associating the key word with a variable number assigned to the ladder command, as shown in FIG. 74(b). In the method shown in FIG. 74(a), the LD command, the AND command, and the OUT command are respectively assigned to variable numbers, "START", "SW1" and "LAMP1", while each command is set as a key word. With this method, the key word does not need to be set specially. On the other hand, in the method shown in FIG. 74(b), key words "SW", which mean a switch, are associated with the variable numbers "START" and "SW1", making key words "SW:START" and "SW:SW1", respectively. Meanwhile, "LAMP1" is associated with a key word "LAMP", which means a lamp, so as to be "LAMP:LAMP1". With this method, it is possible to give the key word an functional attribution as parts.

By the way, the ladder analyzing section 32j extracts, together with the parts, link information such as bit data of switch for associating the ladder command and parts and incidental information such as comments given individually to the ladder commands by the user, and registers the parts, the link information, and the incidental information in the parts file 33e. Moreover, the ladder analyzing section 32j registers, in the parts file 33e, data such as setting value for processing functions (such as counting, timing, comparing, various calculating) of the PLC 2 that corresponds to address and the ladder command assigned to device associated with the ladder command, together with the variable number, as variable number information.

The processing function is provided to not only the PLC 2, but also a programmable display apparatus 1 of a second display/control system and a computer 3 of a third display/control system, which function as PLCs and are described later. Moreover, the incidental information may be set in association with the variable number.

In addition, the ladder analyzing section 32j may be included in each of the ladder editor 32a and the screen generating editor 32b, as a function of one of the editors or a common function of the editors 32a and 32b.

In the data file 33, for example, a user program is stored in the ladder file 33a shown in FIG. 54, while a user screen is stored in a screen file 33b shown in FIG. 55. Moreover, the parts file 33e is, as shown in FIG. 75(a), forms a parts database by storing the data of parts extracted by the ladder analyzing section 32j with respect to the user screen (per one screen). Moreover, the parts file 33e stores the link information, the incidental information, and variable number information as relating information (attribute information), in a data-by-data manner with respect to the data of the respective parts.

The second display/control system shown in FIG. 76 includes a programmable display apparatus 1 and a PLC 2, similarly to the first display/control system, but the programmable display apparatus 1 here is provided with an SRAM 12c in a memory section 12 as well as an input-output unit 20 and an I/O control interface 21, in order to be further provided with a PLC function.

Figure 77:
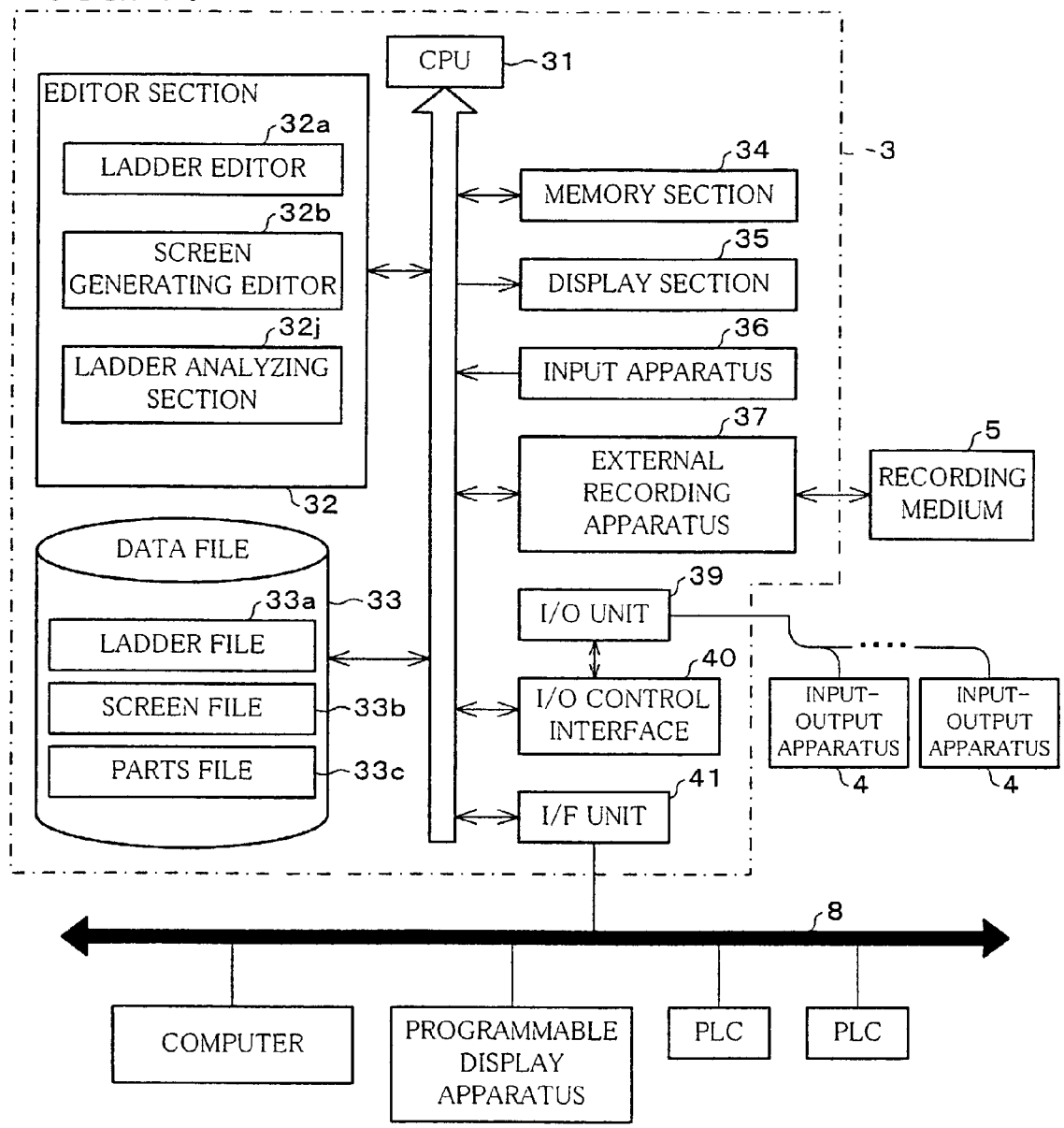
FIG. 77 is a block diagram showing constitution of the third display/control system of the sixth embodiment of the present invention.

The computer 3 of the third display/control system shown in FIG. 77 is provided with an input-output unit 39, an I/O control interface 40, and an interface unit 41, instead of the interface 38, in order to function as an open controller.

Figure 78:
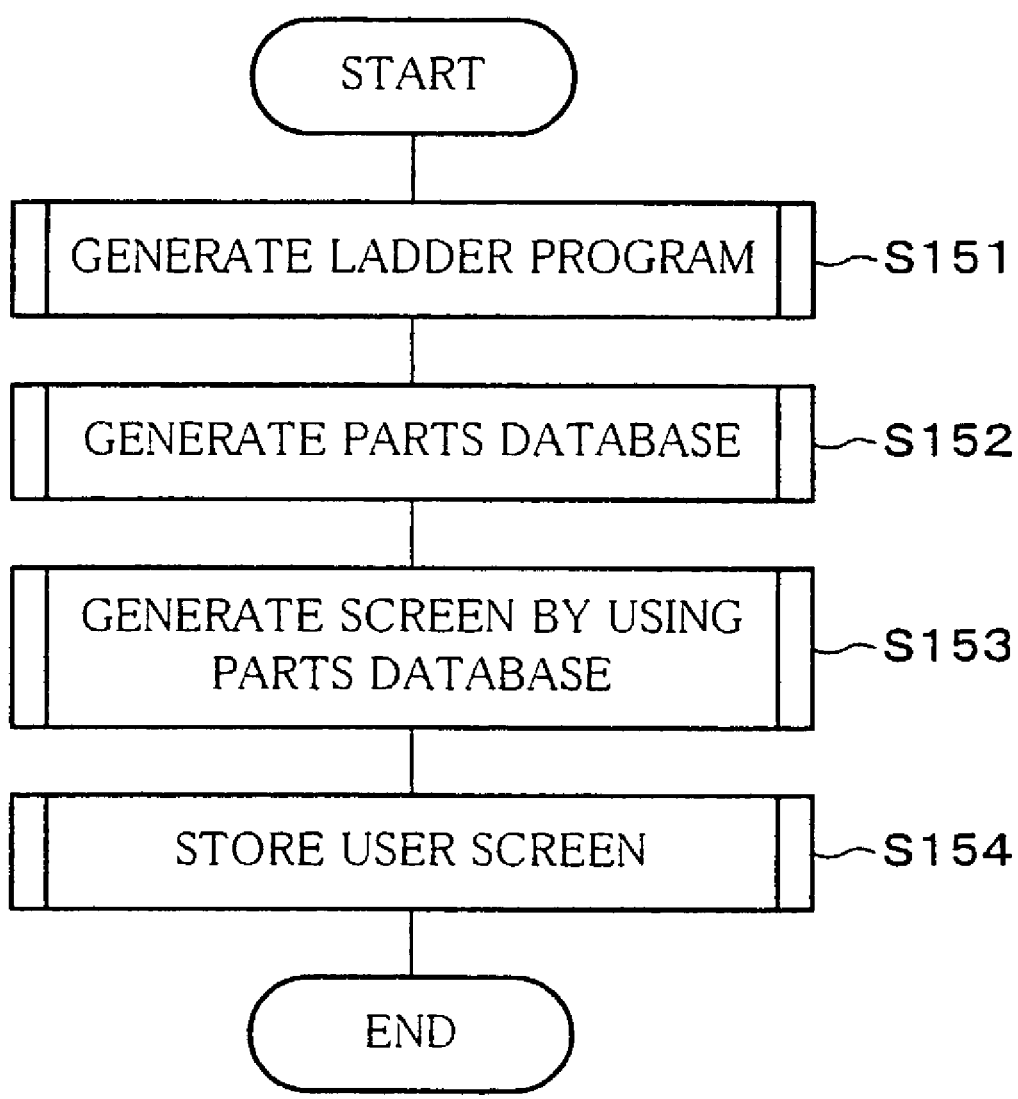
FIG. 78 is a flow chart illustrating a procedure of processes carried out by the respective display/control system, from generating a ladder program to generating a parts database to generating a user screen.

Here, explained is a processing procedure from generation of the ladder program to generation of the user screen, with respect to the first to third display/control systems, with reference to a flow chart shown in FIG. 78.

When the ladder program is generated, the ladder editor 32a is activated on the computer 3, a ladder window $32a_1$ is opened on a display section 35a (see FIG. 81(a)) of the display device 35. Moreover, when the user screen is generated, the screen generating editor 32b is activated and a screen generating window $32b_1$ is opened.

To begin with, the ladder program is generated on the ladder window $32a_1$ by operation by the user (S151). The ladder program is registered in the ladder file 33a after the generation. Next, the ladder analyzing section 32j analyzes, in order, the ladder commands in the ladder program so as to generate the parts database corresponding to the ladder command, by looking up the ladder file 33a (S152). Further, the screen generating editor 32b generates the user screen by using the parts database (S153). Then, the generated user screen is registered in the screen file 33b (S154), thereby finishing the process.

Figure 79:
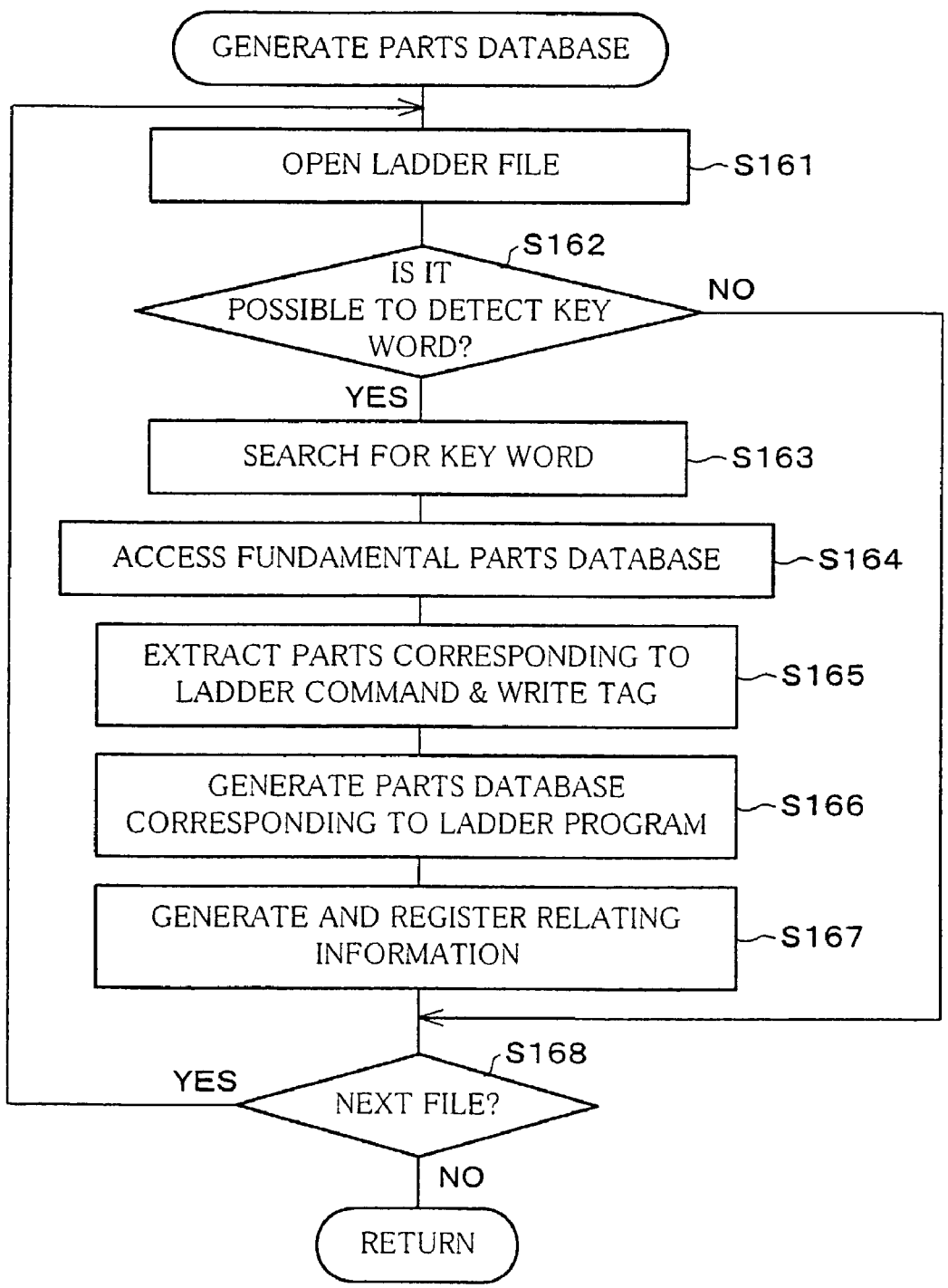
FIG. 79 is a flow chart illustrating a procedure of the generating of the parts database shown in FIG. 78.

Next, explained is a specific procedure of the generating process of the parts database, with reference to a flow chart in FIG. 79 and a block diagram in FIG. 80.

To begin with, a file of a ladder program A, for which a parts database is generated, is opened out of a plurality of ladder programs stored in the ladder file 33a (S161). Then, judged is whether or not the key word detection by the key word detecting section $32j_1$ is possible with respect to the file (S162). If possible, the detection of the key word is performed (S163). In case the key word detection is not possible because, for example, the key word is not set in the ladder program, S168 is performed thereafter.

Next, the parts extracting section $32j_2$ accesses to the fundamental parts database $32b_2$ (S164), and extracts the parts corresponding to the ladder commands out of the fundamental parts database $32b_2$ in accordance with the detected key word, while writing the tag onto the extracted parts (S165). The thus extracted parts is registered in the ladder file 33a, so as to generate the parts database (see FIG. 75(a)), which is partitioned by the tag in a screen-by-screen manner (S166).

Then, the relating information is generated and registered in the parts file 33e (S167). Further, judged is whether or not S161 to S167 are to be carried out for a next file (S168). In case S161 to S167 are not to be carried out for the next file, it means that the generating of the parts database is finished.

When the user screen is generated by using the parts database, an editor main body $32b_3$ of the screen generating editor 32b positions the parts corresponding to the ladder commands onto the base screen, by looking up the parts database. The generated user screen is stored in the screen file 33b.

Here, explained is an specific example how the above processes are carried out.

To begin with, as shown in FIG. 81(a), the ladder program is generated on the ladder window $32a_1$. The ladder program executes Step 1 in which the switch (SW1) and the lamp (LAMP1) are provided, Step 2 in which a switch (SW2) and a counter (COUNTER) are provided, Step 3 in which a push-button switch (PE1) and the LED (LED1) are provided, and Step 4 in which a push-button switch (PB2) and an LED (LED2) are provided.

Here, the ladder analyzing section 32j carries out S161 to S168, thereby generating the parts database for one ladder program for executing Steps 1 to 4. The parts database is looked up at a next time the screen generating editor 32b generates the user screen. Specifically, as shown in FIG. 81(b), a pull-down menu M is displayed on the screen generating window $32b_1$. For example, if the "SW", which indicates the switch, is selected on the pull-down menu M, displayed is a dialog box D including parts $P_3$ and $P_4$ of the switches corresponding to "SW1" and "SW2", as shown in FIG. 81(c).

When the part $P_3$ of SW1 is selected on the dialog box D, the part $P_3$ is positioned onto the screen generating window $32b_1$ as shown in FIG. 81(d), while the part $P_4$ of SW2 is selected, the part $P_4$ is positioned similarly. When such operation is also carried out for "LAMP" and "COUNTER" which are selected from the pull-down menu M, the respective parts $P_3$ and $P_4$ corresponding to "LAMP" and "COUTER" are positioned on the screen generating window $32b_1$, as shown in FIG. 81(e). As a result of this, completed is the positioning of the parts fetched in one screen with respect to the ladder program of steps 1 and 2. Similarly, carried out is the positioning of the parts fetched in one screen with respect to the ladder program of steps 3 and 4 (not shown).

Moreover, as shown in FIG. 81(e), "SW1", "SW2", "LAMP", and "COUNTER", which are displayed in the vicinity of the ladder symbols together with the respective parts $P_3$ to $P_6$, are fetched as the aforementioned incidental information into the parts database, and, if necessary, they are displayed as name plate together with the parts $P_3$ to $P_6$ on the user screen when positioning the parts $P_3$ to $P_6$. Also, the incidental information may be used as a variable number. This makes it possible to reduce the number of the information inputted by the ladder editor 32a.

As described above, the first to third display/control systems of the present embodiment are provided with the ladder analyzing section 32j, in which parts database corresponding to one ladder program is collectively generated in advance. With this, a user generates the user screen by positioning parts on the screen generating window $32b_1$ in accordance with the parts database. Thus, because the parts database generated collectively by the ladder analyzing section 32j is used for generating the user screen, it is possible to carry out the process efficiently. In addition, because the parts corresponding to the ladder commands are used for generating the user screen, such trouble does not occur that although the parts correspond to the ladder commands, they are not reflected in the generation of the user screen.

Further, because the parts database is generated per screen of the user screen, the user can operate without considering which part of the ladder program equivalent to one screen of the user screen is. Therefore, it is possible to increase the efficiency of generating the user screen.

Furthermore, the ladder analyzing section 32j not only generates the parts database so as to supply the information of the ladder commands to the screen generating editor 32b, but the ladder analyzing section 32j also extracts relating information from the ladder program so as to supply the relating information to the screen generating editor 32b. This makes it possible to eliminate a need of carrying out the input again by the screen generating editor 32b, only for the relating information.

Figure 82:
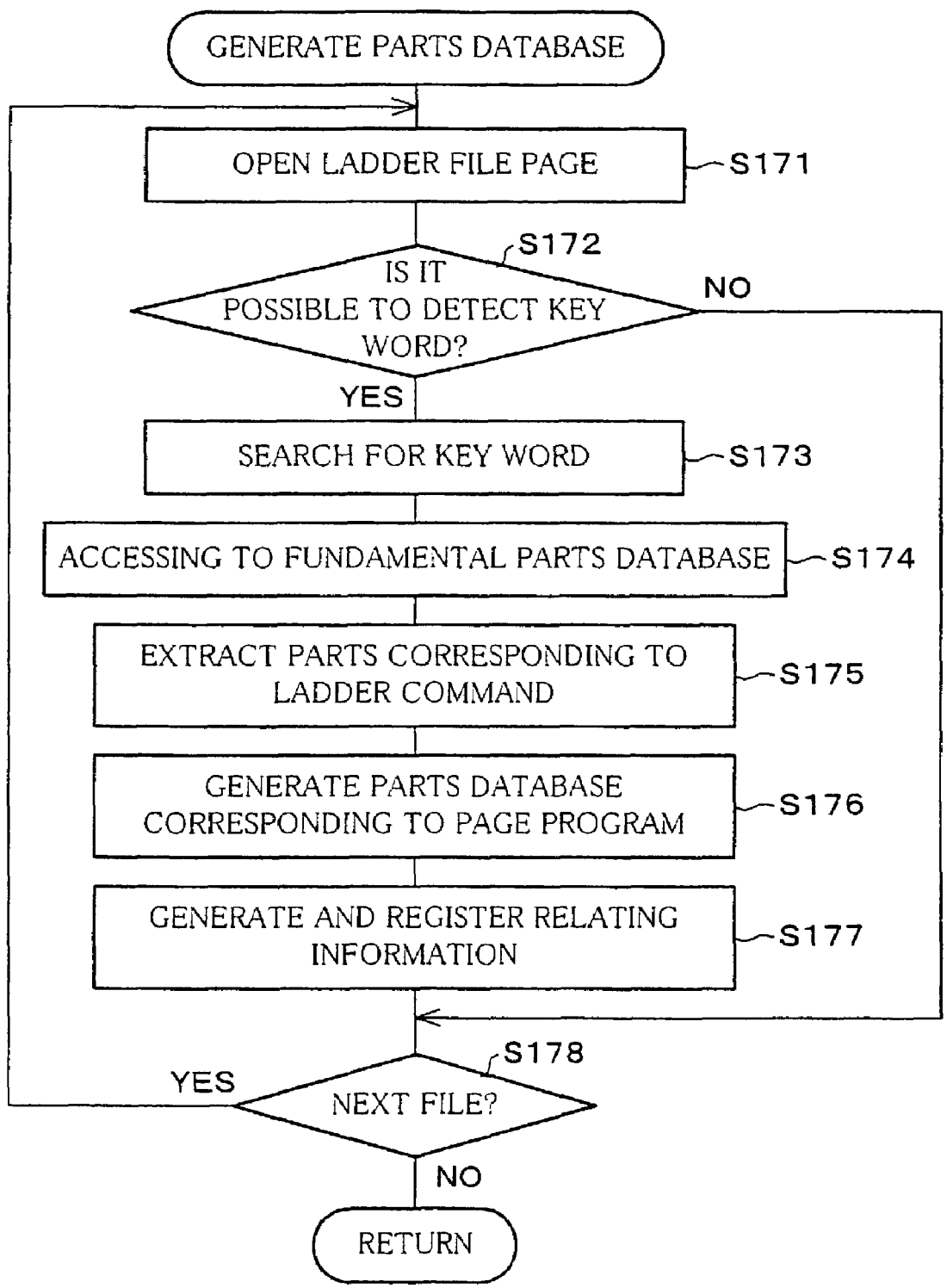
FIG. 82 is a flow chart showing a procedure of generating a parts database in accordance with a ladder program generated in a page mode.

Next, explained are the procedures of generating the parts database in case the ladder program is generated in the aforementioned page mode, with reference to the block diagram of FIG. 80 and the flowchart of FIG. 82.

Figure 83:
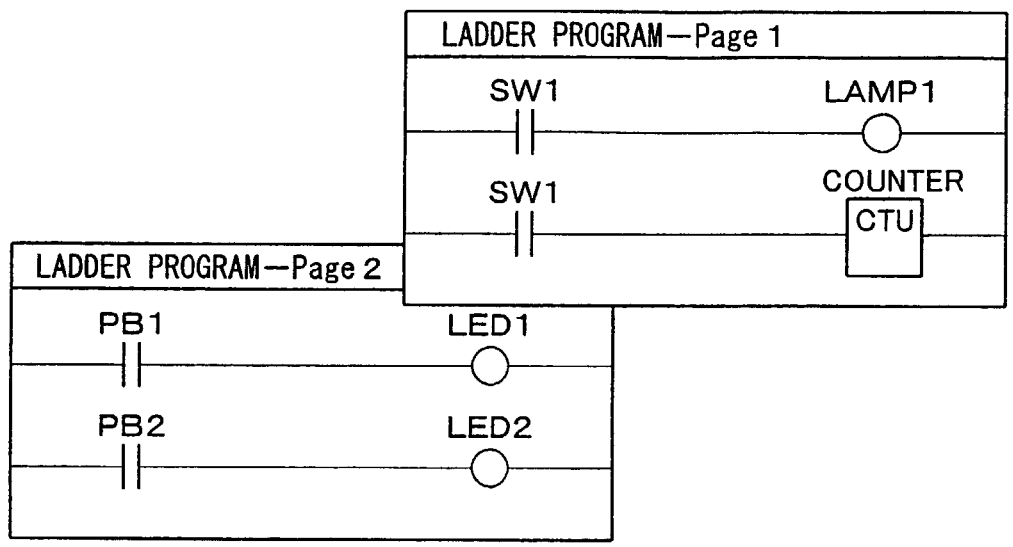
FIG. 83(a) is an explanatory view showing the ladder program generated in the page mode, where the ladder program is equivalent to two pages.
FIG. 83(b) is an explanatory view illustrating a user screen equivalent to two pages, corresponding to the ladder program shown in FIG. 83(a).
Figure 83:
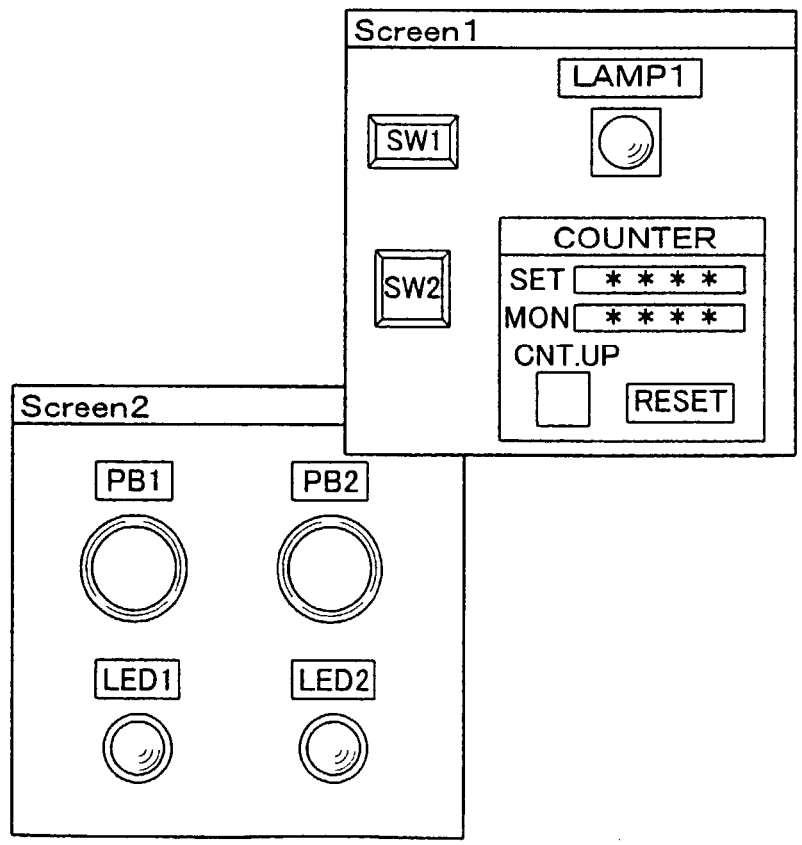
Figure 84:
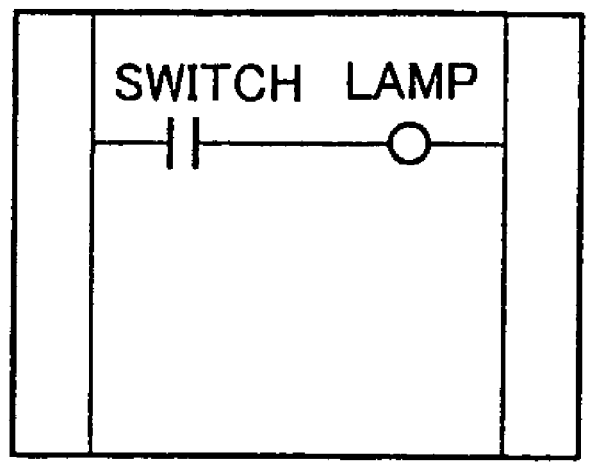
FIG. 84(a) is an explanatory view showing a ladder diagram to which incidental information is attached by a conventional ladder editor.
FIG. 84(b) is an explanatory view illustrating a screen in which the conventional editor attaches the incidental information to parts.
Figure 84:
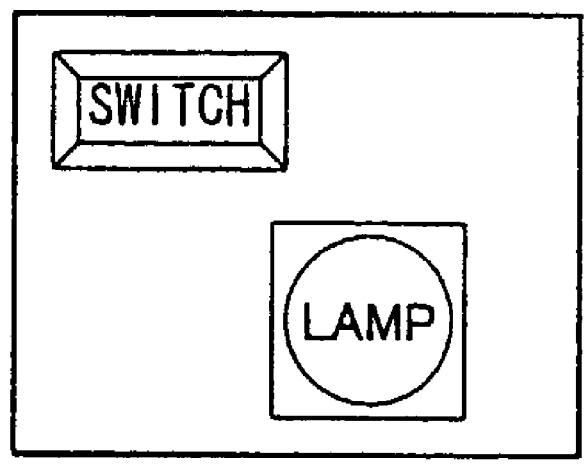

To begin with, a file is opened for each page equivalent to a screen of the user screen, from one of a plurality of ladder programs stored in the ladder file 33*a*, where in the one of the ladder programs the parts database is to be generated (S171). At this point, instead of the ladder program A of FIG. 80, opened is, for example, the partial ladder program file (page program), which is generated in such a manner that the partial ladder program file is divided in a page-by-page manner, as shown in FIG. 83(*a*). Judged is whether or not it is possible to carry out the key word detection for the file by the key word detecting section 32*j*$_1$ (S172). Here, if possible, the key word detection is carried out (S173), and, if not possible, S178 is performed thereafter.

Next, access to the basic parts database 32*b*$_2$ is carried out by the parts extracting section 32*j*$_2$ (S174) the part corresponding to the ladder command is extracted from the basic parts database 32*b*$_2$ in accordance with the detected key word (S175). The thus extracted part is registered in the ladder file 33*a* to generate the parts database (See FIG. 75(*b*)) (S176).

Then, the relating information is generated and registered in the pats file 33*e* (S177). Further, for a next page, judged is whether or not the processes of S171 to S177 are carried out (S178). In case the processes of S171 to S177 are not carried out, it means that the generation of the parts database is finished.

Figure 75:
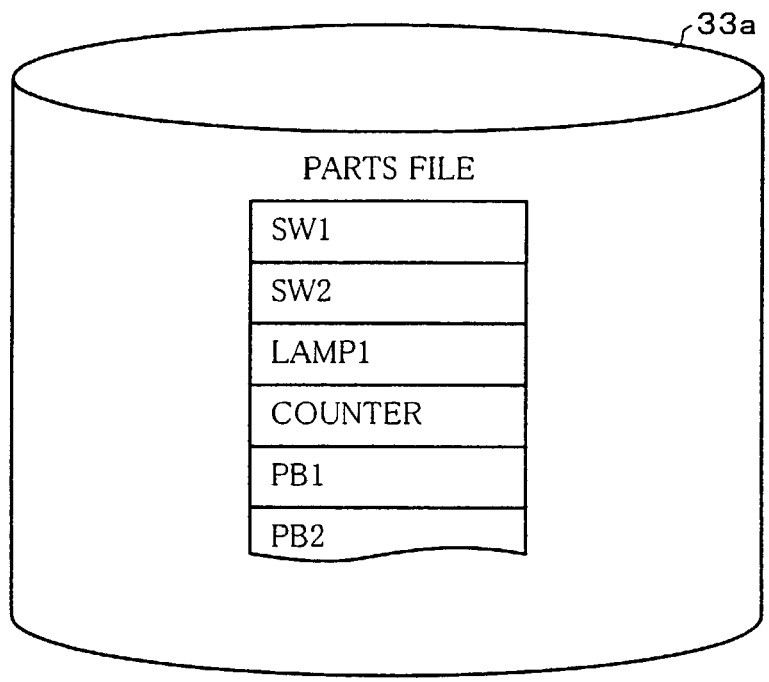
FIGS. 75(a) and 75(b) are explanatory views illustrating constitution of a parts file provided in the computer of the respective display/control system.
Figure 75:
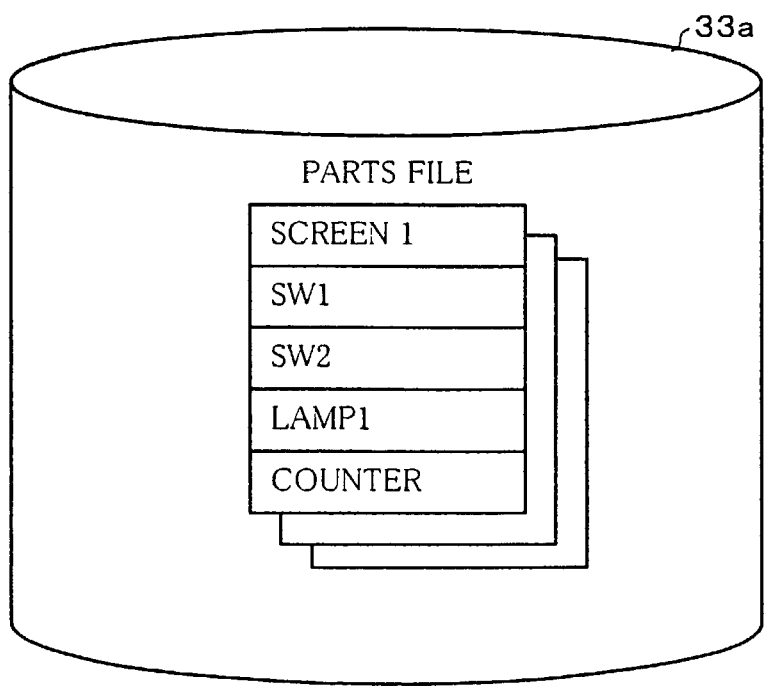

Thus, the parts database, which is generated in accordance with the ladder program generated by page mode, as shown in FIG. 75(*b*), is constructed as screen data independently for each screen. when the user screen is generated in accordance with the parts database, the parts corresponding to the ladder commands are positioned on the base screen while the editor main body 32*b*$_3$ of the screen generating editor 32*b* refers to the parts database. Then the user screen (such as screens 1 and 2 shown in FIG. 83(*a*) and FIG. 83(*b*)), which is generated corresponding to one page of the ladder program in a page-by-page manner, is stored in the screen file 33*b*.

Further, in such manner, when the ladder program is generated by the page mode, the process from the analysis of the ladder command by the ladder analyzing section 32*j* to the positioning of the parts by the screen generating editor 32*b* may be automated. Specifically, the process is carried out as follows.

To begin with, set in advance is the position at which the parts for each page registered in the parts database are positioned on the base screen, and the ladder analyzing process is started in such a state that the ladder analyzing section 32*j* and the screen generating editor 32*b* are activated. In the state that the parts database is generated in accordance with the result of the ladder analysis, when, by inputting, the user instructs the screen generating editor 32*b* to automatically position the parts, the parts of the parts database are positioned at the previously specified positions of the base screen. Further, if necessary, by operating the editor main body 32*b*$_3$, the operations such as adjusting the locations of the parts, positioning special parts other than the basic parts, figure drawing, and inputting of texts, are carried out, so as to complete the screen that the user desires.

Thus, by carrying out the automatic positioning of parts, the user can carry out the operation such as changing locations at which the parts are positioned, if necessary, as described above. This makes it possible to drastically reduce the working burden of the user. Moreover, in case the parts database is generated from the ladder program which is generated by page mode, the parts are extracted per each screen since the ladder program is generated, corresponding to one screen of the user screen. Therefore, as in the case where the darts database is collectively generated from the usual ladder program as described before, the process of writing the tag (See S165 of FIG. 79) is not necessary.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

An editing apparatus of the present invention is provided with data copying means for copying data common to the display content program and the control procedure program, from/to a display content program file to/from a control procedure program file, where the display content program file stores the display content program, and the control procedure program file stores the control procedure program, wherein the data copying means copies data, which is common to one of the display content program and the control procedure program and a figure symbol generated by CAD (Computer-Aided Design), from a CAD database to one of the display content program file and the control procedure program file.

Because in this way the data stored in one of the files is copied to the other one of the file, it is possible to generate the common database between the files. As a result, it is not necessary to generate a common database common to both of the editing means. Further, duplicate input of data by both of the editing means is avoided. Furthermore, the copying of data improves efficiency of processing.

An editing apparatus of the present invention is provided with (ii) a single file for storing ① screen data, which is inclusive of (a) inherent data inherent to the display content program, (b) variable names set with respect to the respective control-object apparatuses, ② control data, which is inclusive of the variable names and inherent data inherent to the control procedure program, the common data including the variable names, and ③ common data, which is common to (a) the display content program, (b) the control procedure program, and which is inclusive of the variable names, (iii) data generating means for causing one of the first and second editing means to generate, in the file, inherent data, which is inherent to one of the display content program and the control procedure program, based on the variable name of the common data obtained by searching out of the file.

In this way, it is possible to avoid duplicate input of data by the editing means (both of the editing means). Moreover, because the inclusion of the variable number names in the common data allows that event names, such as symbols corresponding to control-object apparatuses, operation instructions, operation states of the control-object apparatuses are used as the variable number names.

The editing apparatus of the present invention is provided with incidental information supplying means for supplying, from one of the editing means to the other of the editing means, variable number names, which are so set as to correspond to addresses of the respective control-object apparatuses, where the variable numbers are supplied as incidental information regarding a plurality of display symbols for representing the control-object apparatuses and states thereof, or a plurality of control symbols for representing control operation that corresponds to the control-object apparatuses.

In this way, the variable numbers, which has been already inputted by one of the editing means, is supplied, as the incidental information, to the other of the editing means, thereby allowing to use information in common.

An editing apparatus of the present invention is provided with (i) registering means for registering a variable number assigned to an address of the control-object apparatus in such a manner that the variable number is associated with functionally associated ones of image blocks provided respectively in the first and second editing means, so as to display the variable number on the first and second editing screens, and (ii) display means for displaying the registered variable number, and for displaying, in accordance with operation of selecting the displayed variable number and indicating the selected variable number on one of the first and second editing screens, the image block associated with the variable number on the editing screen on which the variable number is indicated.

Because the image block is displayed in accordance with the registered variable number in this manner, the image block is automatically generated as long as the variable number is registered, without regard to how the program is generated. Therefore, it is possible to realize a simple generation of program that deals with various ways of generation.

An editing apparatus of the present invention is further provided with (i) the first editing means, which assigns an address to each function of an image block having a plurality of the functions, via variable numbers that associate addresses and names of the control-object apparatuses, and (iii) program generating means for generating, upon positioning the image block on the first editing screen by the first editing means, a partial program corresponding to the image block by registering variable numbers on a program list for storing commands that compose the control procedure program in accordance with order of execution, where the variable numbers are associated with each of the functions of the image block.

In this manner, the partial program is generated simply by positioning the image block onto the first editing screen in terms of operation, thereby significantly reducing a number of steps of designing that users should do. Therefore, the efficiency of the generation of the control procedure program is improved.

An editing apparatus of the present invention is provided with extracting means for associating in advance commands for composing the control procedure program with an image block for composing the display content program, and for extracting, with respect to a plurality of the commands, the image block associated with the commands included in the control procedure program generated by the second editing means.

Because this realizes extraction of the image block with respect to a plurality of the commands, efficiency of processing is improved, while the image block corresponding to the commands is used in the display content program. Therefore, it is possible to generate the display content program efficiently and precisely.

The invention claimed is:

1. An editing apparatus, comprising:
first editing means for generating a display content program for setting a content of a display screen for displaying states of input-output apparatuses by using display symbols, the display content program including screen data including variable names and the display symbols, the variable names being set with respect to the input-output apparatuses respectively;
second editing means for generating a control procedure program for setting, by control symbols representing commands, a procedure of control for controlling the input-output apparatuses, the control procedure program including control data including the control symbols and the variable names; and
a single file integrally storing (1) the screen data, (2) the control data, and (3) variable data, which is common to (a) the display content program, (b) the control procedure program, and which includes the variable names; and
data generating means for obtaining the variable data by searching out of the file, causing the first editing means to generate, in the file, data of the display symbols and causing the second editing means to generate, in the file, data of the control symbols based on the variable name of the obtained variable data.

2. The editing apparatus as set forth in claim 1, wherein:
the data generating means configures in the file, the control procedure program by combining the variable data and the control data, where the variable names of the variable data are primary keys and the variable names of the control data are foreign keys, and configures the display content program by combining the variable data and the screen data, where the variable names of the variable data are primary keys and the variable names of the screen data are foreign keys.

3. The editing apparatus as set forth in claim 1, wherein:
in the file, the variable names are root segments while (a) the control data, (b) the screen data and (c) addresses of respective input-output apparatuses are subordinate segments being subordinate to the root segments.

4. The editing apparatus as set forth in claim 1, wherein:
in the file, treated as encapsulated objects are (a) the control symbols, (b) the display symbols, (c) the variable names, and (d) addresses of the respective input-output apparatuses composing the variable data, where, in each of the objects, both the display symbols, the control symbols, and the addresses are treated as data, and the variable names are treated as procedures, the data being accessed via the variable names.

5. The editing apparatus as set forth in claim 1, wherein:
incidental information supplying means for supplying, from one of the editing means to the other of the editing means, the variable names which are so set as to correspond to addresses of the respective input-output apparatuses, as incidental information regarding either of the plurality of the display symbols, or the plurality of the control symbols.

6. The editing apparatus as set forth in claim 5, wherein:
the incidental information supplying means supplies the incidental information in accordance with operation of selecting one of the display symbols and the control symbols that is displayed on an editing screen of one of the editing means, and copying the one of the display symbols and the control symbols, and
the incidental information supplying means causes the copied one of the display symbol and the control symbol to be automatically drawn together with the incidental information, by looking up the common data.

7. A computer-readable recording medium that stores an editing program, the editing program executing:
a first editing process for generating a display content program for setting a content of a display screen for displaying states of input-output apparatuses by using display symbols, the display content program including screen data including variable names and the display symbols, the variable names being set with respect to the input-output apparatuses respectively;

a second editing process for generating a control procedure program for setting, by control symbols representing commands a procedure of control for controlling the input-output apparatuses, the control procedure program, including control data including the control symbols and the variable names; and a data generating process for obtaining the variable data by searching out of a single file, causing the first editing process to generate, in the single file, data of the display symbols and causing the second editing process to generate in the single file, data of the control symbols based on the variable name of the obtained variable data, the file integrally storing (1) the screen data, (2) the control data, and (3) variable data, which is common to (a) the display content program, (b) the control procedure program, and which includes the variable names.

8. The recording medium as set forth in claim 7, wherein:

the recording medium stores the editing program executing an incidental information supplying process for supplying, from one of the editing processes to the other of the editing processes, variable names, which are so set as to correspond to addresses of the respective input-output apparatuses, where the variable names are supplied as incidental information regarding the plurality of the display symbols, or the plurality of the control symbols.

9. The recording medium as set forth in claim 8, wherein:

the incidental information supplying process supplies the incidental information in accordance with operation of selecting an image block that is displayed on an editing screen of one of the editing processes, and copying the image block, and the incidental information supplying process causes the copied one of the display symbol and the control symbol to be automatically drawn together with the incidental information, by the one of the first and second editing processes, by looking up common data.

10. A computer-readable recording medium that stores an editing program, the editing program executing:

one of a first editing process and a second editing process, the first editing process for generating a display content program being for setting a content of a display screen for displaying states of input-output apparatuses by using display symbols, the display content program including screen data including variable names and the display symbols, the variable names being set with respect to the input-output apparatuses respectively, and the second editing process being for generating a control procedure program for setting, by control symbols representing commands, a procedure of control for controlling the input-output apparatuses, the control procedure program including control data including the control symbols and the variable names; and a data generating process for obtaining the variable data by searching out of a single file, causing the first editing process to generate, in the single file, data of the display symbols and causing the second editing process to generate, in the single file, data of the control symbols based on the variable name of the obtained variable data, the file integrally storing (1) the screen data, (2) the control data; and (3) variable data, which is common to (a) the display content program, (b) the control procedure program, and which includes the variable names.

11. The recording medium as set forth in claim 10, wherein:

the recording medium stores the editing program executing an incidental information supplying process for supplying, from one of the editing processes to the other of the editing processes, variable names, which are so set as to correspond to addresses of the respective input-output apparatuses, where the variable names are supplied as incidental information regarding the plurality of the display symbols, or the plurality of the control symbols.

12. The recording medium as set forth in claim 11, wherein:

the incidental information supplying process supplies the incidental information in accordance with operation of selecting an image block that is displayed on an editing screen of one of the editing processes, and copying the image block, and the incidental information supplying process causes the copied one of the display symbol and the control symbol to be automatically drawn together with the incidental information, by the one of the first and second editing processes, by looking up common data.

* * * * *